(12) United States Patent
Graham et al.

(10) Patent No.: US 12,307,079 B2
(45) Date of Patent: May 20, 2025

(54) DEVICES, METHODS, AND GRAPHICAL USER INTERFACES FOR ADJUSTING THE PROVISION OF NOTIFICATIONS

(71) Applicant: Apple Inc., Cupertino, CA (US)

(72) Inventors: David C. Graham, Columbus, OH (US); Heena Ko, San Francisco, CA (US); Caelan G. Stack, Belmont, CA (US); Christopher P. Foss, San Francisco, CA (US); Justin S. Titi, Morgan Hill, CA (US); Matthew E. Shepherd, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/483,751

(22) Filed: Sep. 23, 2021

(65) Prior Publication Data

US 2022/0365640 A1    Nov. 17, 2022

Related U.S. Application Data

(60) Provisional application No. 63/187,896, filed on May 12, 2021.

(51) Int. Cl.
    *G06F 3/04847* (2022.01)
    *G06F 3/0483* (2013.01)

(52) U.S. Cl.
    CPC ........ *G06F 3/04847* (2013.01); *G06F 3/0483* (2013.01)

(58) Field of Classification Search
None
See application file for complete search history.

(56) References Cited

U.S. PATENT DOCUMENTS

| | | |
|---|---|---|
| 6,717,520 B1 | 4/2004 | Dorenbosch |
| 8,218,403 B2 | 7/2012 | Scott et al. |

(Continued)

FOREIGN PATENT DOCUMENTS

| | | |
|---|---|---|
| AU | 2019100493 A4 | 6/2019 |
| CN | 102841755 A | 12/2012 |

(Continued)

OTHER PUBLICATIONS

Amadeo, "Twitter Post [online]", https://twitter.com/ronamadeo/status/972152445848694789, Mar. 9, 2018, 2 pages.

(Continued)

*Primary Examiner* — Matthew Ell
*Assistant Examiner* — Gabriel Mercado
(74) *Attorney, Agent, or Firm* — Morgan, Lewis & Bockius LLP

(57) ABSTRACT

A computer system detects a first input requesting display of a home screen of the computer system, and in response, in accordance with a determination that a first activity mode is active on the computer system, displays a first home screen associated with the first activity mode, and enables provision of first notifications by the computer system in accordance with settings of the first activity mode; and in accordance with a determination that a second activity mode is active on the computer system, the computer system displays a second home screen associated with the second activity mode, and enables provision of second notifications by the computer system in accordance with settings of the second activity mode. The second home screen is different from the first home screen, and at least some settings of the second activity mode are different from the settings of the first activity mode.

50 Claims, 123 Drawing Sheets

(56) References Cited

U.S. PATENT DOCUMENTS

| | | |
|---|---|---|
| 8,477,566 B2 | 7/2013 | Lazaridis et al. |
| 8,553,502 B2 | 10/2013 | Lazaridis et al. |
| 8,768,648 B2 | 7/2014 | Panther et al. |
| 9,032,013 B2 | 5/2015 | Nukala et al. |
| 9,406,103 B1 | 8/2016 | Gray et al. |
| 9,461,833 B1 | 10/2016 | Marra et al. |
| 9,483,879 B2 | 11/2016 | Gourlay et al. |
| 9,541,986 B2 | 1/2017 | Rohrweck |
| 9,590,942 B1 | 3/2017 | Yeskel et al. |
| 9,693,311 B2 | 6/2017 | Cardozo et al. |
| 9,808,185 B2 | 11/2017 | Arnold et al. |
| 9,847,999 B2 | 12/2017 | Van Os et al. |
| 10,055,634 B2 | 8/2018 | Han et al. |
| 10,114,534 B2 | 10/2018 | Kasterstein et al. |
| 10,198,073 B2 | 2/2019 | Chaudhri et al. |
| 10,228,815 B2 | 3/2019 | Forstall et al. |
| 10,261,475 B1 | 4/2019 | Kahn et al. |
| 10,271,283 B2 | 4/2019 | Mujtaba et al. |
| 10,296,128 B1 | 5/2019 | Nold et al. |
| 10,311,745 B2 | 6/2019 | Arnold et al. |
| 10,334,054 B2 | 6/2019 | Van Os et al. |
| 10,338,773 B2 | 7/2019 | Murarka et al. |
| 10,410,035 B2 | 9/2019 | Han et al. |
| 10,521,107 B2* | 12/2019 | van Os ............... G06F 1/3206 |
| 10,860,207 B2 | 12/2020 | Van Os et al. |
| 10,943,411 B1 | 3/2021 | Powers et al. |
| 11,137,904 B1 | 10/2021 | Tyler et al. |
| 11,354,034 B2 | 6/2022 | Van Os et al. |
| 11,861,159 B2 | 1/2024 | Van Os et al. |
| 2002/0078393 A1 | 6/2002 | Parker |
| 2003/0236935 A1 | 12/2003 | Amemiya et al. |
| 2005/0120306 A1* | 6/2005 | Klassen ............ G06F 3/04817 |
| | | 715/765 |
| 2005/0154935 A1 | 7/2005 | Jin |
| 2005/0249023 A1 | 11/2005 | Bodlaender |
| 2006/0116178 A1 | 6/2006 | Vuong et al. |
| 2007/0150842 A1 | 6/2007 | Chaudhri et al. |
| 2007/0211877 A1 | 9/2007 | Martin et al. |
| 2007/0268784 A1 | 11/2007 | Xu |
| 2009/0143062 A1 | 6/2009 | Skinner et al. |
| 2009/0143114 A1 | 6/2009 | Vargas et al. |
| 2009/0284389 A1 | 11/2009 | Klassen et al. |
| 2009/0284482 A1 | 11/2009 | Chin |
| 2010/0295789 A1* | 11/2010 | Shin ..................... G06F 1/1626 |
| | | 715/765 |
| 2011/0119630 A1* | 5/2011 | Stroupe ................ H04M 1/663 |
| | | 715/841 |
| 2011/0231499 A1 | 9/2011 | Stovecek et al. |
| 2011/0283241 A1 | 11/2011 | Miller et al. |
| 2012/0112908 A1 | 5/2012 | Prykari et al. |
| 2012/0157165 A1* | 6/2012 | Kim ................... G06F 21/6218 |
| | | 455/566 |
| 2012/0233563 A1 | 9/2012 | Chakra et al. |
| 2012/0311466 A1* | 12/2012 | Kluttz ................. G06F 3/0488 |
| | | 715/760 |
| 2013/0024799 A1 | 1/2013 | Fadell et al. |
| 2013/0029729 A1 | 1/2013 | Logan et al. |
| 2013/0096768 A1 | 4/2013 | Lovett et al. |
| 2013/0100044 A1 | 4/2013 | Zhao et al. |
| 2013/0190032 A1 | 7/2013 | Li |
| 2013/0290757 A1 | 10/2013 | Barlow et al. |
| 2013/0332721 A1* | 12/2013 | Chaudhri .......... H04M 1/72451 |
| | | 713/100 |
| 2013/0346408 A1 | 12/2013 | Duarte et al. |
| 2014/0055388 A1* | 2/2014 | Yook .................... G06F 3/0488 |
| | | 345/173 |
| 2014/0068755 A1 | 3/2014 | King et al. |
| 2014/0106821 A1 | 4/2014 | Nakahara |
| 2014/0172996 A1 | 6/2014 | Deeter et al. |
| 2014/0232671 A1 | 8/2014 | Chaudhri |
| 2014/0245202 A1 | 8/2014 | Yoon et al. |
| 2014/0282174 A1 | 9/2014 | Dempski |
| 2014/0283142 A1* | 9/2014 | Shepherd ............. G06F 3/0488 |
| | | 726/30 |
| 2014/0365919 A1 | 12/2014 | Shaw et al. |
| 2015/0067365 A1 | 3/2015 | Nakazima et al. |
| 2015/0094120 A1 | 4/2015 | Suh et al. |
| 2015/0105125 A1 | 4/2015 | Min et al. |
| 2015/0186517 A1 | 7/2015 | Gilad et al. |
| 2015/0195789 A1 | 7/2015 | Yoon et al. |
| 2015/0249733 A1 | 9/2015 | Miura |
| 2015/0253894 A1 | 9/2015 | Mckenzie et al. |
| 2015/0261423 A1* | 9/2015 | Beaumont ............... G06F 9/451 |
| | | 715/778 |
| 2016/0005290 A1 | 1/2016 | Takahashi |
| 2016/0022202 A1 | 1/2016 | Peterson et al. |
| 2016/0034695 A1 | 2/2016 | Won et al. |
| 2016/0065708 A1 | 3/2016 | Yang et al. |
| 2016/0077724 A1* | 3/2016 | Lee ................... H04M 1/72451 |
| | | 715/703 |
| 2016/0124579 A1 | 5/2016 | Tokutake |
| 2016/0154549 A1 | 6/2016 | Chaudhri et al. |
| 2016/0235359 A1 | 8/2016 | Cho et al. |
| 2016/0248865 A1 | 8/2016 | Dotan-Cohen et al. |
| 2016/0255188 A1 | 9/2016 | Chaudhri et al. |
| 2016/0292994 A1 | 10/2016 | Grimme et al. |
| 2016/0337299 A1 | 11/2016 | Lane et al. |
| 2016/0357394 A1* | 12/2016 | Tae ................... H04W 52/0258 |
| 2017/0011210 A1 | 1/2017 | Cheong et al. |
| 2017/0099602 A1* | 4/2017 | Joo ........................ G06F 21/32 |
| 2017/0118162 A1 | 4/2017 | Ratiu et al. |
| 2017/0126609 A1 | 5/2017 | Sharifi et al. |
| 2017/0127009 A1 | 5/2017 | Friedrich |
| 2017/0127967 A1 | 5/2017 | Garcia Molina et al. |
| 2017/0185275 A1 | 6/2017 | Ziegler et al. |
| 2017/0189641 A1 | 7/2017 | Moturu et al. |
| 2017/0228114 A1* | 8/2017 | Brett .................... G06F 16/9535 |
| 2017/0302609 A1 | 10/2017 | Vardhan et al. |
| 2017/0347946 A1 | 12/2017 | Arnold et al. |
| 2017/0347949 A1 | 12/2017 | Arnold et al. |
| 2017/0352287 A1 | 12/2017 | Arnold et al. |
| 2017/0357217 A1 | 12/2017 | Raymann et al. |
| 2017/0357419 A1 | 12/2017 | Raymann et al. |
| 2017/0357439 A1 | 12/2017 | Lemay et al. |
| 2018/0032220 A1 | 2/2018 | Anzures et al. |
| 2018/0074693 A1 | 3/2018 | Jones et al. |
| 2018/0088787 A1* | 3/2018 | Bereza ................. G06F 3/04815 |
| 2018/0088795 A1 | 3/2018 | van Os et al. |
| 2018/0088797 A1 | 3/2018 | Mcatee et al. |
| 2018/0101297 A1 | 4/2018 | Yang et al. |
| 2018/0109629 A1 | 4/2018 | Van Os et al. |
| 2018/0121409 A1 | 5/2018 | Karunamuni et al. |
| 2018/0164973 A1 | 6/2018 | Kim et al. |
| 2018/0173928 A1 | 6/2018 | Han et al. |
| 2018/0188925 A1 | 7/2018 | Na et al. |
| 2018/0188935 A1 | 7/2018 | Singh et al. |
| 2018/0225945 A1 | 8/2018 | Moravek et al. |
| 2018/0226055 A1 | 8/2018 | Raymann et al. |
| 2018/0227377 A1 | 8/2018 | Trivedi et al. |
| 2018/0247440 A1 | 8/2018 | Heo et al. |
| 2018/0267593 A1 | 9/2018 | Ramasamy et al. |
| 2018/0336530 A1 | 11/2018 | Johnson et al. |
| 2019/0097957 A1 | 3/2019 | Phanshikar et al. |
| 2019/0150854 A1 | 5/2019 | Chung et al. |
| 2019/0179493 A1 | 6/2019 | Goenka et al. |
| 2019/0213060 A1 | 7/2019 | Raymann et al. |
| 2019/0278901 A1 | 9/2019 | Lewis |
| 2019/0289079 A1 | 9/2019 | Van Os et al. |
| 2019/0318608 A1 | 10/2019 | Rao et al. |
| 2019/0342251 A1 | 11/2019 | Dascola et al. |
| 2019/0342252 A1 | 11/2019 | Dascola et al. |
| 2019/0342447 A1 | 11/2019 | Ko et al. |
| 2019/0361714 A1 | 11/2019 | Rothkopf |
| 2020/0012423 A1 | 1/2020 | Cinek et al. |
| 2020/0098300 A1 | 3/2020 | Verma et al. |
| 2020/0120201 A1 | 4/2020 | Siritzky |
| 2020/0133477 A1 | 4/2020 | Van Os et al. |
| 2020/0228616 A1 | 7/2020 | Nishikawa et al. |
| 2021/0019953 A1 | 1/2021 | Pekelny et al. |
| 2021/0051226 A1 | 2/2021 | Ko et al. |
| 2021/0060429 A1* | 3/2021 | Juenger ................ G06F 3/0482 |
| 2021/0122469 A1* | 4/2021 | Wu .................... B64D 11/00154 |
| 2021/0173664 A1 | 6/2021 | Bai et al. |

(56) References Cited

U.S. PATENT DOCUMENTS

| | | |
|---|---|---|
| 2021/0216201 A1 | 7/2021 | Van Os et al. |
| 2021/0349617 A1 | 11/2021 | Crowley et al. |
| 2021/0349618 A1 | 11/2021 | Crowley et al. |
| 2021/0349619 A1 | 11/2021 | Crowley et al. |
| 2022/0404963 A1 | 12/2022 | Van Os et al. |
| 2023/0035905 A1 | 2/2023 | Dascola et al. |
| 2023/0161470 A1 | 5/2023 | Crowley et al. |
| 2024/0126429 A1 | 4/2024 | Van Os et al. |
| 2024/0406304 A1 | 12/2024 | Foss et al. |
| 2024/0430225 A1 | 12/2024 | Dascola et al. |

FOREIGN PATENT DOCUMENTS

| | | |
|---|---|---|
| CN | 103297939 A | 9/2013 |
| CN | 103514416 A | 1/2014 |
| CN | 104350794 A | 2/2015 |
| CN | 105791545 A | 7/2016 |
| CN | 106022062 A | 10/2016 |
| CN | 106027363 A | 10/2016 |
| CN | 106250133 A | 12/2016 |
| CN | 106462358 A | 2/2017 |
| CN | 107491257 A | 12/2017 |
| CN | 107968885 A | 4/2018 |
| EP | 3 312 713 A1 | 4/2018 |
| JP | H10-106344 A | 4/1998 |
| JP | 2011-509541 A | 3/2011 |
| JP | 4860505 B2 | 1/2012 |
| JP | 2015-045902 A | 3/2015 |
| JP | 2015-188275 A | 10/2015 |
| JP | 2016-105630 A | 6/2016 |
| JP | 2017-126067 A | 7/2017 |
| JP | 2017-208112 A | 11/2017 |
| JP | 2018-185830 A | 11/2018 |
| JP | 2019-111181 A | 7/2019 |
| KR | 2019/0115734 A | 10/2019 |
| WO | WO 2013/184530 A1 | 12/2013 |
| WO | WO 2014/029361 A1 | 2/2014 |
| WO | WO 2016/200584 A1 | 12/2016 |
| WO | WO 2017/027526 A1 | 2/2017 |
| WO | WO 2017/052043 A1 | 3/2017 |
| WO | WO 2018/191972 A1 | 10/2018 |
| WO | WO 2019/217020 A1 | 11/2019 |
| WO | WO 2020/242882 A1 | 12/2020 |

OTHER PUBLICATIONS

Apple, "iPhone User Guide for iOS 7.1 Software", https://manuals.info.apple.com/en_US/iphone_ios7_user_guide.pdf, Mar. 10, 2014, 162 pages.

Apple, "Stay Focused While Driving with iPhone", https://support.apple.com/guide/iphone/turn-on-do-not-disturb-while-driving-iphae754533b/ios#:~:text=Send%20an%20auto%2Dreply%20text%20message%20that%20you're%20driving&text=Go%20to%20Settings%20%3E%20Do%20Not%20Disturb%20%3E%20Auto%2DReply%20To,re%20not%20in%20your%20Contacts, 2022, 2 pages.

Black, "Samsung Galaxy S7 Silent Alarm Fix", https://www.youtube.com/watch?v=35LQtw7ucaw, Jan. 20, 2017, 4 pages.

Bohn, "Why Android Notifications Are Better Than the iPhone's", https://www.youtube.com/watch?v=bHtkjHSB5Nw, Apr. 18, 2018, 10 pages.

CNET, "Android Lollipop Lock-Screen Notification Tips", https://www.youtube.com/watch?v=LZTxHBOwzIU, Nov. 13, 2014, 3 pages.

Droid Life, "Android 5.0 Feature: Notification Access and Do Not Disturb", https://www.youtube.com/watch?v=SY2kAqCqOko, Oct. 17, 2014, 2 pages.

Frick, "Automatically Turn on Theater Mode on Android Wear Watch When Sleep Tracking", https://forum.urbandroid.org/t/automatically-turn-on-theater-mode-on-android-wear-watch-when-sleep-tracking/398, Mar. 6, 2018, 2 pages.

Google, "Limit Interruptions with Do Not Disturb on Android", https://support.google.com/android/answer/9069335?hl=en#zippy=%2Cset-what-to-block, 2022, 2 pages.

Hill, "From Oreo to Jelly Bean, Here's How to Turn Off Notifications in Android", https://web.archive.org/web/20180503062117/https://www.ditaltrends.com/android/how-to-turn-off-notifications-in-android, May 3, 2018, 10 pages.

Hill, Here's How to Use Do Not Disturb Mode in Android, https://web.archive.org/web/20180313165228/https://www.digitaltrends.com/mobile/do-not-disturb-mode-in-android, Mar. 13, 2018, 6 pages.

Hill, "How to Turn Off Notifications in Andoid", http://web.archive.org/web/20180203023547/https://www.digitaltrends.com/android/how-to-turn-off-notifications-in-android, Dec. 28, 2017, 16 pages.

IPhoneHacksTV, How to Group Notifications by App in iOS 9 Notification Center—iPhone Hacks, https://www.youtube.com/watch?v=j9kEN1_1yh8, Sep. 16, 2015, 2 pages.

IPhoneTricks.org, "How to Snooze or Stop an iPhone Alarm Without Looking at the Display?", https://www.iphonetricks.org/how-to-snooze-or-stop-an-iphone-alarm-without-looking-at-the-display, Nov. 29, 2016, 5 pages.

Isom, "How to Change iPhone Notification Settings", https://www.youtube.com/watch?v=P2Z4dvieB5k, Mar. 16, 2017, 3 pages.

Jason, "New iOS 8 Features that Apple Didn't Have Time to Tell Us About Today", https://web.archive.org/web/20171018064601-features-hidden.html, Jun. 2, 2014, 7 pages.

Klein, "How Manage, Customize, and Block Notifications in Android Lollipop and Marshmellow", http://web.archive.org/web/20171229125502/https:www.howtogeek.com/202404/how-to-tame-notifications-in-android-5.0, Sep. 29, 2016, 11 pages.

MacRumors, "iOS 11: How to Use the Lock Screen and Notification Center", https://www.youtube.com/watch?v=BQDyGNO9oGc, Sep. 19, 2017, 4 pages.

Mcfasa09, "Toggle Theater Mode on Wear 2.0", https://www.reddit.com/r/AndroidWear/comments/64qitr/toggle_theater_mode_on_wear_20, Mar. 18, 2014, 3 pages.

Mediati, "Master Notifications in Android Lollipop with Notification Priority and Downtime", https:/web.archive.org/web/20180503062117/https://www.digitaltrends.com/android/how-to-turn-off-notifications-in-android, Dec. 3, 2014, 7 pages.

Phandroid, "Do Not Disturb" mode will save you from notification hell, https://www.youtube.com/watch?v=R6A2As4VJpl, Jan. 16, 2017, 3 pages.

Raphael, "Oh, Oreo! 8 Things to Try When You Get Andoid 8.0", https://web.archive.org/web/20171224100520/https://www.computerworld.com/article/32191126/android/oreo-android-8, Aug. 24, 2017, 10 pages.

Rosenbaun, "How to Keep your Apple Watch Quiet", https://www.theverge.com/2019/10/24/20930506/how-to-apple-watch-do-not-disturb-iphone-quiet-mute-theater-mode, Oct. 24, 2019, 8 pages.

Samsung, "Samsung Goodnight Mode", https://www.samsung.com/us/support/answer/ANS00080310, 1995-2021, 2 pages.

Sony Xperia Z, "How to turn off alarm when it sounds", https://www.youtube.com/watch?v=eerWJMN7e5s, May 14, 2015, 3 pages.

Summerson, 'Android's Confusing "Do Not Disturb" Settings, Explained', https://www.howtogeek.com/260225/androids-confusing-do-not-disturb-settings-explained, Jul. 3, 2017, 8 pages.

Tantsissa Holdings, "Autosleep Seep Rings", http://autosleep.tantsissa.com/sleeprings, 2016-2010, 6 pages.

Tropical Tech, How to Set Up Do Not Disturb Mode Rules / Schedule in Android / 2018, http://www.youtube.com/watch?v=DLnGcpKHVyM, Sep. 4, 2017, 3 pages.

VikuBalupura, "[Android] Hands-On With Android P—Is This the Beginning of a New Design Language?", http://en.miui.com/thread-1995365-1-1.html, Mar. 10, 2018, 11 pages.

Wallen, "How to Customize Androlid Oreo Notifications With Categories", http://web.archive.org/web/20171017232141/https://www.techrepublic.com/article/how-to-customize-android-oreo-notifications-with-categories, Oct. 17, 2017, 14 pages.

Wayback Machine, "Nights Keeper", http://nightskeeper.com/?page_id=15, 2013, 9 pages.

Whitwam, Android N Feature Spotlight: Do Not Disturb Automatic Rules Get Option ToEnd DND on Next Alarm, https://www.androidpolice.com/2016/03/11/android-n-feature-spotlight-do-not-disturb-gets-option-to-end-automatically-on-next-alarm/, Mar. 11, 2016, 5 pages.

(56) References Cited

OTHER PUBLICATIONS

Whitwarm, "Android P Feature Spotlight: Android Will Offer to Hide Notifications From Apps You Frequently Dismiss", https://www.androidpolice.com/2018/03/12/android-P-feature-spotlight-android-will-offer-hide-notifications-apps-frequently-dismiss, Mar. 12, 2018, 5 pages.
Woodpress, "Features—Lighting Launcher", https://www.lightninglauncher.com/wordpress/features, 2021, 3 pages.
XDA Spotlight, "Lock Me Out", https://www.xda-developers.com/curb-android-smartphone-addiction-lock-me-out, Apr. 16, 2018, 7 pages.
YouTube, "Notification Digest", https://support.google.com/youtube/answer/9012820_at_00:38, 1 page.
Office Action, dated Jan. 16, 2020, received in U.S. Appl. No. 16/142,599, 13 pages.
Notice of Allowance, dated Jul. 16, 2020, received in U.S. Appl. No. 16/142,599, 7 pages.
Notice of Allowance, dated Sep. 18, 2020, received in U.S. Appl. No. 16/142,599, 7 pages.
Office Action, dated Nov. 6, 2020, received in Chinese Patent Application No. 202010095124.8, which corresponds with U.S. Appl. No. 16/142,599, 11 pages.
Office Action, dated Jul. 7, 2021, received in Chinese Patent Application No. 202010095124.8, which corresponds with U.S. Appl. No. 16/142,599, 1 page.
Notice of Allowance, dated Aug. 9, 2021, received in Chinese Patent Application No. 202010095124.8, which corresponds with U.S. Appl. No. 16/142,599, 2 pages.
Patent, dated Oct. 29, 2021, received in Chinese Patent Application No. 202010095124.8, which corresponds with U.S. Appl. No. 16/142,599, 5 pages.
Office Action, dated Aug. 27, 2018, received in Danish Patent Application No. 201870333, 9 pages.
Office Action, dated Nov. 12, 2018, received in Danish Patent Application No. 201870333, 3 pages.
Office Action, dated May 14, 2019, received in Danish Patent Application No. 201870333, 6 pages.
Office Action, dated Nov. 15, 2019, received in Danish Patent Application No. 201870333, 2 pages.
Intention to Grant, dated Dec. 19, 2019, received in Danish Patent Application No. 201870333, 2 pages.
Notice of Allowance, dated Apr. 2, 2020, received in Danish Patent Application No. 201870333, 4 pages.
Patent, dated May 15, 2020, received in Danish Patent Application No. 201870333, 5 pages.
Office Action, dated Apr. 3, 2020, received in U.S. Appl. No. 16/145,068, 35 pages.
Final Office Action, dated Nov. 30, 2020, received in U.S. Appl. No. 16/145,068, 44 pages.
Office Action, dated Jul. 12, 2021, received in U.S. Appl. No. 16/145,068, 82 pages.
Notice of Allowance, dated Feb. 28, 2022, received in U.S. Appl. No. 16/145,068, 25 pages.
Office Action, dated Aug. 29, 2018, received in Danish Patent Application No. 201870334, which corresponds with U.S. Appl. No. 16/145,068, 9 pages.
Office Action, dated Mar. 5, 2019, received in Danish Patent Application No. 201870334, which corresponds with U.S. Appl. No. 16/145,068, 6 pages.
Office Action, dated Sep. 6, 2019, received in Danish Patent Application No. 201870334, which corresponds with U.S. Appl. No. 16/145,068, 4 pages.
Office Action, dated Apr. 22, 2020, received in Danish Patent Application No. 201870334, which corresponds with U.S. Appl. No. 16/145,068, 2 pages.
Office Action, dated Apr. 6, 2020, received in U.S. Appl. No. 16/145,074, 22 pages.
Final Office Action, dated Nov. 16, 2020, received in U.S. Appl. No. 16/145,074, 33 pages.
Office Action, dated Jun. 28, 2021, received in U.S. Appl. No. 16/145,074, 39 pages.
Notice of Allowance, dated Mar. 11, 2022, received in U.S. Appl. No. 16/145,074, 27 pages.
Office Action, dated Apr. 16, 2021, received in Australian Patent Application No. 2019265367, U.S. Appl. No. 16/145,074, 3 pages.
Notice of Allowance, dated Jan. 18, 2022, received in Australian Patent Application No. 2019265367, U.S. Appl. No. 16/145,074, 3 pages.
Office Action, dated Jan. 24, 2022, received in Chinese Patent Application No. 201811165505.8, which corresponds with U.S. Appl. No. 16/145,074, 1 page.
Office Action, dated Aug. 31, 2018, received in Danish Patent Application No. 201870335, which corresponds with U.S. Appl. No. 16/145,074, 9 pages.
Office Action, dated Dec. 20, 2018, received in Danish Patent Application No. 201870335, which corresponds with U.S. Appl. No. 16/145,074, 4 pages.
Office Action, dated Aug. 28, 2019, received in Danish Patent Application No. 201870335, which corresponds with U.S. Appl. No. 16/145,074, 5 pages.
Office Action, dated Apr. 20, 2020, received in Danish Patent Application No. 201870335, which corresponds with U.S. Appl. No. 16/145,074, 4 pages.
Office Action, dated Dec. 10, 2021, received in Japanese Patent Application No. 2020-557940, which corresponds with U.S. Appl. No. 16/145,074, 2 pages.
Office Action, dated Nov. 30, 2021, received in Korean Patent Application No. 2020-7037439, which corresponds with U.S. Appl. No. 16/145,074, 3 pages.
Office Action, dated Aug. 12, 2021, received in U.S. Appl. No. 16/948,370, 35 pages.
Office Action, dated Apr. 5, 2022, received in U.S. Appl. No. 16/948,370, 44 pages.
Office Action, dated Jun. 25, 2021, received in Australian Patent Application No. 2020233622, which corresponds with U.S. Appl. No. 16/948,370, 8 pages.
Notice of Allowance, dated Feb. 22, 2022, received in Australian Patent Application No. 2020233622, which corresponds with U.S. Appl. No. 16/948,370, 3 pages.
Office Action, dated Dec. 18, 2020, received in Danish Patent Application No. 2020-70595, which corresponds with U.S. Appl. No. 16/948,370, 9 pages.
Office Action, dated Sep. 30, 2021, received in Danish Patent Application No. 2020-70595, which corresponds with U.S. Appl. No. 16/948,370, 5 pages.
Office Action, dated Dec. 2, 2021, received in Indian Patent Application No. 202014040025, which corresponds with U.S. Appl. No. 16/948,370, 8 pages.
Office Action, dated Mar. 4, 2022, received in Japanese Patent Application No. 2020-160012, which corresponds with U.S. Appl. No. 16/948,370, 2 pages.
Office Action, dated Feb. 1, 2021, received in U.S. Appl. No. 16/948,374, 27 pages.
Final Office Action, dated Jun. 11, 2021, received in U.S. Appl. No. 16/948,374, 29 pages.
Office Action, dated Dec. 29, 2021, received in U.S. Appl. No. 16/948,374, 29 pages.
Office Action, dated May 11, 2021, received in Australian Patent Application No. 2020239686, which corresponds with U.S. Appl. No. 16/948,374, 4 pages.
Notice of Allowance, dated Oct. 7, 2021, received in Australian Patent Application No. 2020239686, which corresponds with U.S. Appl. No. 16/948,374, 3 pages.
Patent, dated Feb. 10, 2022, received in Australian Patent Application No. 2020239686, which corresponds with U.S. Appl. No. 16/948,374, 3 pages.
Innovation Patent, dated Jun. 9, 2021, received in Australian Patent Application No. 2021102471, which corresponds with U.S. Appl. No. 16/948,374, 5 pages.
Office Action, dated Jul. 30, 2021, received in Australian Patent Application No. 2021102471, which corresponds with U.S. Appl. No. 16/948,374, 4 pages.

(56) References Cited

OTHER PUBLICATIONS

Innovation Patent, dated Jan. 31, 2022, received in Australian Patent Application No. 2021102471, which corresponds with U.S. Appl. No. 16/948,374, 3 pages.
Office Action, dated Dec. 21, 2020, received in Danish Patent Application No. 2020-70599, which corresponds with U.S. Appl. No. 16/948,374, 8 pages.
Office Action, dated Oct. 4, 2021, received in Danish Patent Application No. 2020-70599, which corresponds with U.S. Appl. No. 16/948,374, 2 pages.
Office Action, dated Dec. 1, 2021, received in Indian Patent Application No. 202014040935, which corresponds with U.S. Appl. No. 16/948,374, 9 pages.
Office Action, dated Nov. 30, 2021, received in Japanese Patent Application No. 2020-160013, which corresponds with U.S. Appl. No. 16/948,374, 2 pages.
Office Action, dated Jan. 8, 2021, received in U.S. Appl. No. 16/948,375, 19 pages.
Final Office Action, dated Mar. 9, 2021, received in U.S. Appl. No. 16/948,375, 19 pages.
Notice of Allowance, dated Jun. 24, 2021, received in U.S. Appl. No. 16/948,375, 6 pages.
Notice of Allowance, dated Oct. 26, 2021, received in U.S. Appl. No. 16/948,375, 5 pages.
Office Action, dated Apr. 13, 2021, received in Australian Patent Application No. 2020239689, which corresponds with U.S. Appl. No. 16/948,375, 8 pages.
Notice of Allowance, dated Oct. 5, 2021, received in Australian Patent Application No. 2020239689, which corresponds with U.S. Appl. No. 16/948,375, 3 pages.
Patent, dated Feb. 10, 2022, received in Australian Patent Application No. 2020239689, which corresponds with U.S. Appl. No. 16/948,375, 3 pages.
Office Action, dated Jan. 11, 2021, received in Danish Patent Application No. 2020-70629, which corresponds with U.S. Appl. No. 16/948,375, 10 pages.
Office Action, dated Dec. 1, 2021, received in Indian Patent Application No. 202014040936, which corresponds with U.S. Appl. No. 16/948,375, 10 pages.
Office Action, dated Dec. 6, 2021, received in Japanese Patent Application No. 2020-160014, which corresponds with U.S. Appl. No. 16/948,375, 2 pages.
Notice of Allowance, dated Feb. 2, 2022, received in U.S. Appl. No. 17/483,757, 35 pages.
Notice of Allowance, dated Mar. 30, 2022, received in U.S. Appl. No. 17/483,757, 5 pages.
Invitation to Pay Additional Fees, dated Jun. 17, 2019, received in International Patent Application No. PCT/US2019/026353, which corresponds with U.S. Appl. No. 16/142,599, 19 pages.
International Search Report and Written Opinion, dated Aug. 7, 2019, received in International Patent Application No. PCT/US2019/026353, which corresponds with U.S. Appl. No. 16/142,599, 26 pages.
International Search Report and Written Opinion, dated May 28, 2019, received in International Patent Application No. PCT/US2019/026349, which corresponds with U.S. Appl. No. 16/145,068, 16 pages.
Invitation to Pay Additional Fees, dated Aug. 6, 2021, received in International Patent Application No. PCT/US2021/031131, which corresponds with U.S. Appl. No. 16/948,370, 5 pages.
Anonymous, "Create a Group of Notifications / Android Developers", https://web.archive.org/20181028202552/https://devloper.android.com/training/notif-user/group, Oct. 27, 2018, 5 pages.
Lew, "Correctly Handling Bundled Android Notifications", https://web.archive.org/web/20171210085025/https://blog.danlew.net/20171018064601/http://, Feb. 7, 2017, 5 pages.
Certificate of Grant, dated May 19, 2022, received in Australian Patent Application No. 2019265367, U.S. Appl. No. 16/145,074, 3 pages.
Office Action, dated Apr. 14, 2022, received in European Patent Application No. 19718891.5, which corresponds with U.S. Appl. No. 16/145,074, 10 pages.
Office Action, dated May 19, 2022, received in Danish Patent Application No. 2020-70595, which corresponds with U.S. Appl. No. 16/948,370, 2 pages.
Final Office Action, dated May 6, 2022, received in U.S. Appl. No. 16/948,374, 27 pages.
Office Action, dated Jun. 2, 2022, received in Danish Patent Application No. 2020-70599, which corresponds with U.S. Appl. No. 16/948,374, 2 pages.
Office Action, dated May 29, 2022, received in Korean Patent Application No. 2020-0123967, which corresponds with U.S. Appl. No. 16/948,374, 5 pages.
Office Action, dated Apr. 22, 2022, received in U.S. Appl. No. 17/084,579, 10 pages.
Office Action, dated May 5, 2022, received in U.S. Appl. No. 17/084,579, 11 pages.
Office Action, dated Sep. 9, 2022, received in European Patent Application No. 1972341.6, which corresponds with U.S. Appl. No. 16/142,599, 8 Pages.
Notice of Allowance, dated Jul. 28, 2022, received in U.S. Appl. No. 16/145,074, 27 pages.
Office Action, dated Oct. 19, 2022, received in Chinese Patent Application No. 201811165505.8, which corresponds with U.S. Appl. No. 16/145,074, 2 pages.
Notice of Allowance, dated Aug. 8, 2022, received in Japanese Patent Application No. 2020-557940, which corresponds with U.S. Appl. No. 16/145,074, 1 page.
Patent, dated Sep. 9, 2022, received in Japanese Patent Application No. 2020-557940, which corresponds with U.S. Appl. No. 16/145,074, 3 pages.
Notice of Allowance, dated Jul. 28, 2022, received in Korean Patent Application No. 2020-7037439, which corresponds with U.S. Appl. No. 16/145,074, 3 pages.
Notice of Allowance, dated Sep. 7, 2022, received in U.S. Appl. No. 16/948,370, 12 pages.
Notice of Allowance, dated Sep. 28, 2022, received in U.S. Appl. No. 16/948,374, 13 pages.
Notice of Allowance, dated Sep. 22, 2022, received in Japanese Patent Application No. 2020-160013, which corresponds with U.S. Appl. No. 16/948,374, 2 pages.
Office Action, dated Sep. 15, 2022, received in Danish Patent Application No. 2020-70629, which corresponds with U.S. Appl. No. 16/948,375, 5 pages.
Notice of Allowance, dated Jul. 29, 2022, received in Japanese Patent Application No. 2020-160014, which corresponds with U.S. Appl. No. 16/948,375, 2 pages.
Final Office Action, dated Oct. 11, 2022, received in U.S. Appl. No. 17/084,579, 12 pages.
Notice of Allowance, dated Jul. 12, 2022, received in U.S. Appl. No. 16/145,068, 9 pages.
Intention to Grant, dated Nov. 3, 2022, received in Danish Patent Application No. 2020-70595, which corresponds with U.S. Appl. No. 16/948,370, 2 pages.
Patent, dated Oct. 21, 2022, received in Japanese Patent Application No. 2020-160013, which corresponds with U.S. Appl. No. 16/948,374, 2 pages.
Patent, dated Aug. 30, 2022, received in Japanese Patent Application No. 2020-160014, which corresponds with U.S. Appl. No. 16/948,375, 4 pages.
Office Action, dated Nov. 21, 2022, received in Korean Patent Application No. 2022-7032607, which corresponds with U.S. Appl. No. 17/940,858, 5 pages.
International Search Report and Written Opinion, dated Nov. 2, 2022, received in International Patent Application No. PCT/US2022028806, which corresponds with U.S. Appl. No. 17/483,751, 20 pages.
Notice of Allowance, dated Jan. 28, 2023, received in Chinese Patent Application No. 201811165505.8, which corresponds with U.S. Appl. No. 16/145,074, 2 pages.
Notice of Allowance, dated Jan. 17, 2023, received in U.S. Appl. No. 16/948,370, 13 pages.

(56) References Cited

OTHER PUBLICATIONS

Notice of Allowance, dated Jan. 6, 2023, received in Japanese Patent Application No. 2020-160012, which corresponds with U.S. Appl. No. 16/948,370, 2 pages.
Patent, dated Jan. 26, 2023, received in Japanese Patent Application No. 2020-160012, which corresponds with U.S. Appl. No. 16/948,370, 3 pages.
Notice of Allowance, dated Dec. 26, 2022, received in Korean Patent Application No. 2020-0123967, which corresponds with U.S. Appl. No. 16/948,374, 2 pages.
Patent, dated Mar. 24, 2023, received in Korean Patent Application No. 2020-0123967, which corresponds with U.S. Appl. No. 16/948,374, 5 pages.
Notice of Allowance, dated Apr. 19, 2019, received in U.S. Appl. No. 15/707,757, 8 pages.
Notice of Allowance, dated Aug. 6, 2019, received in U.S. Appl. No. 15/707,757, 8 pages.
Patent, dated Jun. 27, 2023, received in Chinese U.S. Appl. No. 16/145,074.8, which corresponds with U.S. Appl. No. 16/145,074, 5 pages.
Office Action, dated Jul. 13, 2020, received in U.S. Appl. No. 16/730,921, 7 pages.
Notice of Allowance, dated Jul. 29, 2020, received in U.S. Appl. No. 16/730,921, 8 pages.
Patent, dated Jun. 20, 2023, received in Danish Patent Application No. 2020-70595, which corresponds with U.S. Appl. No. 16/948,370, 8 pages.
Office Action, dated Apr. 20, 2023, received in Korean Patent Application No. 2020-0123965, which corresponds with U.S. Appl. No. 16/948,370, 4 pages.
Office Action, dated Jul. 26, 2021, received in U.S. Appl. No. 17/112,883, 9 pages.
Notice of Allowance, dated Feb. 4, 2022, received in U.S. Appl. No. 17/112,883, 8 pages.
Office Action, dated May 18, 2023, received in Australian Patent Application No. 2022203663, which corresponds with U.S. Appl. No. 18/100,530, 3 pages.
Office Action, dated Sep. 7, 2023, received in Australian Patent Application No. 2022203663, which corresponds with U.S. Appl. No. 18/100,530, 4 pages.
Office Action, dated Feb. 7, 2023, received in U.S. Appl. No. 17/831,384, 9 pages.
Office Action, dated Oct. 10, 2023, received in U.S. Appl. No. 17/940,858, 32 pages.
Notice of Allowance, dated May 30, 2023, received in Korean Patent Application No. 2022-7032607, which corresponds with U.S. Appl. No. 17/940,858, 2 pages.
Patent, dated Aug. 29, 2023, received in Korean Patent Application No. 2022-7032607, which corresponds with U.S. Appl. No. 17/940,858, 4 pages.
Office Action, dated Sep. 19, 2023, received in Korean Patent Application No. 2023-7029431, 9 pages.
Invitation to Pay Additional Fees, dated Sep. 20, 2023, received in International Patent Application No. PCT/US2023/021750, 10 pages.
7labs, "How to Change Wallpaper Automatically on iPhone or iPad", https://7lads.io/mobile/iphone/change-wallpaper-automatically-on-ios-or-ipados.html, Dec. 6, 2020, 9 pages.
Samsung, "How to Use the Focus Mode Feature in Android Q with One UI 2.0?", http://www.samsung.com/ae/support/mobile-devices/how-to-use-the-focus-mode-feature-in-android-q-with-one-ui-20/, Nov. 22, 2021, 4 pages.
Office Action, dated Jul. 24, 2024, received in U.S. Appl. No. 18/144,749, 31 pages.
Final Office Action, dated Sep. 13, 2024, received in U.S. Appl. No. 18/199,331, 18 pages.
Notice of Allowance, dated Aug. 4, 2023, received in U.S. Appl. No. 17/831,384, 8 pages.
Office Action, dated Jul. 9, 2024, received in U.S. Appl. No. 18/398,059, 10 pages.
Office Action, dated Jul. 1, 2024, received in Korean Patent Application No. 2020-0123973, which corresponds with U.S. Appl. No. 16/948,375, 5 pages.
Notice of Allowance, dated Sep. 13, 2024, received in Korean Patent Application No. 2020-0123973, which corresponds with U.S. Appl. No. 16/948,375, 2 pages.
Patent, dated Jan. 10, 2025, received in Korean Patent Application No. 2020-0123965, which corresponds with U.S. Appl. No. 16/948,370, 3 pages.
Notice of Allowance, dated Jan. 31, 2025, received in Japanese Patent Application No. 2024-008169, 2 pages.
Notice of Allowance, dated Feb. 24, 2025, received in U.S. Appl. No. 17/084,579, 7 pages.
Final Office Action, dated Feb. 3, 2025, received in U.S. Appl. No. 18/144,749, 30 pages.
Office Action, dated Jan. 14, 2025, received in U.S. Appl. No. 18/199,331, 20 pages.
Final Office Action, dated Feb. 6, 2025, received in U.S. Appl. No. 18/100,530, 30 pages.
Notice of Allowance, dated Jan. 15, 2025, received in U.S. Appl. No. 18/398,059, 8 pages.
Notice of Allowance, dated Nov. 21, 2024, received in Korean Patent Application No. 2020-0123965, which corresponds with U.S. Appl. No. 16/948,370, 3 pages.
Office Action, dated Nov. 12, 2024, received in Chinese Patent Application No. 202111351532.6, 1 page.
Notice of Allowance, dated Mar. 7, 2025, received in Japanese Patent Application No. 2023-567948, which corresponds with U.S. Appl. No. 17/483,751, 2 pages.
Office Action, dated Mar. 19, 2025, received in Indian Patent Application No. 202217070342, which corresponds with U.S. Appl. No. 18/100,530, 9 pages.
Patent, dated Feb. 26, 2025, received in Japanese Patent Application No. 2024-008169, 6 pages.

\* cited by examiner

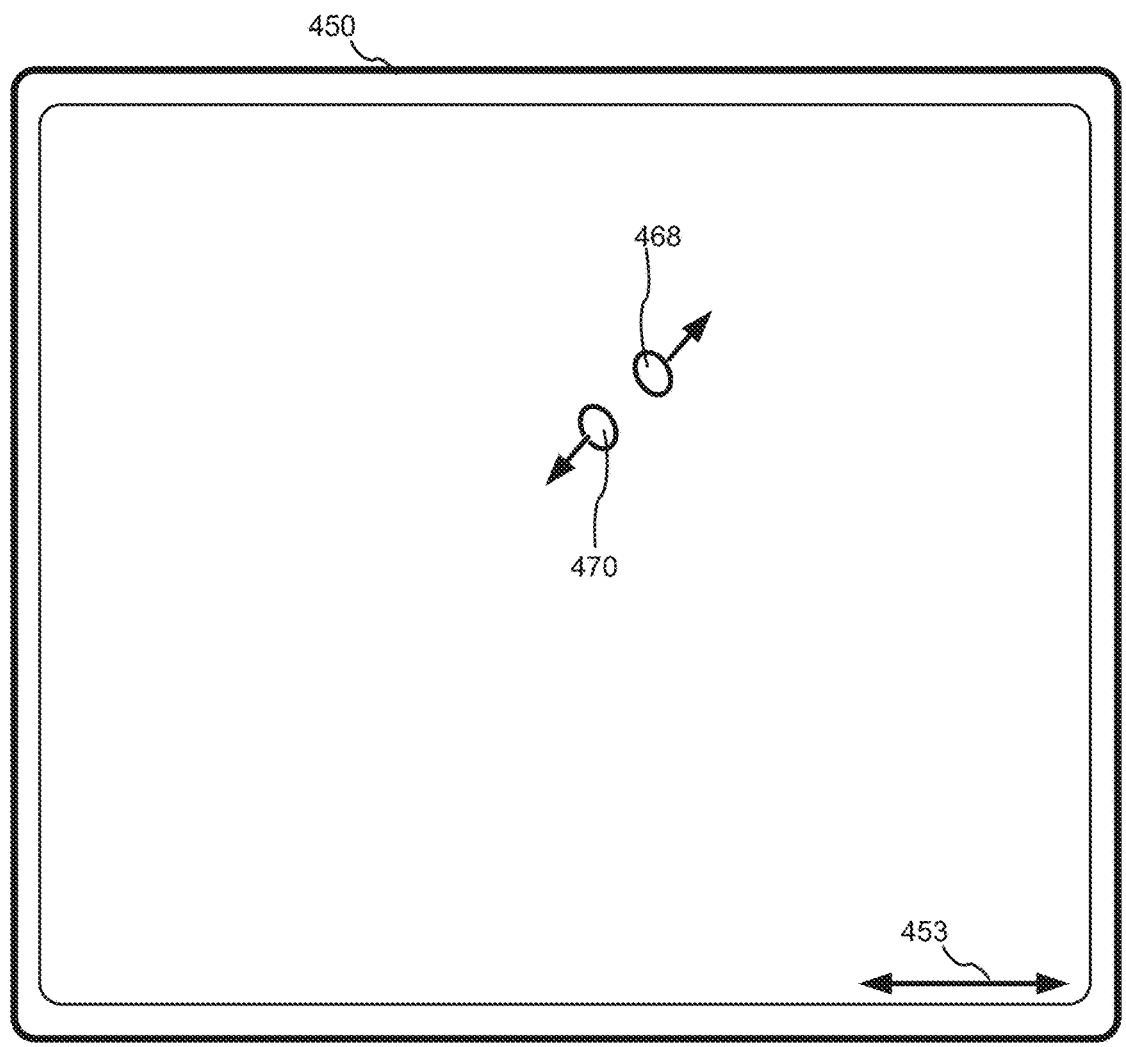
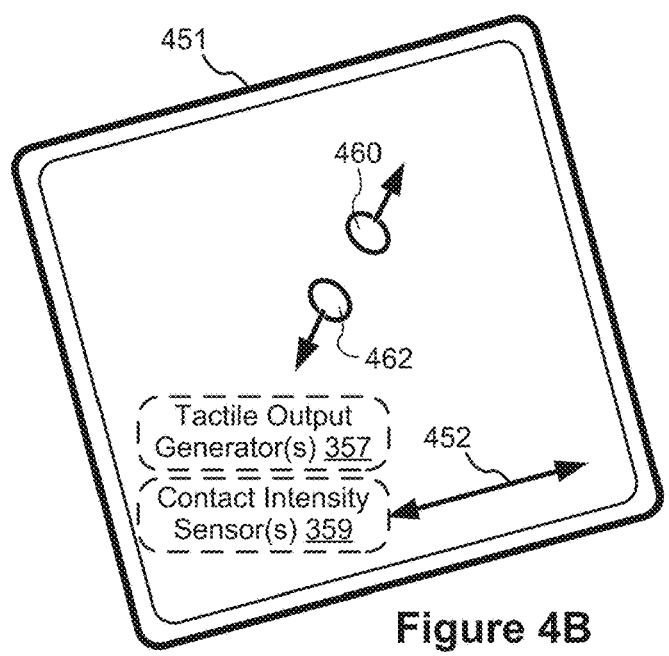
Figure 4B

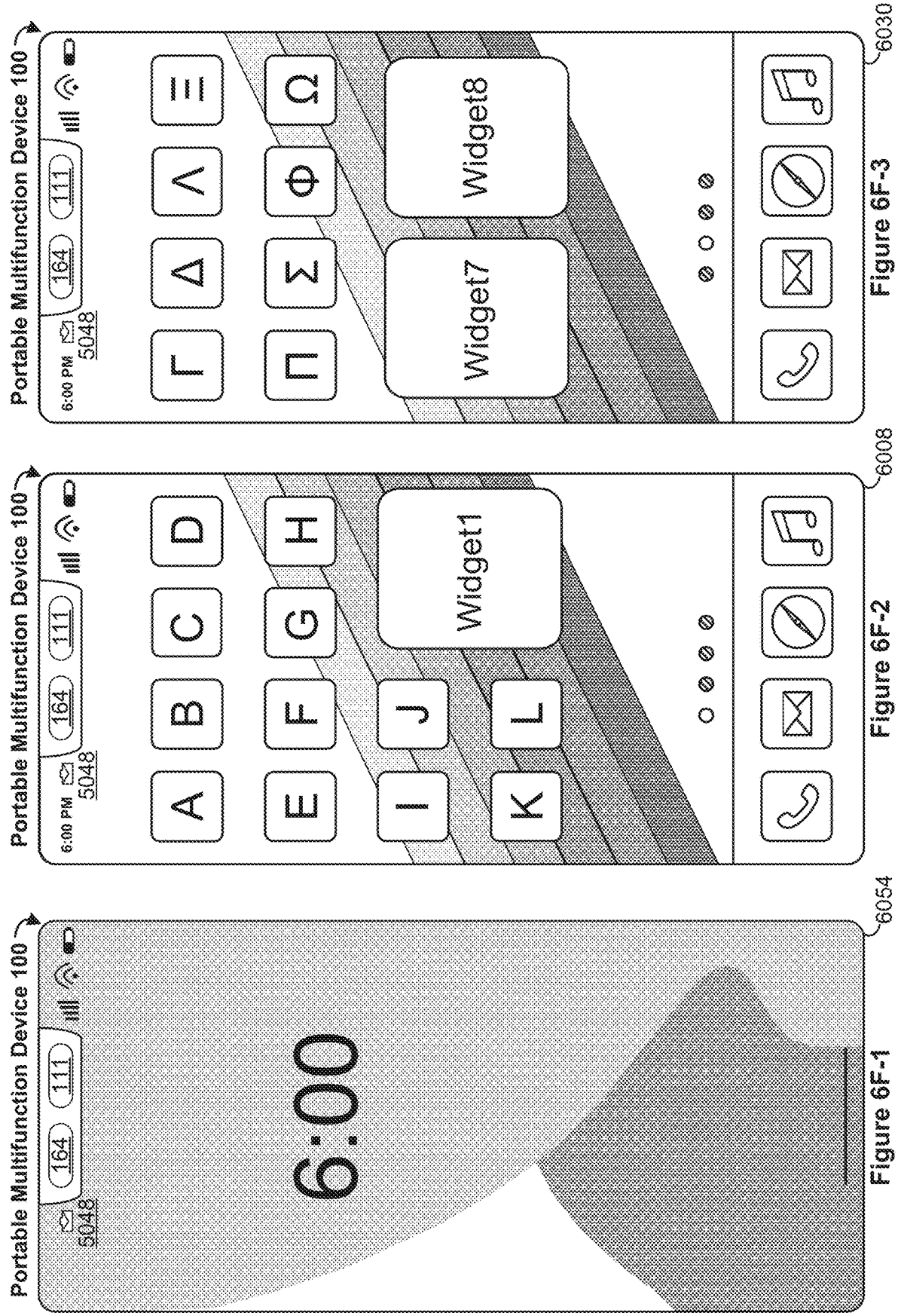

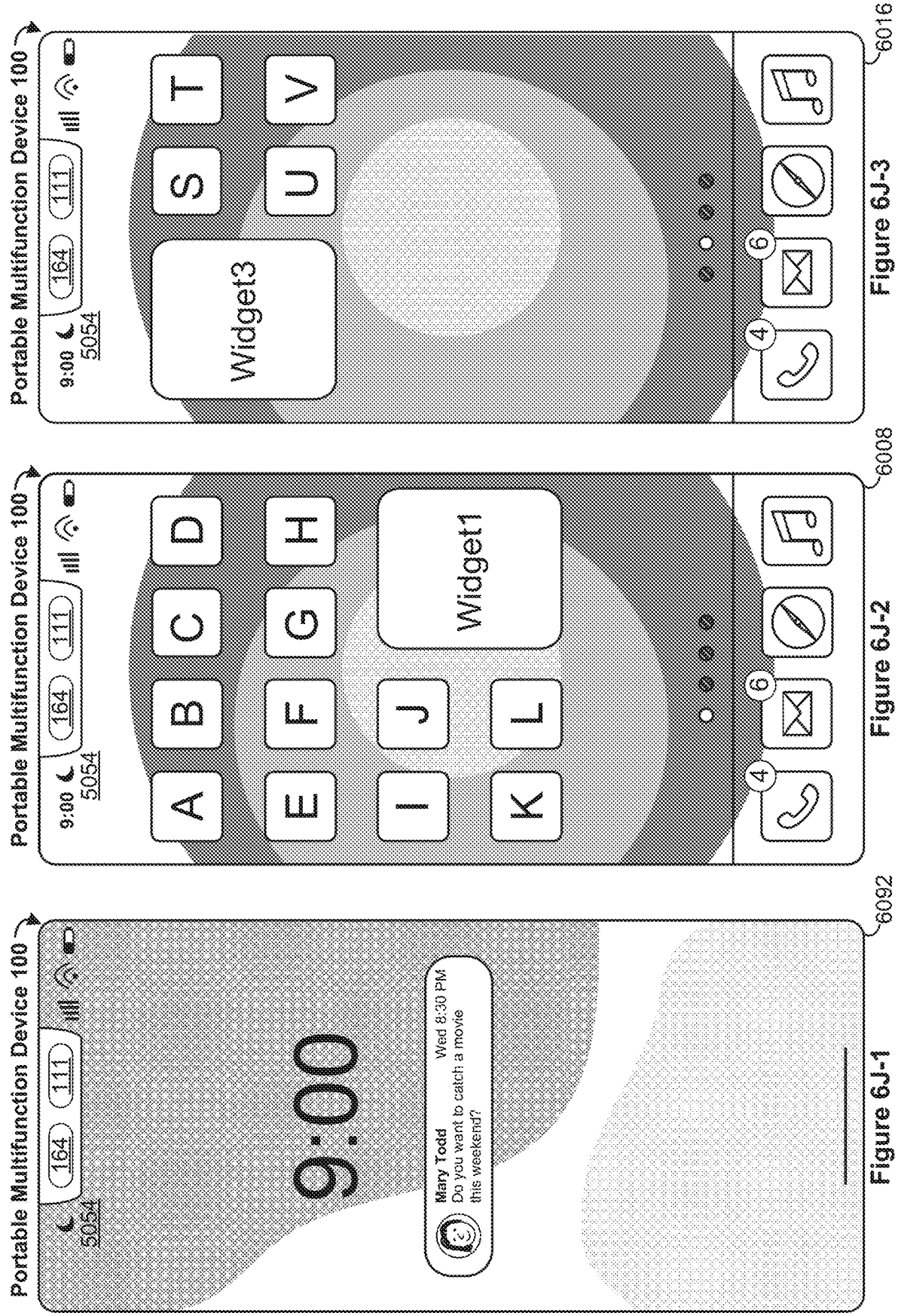

9000

9002 Display, via the display generation component, a first user interface that includes:
- a first affordance associated with a first activity mode,
- a second affordance associated with modifying settings for the first activity mode, and
- a third affordance associated with a second activity mode 9004 While displaying the first user interface, detecting a first user input 9006 In response to detecting the first user input:

9008 In accordance with a determination that the first user input activates the first affordance, initiate activation of the first activity mode 9010 In accordance with a determination that the first user input activates the second affordance, display, via the display generation component, a first settings interface for modifying settings of the first activity mode 9012 In accordance with a determination that the first user input activates the third affordance, initiate activation of the second activity mode

9014 Before displaying the first user interface, display a control user interface with an activity mode affordance;
while displaying the control user interface, detect an input on the activity mode affordance; and
in response to detecting the input on the activity mode affordance, display the first user interface 9016 Before displaying the control user interface, display an application launch interface;
detect an input on the application launch user interface; and,
in response to detecting the input on the application launch user interface, display the control user interface 9018 The first user interface includes a fourth affordance associated with modifying settings for the second activity mode, which, when activated, causes display of a settings interface for the second activity mode 9020 The first settings interface for modifying the settings of the first activity mode includes at least one option for specifying criteria for automatically initiating activation of the first activity mode 9022 The criteria for automatically initiating activation of the first activity mode include criteria based at least in part on a specified time, location, or active application 9023 Display, in response to a detection of a trigger condition, a notification that includes a prompt to configure the first activity mode to automatically initiate activation of the first activity mode when a condition, specified in the notification, is detected.

9024 The criteria for automatically initiating activation of the first activity mode is based at least in part on recorded user data corresponding to user activity associated with the computer system

9026 Display the first settings interface, including displaying at least one of:
   an option for determining whether or not notifications associated with a respective application will be output by the computer system while the first activity mode is active; and
   an option for determining whether or not notifications associated with a contactable user will be output by the computer system while the first activity mode is active

9028 The first settings interface includes an affordance that when activated, switches between a first portion of the first settings interface that includes an option for configuring a respective application to provide notifications while the first activity mode is active, and a second portion of the first settings interface that includes an option for configuring a respective user contact for which notifications will be provided while the first activity mode is active

9030 The option for determining whether or not notifications associated with a contactable user will be output by the computer system while the first activity mode is active configures the respective application to provide notifications while the first activity mode is active without configuring the respective application to provide notifications while an activity mode other than the first activity mode is active

9032 Display, via the display generation component, an activity mode indicator, indicating a current activity mode of the computer system, on a wake screen user interface that corresponds to a wake state of the computer system, including, in accordance with a determination that the computer system is in the first activity mode, the activity mode indicator has a first appearance and in accordance with a determination that the computer system is in the second activity mode that is different from the first activity mode, the activity mode indicator has a second appearance that is different from the first appearance

9034 Displaying, via the display generation component, a representation of a current time on the wake screen user interface. The activity mode indicator is displayed below the representation of the current time on the wake screen user interface

9036 Display via the display generation component, an activity mode indicator, indicating a current activity mode of the computer system, in a status region of a respective user interface, including, in accordance with a determination that the computer system is in the first activity mode, the activity mode indicator has a first appearance, and in accordance with a determination that the computer system is in the second activity mode that is different from the first activity mode, the activity mode indicator has a second appearance that is different from the first appearance 9038 While a current activity mode, of a plurality of activity modes, is active, detect a fourth user input that selects the first an activity mode affordance; and in response to detecting the fourth user input that selects the respective first activity mode affordance of the plurality of first affordances, initiate deactivation of the first current activity mode 9040 Display, in a plurality of user interfaces associated with a first user of another computer system, an activity mode indicator for the first user, the activity mode indicator for the first user corresponding to a respective activity mode that is active for the first user 9042 Concurrently display, in a respective user interface of the plurality of user interfaces associated with the first user, an avatar of the first user, and the activity mode indicator for the first user that is visually associated with the avatar of the first user 9044 The plurality of user interfaces associated with the first user includes a messaging user interface that corresponds to a communication session between the first user of the other computer system and a user of the computer system 9046 The activity mode indicator for the first user is the same for a plurality of the different activity modes of a plurality of activity modes (A)

9048 While the respective activity mode is active for the first user, transmit a first communication to the first user; and display in the messaging user interface an indication that the first communication was delivered in accordance with the respective activity mode being active for the first user 9050 The indication that the first communication was delivered in accordance with the respective activity mode being active for the first user includes an option which, when activated, sends a request to the other computer system to provide a notification corresponding to the first communication 9052 The indication that the first communication was delivered in accordance with the respective activity mode being active for the first user is displayed in accordance with a determination that the other computer system is configured to indicate that the respective activity mode is active for the first user 9054 One or more of the first user interface and the first settings interface include:
an option for enabling display, to users other than a user of the computer system, of a status indicator corresponding to the first activity mode; and
an option for disabling display, to users other than the user of the computer system, of the status indicator corresponding to the first activity mode 9056 While displaying the first settings interface, detect a fifth user input that meets navigation criteria; and
in response to detecting the fifth user input that meets the navigation criteria, display a second settings interface for modifying settings of the second activity mode

9058 The first settings interface includes an option for specifying applications for which notifications will be provided while the first activity mode is active

---

9060 The first settings interface includes an option for enabling delivery, while the first activity mode is active, of time-sensitive notifications for a plurality of applications, wherein the time-sensitive notifications satisfy time sensitivity criteria

---

9062 The first user interface includes an option to configure a new activity mode, distinct from the first activity mode and the second activity mode; and after the new activity mode is configured, an affordance for the new activity mode is displayed in the first user interface

---

9064 Display in the first user interface a scheduled activation time for the first activity mode or the second activity mode

---

9066 Display, in response to detection of a trigger condition, a notification that includes a prompt to set up or start use of a new activity mode, distinct from the first activity mode and the second activity mode

10002 Detect a first input requesting display of a home screen of the computer system 10004 In response to detecting the first input:

10006 in accordance with a determination that a first activity mode is active on the computer system, display, via the display generation component, a first home screen associated with the first activity mode, and enabling provision of first notifications by the computer system in accordance with settings of the first activity mode 10008 In accordance with a determination that a second activity mode is active on the computer system, display, via the display generation component, a second home screen associated with the second activity mode, wherein the second home screen is different from the first home screen, and enabling provision of second notifications by the computer system in accordance with settings of the second activity mode, wherein at least some of the settings of the second activity mode are different from the settings of the first activity mode

10010 Detect a user input that activates a settings affordance; and in response to detecting the user input that activates the settings affordance, display a settings interface that includes an option for selecting a first respective home screen page to use as the first home screen, and an option for selecting a second respective home screen page, distinct from the first respective home screen page, to use as the second home screen 10012 The first home screen is one page of a first plurality of home screen pages; and the second home screen is one page of a second plurality of home screen pages different from the first plurality of home screen pages 10014 The first plurality of home screen pages includes at least one home screen page also included in the second plurality of home screen pages 10016 The first plurality of home screen pages includes at least one home screen page that is not included in the second plurality of home screen pages 10018 The second plurality of home screen pages includes at least one home screen page that is not included in the first plurality of home screen pages 10020 Detect a user input that activates a settings affordance; and in response to detecting the user input that activates the settings affordance, display a settings interface that includes options for configuring one or more settings of a respective activity mode, including an option to select a home screen page to be included in the first plurality of home screen pages 10022 At least one home screen page is available for selection for inclusion in the first plurality of home screen pages and inclusion in the second plurality of home screen pages (A)

10024 A respective home screen page in the first plurality of home screen pages includes a respective background region, and the settings interface includes an option to configure the respective background region for the respective home screen page 10026 The settings interface includes an option for configuring at least one of a start time and an end time for the respective activity mode 10028 The settings interface includes an option for enabling delivery of notifications, in response to requests by other users, with respect to notifications that are otherwise blocked or deferred while a respective activity mode is active 10030 The settings interface includes an option that configures a brightness with which a wake screen user interface is displayed while the respective activity mode is active 10032 The settings interface includes an option for forgoing display of notification indicators on application icons while the respective activity mode is active 10034 The settings interface includes an option for suppressing notifications on a user interface corresponding to a locked state of the computer system 10036 The first home screen includes a first plurality of application user interface elements, and the second home screen includes a second plurality of application user interface elements, different from the first plurality of application user interface elements

10038 Automatically activate the first activity mode in accordance with predefined criteria 10040 Activate the first activity mode in response to a user input 10042 Detect the user input while displaying a wake screen

11002 While a user is using the computer system:

11004 Detect the occurrence of a first plurality of events including a first event corresponding to a first application. The first event is associated with a first time, and a second event corresponding to a second application that is different from the first application. The second event is associated with a second time.

11006 At a first delivery time that is after the first time and after the second time, provide notifications corresponding to the first plurality of events as a first bundled notification that includes an indication of the first event and an indication of the second event. A notification for the first event was not provided prior to the first delivery time and a notification for the second event was not provided prior to the first delivery time.

11008 The notifications corresponding to the first plurality of events are ordered in the first bundled notification in a non-chronological order based on importance criteria of the respective events.

11010 the importance criteria include a criterion based on a determination of whether a respective event corresponds to a communication received by the computer system. Order events corresponding to communications received by the computer system with a higher priority than events, which do not correspond to communications received by the computer system, having event types corresponding to a predefined set of event types.

11012 The importance criteria include a criterion based on a level of user interaction with the respective event. Order events associated with higher levels of user interaction with a higher priority than events associated with lower levels of user interaction.

11014 Display the first bundled notification, and display, in the first bundled notification, indications of events meeting higher importance criteria with a greater prominence than indications of events meeting lower importance criteria.

11016 The notifications for the first event and the second event were not provided prior to the first delivery time in accordance with a determination that a reduced notification mode was active on the computer system at both the first time and the second time.

11018 Detect the first plurality of events when a reduced notification mode is active. First settings for the reduced notification mode disable delivery of notifications corresponding to the first plurality of events while the reduced notification mode is active.
Detect, while the reduced notification mode is not active, occurrence of a second plurality of events that correspond to notifications for which the first settings for the reduced notification mode disable delivery. Deliver notifications corresponding to the second plurality of events in a same chronological order as the second plurality of events are detected.

11020 The first delivery time is a time when the reduced notification mode is deactivated.

11022 Detect the first plurality of events when a reduced notification mode is active.
Detect, while the reduced notification mode is not active, occurrence of a second third plurality of events.
Deliver notifications corresponding to at least some events of the second third plurality of events in a non-chronological order based on importance criteria of the respective events, and deliver notifications corresponding to at least some of the second third plurality of events notification in chronological order.

11024 The first delivery time is a first scheduled delivery time.

11026 The first scheduled delivery time is a time selected by a user of the computer system.

11028 After the first delivery time, detect the occurrence of a second fourth plurality of events including a third event corresponding to a third application, wherein the third event is associated with a third time, and a fourth event corresponding to a fourth application that is different from the third application, wherein the fourth event is associated with a fourth time. The third time and the fourth time are after the first delivery time. At a second delivery time that is after the third time, after the fourth time, and after the first delivery time, provide notifications corresponding to the second fourth plurality of events as a second bundled notification that includes an indication of the third event and an indication of the fourth event. A notification for the third event was not provided prior to the second delivery time and a notification for the fourth event was not provided prior to the second delivery time.

11030 The second delivery time is a scheduled delivery time selected by a user of the computer system.

11032 The first bundled notification includes notifications generated by one or more predetermined applications.

11034 Detect a user input corresponding to the first bundled notification. In response to detecting the user input at a location corresponding to the first bundled notification, display the indication of the first event and the indication of the second event.

11036 The first bundled notification includes a count of indications, corresponding to respective events, that are included in the first bundled notification.

11038 The first bundled notification includes an indication of at least one of the first application and the second application.

11040 Each respective indication included in the first bundled notification has a respective size based on a type of content associated with the respective indication.

11042 The indication of the first event and the indication of the second event are bundled together as part of the first bundled notification in accordance with bundled notification settings of the computer system.
Display a settings user interface that includes the bundled notification settings of the computer system. The bundled notification settings of the computer system are configurable in the settings user interface.
The settings user interface includes one or more options for specifying one or more respective applications for which indications of events will be bundled.
Display in the settings user interface a bundling recommendation that indicates one or more applications for which indications of events would be bundled in accordance with the bundling recommendation.

11044 The notifications for the first event and the second event are not provided prior to the first delivery time in accordance with the bundled notification settings of the computer system.

11046 The one or more options for specifying one or more respective applications for which indications of events will be bundled includes only options corresponding to respective applications that are configured to provide notifications.

11048 The one or more options for specifying one or more respective applications for which indications of events will be bundled are grouped at least in part based application types of the respective applications (C)

11050 The bundling recommendation includes indications of a plurality of suggested applications for which indications of events would be bundled in accordance with the respective bundling recommendation.

11052 The settings user interface includes an option for selecting a subset of the suggested applications as applications for which indications of events will be bundled.

11054 The settings user interface includes an option for selecting all of the suggested applications as applications for which indications of events will be bundled.

11056 The settings user interface includes an option for specifying the first delivery time and an option for specifying a second delivery time for delivering respective bundled notifications.

11058 The settings user interface includes one or more options for specifying a third delivery time, distinct from the first delivery time and distinct from the second delivery time.
At the third delivery time, provide a third bundled notification that includes indications of a respective plurality of events associated with respective times. The third delivery time is after the first delivery time and after the second delivery time, and notifications for the respective plurality of events were not provided prior to the third delivery time.

11060 After the first delivery time, detect occurrence of a fifth event associated with a fifth time that is after the first delivery time.
After detecting occurrence of the fifth event, concurrently display, with at least a portion of the first bundled notification, an upcoming notification affordance, and in response to user selection of the upcoming notification affordance, display a preview of an indication of the fifth event.

11062 After the first delivery time, defer delivery of notifications corresponding to a fifth plurality of events while a respective activity mode is active, and then in response to user selection of the upcoming notification affordance, display a preview of indications of the fifth plurality of events 11064 After the first delivery time, defer delivery of notifications corresponding to a sixth plurality of events in accordance with bundled notification settings of the computer system, the bundled notification settings specifying one or more applications for which indications of events are to be bundled, and then in response to user selection of the upcoming notification affordance, display a preview of indications of the sixth plurality of events.

11066 While displaying a notification associated with a respective application, display an option to specify that future indications of events for the respective application are to be included in respective future bundled notifications.

11068 While displaying a notification associated with a communication thread with one or more other users, display:
  a mute option for forgoing display of future notifications corresponding to the communication thread until predetermined criteria are satisfied; and
  a reduced notification option for initiating activation of a reduced notification mode, during which delivery of a predefined set of notifications is deferred.

11070 While a reduced notification mode is inactive, display a plurality of mode control options including an option for activating the reduced notification mode, and in response to a user input activating the reduced notification mode, suppress provision of bundled notifications for at least the first application and second application.

12002 While notifications for a respective application are suppressed:

12004 Detect an event associated with the respective application

12006 In response to detecting the event:

12008 In accordance with a determination that notifications corresponding to the respective application are being suppressed and that the event meets predefined criteria for overriding suppression of notifications, provide a notification of the event, the notification including an option to suppress future notifications, associated with the respective application, that meet the predefined criteria for overriding suppression of notifications.

12010 In accordance with a determination that notifications corresponding to the respective application are being suppressed and the event does not meet the predefined criteria for overriding suppression of notifications, forgo providing the notification of the event

12012 In accordance with a determination that notifications corresponding to the respective application are not being suppressed, provide the notification of the event.

12014 If the notification of the event is provided in accordance with a determination that notifications corresponding to the respective application are not being suppressed, display the notification of the event without the option to suppress future notifications

---

12016 The option to suppress future notifications is displayed at a first level of prominence, and subsequent notifications, associated with the respective application, include respective options to suppress future notifications. The respective options to suppress future notifications are displayed with a level of prominence below the first level of prominence.

---

12018 The determination that notifications for the respective application are suppressed includes a determination that a reduced notification mode is active on the first computer system.

---

12020 Suppress notifications for the respective application in accordance with settings for bundled notifications. Suppressed notifications for the respective application are provided, at one or more delivery times, in one or more bundled notifications that each include a plurality of indications of events corresponding to respective suppressed notifications.

12022 Configure the settings for bundled notifications, including displaying an indication corresponding to the predefined criteria.

---

12024 Detect a user input directed to the option to suppress future notifications associated with the respective application.
In response to detecting the user input directed to the option to suppress future notifications, suppress future notifications, associated with the respective application, that meet the predefined criteria for overriding suppression of notifications.

---

12026 In response to detecting a user input that causes display of a settings user interface, display the settings user interface, including an option to suppress future notifications, associated with the respective application, that meet the predefined criteria for overriding suppression of notifications.

13002 Display, via the display generation component, a messaging user interface on the display, the messaging user interface including a conversation region that includes a plurality of messages between a user of the first computer system and another participant.

13004 After displaying the messaging user interface, receive a request to send a message to the other participant

13006 In response to the request to send the message to the other participant, send a message to the other participant

13008 After sending the message to the other participant, concurrently display in the messaging user interface, via the display generation component:
    a representation of the message;
    an indication that the message was delivered in accordance with reduced notification settings for the other participant; and
    an affordance for requesting delivery, to the other participant, of a notification associated with the message.

13010 Detect activation of the affordance for requesting delivery of the notification.
In response to detecting activation of the affordance for requesting delivery of the notification associated with the message, send a request for delivery of the notification associated with the message.

13012 If the affordance for requesting delivery of the notification associated with the message is not activated, defer delivery of the message to the other participant in accordance with the reduced notification settings for the other participant.

13014 Send a second message to the other participant.
In accordance with a determination that the second message was delivered to the other participant, display, via the display generation component, a second indication that the second message was delivered to the other participant.

13016 In accordance with a determination that the message has been viewed by the other participant, display a third indication that the message has been viewed.

Figure 13B

DEVICES, METHODS, AND GRAPHICAL USER INTERFACES FOR ADJUSTING THE PROVISION OF NOTIFICATIONS

RELATED APPLICATIONS

This application claims priority to U.S. Provisional Patent Application No. 63/187,896, filed May 12, 2021, which is hereby incorporated by reference in its entirety.

TECHNICAL FIELD

This relates generally to electronic devices, including but not limited to electronic devices that provide notifications, and more particularly, to devices and methods that adjust the provision of notifications.

BACKGROUND

The use of portable electronic devices (e.g., computer systems) has increased significantly in recent years, with many applications typically residing in the memory of such devices. Example applications include communications applications (e.g., messaging and telephone), calendar applications, news applications, media playback applications (e.g., podcast, music, and video), payment applications, reminder applications, social media applications, and service delivery applications. These applications generate events, which contain information of varying degrees of importance to users. Notifications that correspond to the generated events may be displayed. Example notifications include digital images, video, text, icons, control elements (such as buttons) and/or other graphics to notify users of events. Example applications that generate notifications include messaging applications (e.g., iMessage or Messages from Apple Inc. of Cupertino, California), calendar applications (e.g., iCal or Calendar from Apple Inc. of Cupertino, California), news applications (e.g., Apple News from Apple Inc. of Cupertino, California), media playback applications (e.g., Podcasts, Apple Music and iTunes from Apple Inc. of Cupertino, California), payment applications (e.g., Apple Pay from Apple Inc. of Cupertino, California), reminder applications (e.g., Reminders from Apple Inc. of Cupertino, California), social media applications, and service delivery applications.

The types of notifications that a user wants to receive while working, playing, or sleeping may be quite different. But current user interfaces for adjusting when alerts and other notifications are provided (and which notifications are provided) are cumbersome and inefficient. For example, to change alert settings, some devices require the user to navigate to obscure, hard-to-find settings user interfaces of the devices' operating systems. At present, there is no simple way for a user to easily adjust the provision of notifications in different contexts. Existing methods take longer than necessary, thereby wasting energy. This latter consideration is particularly important in battery-operated devices.

SUMMARY

Accordingly, there is a need for electronic devices with faster, more efficient methods and interfaces for adjusting the provision of notifications. Such methods and interfaces optionally complement or replace conventional methods for adjusting the provision of notifications. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device that is in communication with a display generation component and one or more input devices. The method includes displaying via the display generation component, a first user interface that includes: a first affordance associated with a first activity mode, a second affordance associated with modifying settings for the first activity mode, and a third affordance associated with a second activity mode. The method includes, while displaying the first user interface, detecting a first user input, and in response to detecting the first user input: in accordance with a determination that the first user input activates the first affordance, initiating activation of the first activity mode; in accordance with a determination that the first user input activates the second affordance, displaying, via the display generation component, a first settings interface for modifying settings of the first activity mode; and in accordance with a determination that the first user input activates the third affordance, initiating activation of the second activity mode.

In accordance with some embodiments, a method is performed at an electronic device that is in communication with a display generation component and one or more input devices. The method includes detecting a first input requesting display of a home screen of the computer system, and in response to detecting the first input: in accordance with a determination that a first activity mode is active on the computer system, displaying, via the display generation component, a first home screen associated with the first activity mode, and enabling provision of first notifications by the computer system in accordance with settings of the first activity mode; and in accordance with a determination that a second activity mode is active on the computer system, displaying, via the display generation component, a second home screen associated with the second activity mode, wherein the second home screen is different from the first home screen, and enabling provision of second notifications by the computer system in accordance with settings of the second activity mode, wherein at least some of the settings of the second activity mode are different from the settings of the first activity mode.

In accordance with some embodiments, a method is performed at an electronic device that is in communication with a display generation component and one or more input devices. The method includes, while a user is using the computer system, detecting the occurrence of a first plurality of events including a first event corresponding to a first application, wherein the first event is associated with a first time, and a second event corresponding to a second application that is different from the first application, wherein the second event is associated with a second time. The method further includes, at a first delivery time that is after the first time and after the second time, providing notifications corresponding to the first plurality of events as a first bundled notification that includes an indication of the first event and an indication of the second event, wherein a notification for the first event was not provided prior to the first delivery time and a notification for the second event was not provided prior to the first delivery time.

In accordance with some embodiments, a method is performed at an electronic device that is in communication with a display generation component and one or more input devices. The method includes, while notifications for a respective application are suppressed, detecting an event associated with the respective application. The method further includes, in response to detecting the event: in accordance with a determination that notifications corresponding to the respective application are being suppressed and that the event meets predefined criteria for overriding suppression of notifications, providing a notification of the event, the notification including an option to suppress future notifications, associated with the respective application, that meet the predefined criteria for overriding suppression of notifications; in accordance with a determination that notifications corresponding to the respective application are being suppressed and the event does not meet the predefined criteria for overriding suppression of notifications, forgoing providing the notification of the event; and in accordance with a determination that notifications corresponding to the respective application are not being suppressed, providing the notification of the event.

In accordance with some embodiments, a method is performed at an electronic device that is in communication with a display generation component and one or more input devices. The method includes, displaying, via the display generation component, a messaging user interface on the display, the messaging user interface including a conversation region that includes a plurality of messages between a user of the first computer system and another participant. The method further includes, after displaying the messaging user interface, receiving a request to send a message to the other participant, and in response to the request to send the message to the other participant, sending a message to the other participant. The method further includes, after sending the message to the other participant, concurrently displaying in the messaging user interface, via the display generation component: a representation of the message, an indication that the message was delivered in accordance with reduced notification settings for the other participant, and an affordance for requesting delivery, to the other participant, of a notification associated with the message.

In accordance with some embodiments, an electronic device includes a display, an optional touch-sensitive surface, one or more optional sensors to detect intensities of contacts with the touch-sensitive surface, one or more processors, memory, and one or more programs. The one or more programs are stored in the memory and configured to be executed by the one or more processors. The one or more programs include instructions for performing the operations of any of the methods described herein. In accordance with some embodiments, a computer readable storage medium has stored therein instructions which when executed by an electronic device with a display, an optional touch-sensitive surface, and one or more optional sensors to detect intensities of contacts with the touch-sensitive surface, cause the device to perform the operations of any of the methods described herein. In accordance with some embodiments, a graphical user interface on an electronic device that includes memory and one or more processors to execute one or more programs stored in the memory includes one or more of the elements displayed in any of the methods described herein, which are updated in response to inputs, as described in any of the methods described herein. In accordance with some embodiments, an electronic device includes a display, an optional touch-sensitive surface, one or more optional sensors to detect intensities of contacts with the touch-sensitive surface, and means for performing the operations of any of the methods described herein. In accordance with some embodiments, an information processing apparatus, for use in an electronic device that includes a display, an optional touch-sensitive surface, and one or more optional sensors to detect intensities of contacts with the touch-sensitive surface, includes means for performing the operations of any of the methods described herein.

Thus, electronic devices are provided with faster, more efficient methods and interfaces for adjusting the provision of notifications, thereby increasing the effectiveness, efficiency, and user satisfaction with such devices. Such methods and interfaces may complement or replace conventional methods for adjusting the provision of notifications.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-1 through 6J-3 illustrate example user interfaces for configuring home screen pages and preferences for activity modes of a portable multifunction device, in accordance with some embodiments.

FIGS. 9A-9F are flow diagrams of a process for activating, deactivating, and modifying the settings for activity modes of the electronic device in accordance with some embodiments.

FIGS. 10A-10D are flow diagrams of a process for configuring home screen pages and preferences for activity modes of a portable multifunction device in accordance with some embodiments.

FIGS. 11A-11H are flow diagrams of a process for configuring bundled notifications in accordance with some embodiments.

FIGS. 12A-12B are flow diagrams of a process for configuring and managing time-sensitive notifications in accordance with some embodiments.

FIGS. 13A-13B are flow diagrams of a process for displaying an indication indicating that a message is delivered according to reduced notification settings of another device, and for providing an affordance to override the reduced notification settings of the other device, in accordance with some embodiments.

DESCRIPTION OF EMBODIMENTS

Figure 1A:
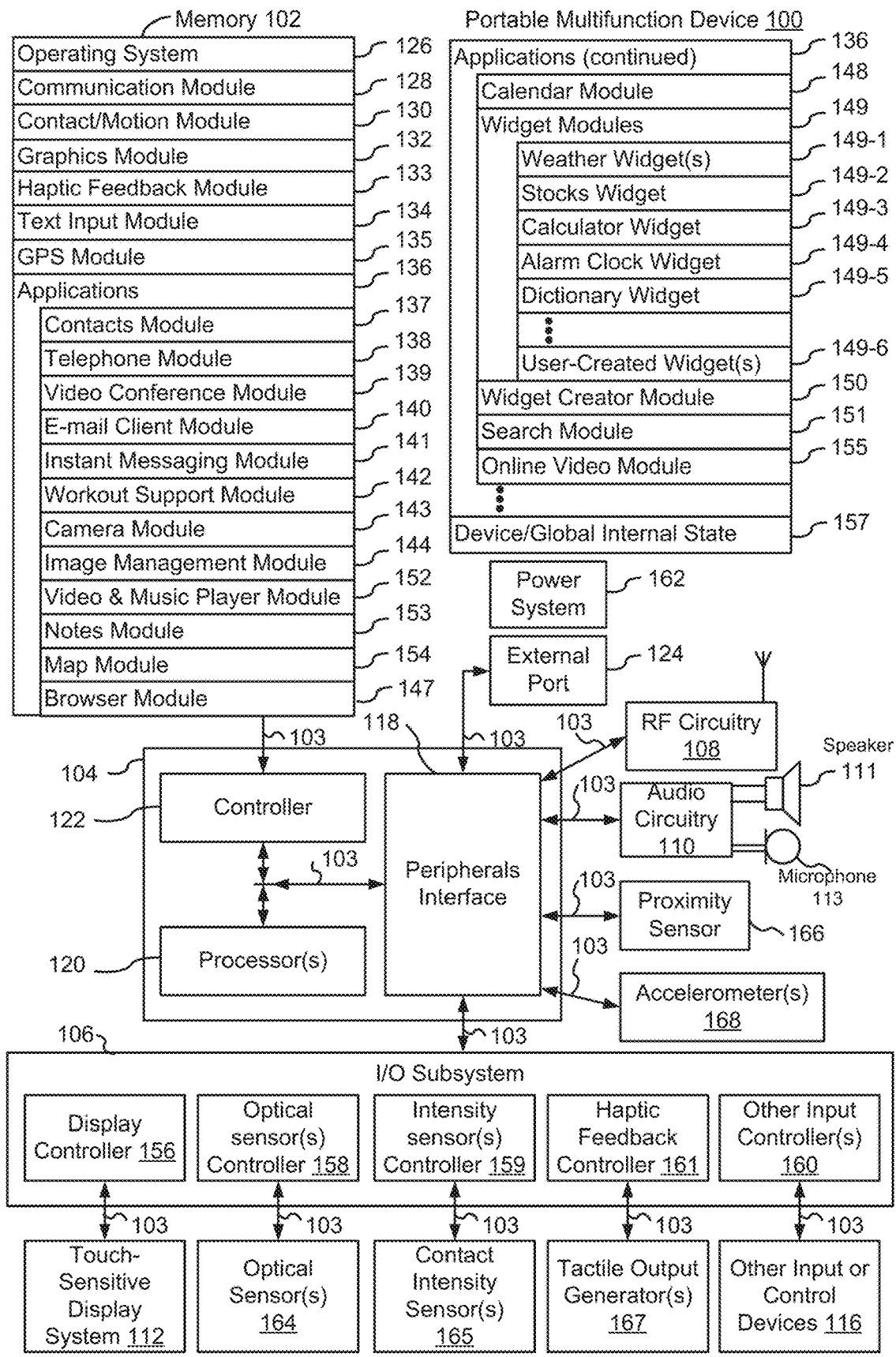
FIG. 1A is a block diagram illustrating a portable multifunction device with a touch-sensitive display in accordance with some embodiments.

Many electronic devices can activate a reduced notification mode to suppress certain notifications while the reduced notification mode is active. Such electronic devices, however, generally include only one reduced notification mode (e.g., a "Do Not Disturb" mode), that while configurable, must be reconfigured constantly (e.g., in order to suppress different kinds of notifications in different contexts (e.g., times of day, locations, etc.)). In the embodiments described below, an improved method for selectively suppressing notifications is achieved by the use of multiple activity modes (e.g., reduced notification modes) that can be easily created, configured, activated, and deactivated (e.g., automatically). This allows users to configure various activity modes for common contexts (e.g., while at work, while sleeping, while driving, etc.) without needing to constantly reconfigure a single reduced notification mode as the context changes.

The embodiments described below also describe various notification settings that can be configured (e.g., as part of, or separately from, the activity modes) to provide improved flexibility regarding which notifications are suppressed. For example, the user can configure the device to allow time-sensitive notifications to be delivered (e.g., without having to disable a reduced notification mode), and the user can configure the device to bundle other notifications for delivery at a predetermined delivery time. Providing increased flexibility and control over which notifications are provided and which notifications are suppressed allows users to avoid unnecessary distraction and conserve battery life of the device (e.g., because the device does not need to provide notifications in contexts where the user cannot, or does not want to, interact with the notifications).

Below, FIGS. 1A-1B, 2, and 3 provide a description of example devices. FIGS. 4A-4E and 5A-5AL illustrate example user interfaces for activating, deactivating, and modifying the settings for activity modes of the electronic device. FIGS. 6A-1 through 6J-3 illustrate example user interfaces for configuring home screen pages and preferences for activity modes of a portable multifunction device. FIGS. 7A-7AE illustrate example user interfaces for configuring bundled notifications. FIGS. 8A-8J illustrate example user interfaces for configuring and managing time-sensitive notifications. FIGS. 9A-9F illustrate a flow diagram of a method of activating, deactivating, and modifying the settings for activity modes of the electronic device. FIGS. 10A-10D illustrate a flow diagram of a method of configuring home screen pages and preferences for activity modes of a portable multifunction device. FIGS. 11A-11H illustrate a flow diagram of a method of configuring bundled notifications. FIGS. 12A-12B illustrate a flow diagram of a method of configuring and managing time-sensitive notifications. FIGS. 13A-13B illustrate a flow diagram of a method of displaying an indication indicating that a message is delivered according to reduced notification settings of another device, and for providing an affordance to override the reduced notification settings of the other device. The user interfaces in FIGS. 5A-5AL, 6A-1 through 6J-3, 7A-7AE, and 8A-8J are used to illustrate the processes in FIGS. 9A-9F, 10A-10D, 11A-11H, 12A-12B, and 13A-13B.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, sometimes called a display generation component, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
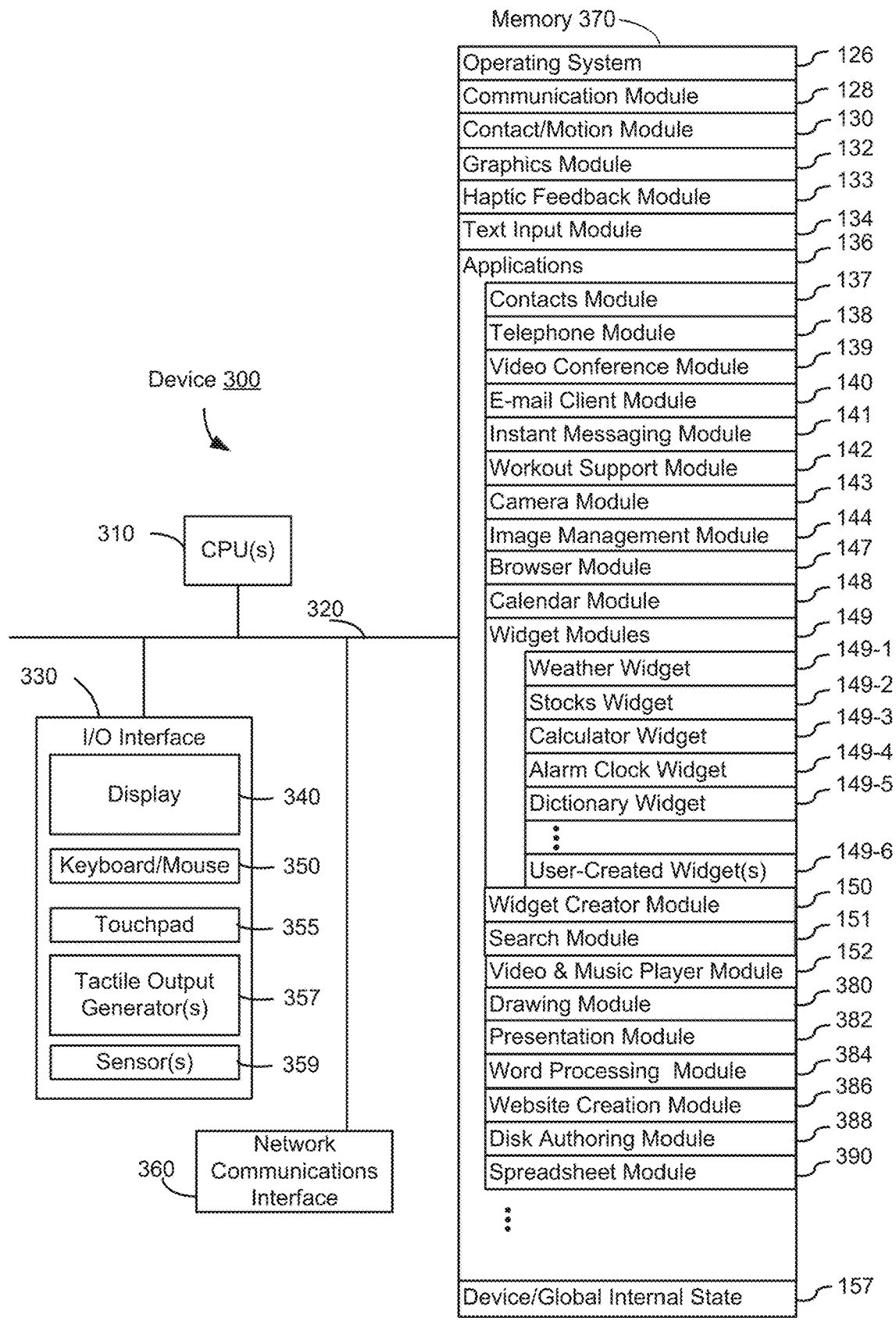
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g., for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
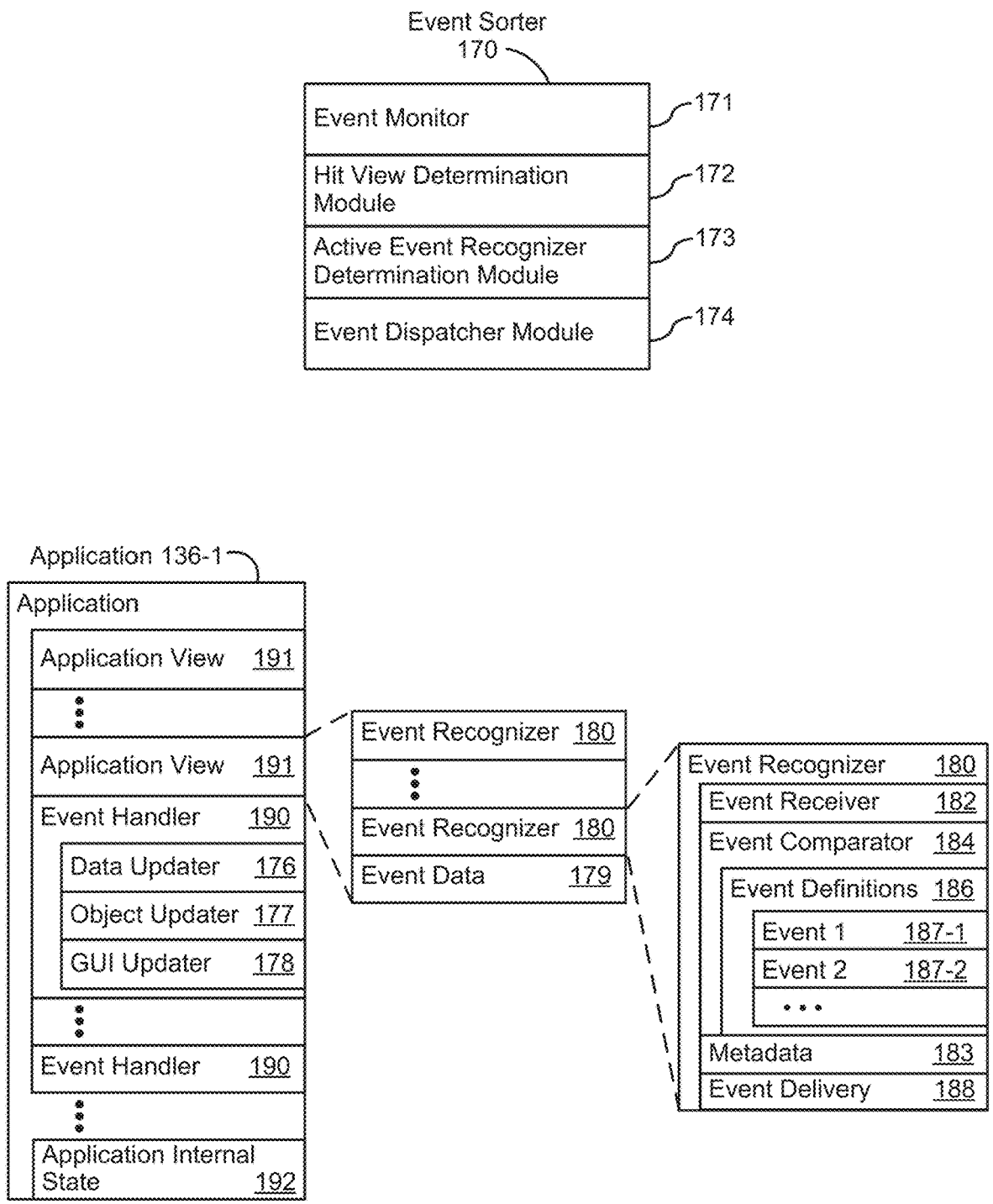
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions;

detected eye movements; biometric inputs; and/or any combination thereof are optionally utilized as inputs corresponding to sub-events which define an event to be recognized.

Figure 2:
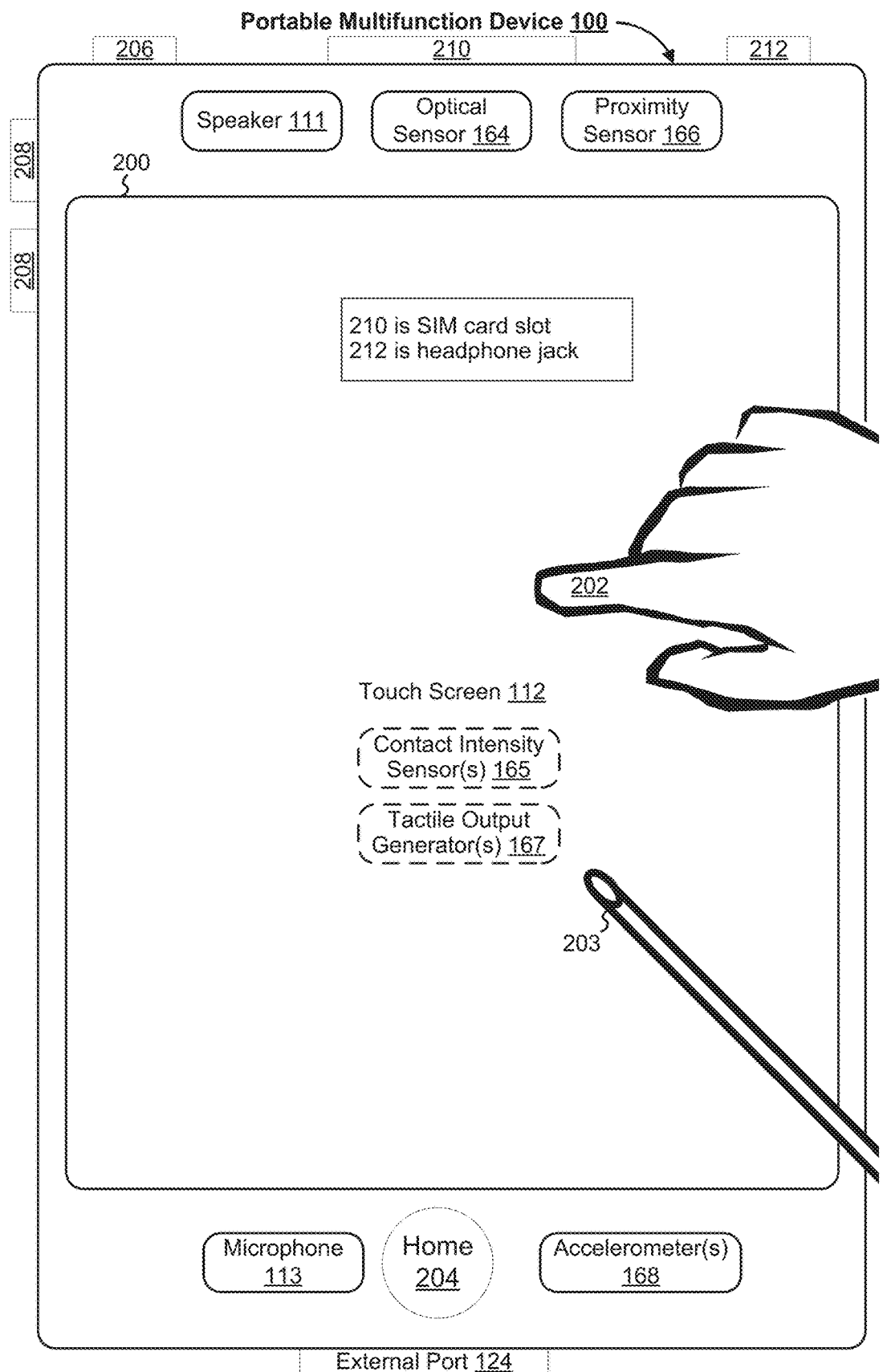
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display, or alternatively a display generation component such as a display controller configured to be coupled to or in communication with a display device. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
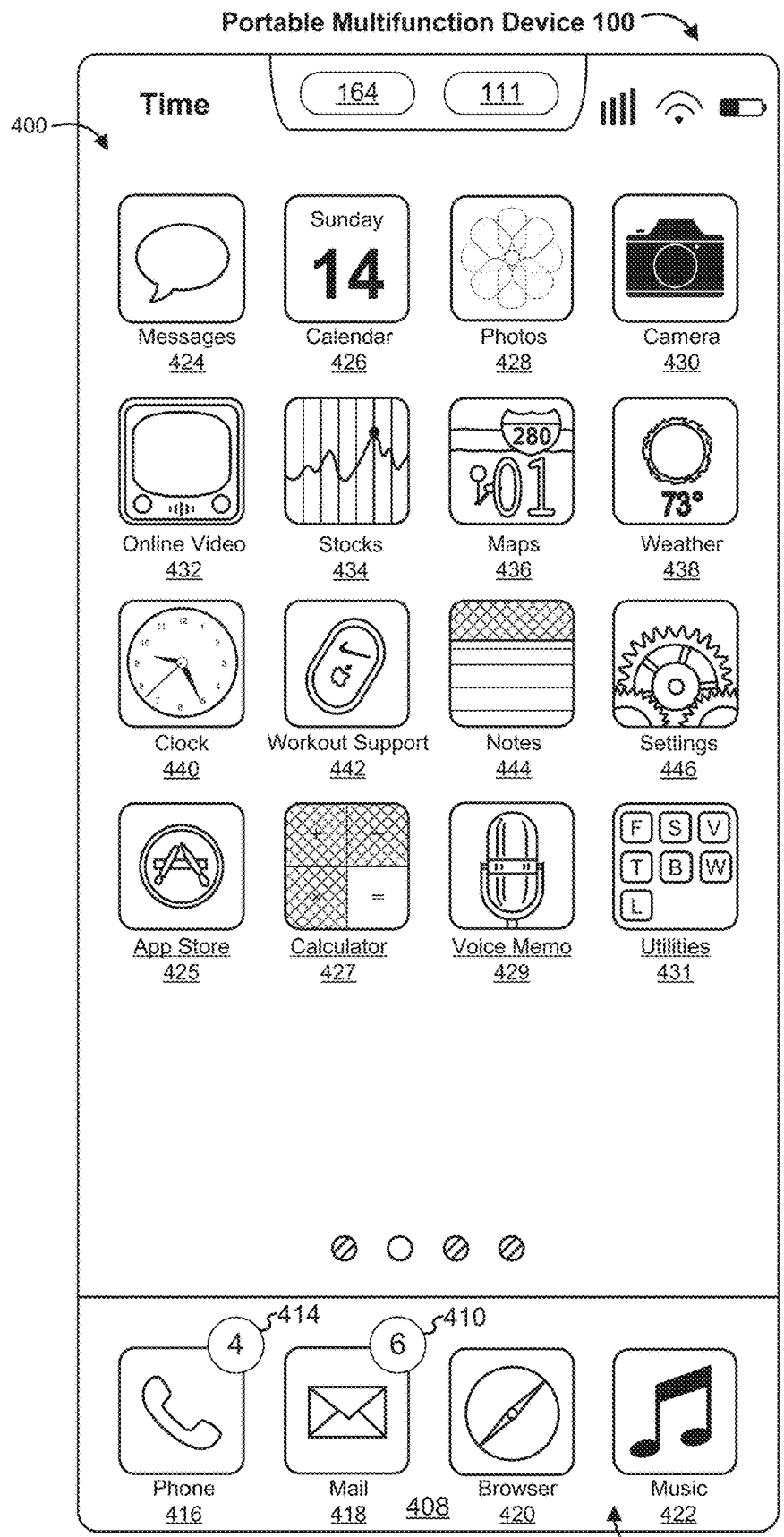
FIG. 4A illustrates an example user interface for a menu of applications on a portable multifunction device in accordance with some embodiments.

FIG. 4A illustrates an example user interface 400, sometimes called a home screen or a multi-page application launch user interface, which includes a menu of applications stored on (or installed on) portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as one or more (or two or more, or all) of the following:
  Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, labeled "Music;" and

Icons for other applications, such as one or more (or two or more, or all) of the following:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;"

Icon 446 for a settings application or module, which provides access to settings for device 100 and its various applications 136;

Icon 425 for an application store application, for installing additional applications Icon 427 for a calculator widget 149-3, labeled "Calculator";

Icon 429 for a voice recording application; and

Icon 431 for a utilities widget, for providing access to a plurality of utilities applications or to a subset of features of the plurality of utilities applications (e.g., a user-created widget 149-6).

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
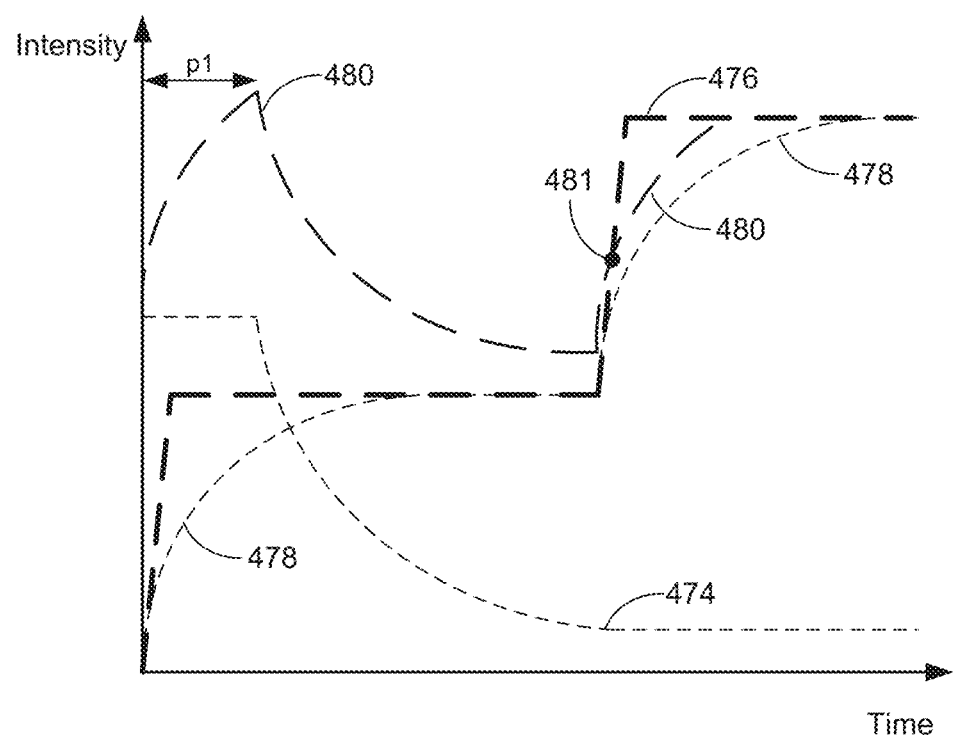
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
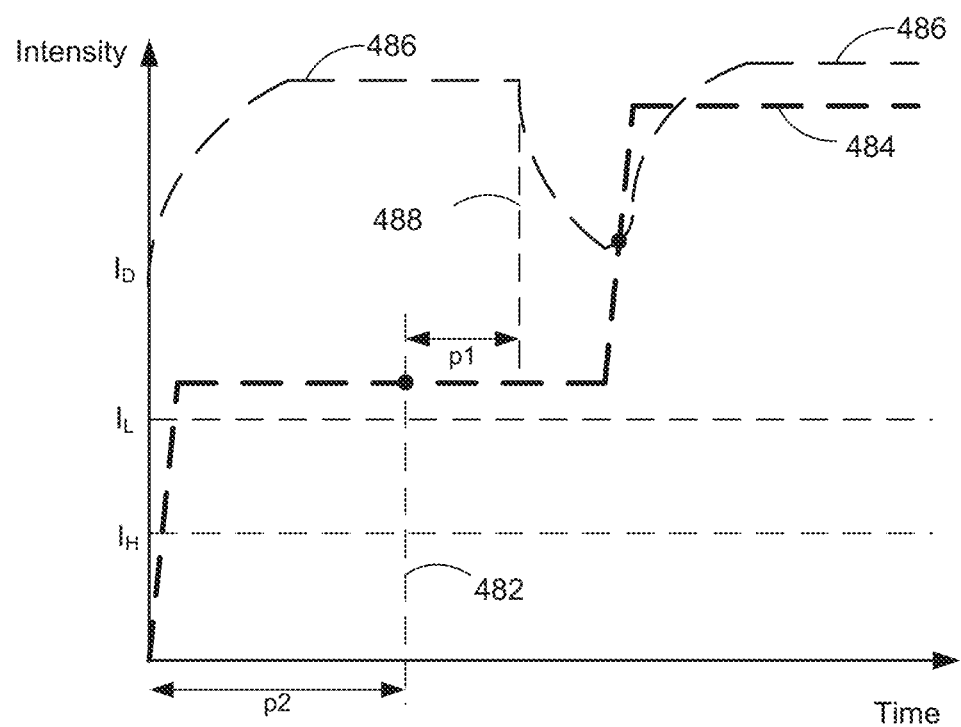

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
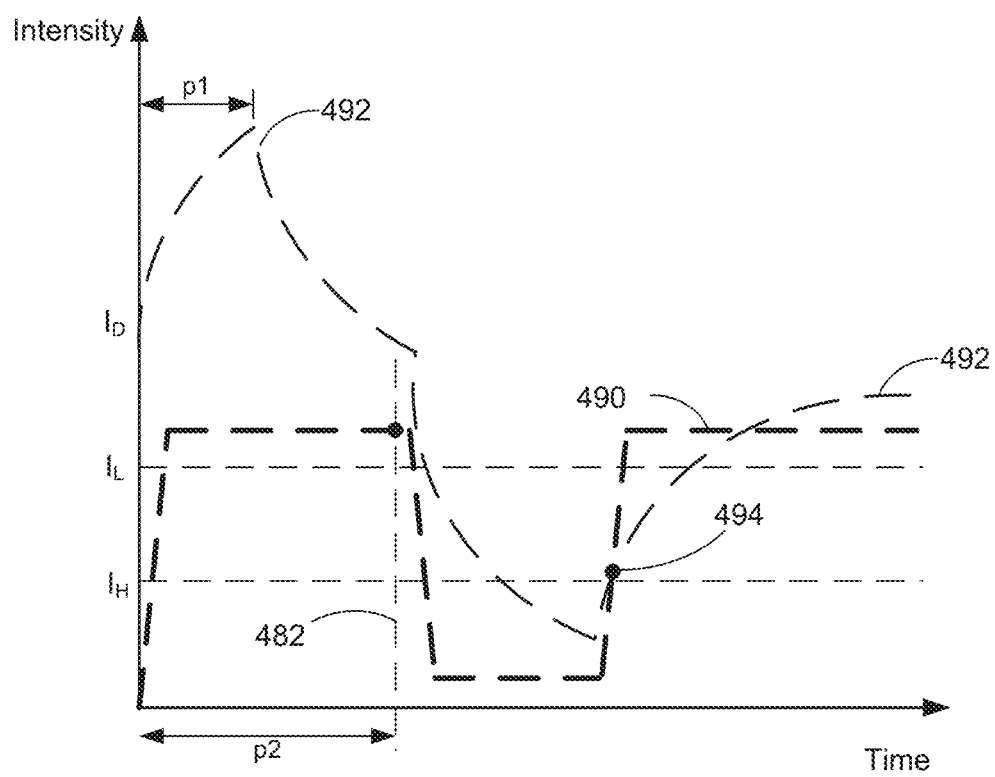

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

User Interfaces and Associated Processes

Attention is now directed towards embodiments of user interfaces ("UI") and associated processes that may be implemented on a computer system, sometimes herein referred to as electronic device, such as portable multifunction device 100 or device 300, with a display, and a touch-sensitive surface.

Figure 5A:
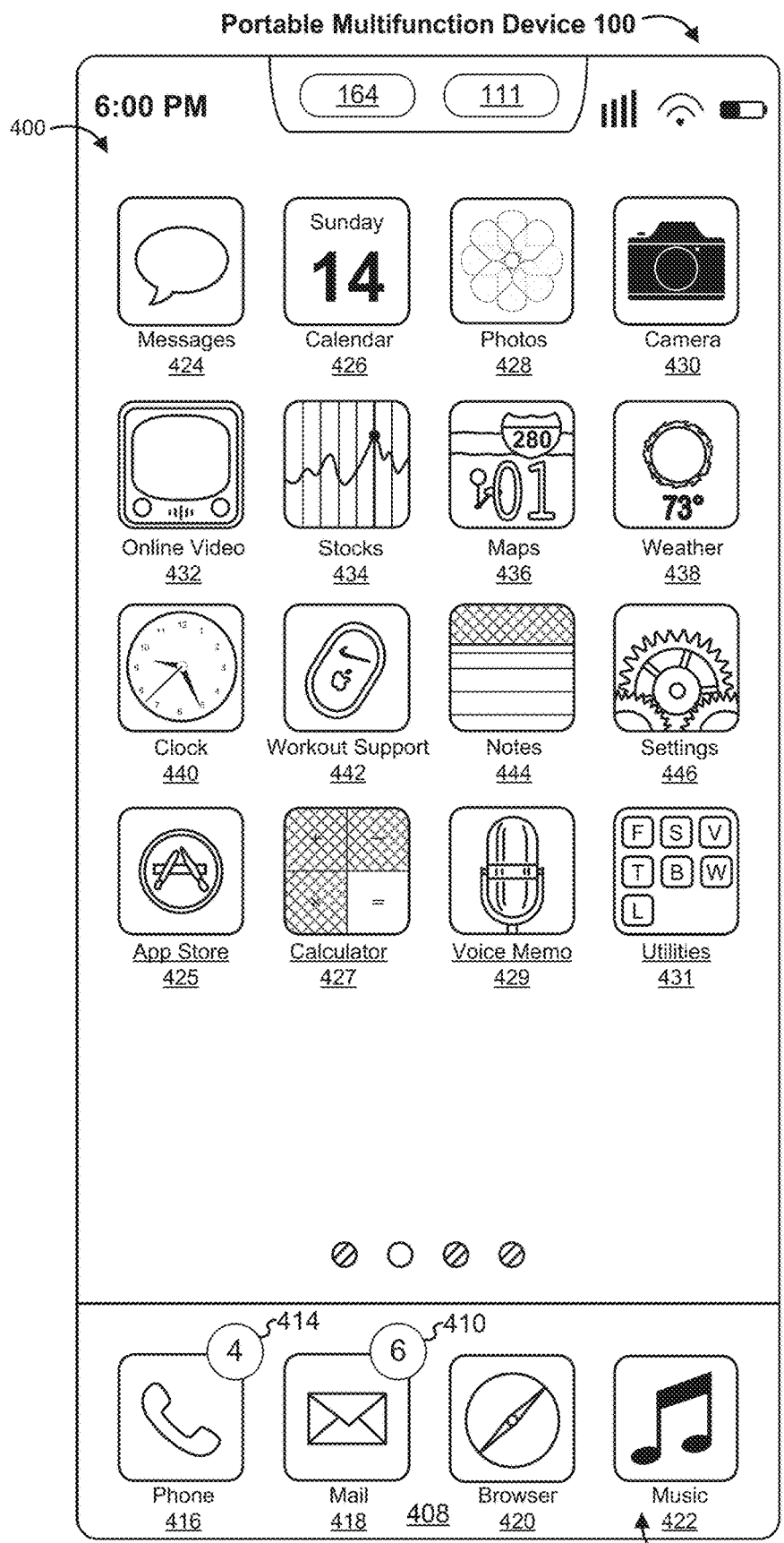
FIGS. 5A-5AL illustrate example user interfaces for activating, deactivating, and modifying the settings for activity modes of the electronic device, in accordance with some embodiments.

FIGS. 5A-5AL illustrate example user interfaces for activating, deactivating, and modifying the settings for activity modes of the computer system, in accordance with some embodiments. The user interfaces in these figures are used to illustrate the processes described below, including the processes in FIGS. 9A-9F and 13A-13B. For convenience of explanation, some of the embodiments will be discussed with reference to operations performed on a device with a touch-sensitive display system 112 (e.g., portable multifunction device 100 with a touch screen 112).

FIG. 5A illustrates an example of an application launch user interface (e.g., a home screen user interface). The user can interact with the portable multifunction device 100 as normal, while no activity modes are active. The user can interact with application launch icons 416-446 for activating respective application user interfaces. In some embodiments, the application launch user interface includes one or more widgets, in addition to one or more application launch icons, which can also be activated to display respective widget user interfaces. While the application launch user interface is displayed (and in some embodiments, while other user interfaces, or while any user interface, is/are displayed), the user can perform inputs to navigate to other user interfaces (e.g., a swipe left or swipe right input to navigate between pages of the application launch user interface, a swipe down input to navigate to a control panel user interface or a notification center user interface (e.g., depending on the location at which the swipe down input is detected), etc.).

Figure 5B:
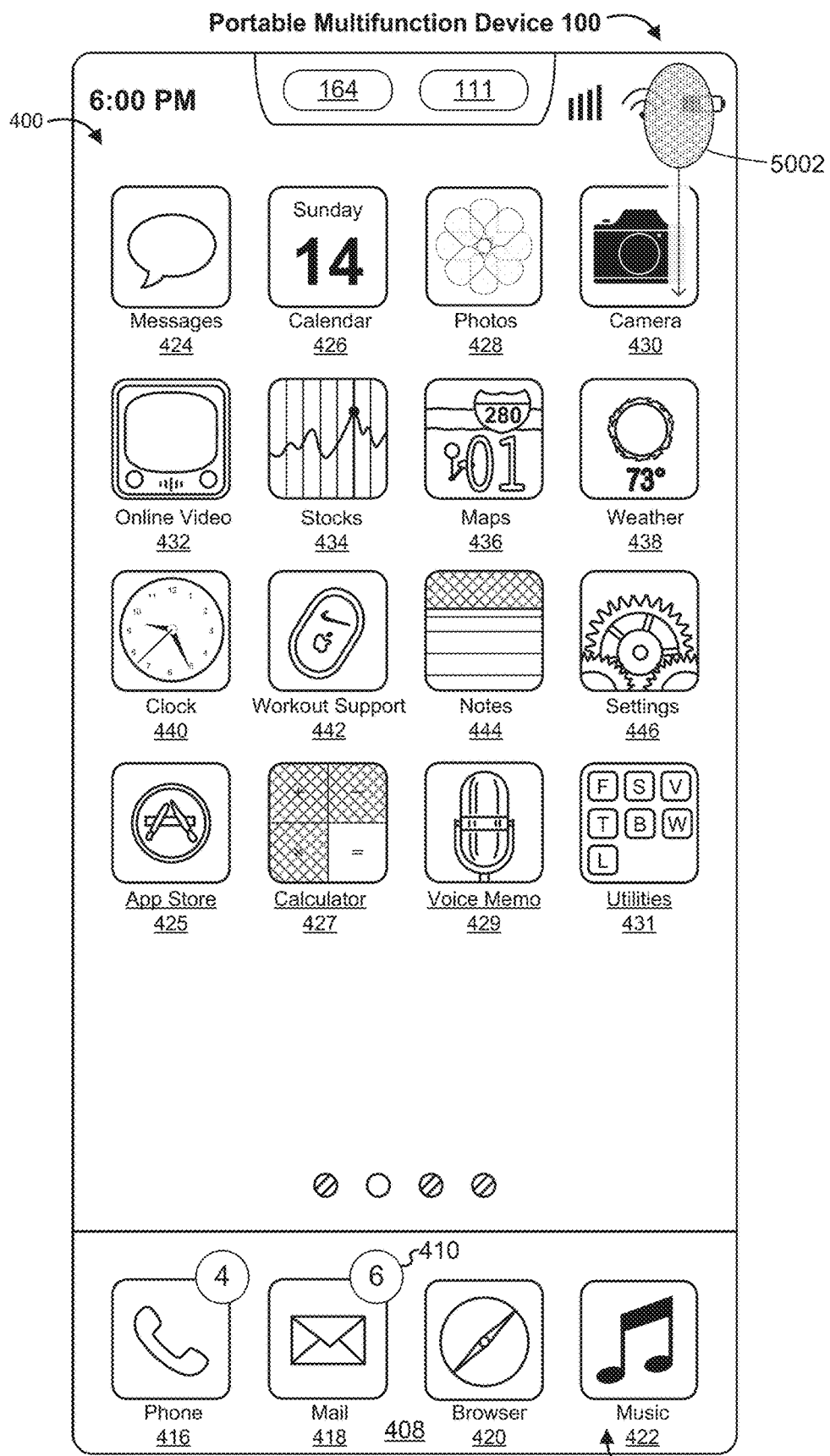

FIG. 5B illustrates an example of an input for displaying a control panel user interface (e.g., control panel 5004). In some embodiments, in response to a user input (e.g., downward edge swipe input by the contact 5002 detected on the upper right corner of the touch screen 112, where an edge swipe is a gesture that starts at a position corresponding to a respective edge of a displayed user interface or at an edge of the display area of a display device), the portable multifunction device 100 displays a control panel 5004 (as shown in FIG. 5C).

Figure 5C:
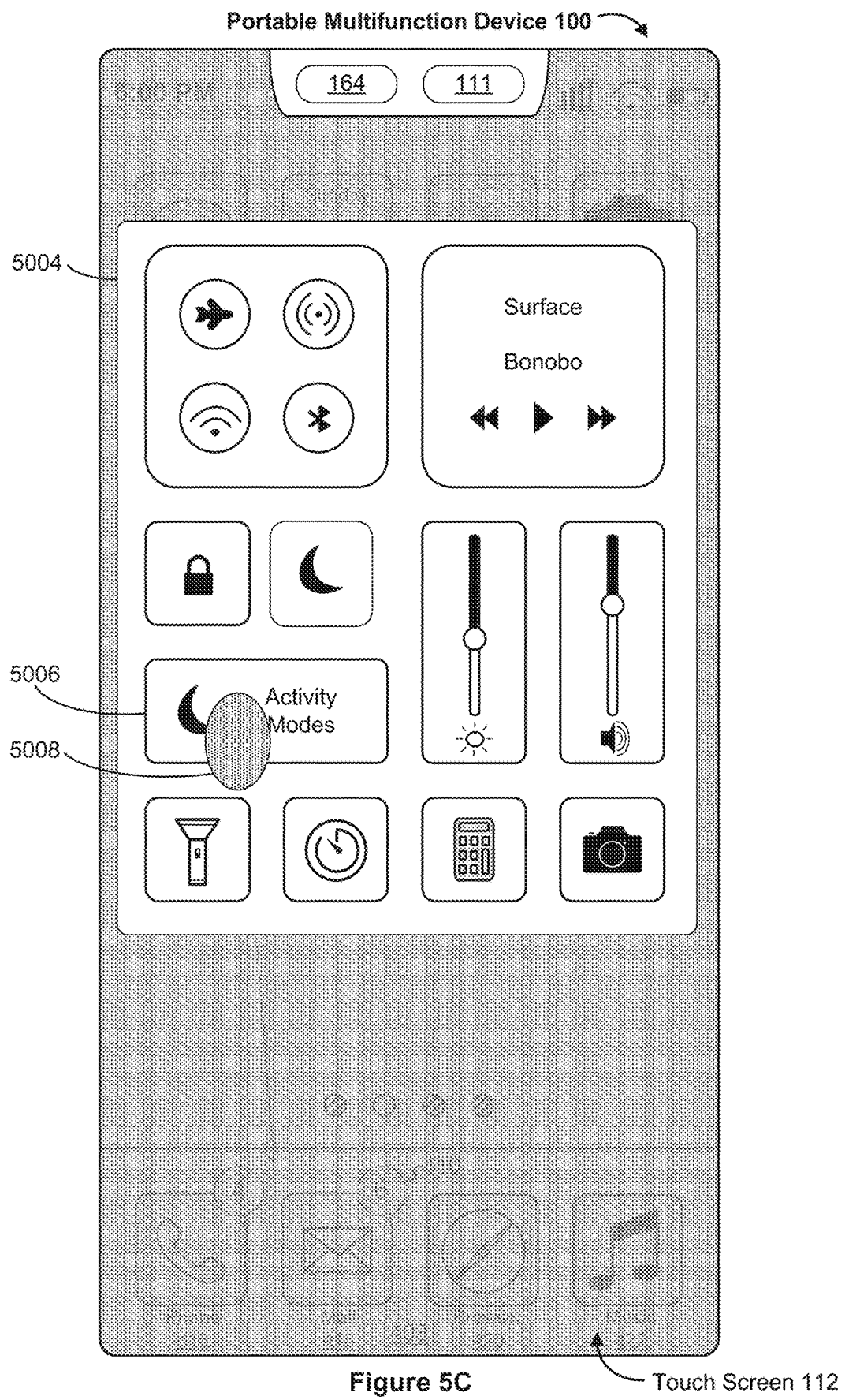

FIG. 5C illustrates an example of a control panel user interface displayed in response to a user input. The control panel 5004 includes selectable options for triggering a plurality of device control functions (e.g., options for adjusting display brightness, adjusting device volume, locking screen orientation, turning on/off network connections, turning on/off airplane mode, turning on/off Bluetooth connection, etc.) and optionally some application functions (e.g., starting media playback, turning on a flashlight, turning on a camera, displaying an alarm application, displaying a calculator application, etc.). In some embodiments, the control panel 5004 includes an affordance 5006 for displaying (e.g., in response to detecting a user input 5008 on the affordance 5006) a first user interface that includes affordances associated with activity modes available on the portable multifunction device 100, and affordances for modifying settings for the available activity modes.

Figure 5D:
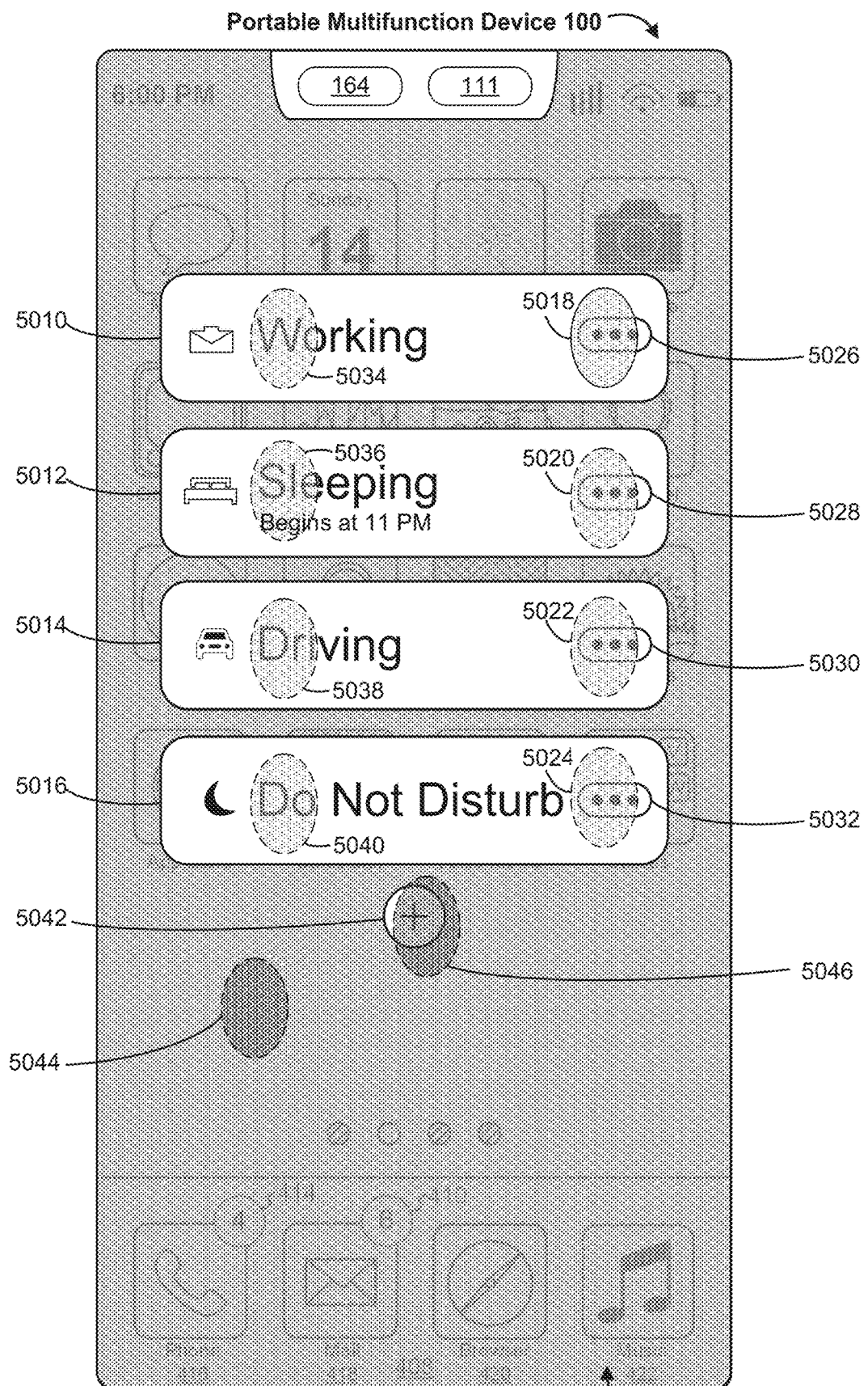

FIG. 5D illustrates an example of a first user interface that includes affordances associated with activity modes available on the portable multifunction device 100, and affordances for modifying settings for the available activity modes. The first user interface includes affordances 5010, 5012, 5014, and 5016 corresponding to a "Working," "Sleeping," "Driving," and "Do Not Disturb" activity mode of the portable multifunction device 100, respectively. In some embodiments, an activation of an activity mode is initiated in response to detecting a user input (e.g., user input 5034, 5036, 5038, or 5040) on a respective affordance corresponding to a respective activity mode. In some embodiments, the affordances 5010, 5012, 5014, and 5016 include icons corresponding to the respective activity mode (e.g., the affordance 5010 corresponding to the "Working" activity mode includes a briefcase icon). In some embodiments, the affordances 5010, 5012, 5014, and 5016 include an indication corresponding to the settings (e.g., an indication of an automatic activation or deactivation condition) for the respective activity mode (e.g., the affordance 5012 corresponding to the "Sleeping" activity mode includes the text "Begins at 11 PM," indicating that the "Sleeping" activity mode is scheduled to start automatically at 11:00 PM). In some embodiments, fewer than all of affordances 5010, 5012, 5014, and 5016 include an indication corresponding to the settings for the respective activity mode. In some embodiments, only the next scheduled activity mode includes an indication corresponding to the settings for the respective activity mode (e.g., in FIG. 5D, no activity mode is scheduled to become active after the current time 6:00 PM, but before the "Sleeping" activity mode begins at 11:00 PM, so only affordance 5012 corresponding to the "Sleeping" activity mode displays the indication corresponding to the settings for the "Sleeping" activity mode).

In some embodiments, the first user interface includes affordances 5026, 5028, 5030, and 5032, for modifying settings for the "Working," "Sleeping," "Driving," and "Do Not Disturb" activity modes, respectively. In some embodiments, the first user interface includes an affordance 5042 for adding another activity mode to the first user interface. In some embodiments, activating the affordance 5042 (e.g., in response to detecting a user input 5046 on the affordance 5042) causes display of a settings user interface for configuring a new activity mode. In some embodiments, in response to detecting a user input 5044 at a location away from the affordances included in the first user interface, the portable multifunction device 100 ceases displaying the first user interface (e.g., and resumes displaying the user interface displayed immediately prior to the first user interface).

Figures 1, 5E:
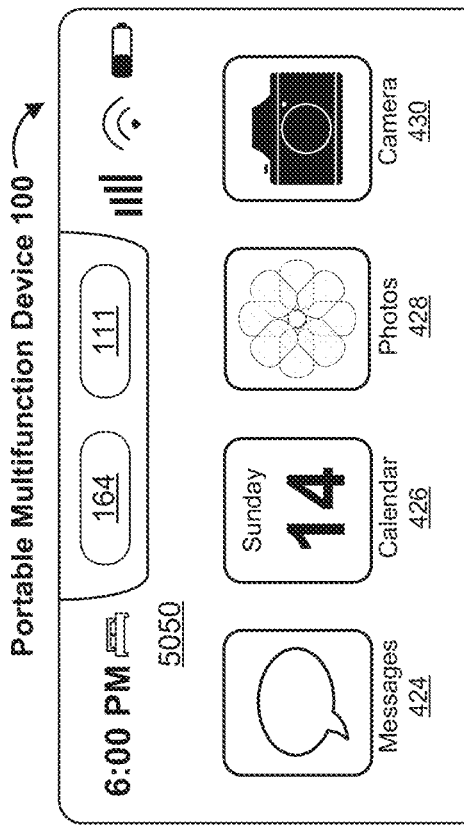
Figures 2, 5E:
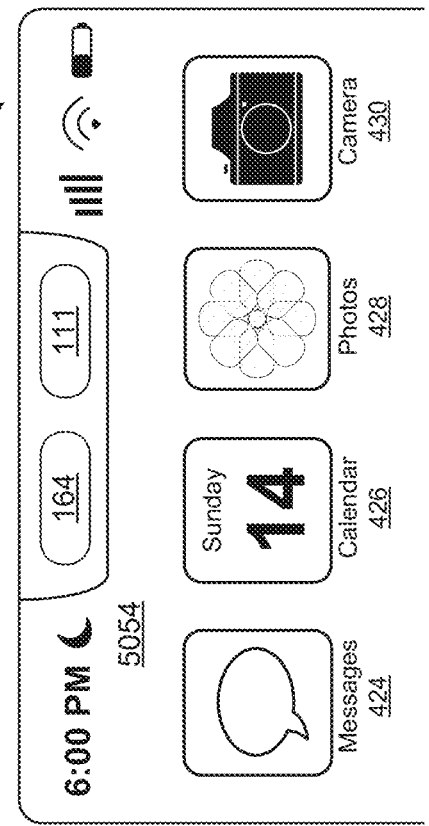
Figures 3, 5E:
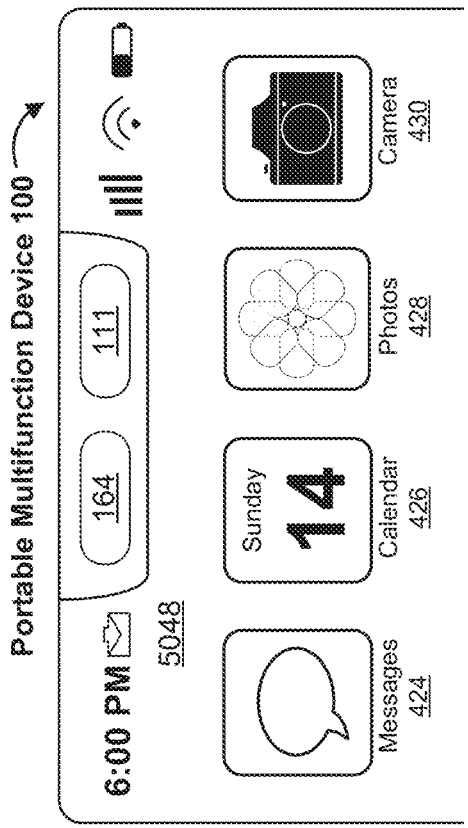
Figures 4, 5E:
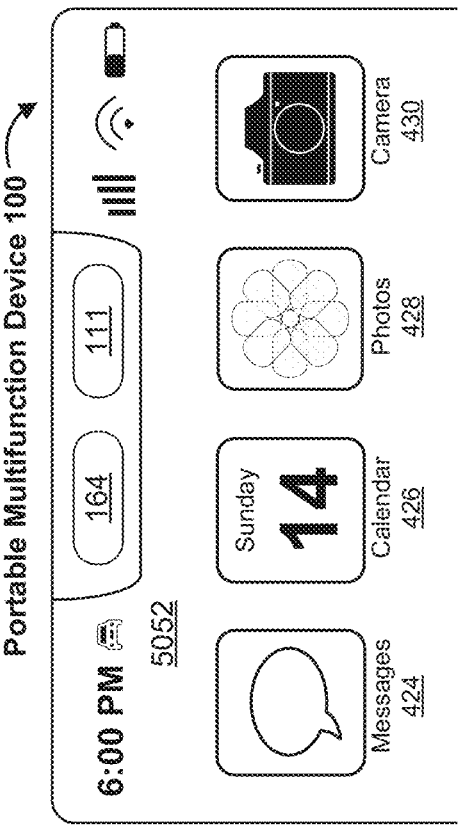
FIG. 4B illustrates an example user interface for a multifunction device with a touch-sensitive surface that is separate from the display in accordance with some embodiments.

FIGS. 5E1-5E4 illustrate exemplary user interfaces of the portable multifunction device 100 when an activity mode is active. Specifically, FIGS. 5E1-5E4 illustrate exemplary application launch user interfaces displayed after the "Working," "Sleeping," "Driving," and "Do Not Disturb" activity modes have been activated, respectively (e.g., in response to detecting inputs 5034, 5036, 5038, or 5040, respectively). In some embodiments, an indication corresponding to the current activity mode, sometimes called the active activity mode, is displayed in the upper left corner of the touch screen 112 (e.g., a unique glyph or icon corresponding to the current activity mode). In FIGS. 5E-1-5E4, indications 5048, 5050, 5052, and 5054, respectively, are displayed in the upper left corner of the touch screen 112 to indicate that the "Working" activity mode, the "Sleeping" activity mode, the "Driving" activity mode, and the "Do not disturb" activity mode, respectively, are active.

Figure 5F:
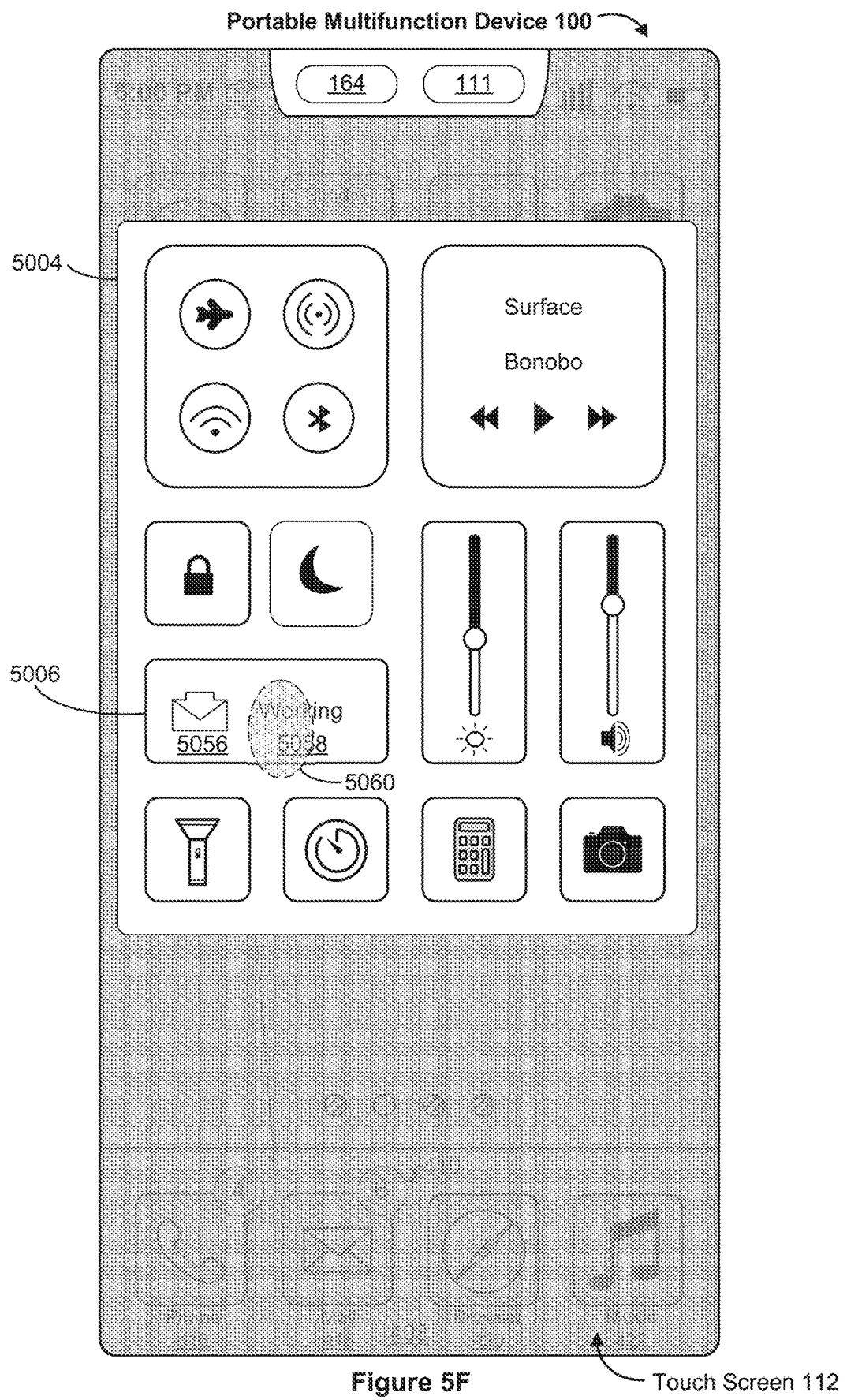

FIG. 5F illustrates an example of a control panel user interface while an activity mode is active. The affordance 5006 in the control panel 5004 previously displayed the text "Activity Modes" in FIG. 5D, when no activity modes were active. In FIG. 5F, the affordance 5006 now displays an indication 5056, and the name 5058, corresponding to the "Working" activity mode. In some embodiments, in response to a user input 5060 on the affordance 5006, the portable multifunction device 100 deactivates the currently active activity mode (e.g., the "Working" activity mode). In some embodiments, after deactivating the currently active activity mode, the appearance of the affordance 5006 returns to its original state (e.g., displaying the text "Activity Modes," as shown in FIG. 5D).

Figure 5G:
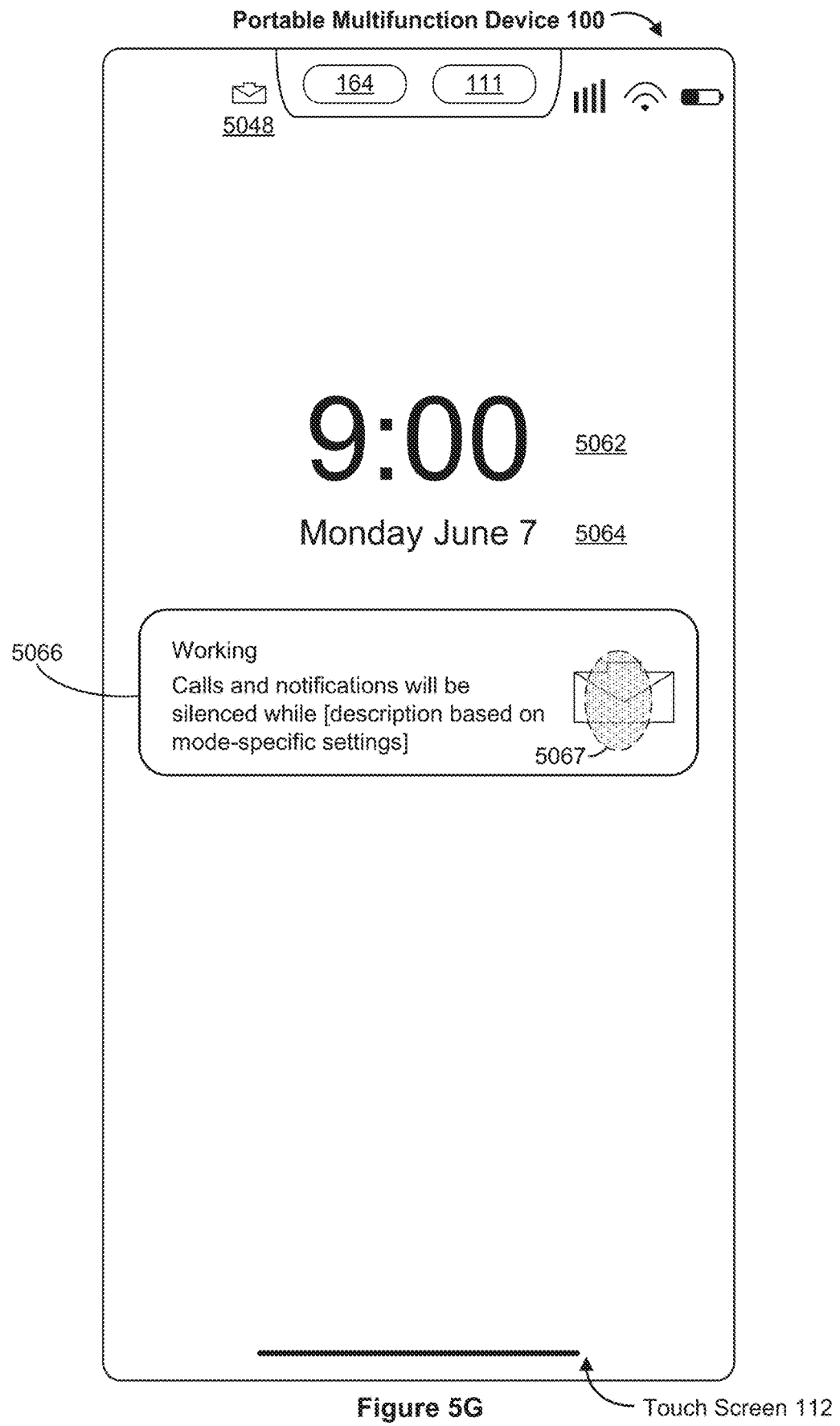

FIG. 5G illustrates an example of a lock screen user interface while an activity mode is active. In some embodiments, an indication 5066 of the current activity mode (e.g., an indication that the "Working" activity mode is active) is displayed on the lock screen. In some embodiments, the indication 5066 displays a description specific to the current activity mode (e.g., the description of the indication 5066 is different when different activity modes are active). In some embodiments, the description specific to the activity mode indicates which activity mode is active. In some embodiments, the description specific to the activity mode indicates additional details (e.g., settings) associated with the active activity mode. In some embodiments, the indication 5066 is displayed below a time 5062 and a date 5064, which are concurrently displayed on the lock screen user interface with indication 5066. In some embodiments, a user input (e.g., user input 5067) selecting the indication 5066 of the current activity mode deactivates the current activity mode.

FIGS. 5H-5P illustrate exemplary user interfaces within a messaging application of a first user (e.g., a user of portable multifunction device 100-b, which is, e.g., analogous to, but another instance of, portable multifunction device 100). In these examples, the first user is messaging a second user (e.g., a user of portable multifunction device 100, FIGS. 5A-5G). FIGS. 5H-5K illustrate examples within the messaging application of the first user when no activity mode is active for the portable multifunction device 100 of the second user. In contrast, FIGS. 5L-5P illustrate examples within the messaging application of the first user when an activity mode is active for the portable multifunction device of the second user. One of skill in the art, having the benefit of this disclosure, will recognize that the embodiments described with reference to FIGS. 5H-5P are applicable to user interfaces for other applications in addition to, or in place of, a messaging application user interface (e.g., other communication applications such as e-mail or telephone, entertainment applications that can be experienced with other users, etc.).

Figure 5H:
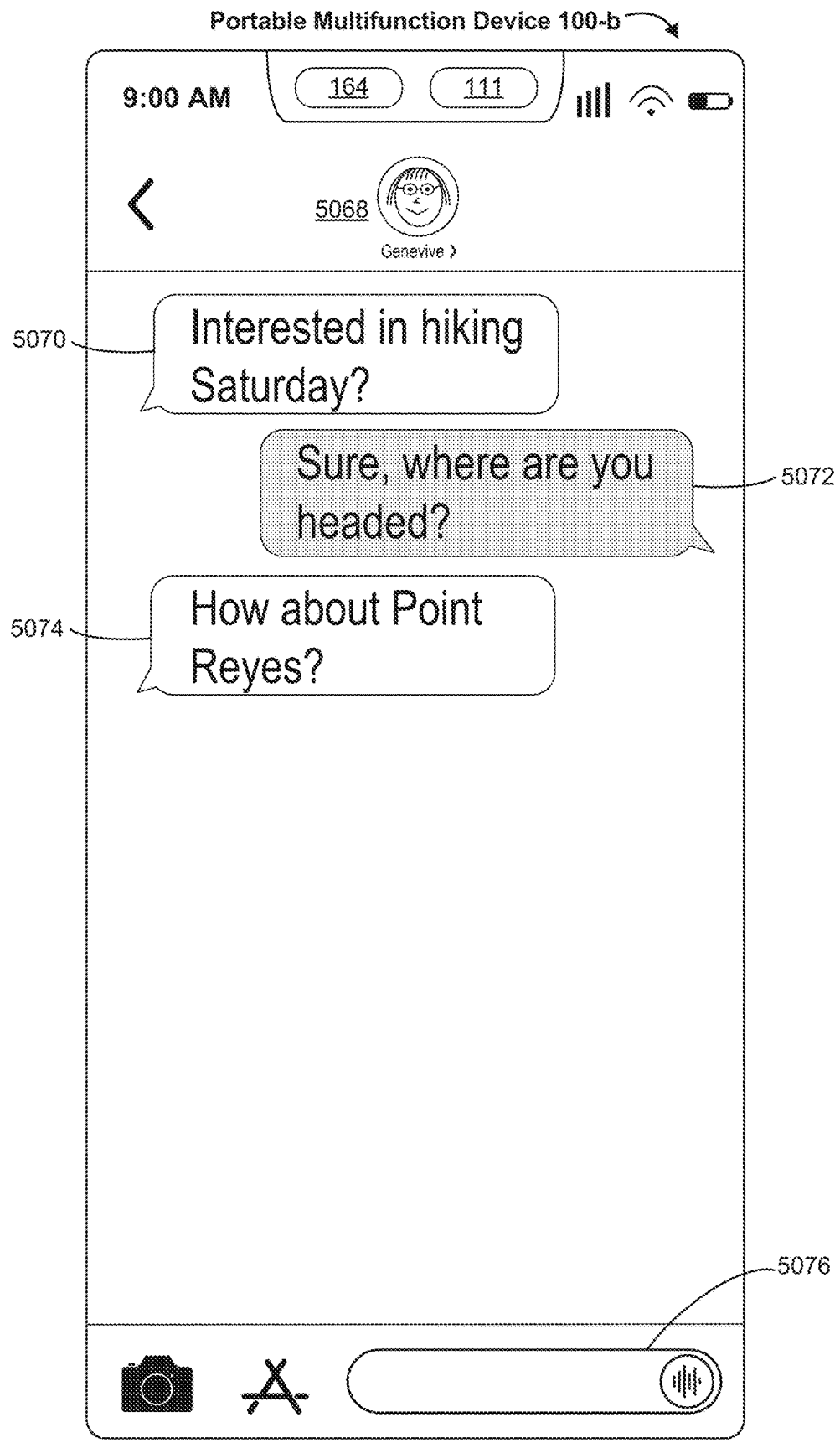

FIG. 5H illustrates an example of a messaging application user interface for a first user of portable multifunction device 100-b when no activity mode is active for the second user (e.g., of the other portable multifunction device 100). The messaging application user interface includes an indication 5068 (e.g., an avatar) associated with the second user of the other portable multifunction device, and a message-input area 5076. The messaging application user interface includes messages 5070, 5072, and 5074, with messages 5070 and 5074 being received by the first user and sent from the second user of the other portable multifunction device, and message 5072 being sent by the first user to the second user of the other portable multifunction device.

Figure 5I:
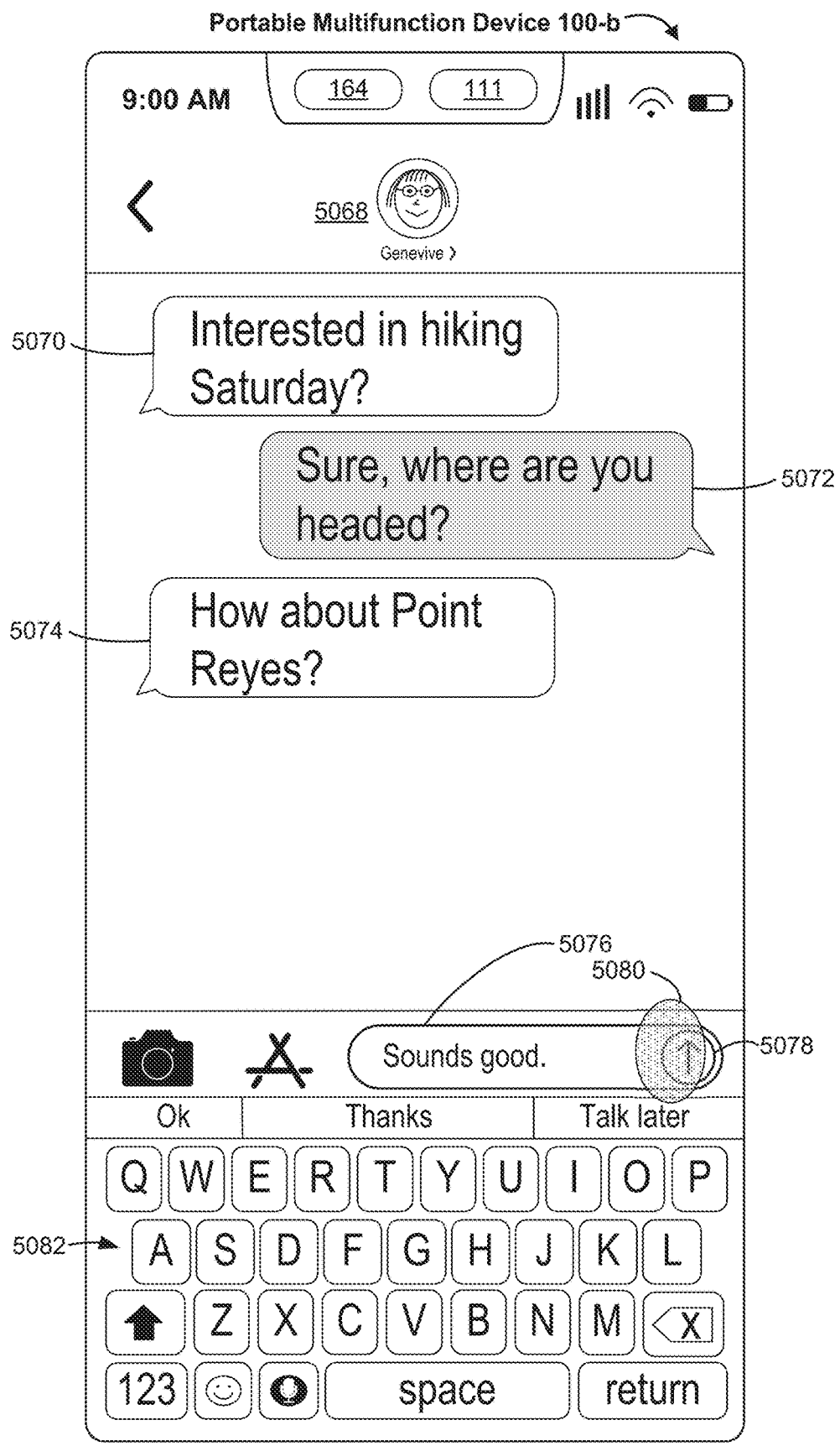

FIG. 5I illustrates an example of a messaging application user interface, when no activity mode is active for the second user of the other portable multifunction device, as the first user composes a reply in the messaging application user interface. The first user inputs a reply (e.g., using the keyboard 5082), which appears in the message-input area 5076, prior to the sending of the message to the second user of the other portable multifunction device. In response to detecting a user input 5080 on an affordance 5078 (e.g., a "send" affordance for sending or transmitting the message in the message-input area 5076), the portable multifunction device 100-b transmits the message in the message-input area 5076, to the second user of the other portable multifunction device.

Figure 5J:
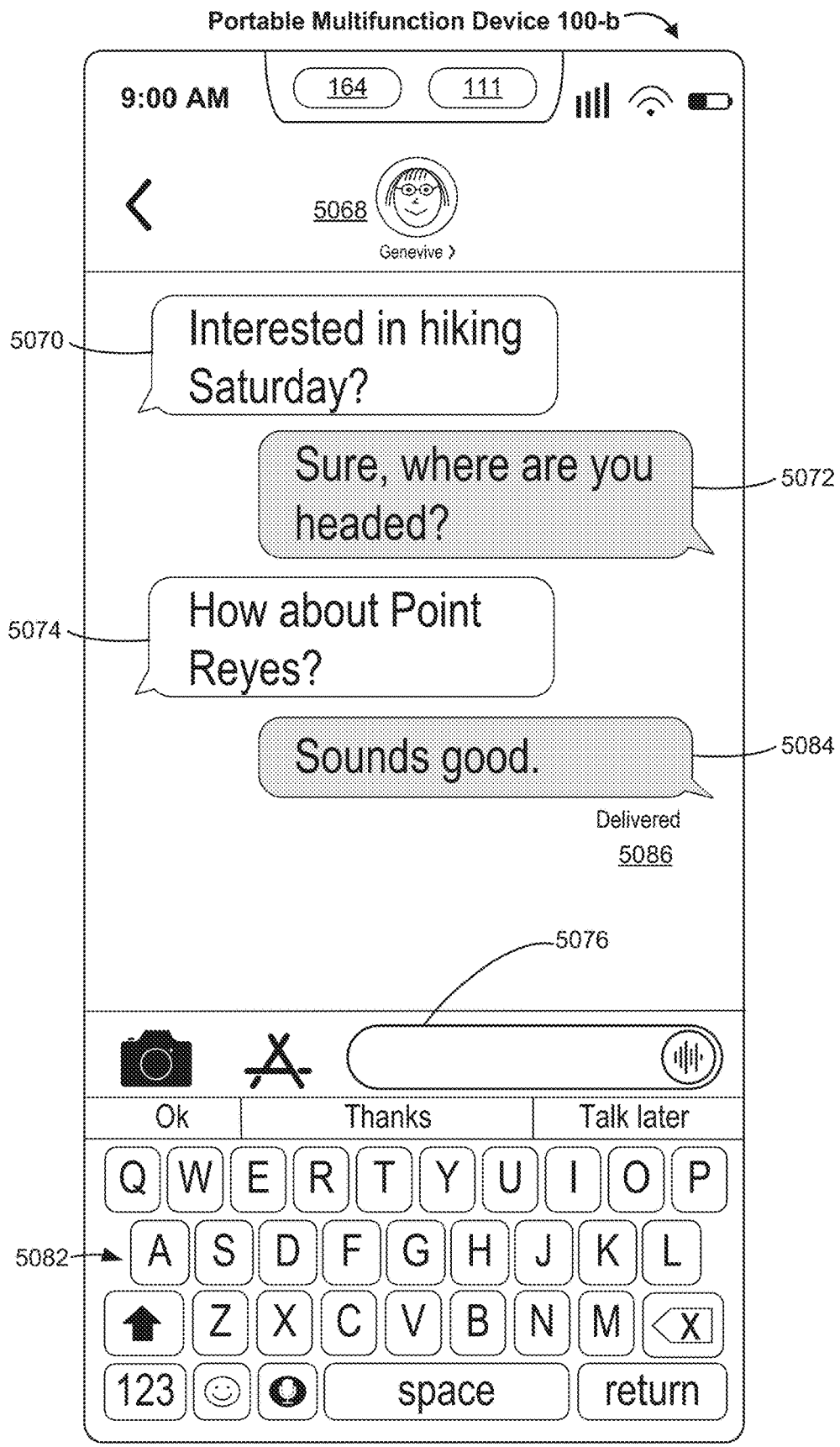

FIG. 5J illustrates an example of a messaging application user interface, when no activity mode is active for the second user of the other portable multifunction device, and after the portable multifunction device 100-b transmits a message to the second user of the other portable multifunction device. The transmitted message appears in the messaging application user interface as message 5084. In addition, the messaging application user interface includes a "Delivered" indication 5086 that the message 5084 was delivered to the second user of the other portable multifunction device. In some embodiments, the "Delivered" indication 5086 is displayed adjacent to (e.g., below) the message 5084.

Figure 5K:
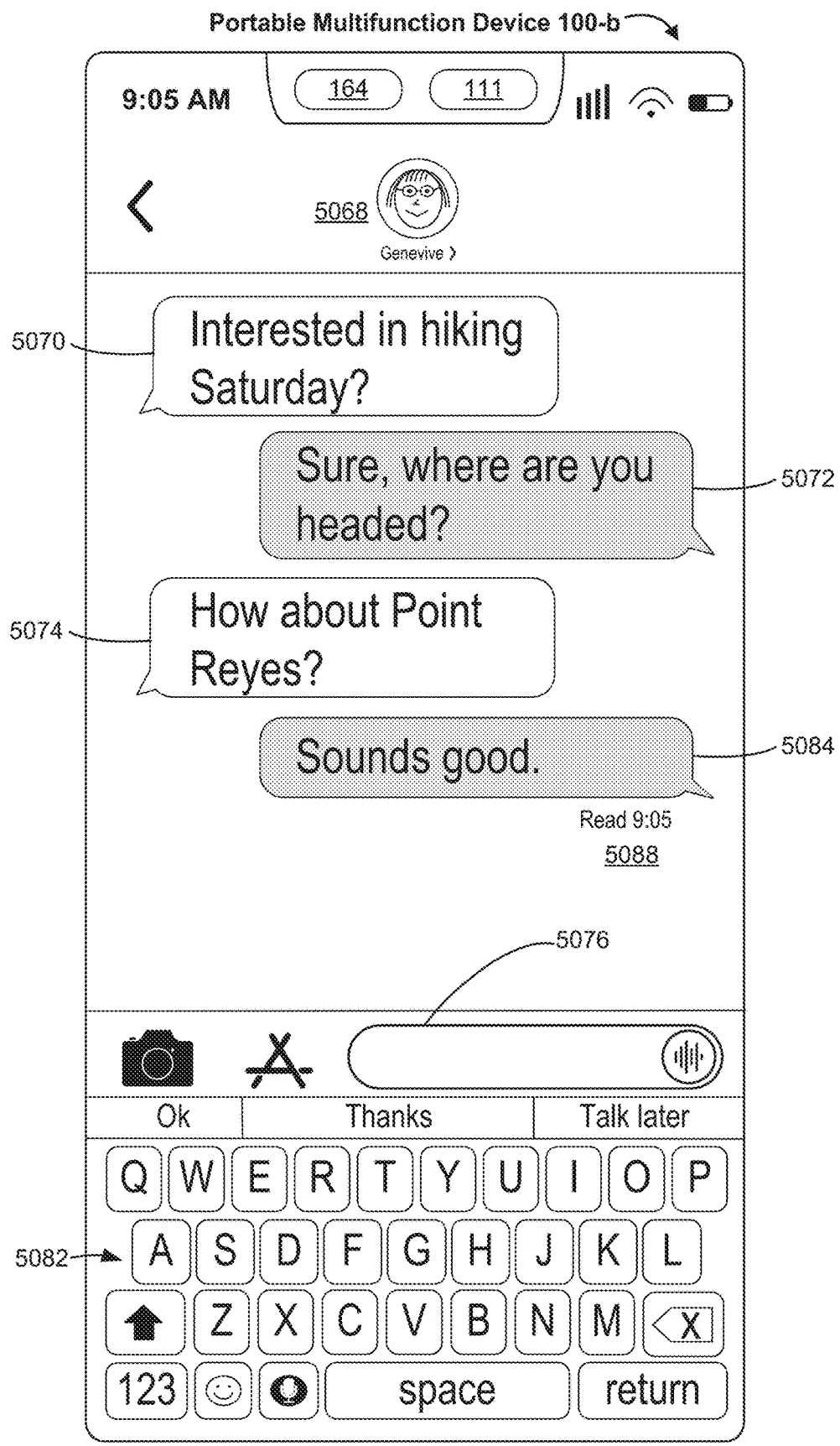

FIG. 5K illustrates an example of a messaging application user interface, when no activity mode is active for the second user of the other portable multifunction device, and after the delivered message has been viewed by the second user of the other portable multifunction device. After the second user of the other portable multifunction device views the message (on the other portable multifunction device, e.g., the portable multifunction device 100) corresponding to the message 5084 (displayed on the portable multifunction device 100-b), the portable multifunction device displays a second indication 5088 (sometimes called a "Read" indication) that the message has been viewed (e.g., an indication that includes the text "Read").

FIGS. 5L-5P illustrate exemplary user interfaces associated with a first user of the portable multifunction device when an activity mode is active on the second user's portable multifunction device. In contrast, FIGS. 5H-5K, as discussed above, illustrate exemplary user interfaces associated with the first user of the portable multifunction device when no activity mode is active on the second user's portable multifunction device.

Figure 5L:
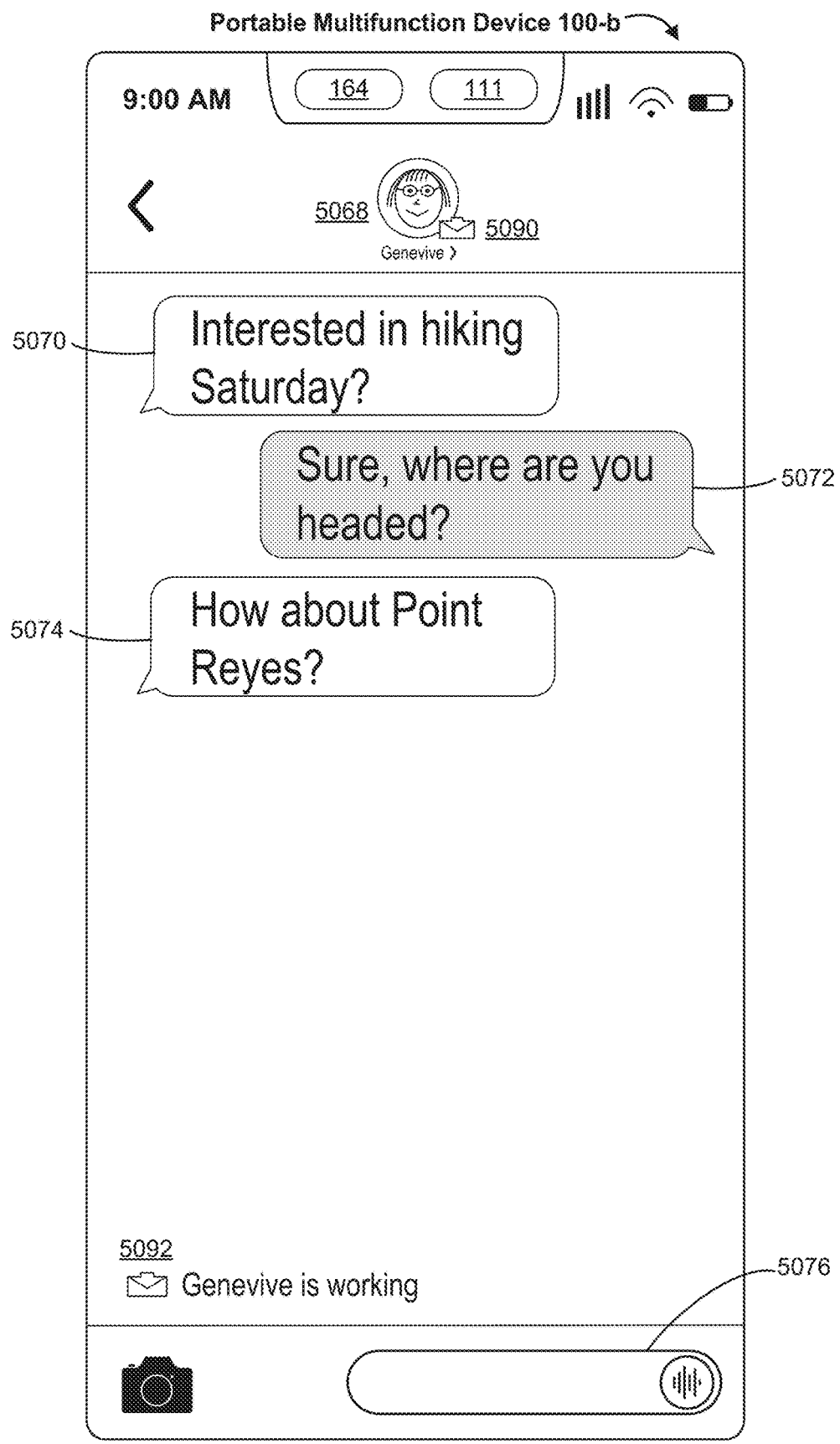

FIG. 5L illustrates an example of a messaging application user interface when an activity mode is active for the second user of the other portable multifunction device. FIG. 5L illustrates a similar state to FIG. 5H, but notably illustrates a first activity mode indicator 5090 for the second user, and optionally includes a second activity mode indicator 5092. In some embodiments, the first activity mode indicator 5090 is visually associated with (e.g., displayed overlapping or adjacent to) the indication 5068 (e.g., the avatar) associated with the second user of the other portable multifunction device.

In some embodiments, the first activity mode indicator 5090 is or includes a graphical indication (e.g., an icon) of the activity mode (e.g., a briefcase representing a "Working" activity mode). In some embodiments, the first activity mode indicator 5090 includes text (e.g., an away status indicating the activity mode that is active) associated with the activity mode, in conjunction with or in place of, a graphical indication of the activity mode. In some embodiments, the first activity mode indicator 5090 partially overlaps the indication 5068 (e.g., as shown in FIG. 5L) associated with the second user of the other portable multifunction device. In some embodiments, the first activity mode indicator 5090 is adjacent to (e.g., to the left of, to the right of, above, below, etc.) the indication 5068 associated with the second user of the other portable multifunction device. In some embodiments, the first activity mode indicator 5090 is adjacent to (e.g., to the left of, to the right of, above, below, etc.), and without overlapping, the indication 5068 associated with the second user of the other portable multifunction device.

In some embodiments, the second activity mode indicator 5092 is or includes a graphical indication (e.g., an icon) of the activity mode (e.g., a briefcase representing a "Working" activity mode). In some embodiments, the second activity mode indicator 5092 includes text (e.g., an away status indicating the activity mode that is active) associated with the activity mode, in conjunction with or in place of, a graphical indication of the activity mode. In some embodiments, the second activity mode indicator 5092 is displayed in a different region of the messaging application user interface, from the first activity mode indicator 5090. In some embodiments, the second activity mode indicator 5092 includes additional details associated with the activity mode (e.g., text indicating a characteristic, such as the name, of the activity mode) not included in the first activity mode indicator 5090.

Figure 5M:
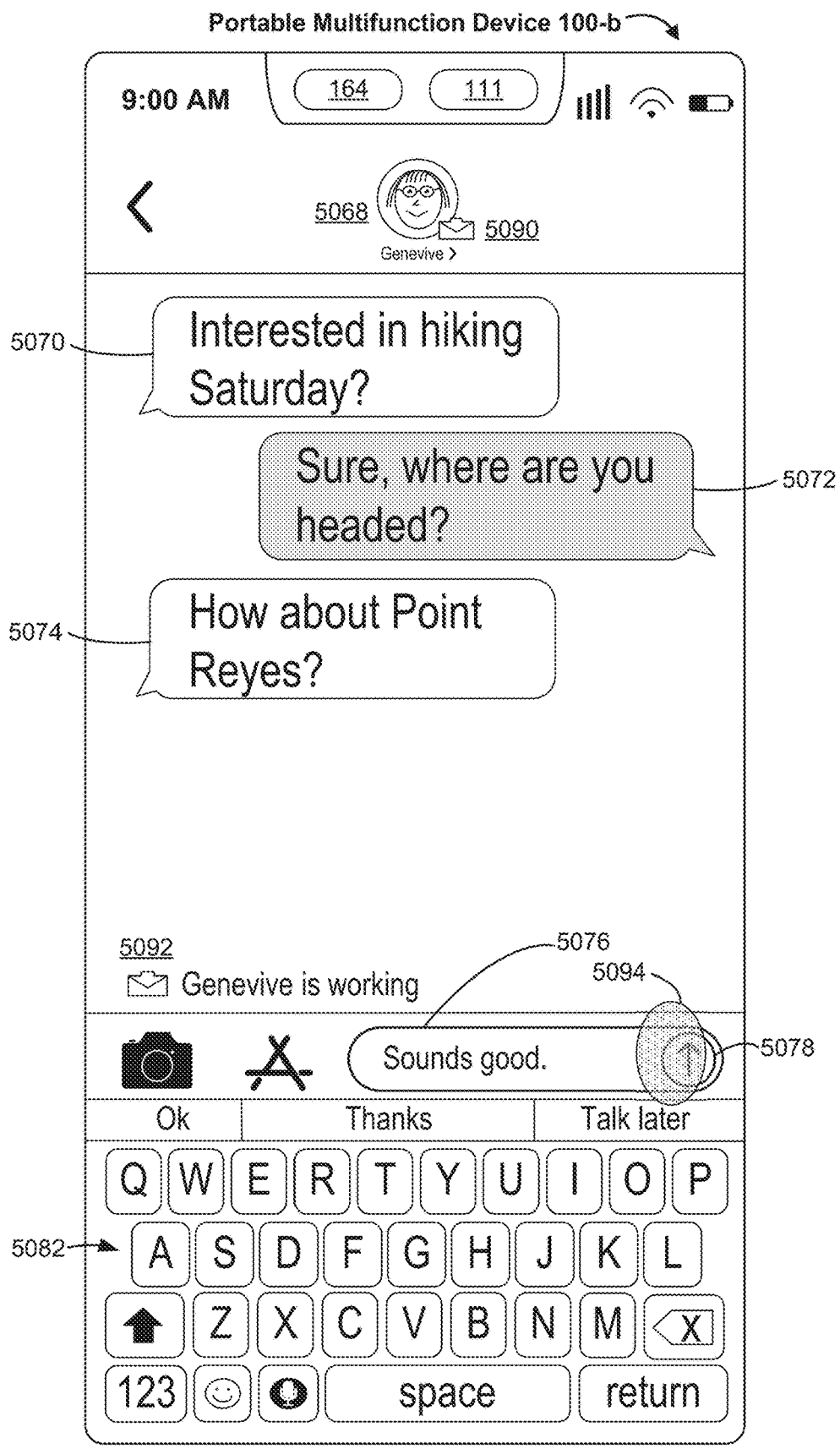

FIG. 5M illustrates an example of a messaging application user interface, when an activity mode is active for the second user of the other portable multifunction device, as the first user composes a reply in the messaging application user interface. FIG. 5M is analogous to Figure SI, but includes the first activity mode indicator 5090 and the second activity mode indicator 5092 described above with reference to FIG. 5L. In response to detecting a user input 5094 on the affordance 5078, the portable multifunction device 100-*b* transmits the message to the second user of the other portable multifunction device.

Figure 5N:
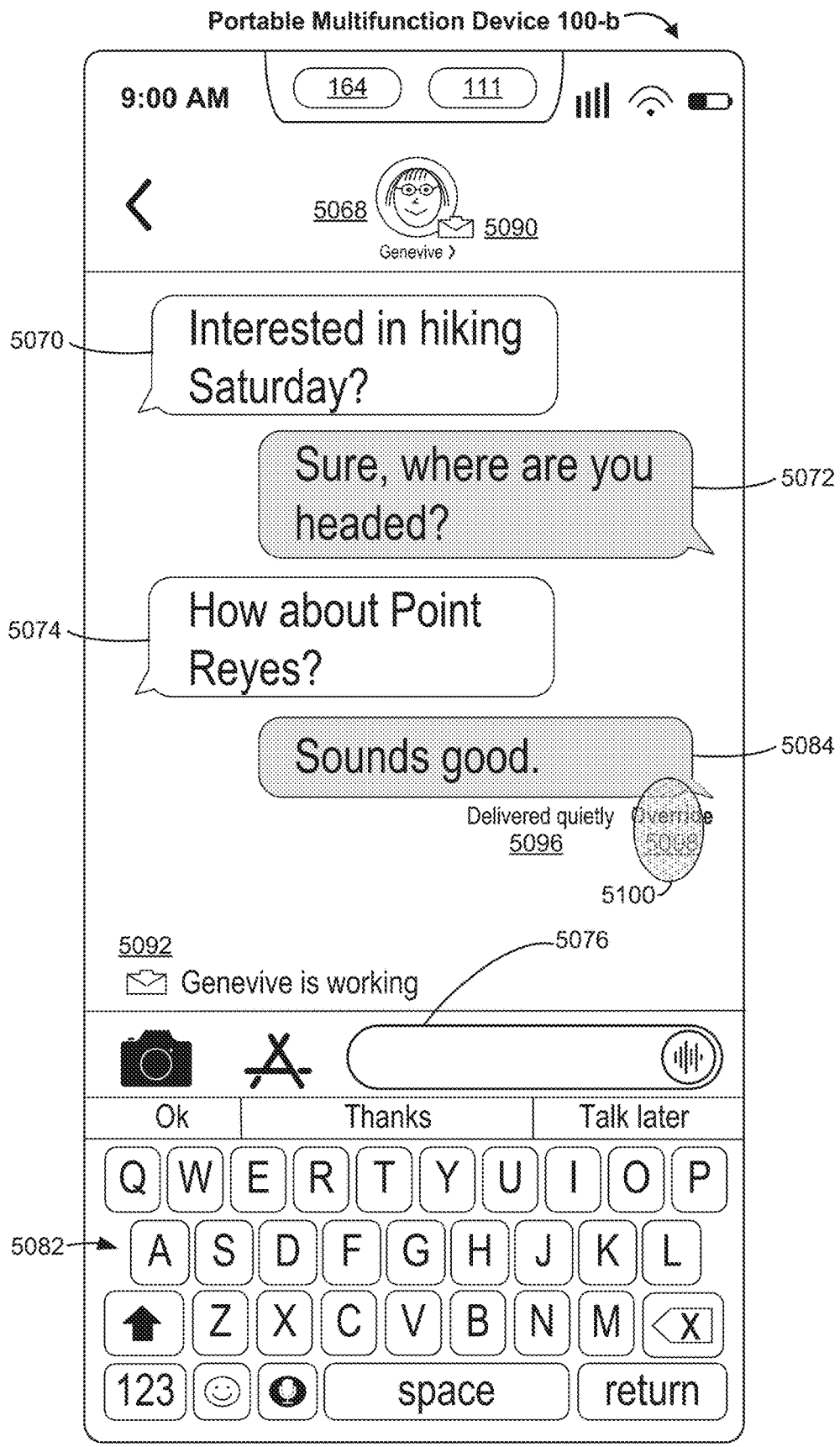

FIG. 5N illustrates an example of a messaging application user interface, when an activity mode is active for the second user of the other portable multifunction device, and after the portable multifunction device 100-*b* transmits a message to the second user of the other portable multifunction device. In contrast to FIG. 5J, which includes an indication 5086 that the message 5084 was delivered to the second user of the other portable multifunction device, FIG. 5N includes a "Delivered quietly" indication 5096 that the message was delivered in accordance with activity mode (e.g., reduced notification) settings for the other participant. In some embodiments, the "Delivered quietly" indication includes text in addition to, or in place of, "Delivered quietly," to indicate that a notification associated with the message 5084 was not delivered to the second user of the other portable multifunction device. In some embodiments, an override affordance 5098 is displayed in conjunction with the "Delivered quietly" indication 5096. In some embodiments, the override affordance 5098 is displayed adjacent to (e.g., to the left of, to the right of, above, below, etc.) the "Delivered quietly" indication 5096. In response to detecting a user input 5100 that activates the override affordance 5098, the portable multifunction device sends a request for delivery of the notification associated with the message 5084.

Figure 5O:
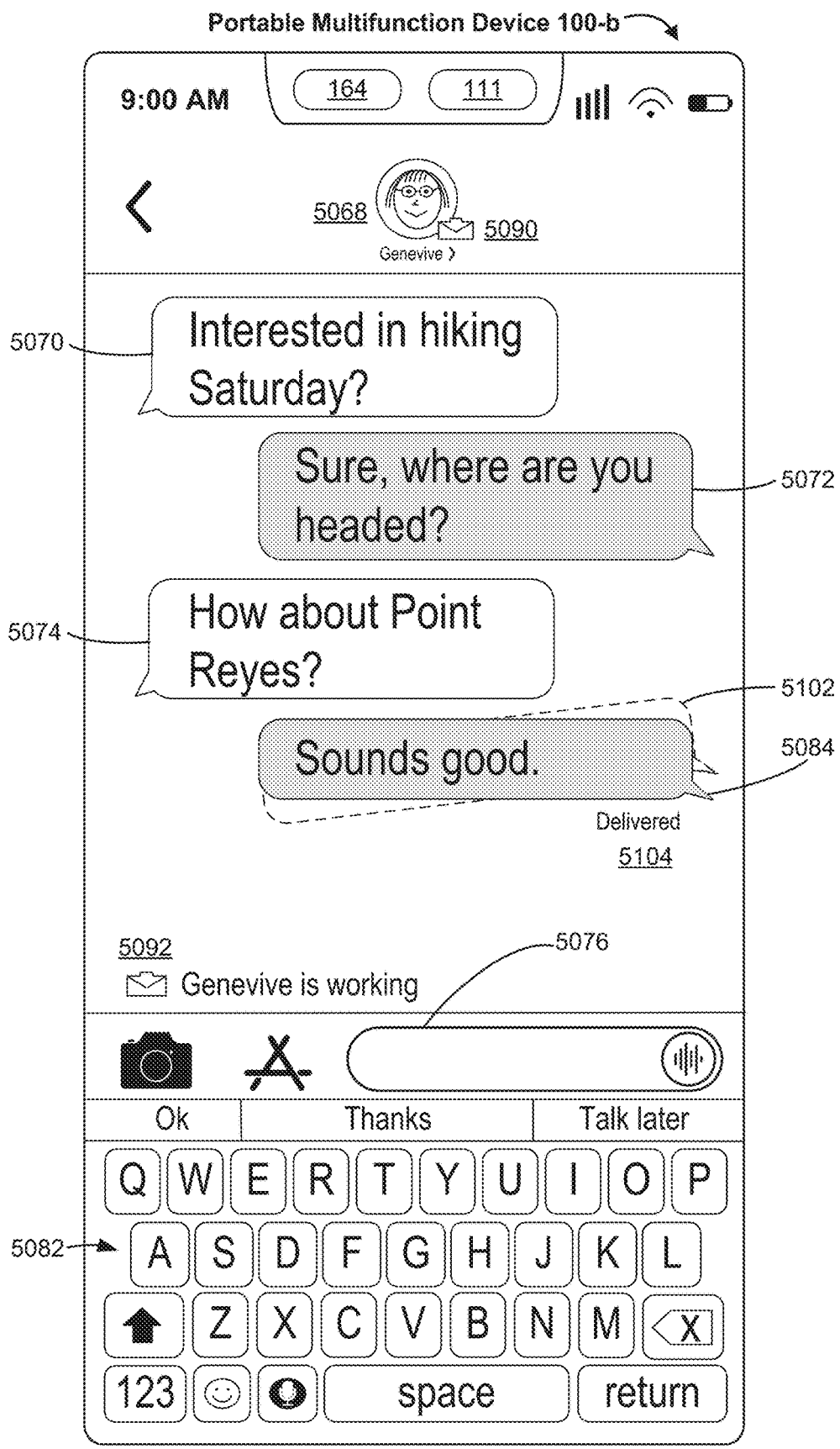

FIG. 5O illustrates an example of a messaging application user interface on the first user's portable multifunction device 100-*b*, when an activity mode is active for the second user of the other portable multifunction device, and after the first user's portable multifunction device 100-*b* sends the request for delivery of the notification associated with the message. FIG. 5O illustrates an analogous state to FIG. 5J, except that the activity mode is active for the second user of the other portable multifunction device, and FIG. 5O includes the first activity mode indicator 5090 and/or the second activity mode indicator 5092 described above with reference to FIG. 5L. After the portable multifunction device 100-*b* sends a request for delivery of the notification associated with the message, the other portable multifunction device delivers the notification associated with the message. In some embodiments, the notification associated with the message is a message, displayed on the other portable multifunction device, corresponding to the message 5084. After sending the request for delivery of the notification associated with the message 5084, the portable multifunction device 100-*b* displays a "Delivered" indication 5104. In some embodiments, displaying the "Delivered" indication 5104 includes replacing the "Delivered quietly" indication 5096 with display of the "Delivered" indication 5104. In some embodiments, after sending the request for delivery of the notification associated with the message 5084, the portable multifunction device 100-*b* displays an animation (e.g., as indicated by the dotted outline 5102) associated with the message 5084 (e.g., the message 5084 jiggles, and/or the message 5084 changes size, and/or the message 5084 is tilted and/or rotated, etc.), to indicate that the request for delivery of the notification associated with the message 5084 was sent (and/or that the notification associated with the message 5084 was delivered to the second user of the other portable multifunction device).

Figure 5P:
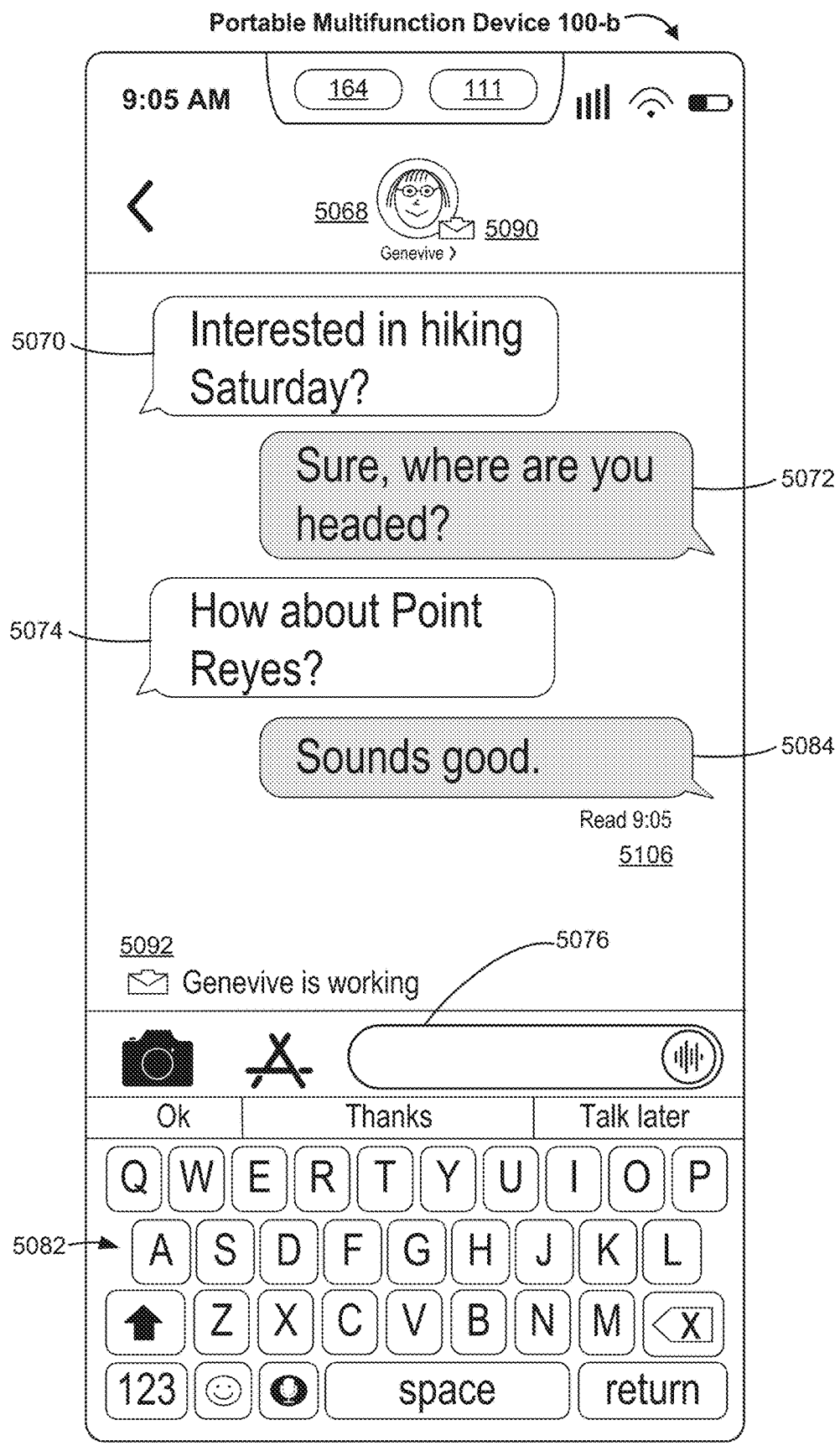

FIG. 5P illustrates an example of a messaging application user interface, when an activity mode is active for the second user of the other portable multifunction device, and after the delivered message has been viewed by the second user of the other portable multifunction device. FIG. 5P is analogous to FIG. 5K, except that the activity mode is active for the second user of the other portable multifunction device, and FIG. 5P includes the first activity mode indicator 5090 and/or the second activity mode indicator 5092 described above with reference to FIG. 5L. After the second user of the other portable multifunction device views the message (on the other portable multifunction device) corresponding to the message 5084 (displayed on the portable multifunction device 100-*b*), the portable multifunction device displays a "Read" indication 5106 that the message has been viewed (e.g., an indication with the text "Read").

Figures 1, 5Q:
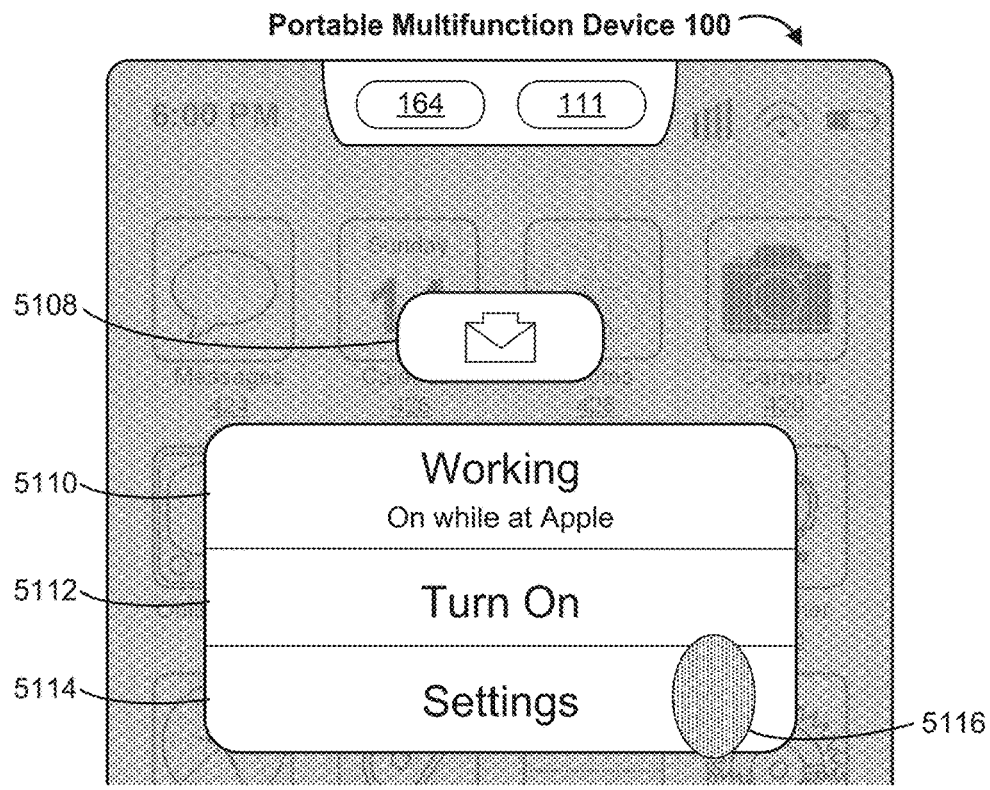
Figures 2, 5Q:
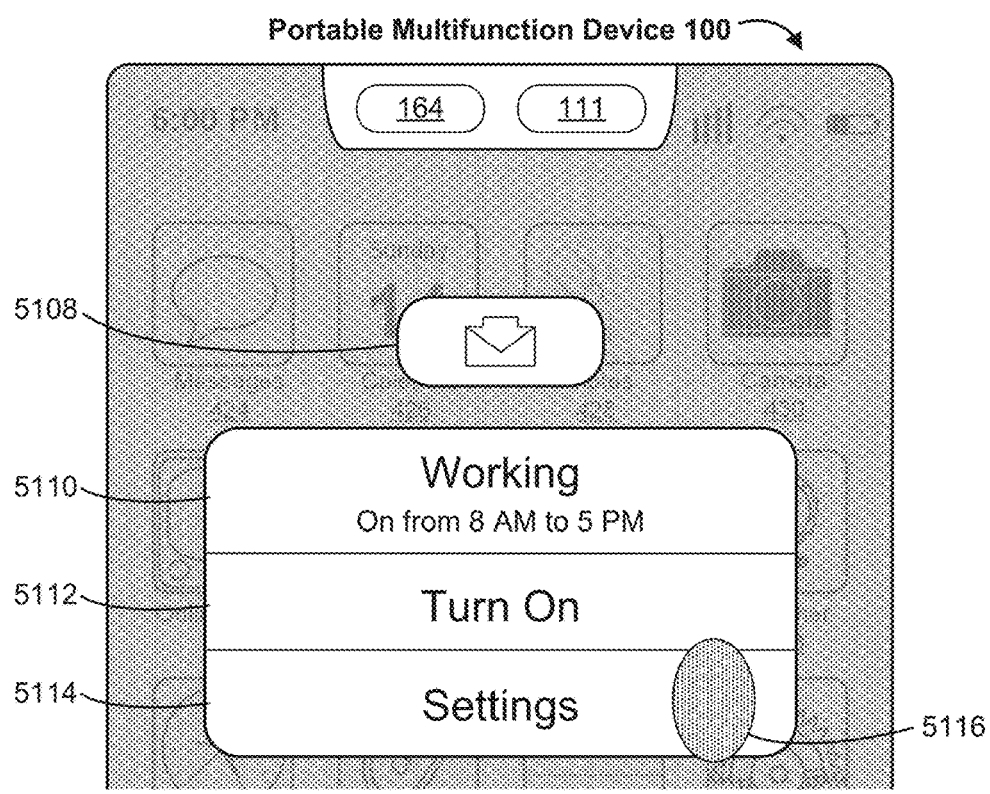
Figures 3, 5Q:
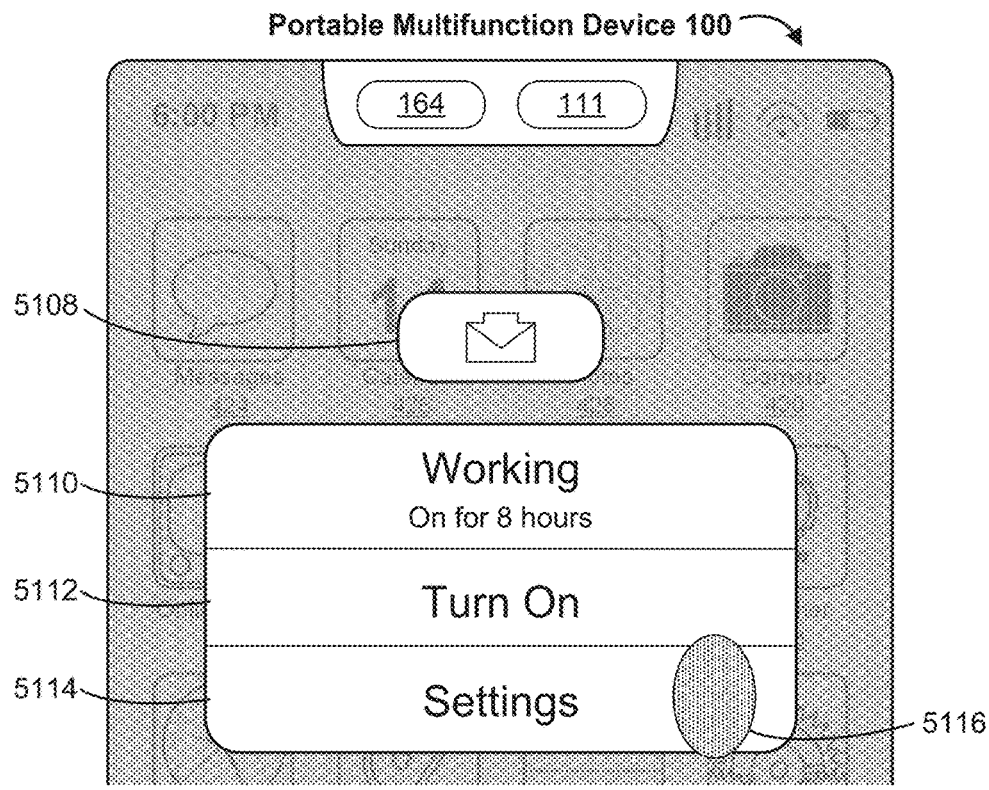
Figures 4, 5Q:
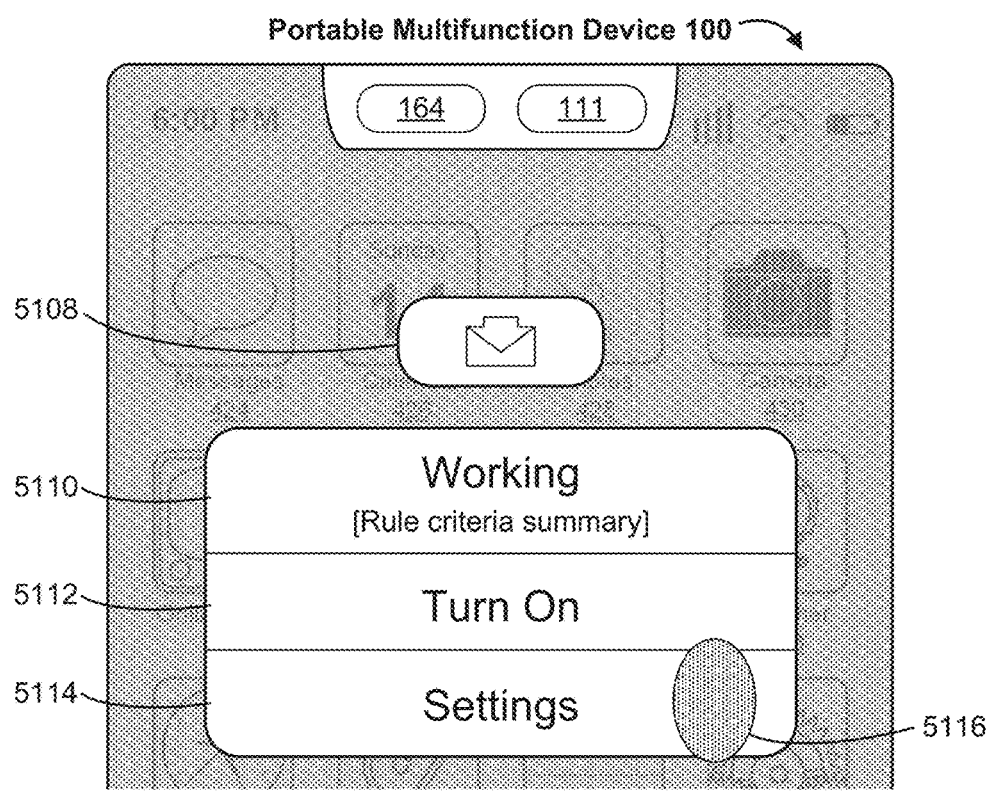

In some embodiments, as shown in FIG. 5Q1-5Q4, in response to a user input (e.g., the user input 5018 on affordance 5026, shown in FIG. 5D), the portable multifunction device 100 displays a user interface for activating or configuring activity modes of the portable multifunction device 100. The user interface for activating or configuring activity modes includes an indication 5108 corresponding to a respective activity mode (e.g., a briefcase icon, corresponding to the "Working" activity mode associated with the affordance 5026 shown in FIG. 5D). In some embodiments, the user interface for activating or configuring activity modes includes a description 5110 of the respective activity mode. In some embodiments, the description 5110 of the respective activity mode includes information associated with settings for the respective activity mode (e.g., a location at which the respective activity mode is active (as shown in FIG. 5Q-1), a scheduled start and end time for the respective activity mode (as shown in FIG. 5Q-2), a duration for the respective activity mode (as shown in FIG. 5Q-3), or a summary of rule criteria associated with activation and/or deactivation of the respective activity mode (as shown in FIG. 5Q-4), etc.). Optionally, the user interface for activating or configuring activity modes also includes an option 5112 for manually initiating activation of the respective activity mode, and a settings option 5114 for modifying settings for the respective activity mode.

Figures 2, 5R:
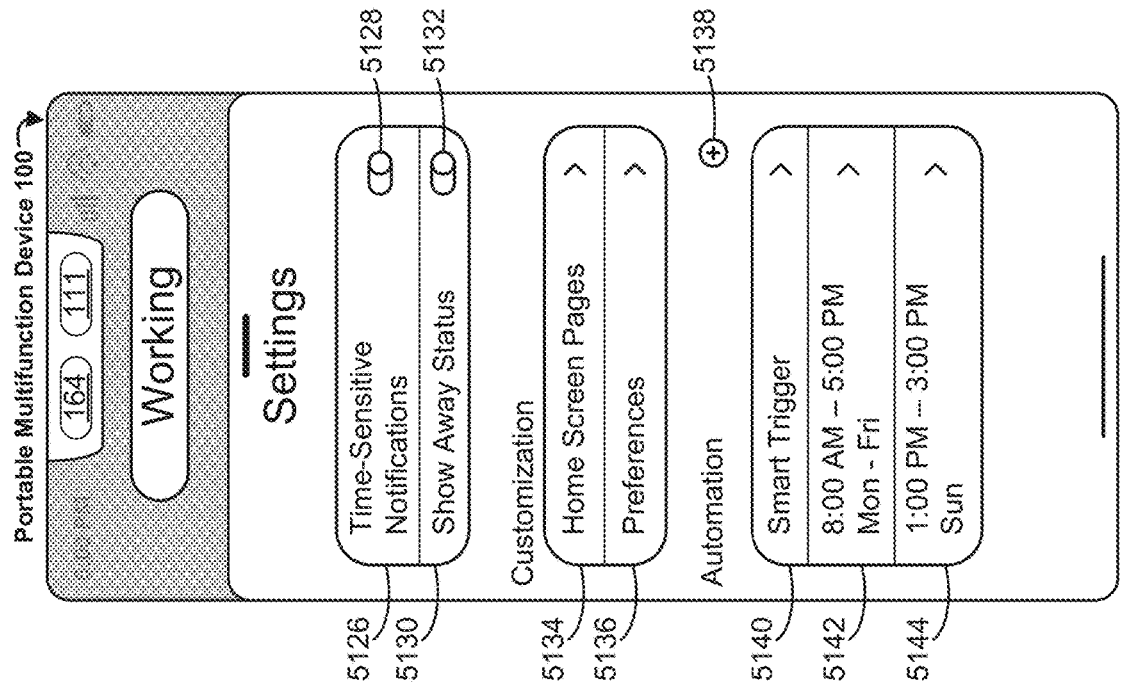
Figures 1, 5R:
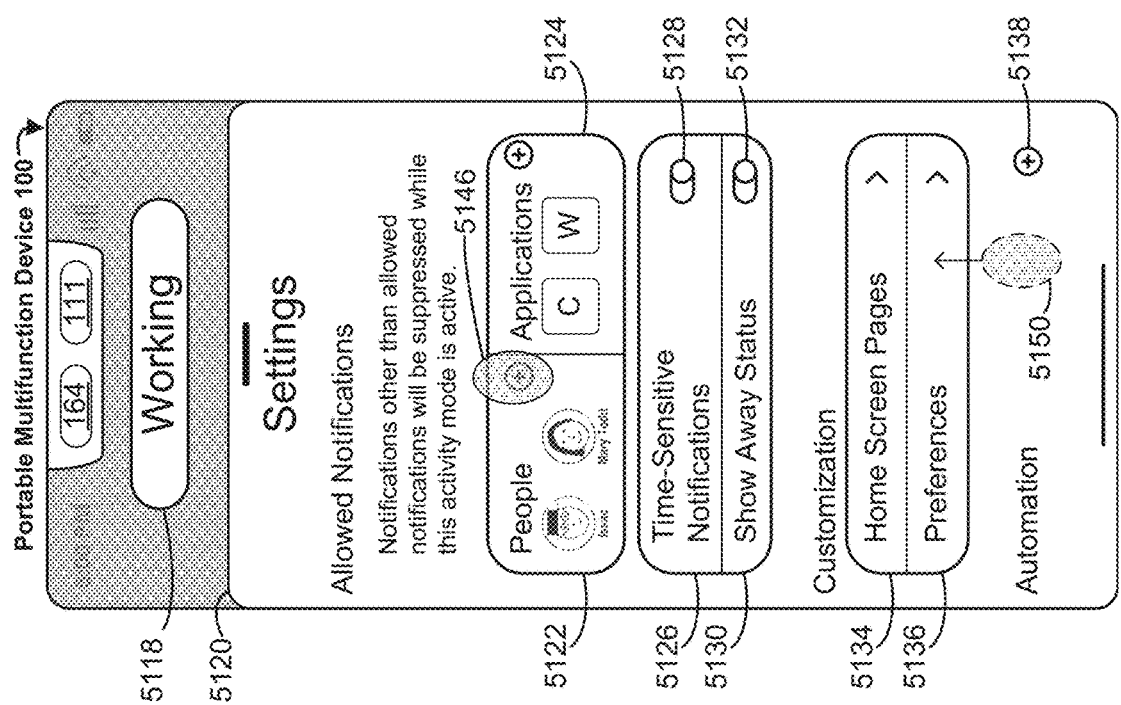

FIGS. 5R-1 through 5AF illustrate exemplary settings interfaces for configuring or modifying an activity mode, sometimes herein called a respective activity mode. In some embodiments, as shown in FIG. 5R-1, the portable multifunction device 100 displays a settings interface 5120, in response to a user input (e.g., a user input 5116 on the settings option 5114, as shown in FIGS. 5Q-1 through 5Q-4, or a user input 5018 on affordance 5026, as shown in FIG. 5D). For ease of discussion, the following descriptions will refer to modifying the settings of the "Working" activity mode, but analogous modifications can be made in the settings interface for any activity mode of the device.

The settings interface 5120 includes an indication 5118 that the "Working" activity mode is the current activity mode for which settings are being modified (e.g., the text "Working"). The settings interface 5120 further includes options for modifying the settings for the "Working" activity mode, including one or more (or two or more, or a subset of) the following options:

A "People" option 5122, for configuring a list of users (e.g., a whitelist of users for the "Working" activity mode). Notifications associated with the listed users are output by the portable multifunction device 100 while the "Working" activity mode is active. Delivery of notifications associated with users other than the listed users, unless enabled by another "Working" activity mode setting, are deferred by the portable multifunction device 100 while the "Working" activity mode is active, and instead are delivered later, such as in bundled notifications. As discussed above, in some situations, e.g., as discussed with respect to FIGS. 5M-5P, if the sender requests delivery an otherwise blocked notification, the notification is delivered.

An "Application" option 5124, for configuring a list of applications (e.g., a whitelist of applications for the "Working" activity mode). Notifications associated with the listed applications are output by the portable multifunction device 100 while the "Working" activity mode is active. Delivery of notifications associated with applications other than the listed applications, unless enabled by another "Working" activity mode setting, are deferred by the portable multifunction device 100 while the "Working" activity mode is active, and instead are delivered later, such as in bundled notifications.

A "Time-Sensitive Notifications" option 5126, along with an associated "Time-Sensitive Notifications" toggle affordance 5128, for enabling or disabling delivery of time-sensitive notifications while the "Working" activity mode is active. The "Time-Sensitive Notifications" option is discussed in further detail below, with respect to FIGS. 8A-8J.

A "Show Away Status" option 5130, along with an associated "Show Away Status" toggle affordance 5132, for enabling or disabling an option to indicate to users of other devices that the "Working" activity mode is active (as shown in FIGS. 5L-5P).

A "Home Screen Pages" option 5134, for selecting one or more home screen pages to display while the activity mode is active. The "Home Screen Pages" option 5134 is discussed in further detail below with reference to FIGS. 6A through 6J-3.

A "Preferences" option 5136, for modifying additional settings relating to user interface customization, and discussed in further detail below with reference to FIGS. 6E, 6F-1 to 6F-3, 6I, and 6J-1 to 6J-3.

An additional Automation affordance (e.g., a plus affordance) 5138 for configuring new automation criteria for automatically initiating activation of the activity mode, and discussed in further detail below with reference to FIGS. 5R-1 to 5R-2.

A "Smart Trigger" option 5140, for configuring additional automation criteria (e.g., triggers), different from the options presented after selecting automation addition affordance 5138) for automatically initiating activation of the "Working" activity mode, an example of which is shown in FIG. 5R-2. Some examples of additional automation criteria include: events on a calendar, a motion state of the portable multifunction device 100, detecting that a Bluetooth device has connected to the portable multifunction device 100, detecting that a user of the portable multifunction device 100 has initiated screen sharing or has started recording the screen of the portable multifunction device, triggers associated with signals from peripheral devices (e.g., a smartwatch in communication with the portable multifunction device 100), and receiving data from a workout or sleep application (e.g., health applications).

One or more automation schedule options, such as a first automation schedule 5142, with scheduled times at which the portable multifunction device 100 initiates activation or deactivation of the "Working" activity mode. In some embodiments, the first automation schedule 5142 is a selectable option, which, when activated, displays a user interface for modifying the first automation schedule.

Optionally, the one or more automation schedule options include a second automation schedule 5144 with scheduled times at which the portable multifunction device 100 initiates activation or deactivation of the "Working" activity mode. In some embodiments, the second automation schedule 5144 is a selectable option, which, when activated, displays a user interface for modifying the second automation schedule.

In some embodiments, in response to a user input (e.g., an upward swipe, such as a user input 5150 in FIG. 5R-1), the portable multifunction device 100 scrolls the display of the settings interface 5120. For example, as shown in FIG. 5R-2, the "People" option 5122 and the Applications option 5124 are no longer displayed in the settings interface 5120, while the "Smart Trigger" option 5140, the first automation schedule 5142, and the second automation schedule 5144 (which were not visible in FIG. 5R-1) are displayed.

Figure 5S:
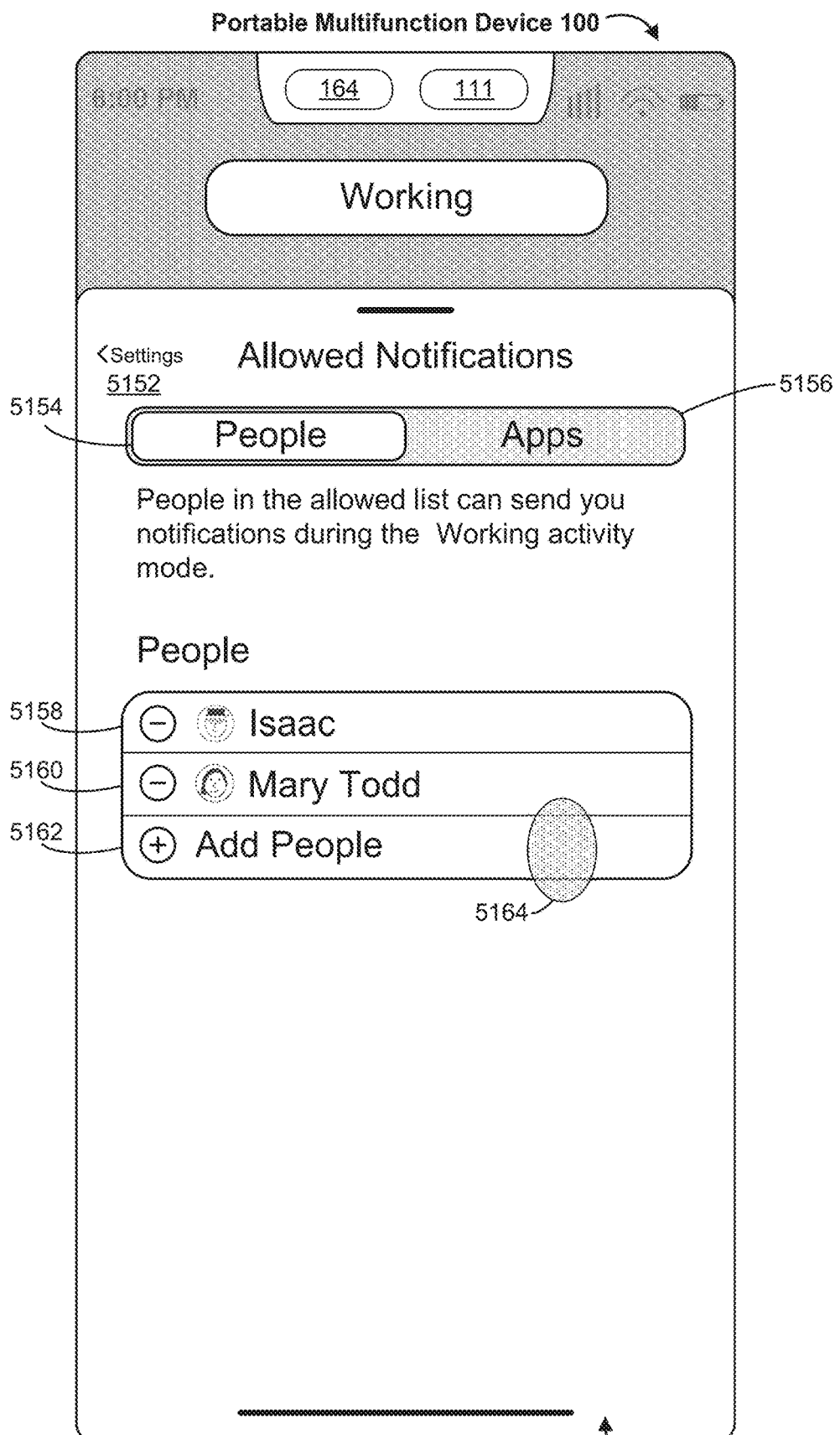

In some embodiments, as shown in FIG. 5S, in response to a user input (e.g., user input 5146 on a plus button in the "People" option 5122, shown in FIG. 5R-1), the portable multifunction device 100 displays a user interface for configuring a list of users. The user interface for configuring the list of users includes a "Settings" affordance 5152, which when activated, causes display of the settings interface 5120 (e.g., navigates back to the settings interface 5120 shown in FIGS. 5R-1 and 5R-2). The user interface for configuring the list of users includes a toggle 5156, which includes a "People" region that is currently selected by an indicator 5154 (as the portable multifunction device 100 is currently displaying the user interface for configuring the list of users), and an "Apps" region.

A list of users is displayed below the toggle 5156, including a user Isaac 5158, a user Mary Todd 5160. Notifications associated with the listed users (e.g., users listed under "People" as shown in FIG. 5S) will be output by the portable multifunction device 100 while the "Working" activity mode is active. In some embodiments, notifications associated with users that are not listed will be subject to reduced notification settings while the "Working" activity mode is active on the portable multifunction device 100 (unless another criterion is met for allowing the notification). The list of users includes an "Add People" affordance 5162.

Figure 5T:
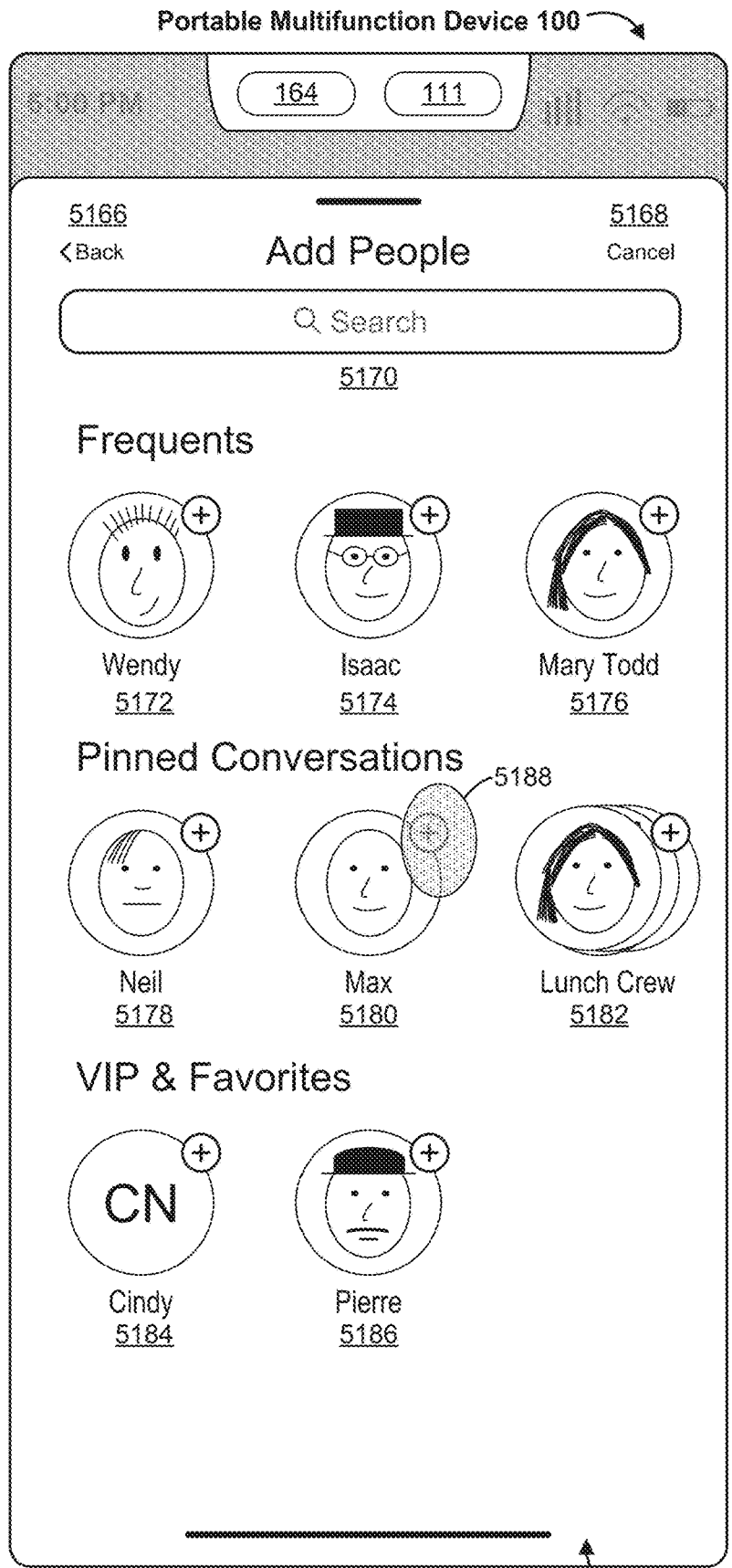

As shown in FIG. 5T, in response to a user input 5164 on the "Add People" affordance 5162 (in FIG. 5S), the portable multifunction device 100 displays a user interface for adding additional users to the list of users. In some embodiments, the user interface for adding additional users includes navigation controls, such as a "Back" button 5166 (e.g., for returning to the user interface shown in FIG. 5S) and a "Cancel" button 5168 (e.g., for returning to the settings interface shown in FIG. 5R-1). In some embodiments, entering a search query into search bar 5170 returns a list of users in accordance with the search query. In some embodiments, the portable multifunction device 100 displays a list of users (e.g., prior to detecting entry of any search query in the search bar 5170). In some embodiments, the list of users is a suggested list of users (e.g., based on users that the user of the portable multifunction device 100 communicates with frequently, and/or based on a "favorites" list of the user of the portable multifunction device 100, etc.). In some embodiments, the list of users is organized by groups (e.g., "Frequents," "Pinned Conversations," and "VIP & Favorites"). In some embodiments, the list of users includes both individual users and one or more groups of users (e.g., "Lunch Crew" group 5182). In some embodiments, one or more users in the list of users are represented with a graphical indication associated with the respective user (e.g., an avatar of the respective user, a photo of the respective user, etc.). In some embodiments, if no graphical indication is available for a particular user, an alternative indication is displayed (e.g., the initials "CN" for a user "Cindy" 5184, for which no graphical indication is available). In some embodiments, a user is added to the list of users (in the user interface shown in FIG. 5S) in response to detecting a user input on the graphical indication associated with the respective user. In some embodiments, the graphical indication (or alternative indication) includes an additional affordance (e.g., a plus affordance) for adding the respective user to the list of users.

Figure 5U:
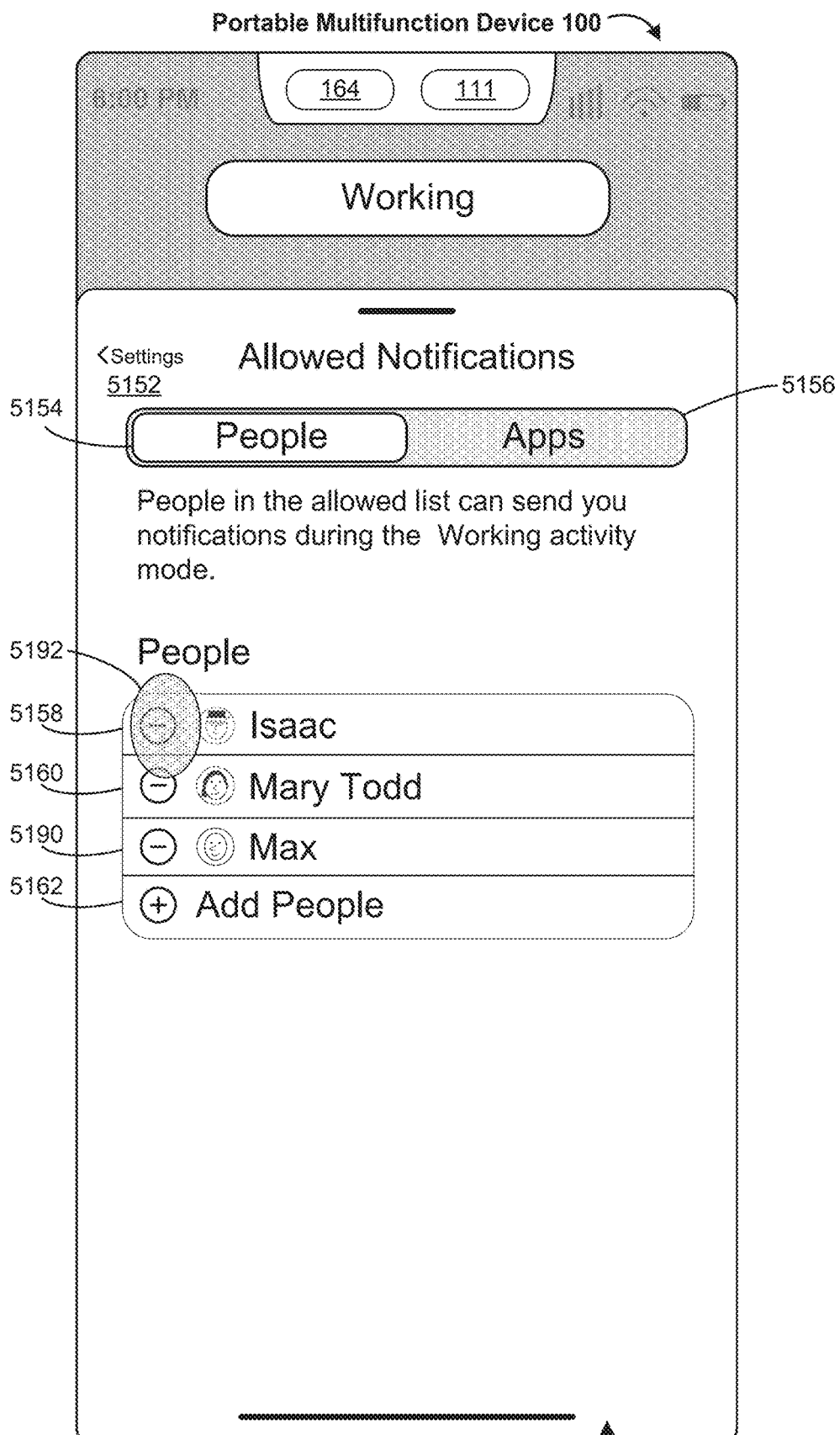

In response to detecting a user input 5188 on a graphical indication 5180 associated with a user-selected, respective user, (e.g., Max), and as shown in FIG. 5U, the portable multifunction device 100 adds the respective user to the list of users. FIG. 5U is analogous to FIG. 5S, but shows that the user Max has now been added to the list of users (as a user Max 5190). In some embodiments, the list of users is organized in alphabetical order (e.g., as shown in FIG. 5U). In some embodiments, the list of users is organized based on other criteria (e.g., based on a user-specified order, based on a calculated frequency of communication, etc.).

Figure 5V:
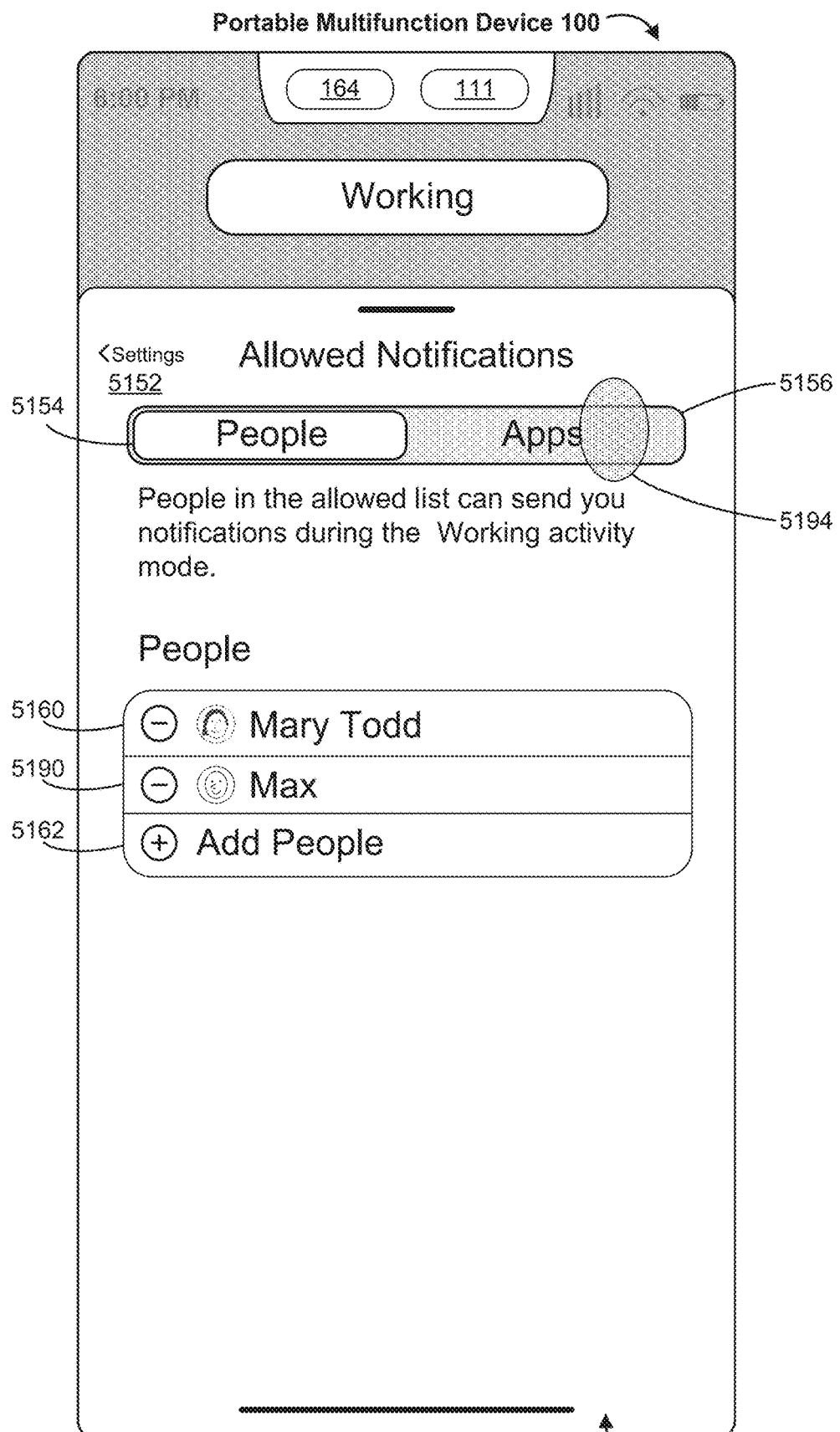

In response to detecting a user input 5192 on a minus affordance of a selected user (e.g., the user Isaac) 5158, and as shown in FIGS. 5U-5V, the portable multifunction device 100 removes the selected user from the list of users.

Figure 5W:
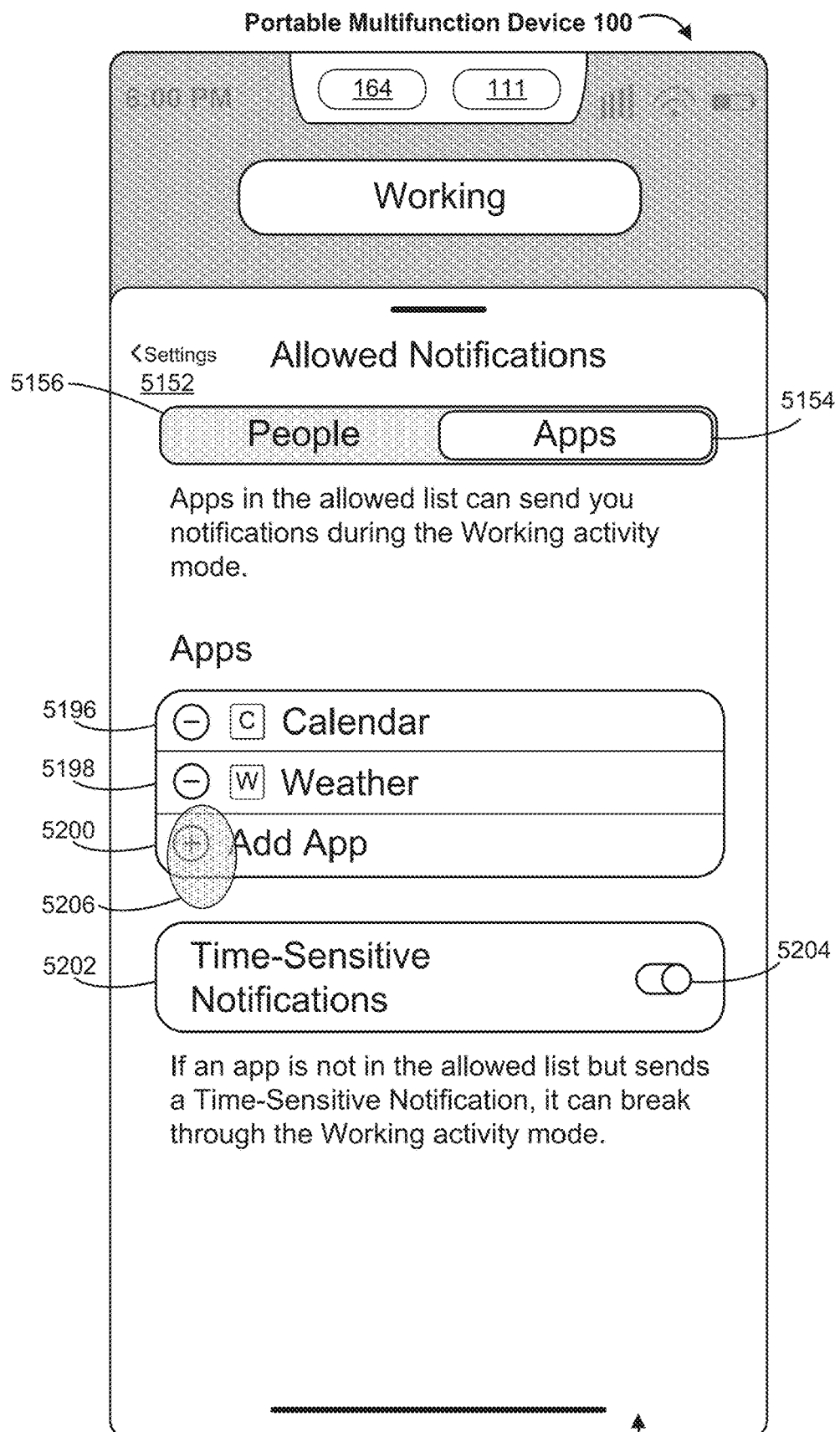

In response to detecting a user input 5194 on the "Apps" region of the toggle 5156, and as shown in FIG. 5W, the portable multifunction device 100 displays a user interface for configuring a list of applications. Notifications corresponding to the listed applications will be output by the portable multifunction device 100 while the "Working" activity mode is active. In some embodiments, notifications corresponding to applications that are not listed will be subject to reduced notification settings while the activity mode being configured (e.g., the "Working" activity mode) is active on the portable multifunction device 100 (e.g., such notifications are deferred unless another criterion is met for allowing the notification to be delivered while the activity mode is active). The user interface for configuring a list of applications includes a list of applications, including, in this example, list items for a Calendar application 5196 and a Weather application 5198. In some embodiments, the list of applications includes an affordance, such as "Add App" affordance 5200, for adding additional applications to the list of applications. In some embodiments, the user interface for configuring a list of applications includes a "Time-Sensitive Notifications" option 5202, and associated "Time-Sensitive Notifications" toggle 5204, for enabling or disabling delivery of time-sensitive notifications for applications that are not in the list of applications while the activity mode being configured (e.g., the "Working" activity mode) is active. In some embodiments, changing the toggle state of the toggle 5204 (e.g., enabling or disabling the "Time-Sensitive Notifications" option 5202) changes the toggle state of the toggle 5128 (e.g., enables or disables the "Time-Sensitive Notifications" option 5126 of settings interface 5120, shown in FIG. 5R-2) to match the toggle state of the toggle 5204 (e.g., the "Time Sensitive Notifications" option 5126 and the "Time-Sensitive Notifications" option 5202 are the same option, but can be configured from different places in the settings user interface).

Figure 5X:
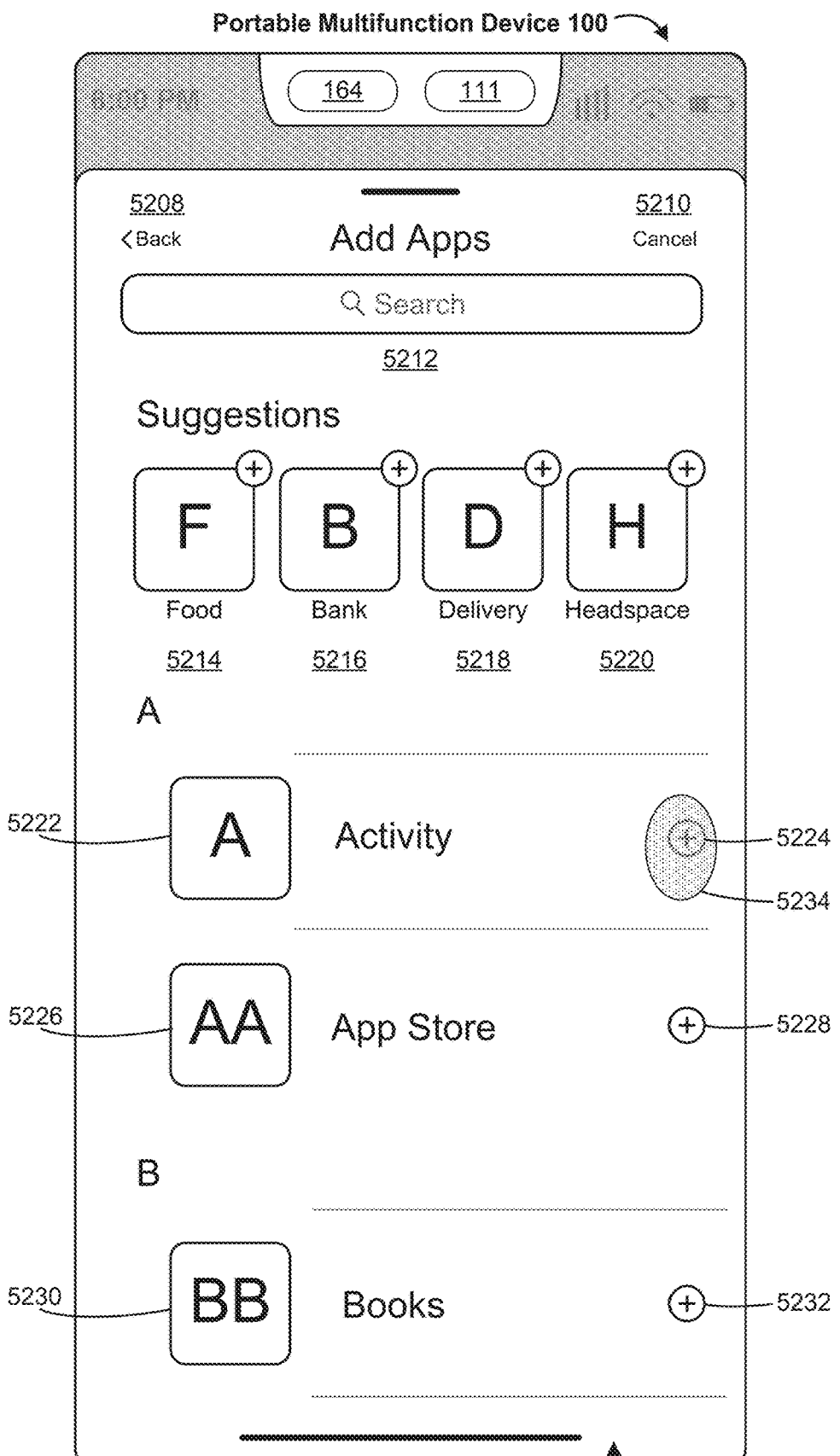

In response to detecting a user input 5206 on the "Add App" affordance 5200 (see FIG. 5W), and as shown in FIG. 5X, the portable multifunction device 100 displays a user interface for adding additional applications to the list of applications. In some embodiments, the user interface for adding additional applications includes navigation controls, such as a "Back" button 5208 (e.g., for returning to the user interface shown in FIG. 5W) and a "Cancel" button 5210 (e.g., for returning to the settings interface shown in FIG. 5R-1). In some embodiments, entering a search query into search bar 5212 returns a list of applications in accordance with the search query. In some embodiments, the portable multifunction device 100 displays a list of applications (e.g., prior to detecting entry of any search query in the search bar 5212). In some embodiments, the list of applications is or includes a suggested list of applications (e.g., based on usage history of the user or the electronic device). In some embodiments, the list of applications is organized alphabetically (e.g., as shown in FIG. 5X). In some embodiments, the list of applications is organized by groups (e.g., "Social" "Entertainment," "Games," etc.).

The list of applications includes a graphical indication associated with the respective application (e.g., an application icon, such as an application icon 5222 associated with the Activity application), and an affordance (e.g., a plus affordance) for adding the respective application to the list of applications (e.g., plus affordance 5224, for adding the Activity application to the list of applications).

Figure 5Y:
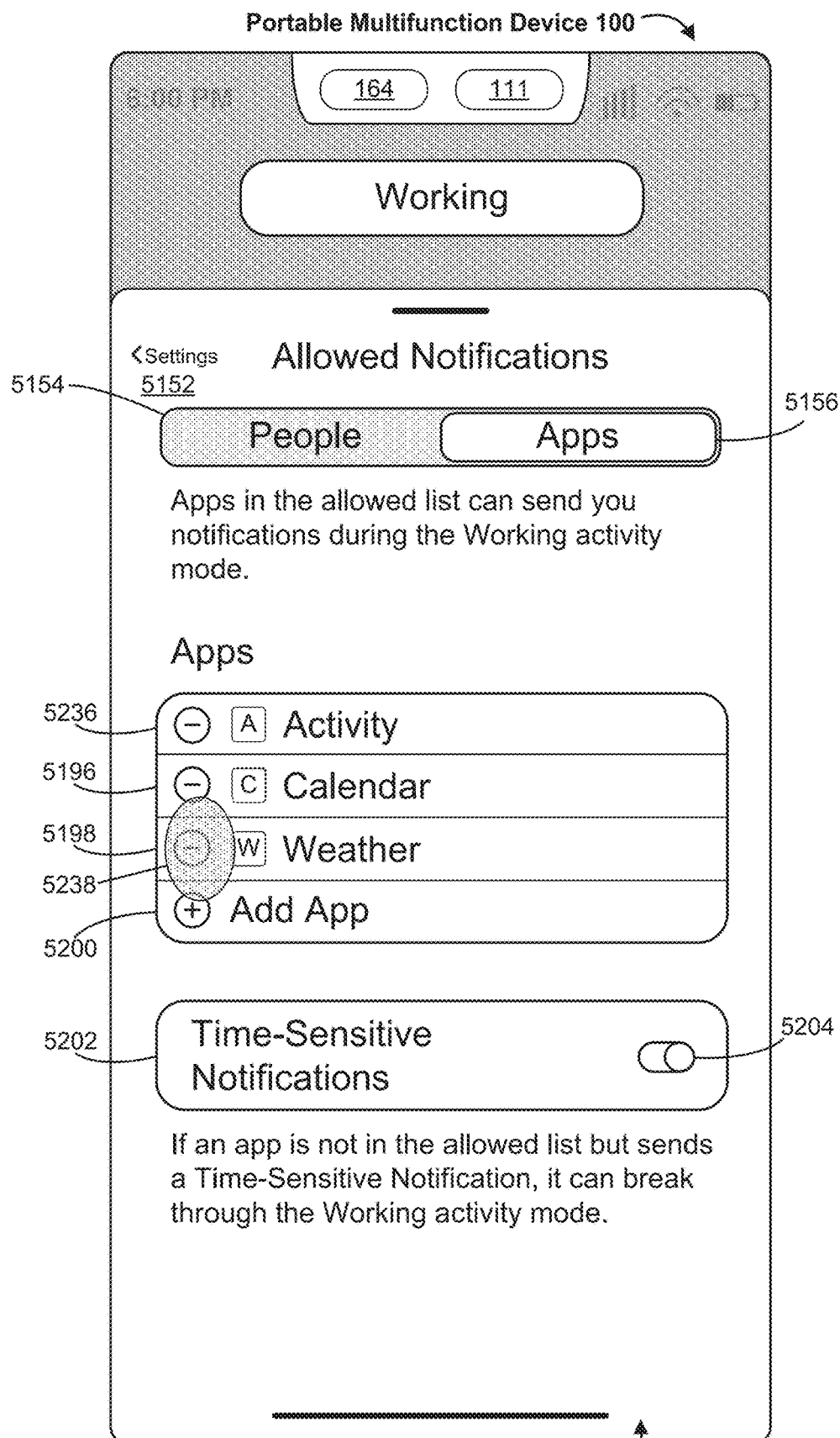

In response to detecting a user input on the affordance 5224, and as shown in FIG. 5Y, the portable multifunction device 100 adds the respective application (e.g., the Activity application) to the list of applications. FIG. 5Y is analogous to FIG. 5W, but shows that a list item 5236 representing the Activity application has now been added to the list of applications. In some embodiments, the list of applications is organized in alphabetical order (e.g., as shown in FIG. 5Y). In some embodiments, the list of applications is organized based on other criteria (e.g., based on a user-specified order, based on a calculated frequency of communication, etc.).

Figure 5Z:
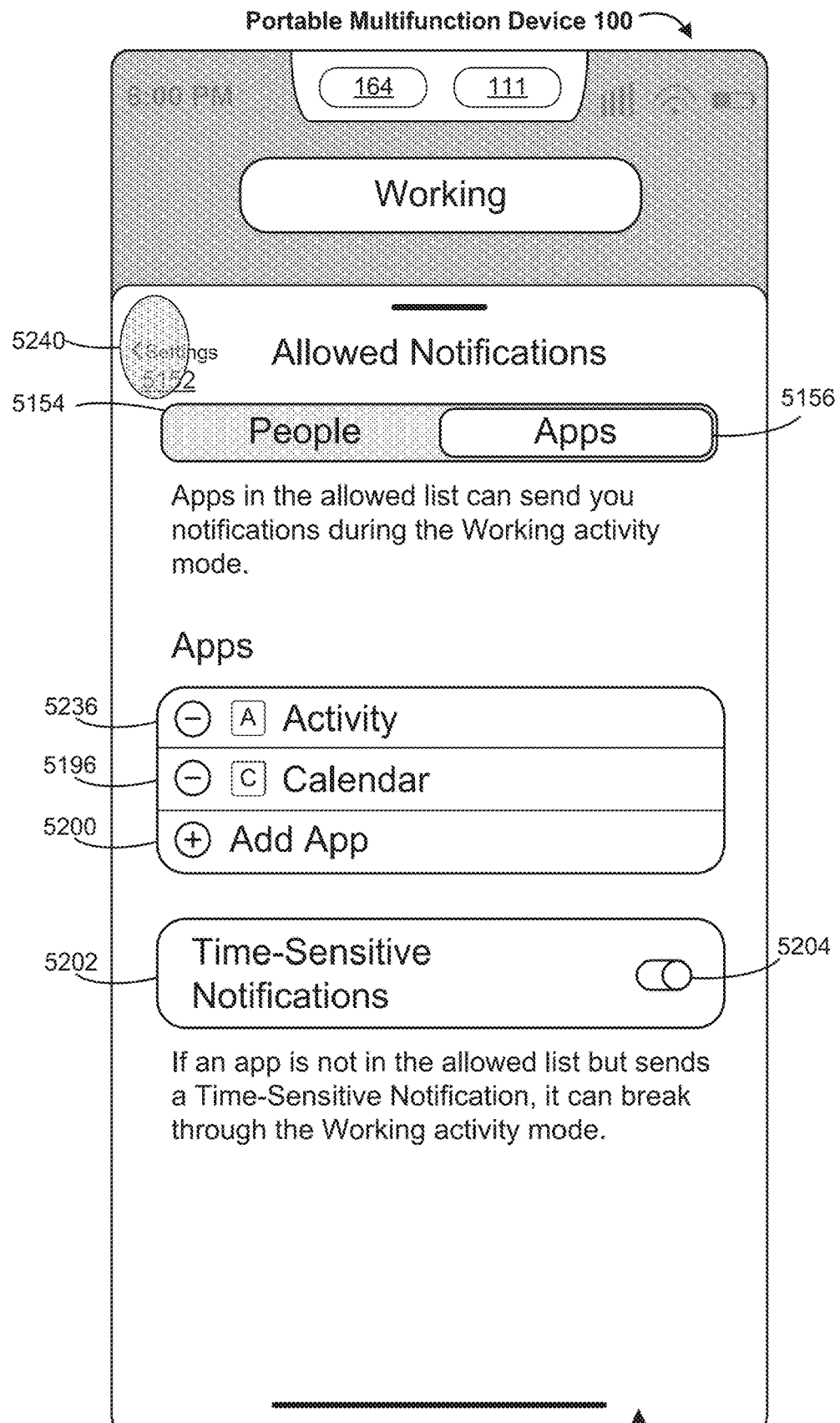
Figure 5A:
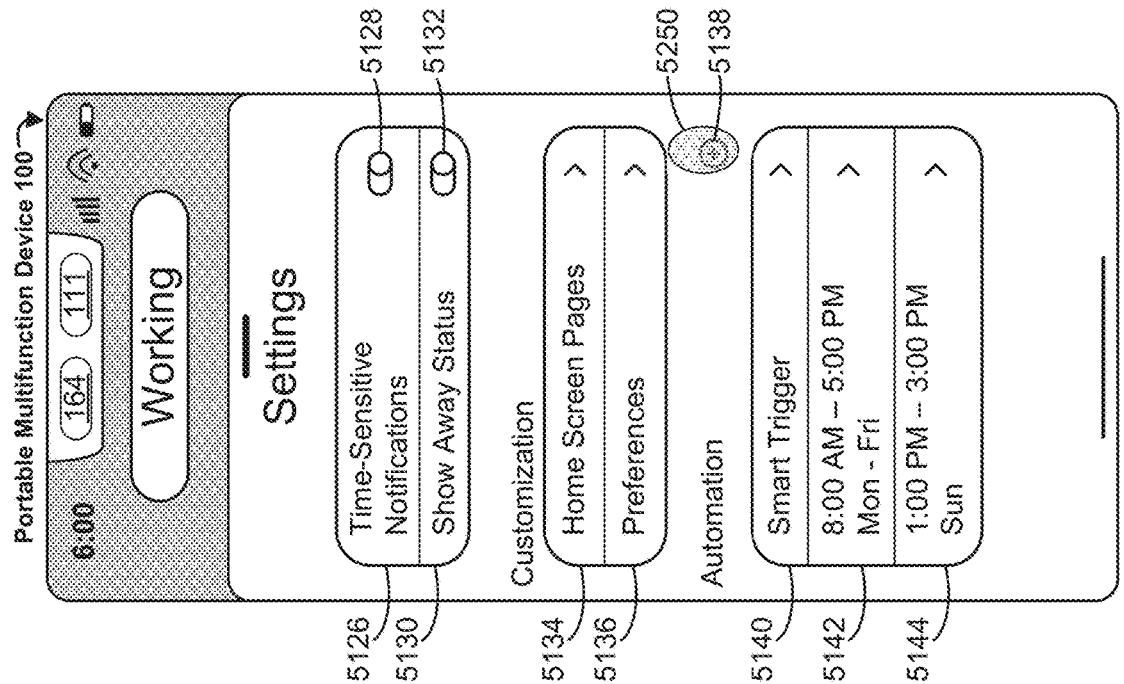
Figure 5A:
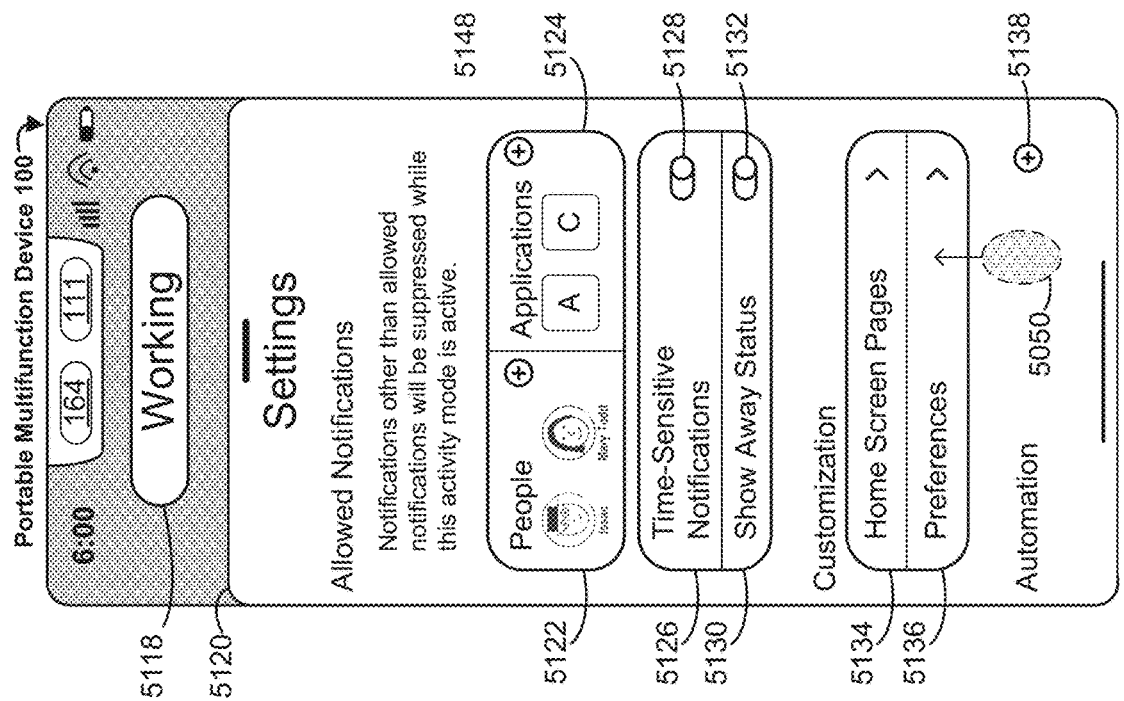
Figure 5A:
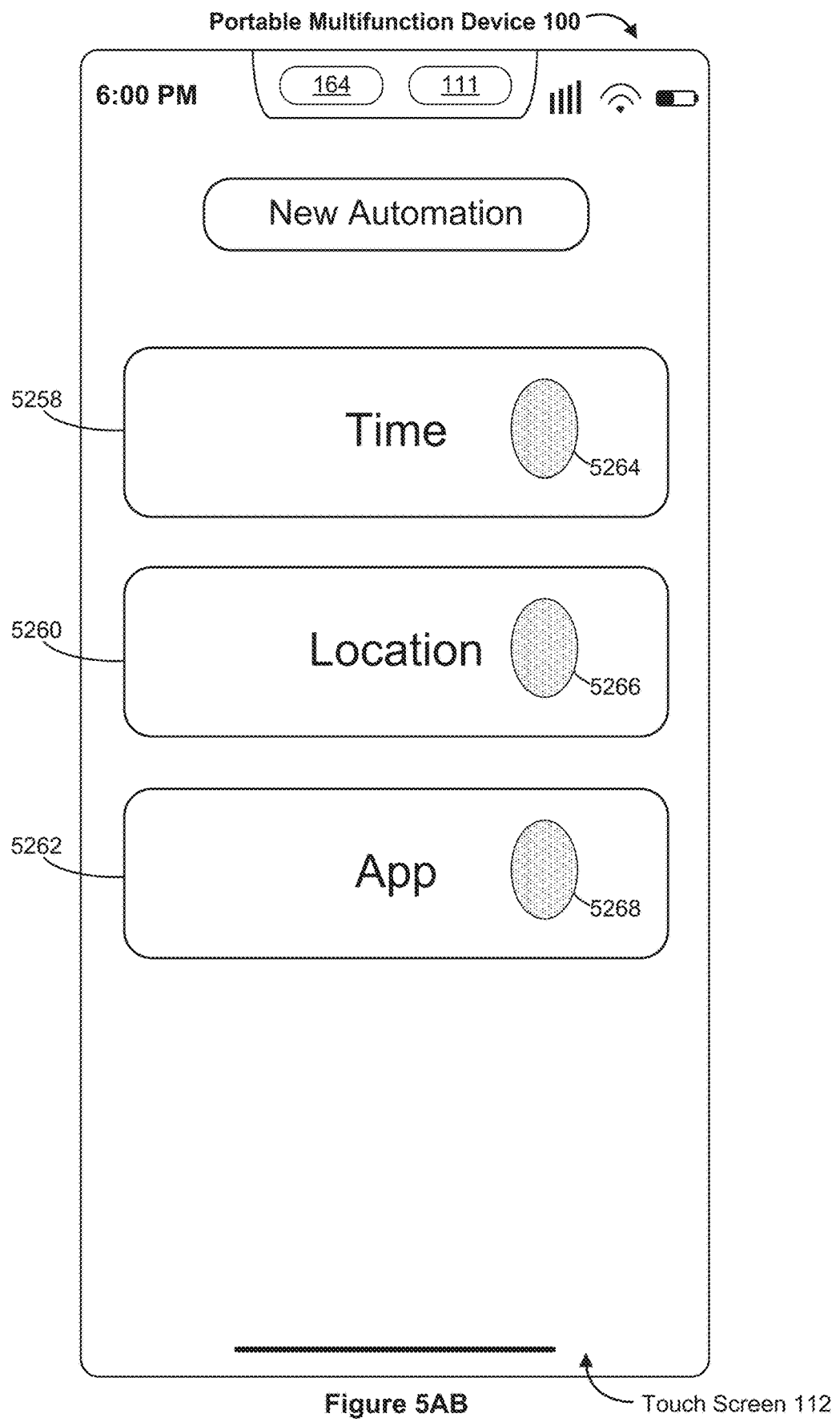
Figure 5A:
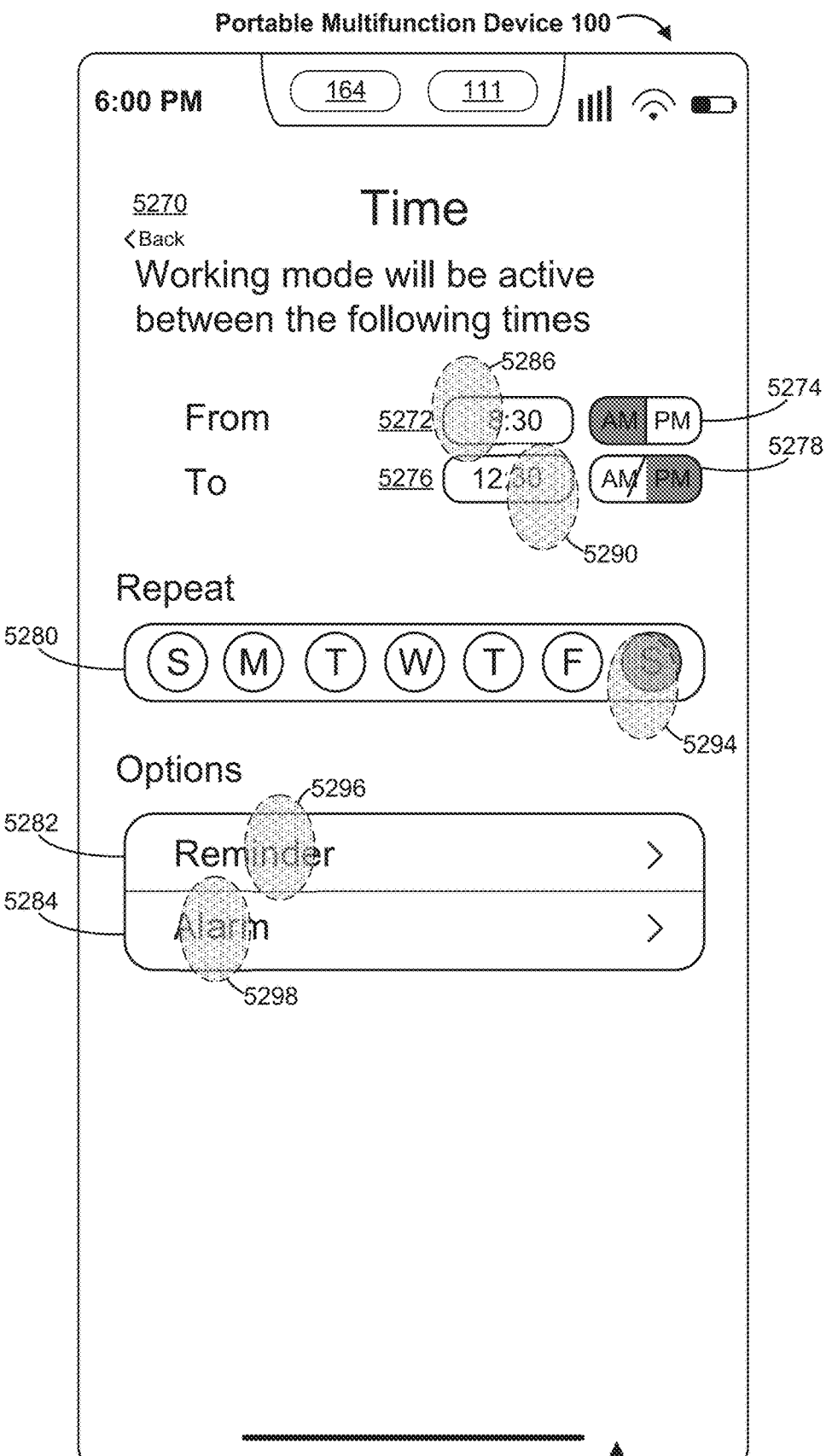
Figure 5A:
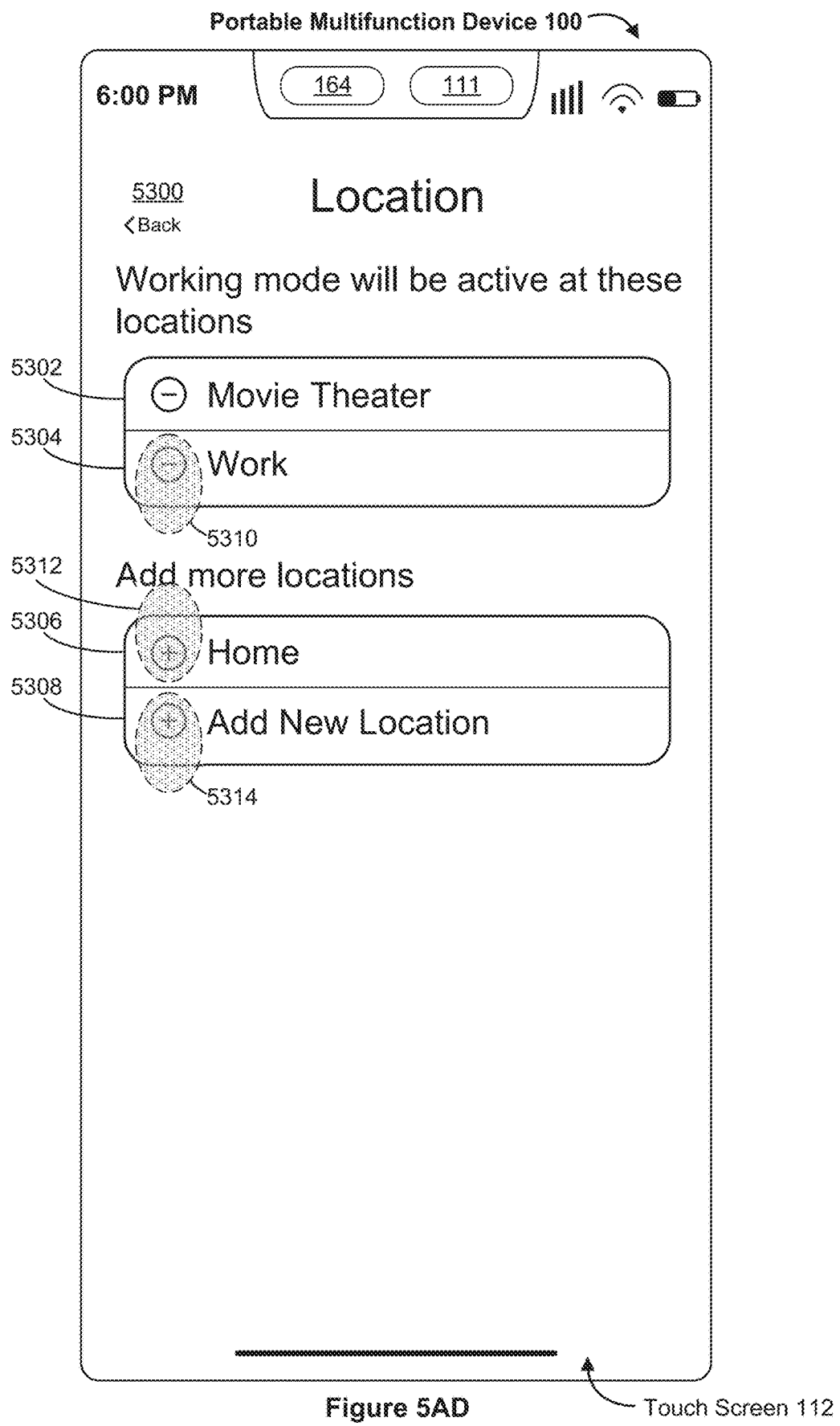
Figure 5A:
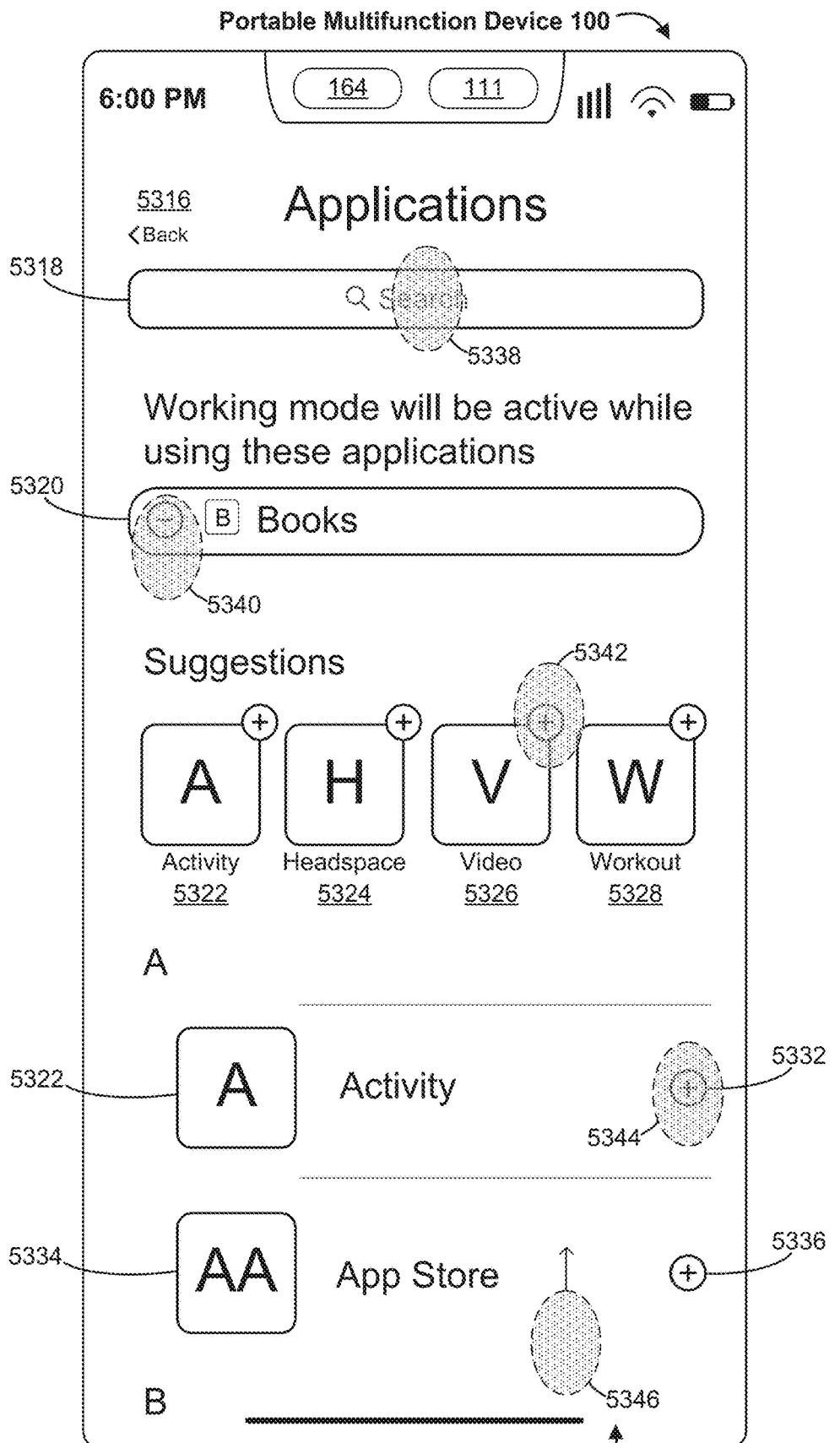
Figure 5A:
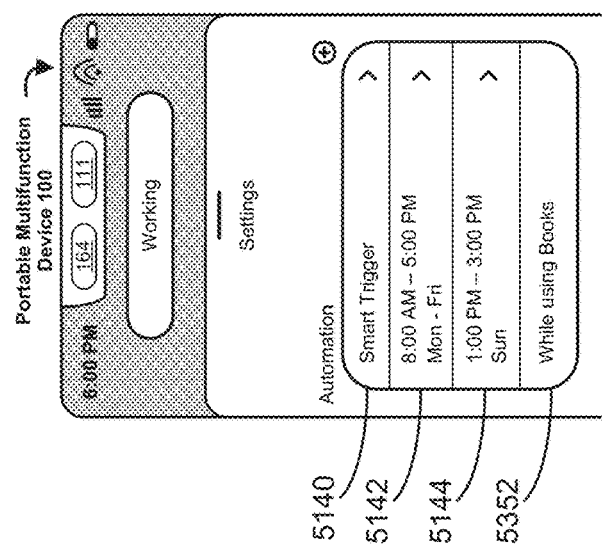
Figure 5A:
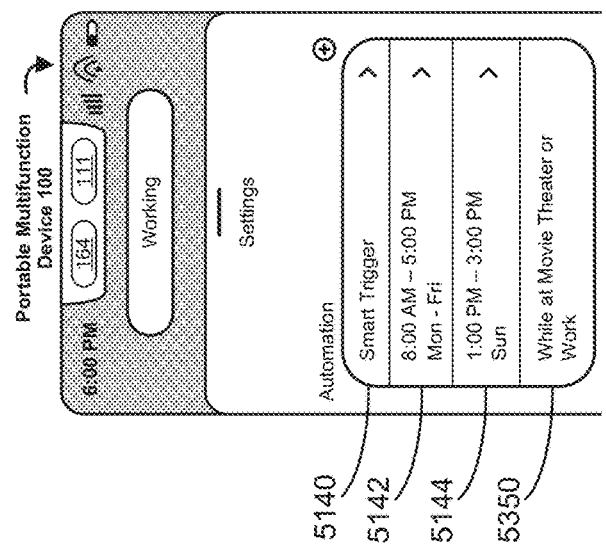
Figure 5A:
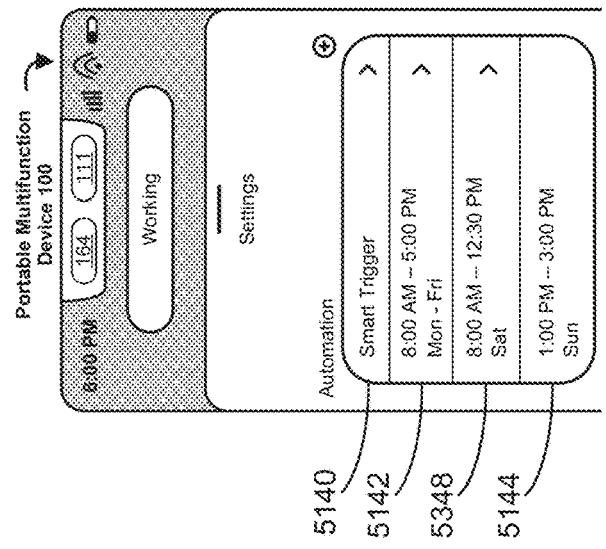
Figure 5A:
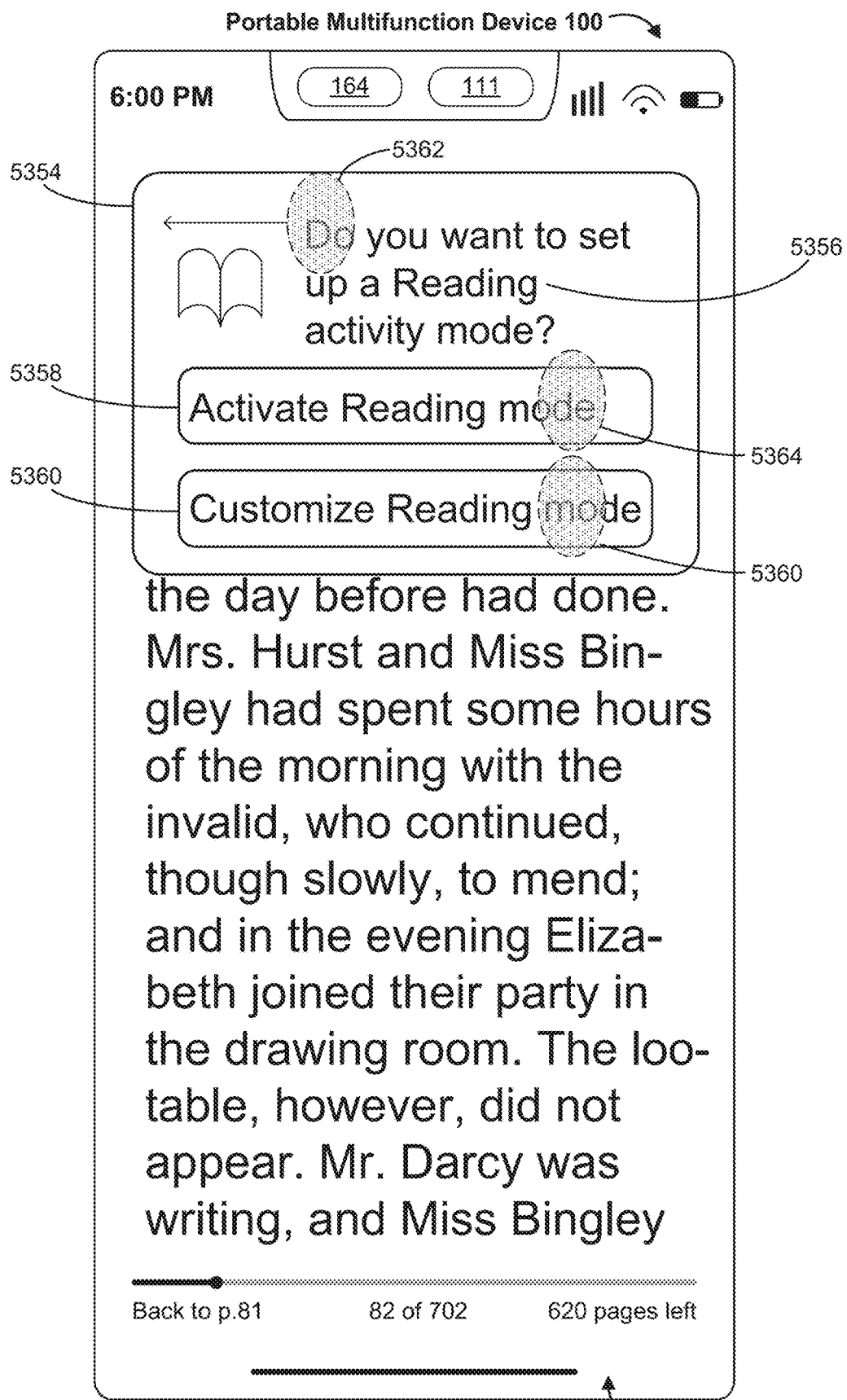
Figure 5A:
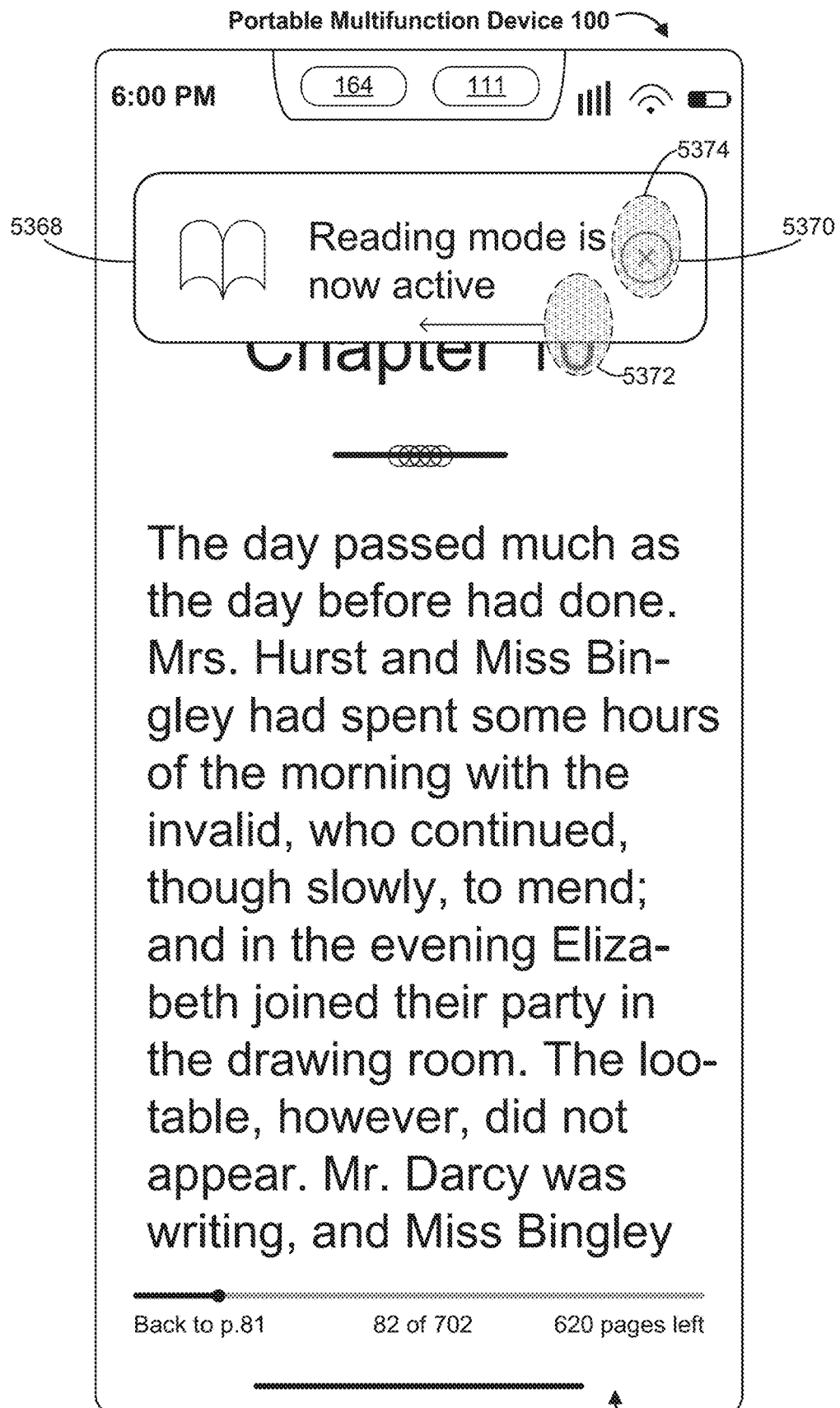
Figure 5A:
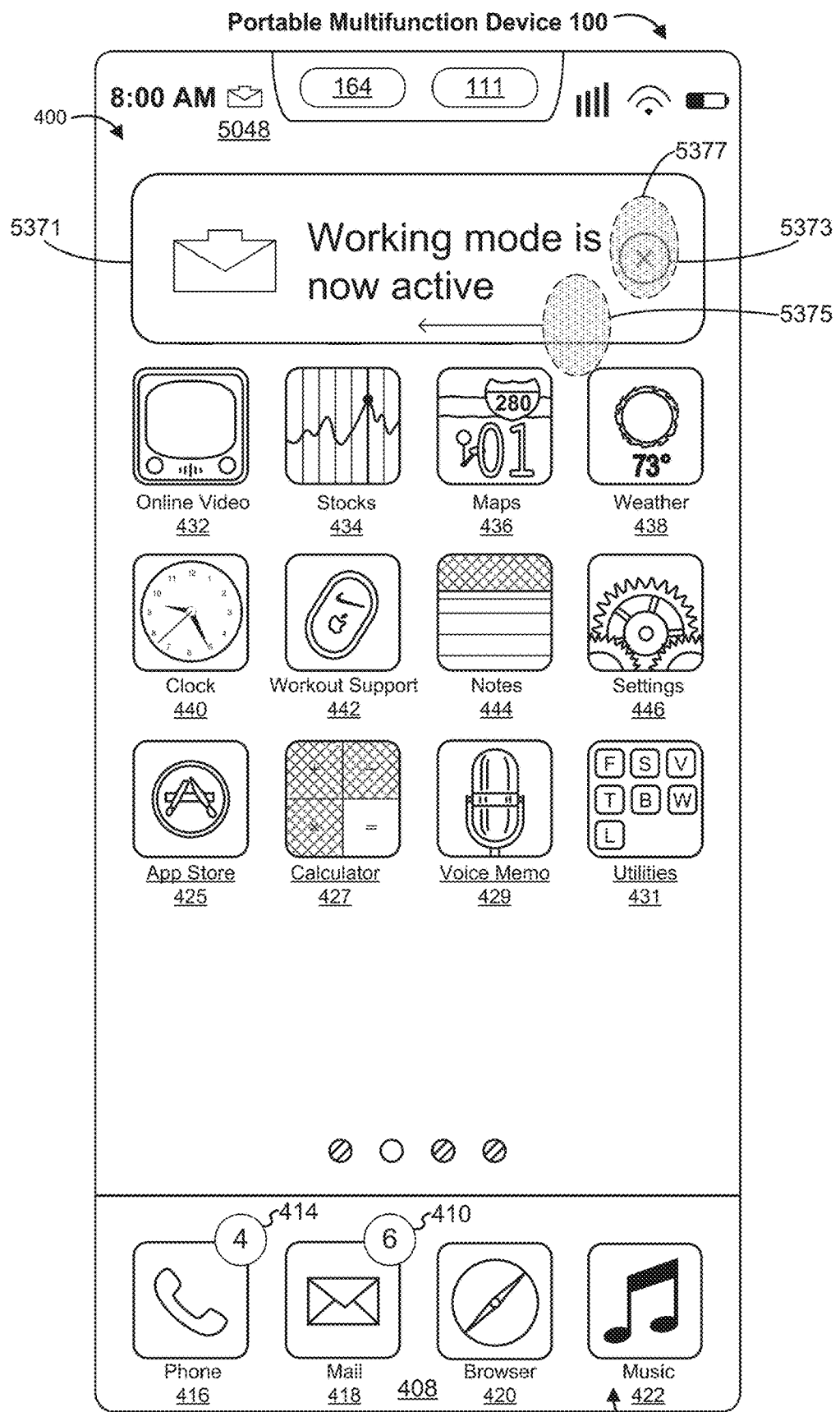
Figure 5A:
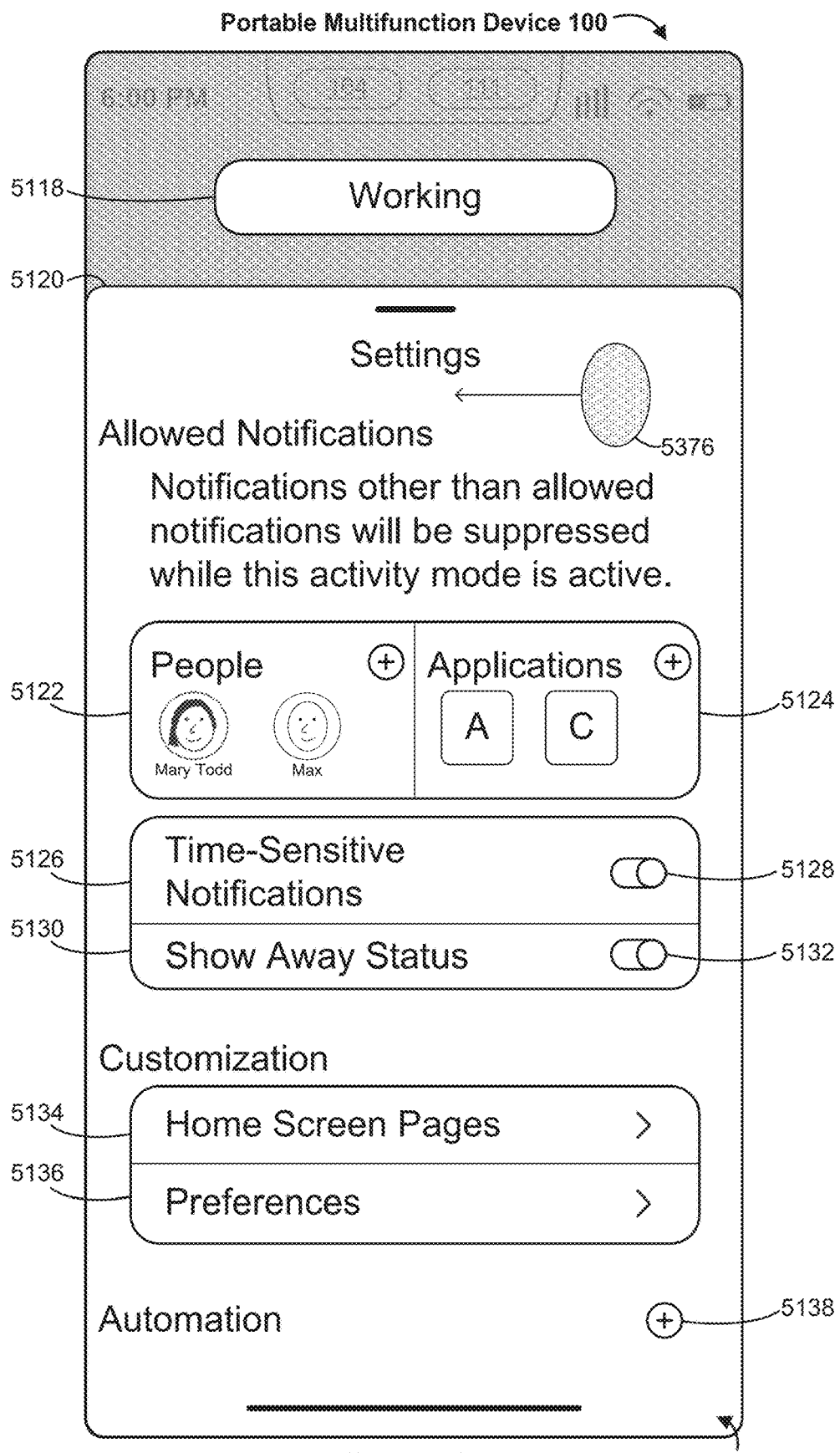
Figure 5A:
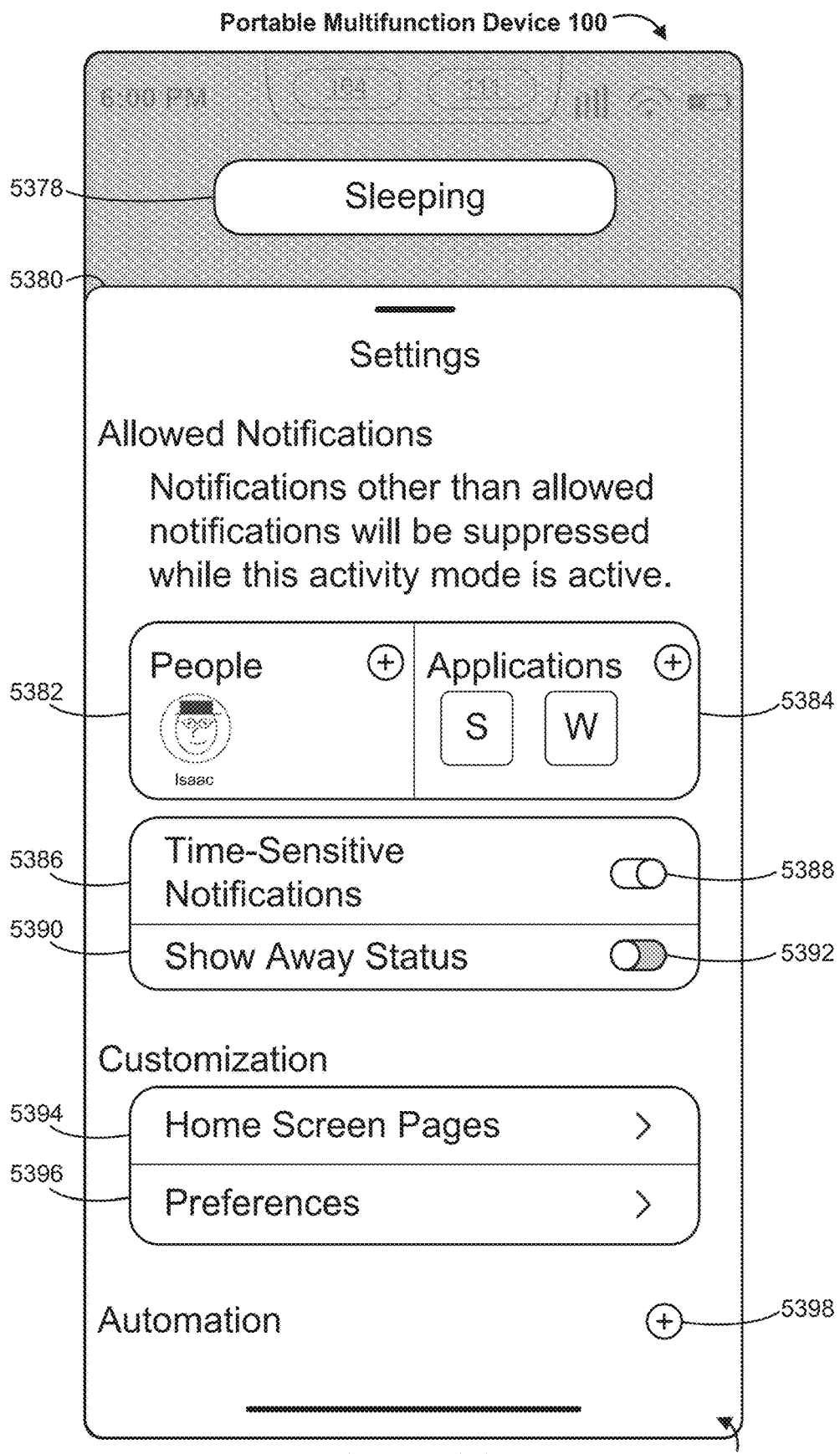
Figure 5A:
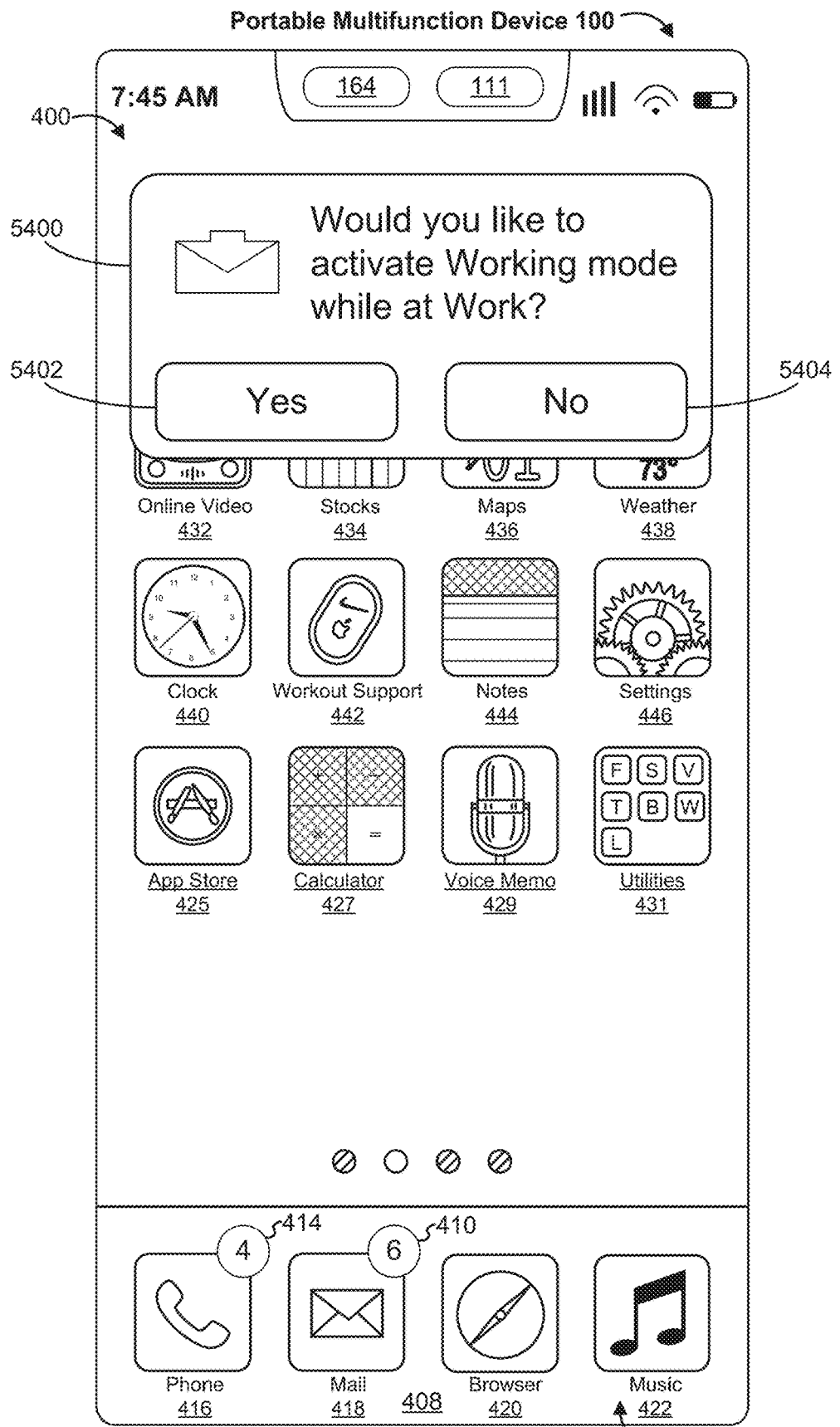

In response to detecting a user input 5238 on an application removal affordance (e.g., a minus affordance) associated with the Weather application 5198, and as shown in FIG. 5Z, the portable multifunction device 100 removes the Weather application 5198 from the list of applications.

In response to detecting a user input 5240 on the "Settings" affordance 5152, and as shown in FIGS. 5AA-1 and 5AA-2, the portable multifunction device displays the settings interface 5120. FIGS. 5AA-1 and 5AA-2 are analogous to FIGS. 5R-1 and 5R-2, respectively, but illustrate that the "People" option 5122 and the "Applications" option 5124 have been updated to reflect the changes made to the list of users and the list of applications (as described above with reference to FIGS. 5S-5Z). Specifically, the "People" option 5122 displays the added user Max, and does not display the removed user Isaac, and the "Applications" option 5124 displays the added Activity application (shown with the "A" application icon), and does not display the removed Weather application (previously shown with the "W" application icon).

In response to detecting a user input 5250 on an affordance (e.g., the plus affordance) 5138 for adding an automation to the settings for the activity mode being configured, and as shown in FIG. 5AB, the portable multifunction device 100 displays a user interface for configuring new automation for the activity mode being configured (e.g., the "Working" activity mode). In some embodiments, the user interface for configuring new automation includes one or more of, or two or more of, or all of a "Time" option 5258, a "Location" option 5260, and an "App" option 5262.

In response to detecting a user input 5264 on the "Time" option 5258, and as shown in FIG. 5AC, the portable multifunction device 100 displays a user interface for configuring a new time-based automation for the respective activity mode being configured (e.g., the "Working" activity mode), specifying a range of times during which the respective activity mode is to be automatically activated. The user interface for configuring new time-based automation includes a "From" time 5272, which optionally includes an associated AM/PM toggle 5274, and a "To" time 5276, which optionally incudes an associated AM/PM toggle 5278. In some embodiments, the "From" time 5272 and the "To" time 5276 include separately selectable hour and minute segments (e.g., a user input 5286 on the hour segment of the "From" time 5272, configures only the hour segment of the "From" time 5272; a user input 5290 on the minute segment of the "To" time 5276 configures only the minute segment of the "To" time 5276). In some embodiments, the "From" time 5272 and the "To" time 5276 are single selectable objects (e.g., both the user input 7286 and the user input 5290 would result in configuring the entire time (e.g., both the hour and minute) of the "From" time 5272, or the "To" time 5276, respectively). In some embodiments, the user interface for configuring new time-based automation includes an option 5280 for selecting one or more days of the week for which the time-based automation will apply (e.g., a user input 5294 configures "Saturday" as a day for which time-based automation will apply). Optionally, the user interface for configuring new time-based automation includes a "Reminder" option 5282 (e.g., for displaying a reminder prior to (e.g., at a preset amount of time before) the new activity mode is automatically activated, and optionally incudes an "Alarm" option 5284 (e.g., for playing an alarm (e.g., that includes audio and/or haptic feedback) when the activity mode is automatically activated).

In response to detecting a user input 5266 on the "Location" option 5260, and as shown in FIG. 5AD, the portable multifunction device 100 displays a user interface for configuring new location-based automation for the respective activity mode being configured (e.g., the "Working" activity mode). The user interface for configuring new location-based automation includes a list of locations at which the portable multifunction device 100 automatically initiates activation of the respective activity mode (e.g., the "Working" mode) (e.g., at a "Movie Theater" location 5302, and a "Work" location 5304, as shown in FIG. 5AD). A user input on a removal affordance (e.g., a minus affordance) associated with a listed location (e.g., user input 5310 on the removal affordance associated with the "Work" location 5304) removes the respective location from the list of locations. In some embodiments, the portable multifunction device 100 displays suggested locations (e.g., a "Home" location 5306, or a list of suggested locations) for adding to the list of locations. A user input on an addition affordance (e.g., a plus affordance) associated with a listed suggested location (e.g., user input 5312 on the plus affordance associated with the "Home" location 5306) adds the respective location from the list of suggested locations (e.g., directly above the "Movie Theater" location 5302, if the list is ordered alphabetically, or directly below the "Work" location 5304, if the list is ordered based on when each location was added to the list, etc.). The user interface for configuring new location-based automation includes an "Add New Location" affordance 5308, for adding additional locations (e.g., if the desired location is not a suggested location). In some embodiments, a user input 5314 on the "Add New Location" affordance 5308 causes display of a user interface for selecting new locations to add to the list of locations.

In response to detecting a user input 5268 on the "App" option 5262 (shown in FIG. 5AB), and as shown in FIG. 5AE, the portable multifunction device 100 displays a user interface for configuring new application-based automation for the respective activity mode being configured (e.g., the "Working" activity mode). In some embodiments, the portable multifunction device 100 displays a "Back" affordance 5316 (e.g., for returning to the user interface for configuring new automation for the respective activity mode being configured (e.g., the "Working" activity mode) as shown in FIG. 5AB). In some embodiments, the user interface for configuring new application-based automation includes a search bar 5318 and/or representations of applications (e.g., an "Activity" application icon 5330 and an "App Store" application icon 5334) for applications that can be added to the list of applications (e.g., by a user input, such as user input 5344, on an addition affordance (e.g., a plus affordance) 5332 associated with a respective application (e.g., the "Activity" application)). The user interface for configuring new application-based automation includes a list of applications (e.g., a "Books" application 5320) that automatically activate the respective activity mode. The respective activity mode will be active while the listed applications are in use (e.g., activating one of the listed applications also automatically initiates the "Working" activity mode). In some embodiments, the portable multifunction device 100 displays suggested applications for adding to the list of applications (e.g., an "Activity" application 5322, a "Headspace" application 5324, a "Video" application 5326, and/or a "Workout" application 5328).

FIGS. 5AF-1-5AF-3 illustrate exemplary settings interfaces after new automation has been added for the "Working" activity mode. FIG. 5AF-1 shows the addition of new time-based automation (a third automation schedule 5348), corresponding to the configuration shown in FIG. 5AC. FIG. 5AF-2 shows the addition of new location-based automation (location automation 5350), corresponding to the configuration shown in FIG. 5AD. FIG. 5AF-3 shows the addition of new app-based automation (application automation 5352), corresponding to the configuration shown in Figure AE.

FIG. 5AG illustrates an example of an application user interface for an application (e.g., a "Books" application 5320) and, more particularly, illustrates a situation in which no activity mode is configured to automatically activate while the application is in use. In some embodiments, when the "Books" application is launched, the portable multifunction device 100 displays (e.g., in accordance with a determination that no existing activity mode is configured to automatically activate while the "Books" application is in use) a prompt 5354 for configuring a new activity mode (e.g., a "Reading" activity mode) that will automatically activate when the "Books" application is in use. The prompt 5354 includes text 5356 (e.g., text that informs the user that it is possible to configure a new activity mode), an "Activate Reading mode" affordance (e.g., for activating a default "Reading" activity mode, where the default settings are configured by the portable multifunction device (e.g., without further user input)), and a "Customize Reading mode" affordance (e.g., for customizing settings for a new activity mode). In some embodiments, activating the "Customize Reading mode" affordance causes display of the settings interfaces described above with reference to FIGS. 5R-1 through 5AF-3. In some embodiments, the new "Reading" activity mode is automatically activated after configuration (e.g., immediately after configuring the new "Reading" activity mode, the portable multifunction device 100 redisplays the user interface for the "Books" application, and automatically initiates activation of the new "Reading" activity mode).

FIG. 5AH illustrates an example of an application user interface for an application (e.g., a "Books" application 5320) and, more particularly, illustrates a situation in which the "Reading" mode is configured to be automatically activated while the application is in use. In some embodiments, the application user interface for the "Books" application is displayed in response to a user input on an application icon for the "Books" application (e.g., from an application launch user interface, such as the home screen user interface shown in FIG. 5A). When the "Books" application is in use, the portable multifunction device 100 automatically initiates activation of the "Working" activity mode, in accordance with settings for the "Working" activity mode (e.g., as shown in FIG. 5AF-2). A banner 5368 is displayed, indicating that the "Reading" activity mode is active (e.g., with the text "Reading mode is now active"). In some embodiments, a user input (e.g., a left swipe by user input 5372) dismisses the banner 5368 and the "Reading" activity mode remains active. In some embodiments, the banner 5368 includes an "X" affordance 5370, that when activated (e.g., by a user input 5374) deactivates the "Reading" activity mode (e.g., the user overrides the automation settings for the "Reading" activity mode by activating the "X" affordance 5370, when the user does not want the "Reading" activity mode to be active while using the "Books" application). In some embodiments, the banner 5368 is displayed when an existing activity mode is automatically initiated (e.g., an activity mode that was already configured before the user interface for the "Books" application is displayed). In some embodiments, the banner 5368 is displayed in response to completing configuration for a new activity mode (e.g., a new activity mode configured immediately after the user interface for the "Book" application is displayed, as discussed above with reference to FIG. 5AG).

FIG. 5AI illustrates an example of an application launch user interface when an existing activity mode automatically activates. At 8:00 AM on a weekday, the portable multifunction device 100 automatically initiates activation of the "Working" activity mode (e.g., in accordance with the automation settings for the "Working" activity as shown in FIG. 5AA-2). The portable multifunction device 100 also displays a banner 5371 that indicates that the "Working" activity mode is now active. In some embodiments, a user input (e.g., a left swipe by user input 5375) dismisses the banner 5371 and the "Working" activity mode remains active. In some embodiments, the banner 5371 includes an "X" affordance 5373, that when activated (e.g., by a user input 5377) deactivates the "Working" activity mode (e.g., the user can override the automation settings for the "Working" activity mode by activating the "X" affordance 5373, when the user does not want the "Working" activity mode to be active (e.g., if the user takes a vacation day)).

FIG. 5AJ is analogous to FIG. 5AA-1, and shows the settings interface for the "Working" activity mode. In response to detecting a user input 5376 (e.g., a left swipe), the portable multifunction device 100 displays a settings interface for an activity mode other than the respective activity mode for which settings are configured using the settings interface of FIG. 5AJ (e.g., a settings interface 5380 for the "Sleeping" activity mode), as shown in FIG. 5AK. FIG. 5AK illustrates analogous settings (for the "Sleeping" activity mode) to the settings for the "Working" activity mode shown in FIG. 5AJ, and the settings for the "Sleeping" activity mode are configured in an analogous manner (e.g., as described above with reference to FIGS. 5R-1 through 5AF-3. For example, the settings user interface 5380 for the "Sleeping" activity mode includes an indication 5378 that the "Sleeping" activity mode is the current activity mode for which settings are being modified (e.g., the text "Sleeping"), and one or more of (or two or more of, or a subset of) the following options for modifying settings of the "Sleeping" activity mode: a People option 5382, an Application option 5384, a Time-Sensitive Notifications option 5386 with a toggle affordance 5388, a Show Away Status option 5390 with a toggle affordance 5392, a Home Screen Pages option

5394, a Preferences option 5396, and an Automation affordance 5396, each of which has the functionality described above with respect to options for modifying settings for the "Working" activity mode.

In some embodiments, additional user inputs (e.g., another left swipe) cause the portable multifunction device 100 to display a settings interface for an activity mode other than the "Working" activity mode and the "Sleeping" activity mode (e.g., the "Driving" activity mode). In some embodiments, a different user input (e.g., a right swipe) causes the portable multifunction device 100 to display a previously displayed settings interface (e.g., for the "Working" activity mode). In some embodiments, the portable multifunction device 100 cycles through each activity mode for the device as a user input (e.g., a left swipe) is repeated. In some embodiments, when the portable multifunction device 100 reaches the settings interface for a last activity mode of the plurality of activity modes (e.g., the portable multifunction device 100 has displayed the settings interface for each activity mode at least once, in response to multiple left swipes), repeating the user input (e.g., performing another left swipe) causes the portable multifunction device 100 to display the settings interface for a previously displayed activity mode (e.g., the "Working" activity mode, as the settings interface for the "Working" activity mode was the initially displayed settings interface). In some embodiments, when the portable multifunction device 100 reaches the settings interface for the last activity mode (e.g., the portable multifunction device 100 has displayed the settings interface for each activity mode at least once, in response to multiple left swipes), the portable multifunction device 100 maintains display of the currently displayed settings interface (e.g., the portable multifunction device 100 does not display a previously displayed settings interface).

FIG. 5AL illustrates an example of a respective page of a multi-page application launch interface 400 when the portable multifunction device 100 is at a location known by the device to be the user's place of work (e.g., due to the designation of a "work" address or location in a navigation application or contacts application). In this example, the activity mode settings for the device do not yet include an automation setting for automatically activating the Working mode when the user is at the user's place of work. In response to the device detecting a trigger condition, such as the user arriving or being located at the user's place of work, a notification 5400, suggesting that the Working mode be automatically activated when the user is at the user's place of work, displayed (e.g., displayed over a multi-page application launch interface 400, or more generally, displayed over whichever user interface was being displayed by the device at the time that the trigger condition is detected). In some embodiments, the notification includes an acceptance affordance 5402 for accepting the automation settings suggestion, and optionally includes an affordance 5404 for dismissing or rejecting the automation settings suggestion. In response to the user accepting the automation settings suggestion, by touching or otherwise selecting the acceptance affordance 5402, automation settings for the Working mode are updated, so that the Working mode is automatically activated when the user is at the user's place of work.

FIGS. 6A-1 through 6J-3 illustrate example user interfaces for configuring home screen pages and preferences for activity modes of a portable multifunction device, in accordance with some embodiments. The user interfaces in these figures are used to illustrate the processes described below, including the processes in FIGS. 10A-10D. For convenience of explanation, some of the embodiments will be discussed with reference to operations performed on a device with a touch-sensitive display system 112.

Figures 2, 6A:
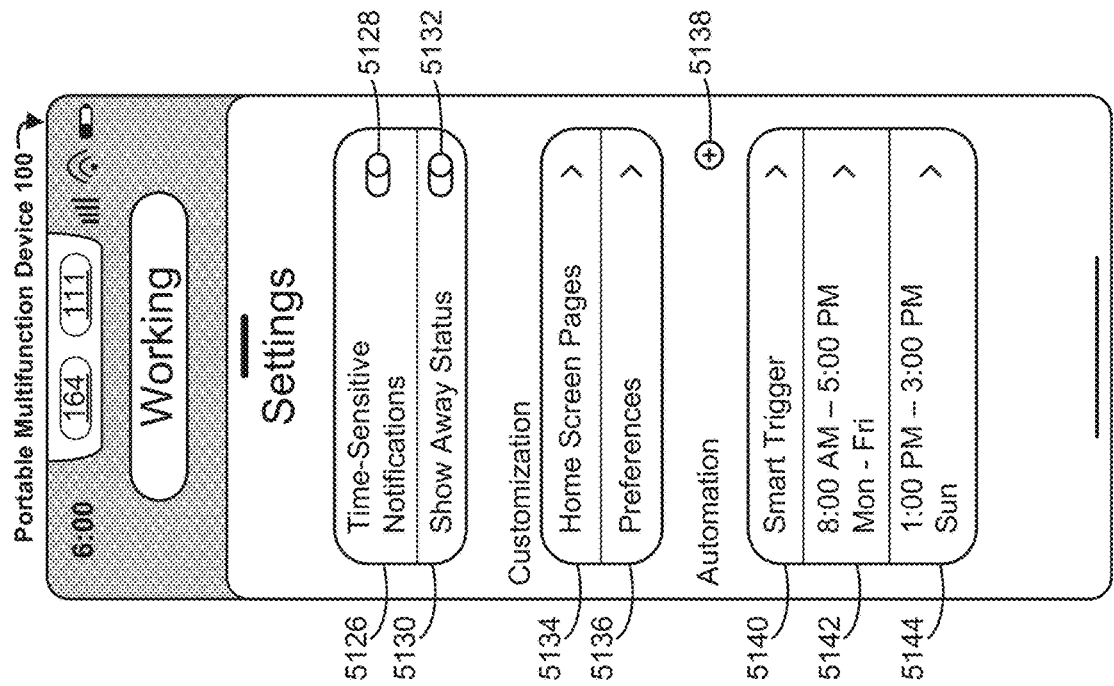
Figures 1, 6A:
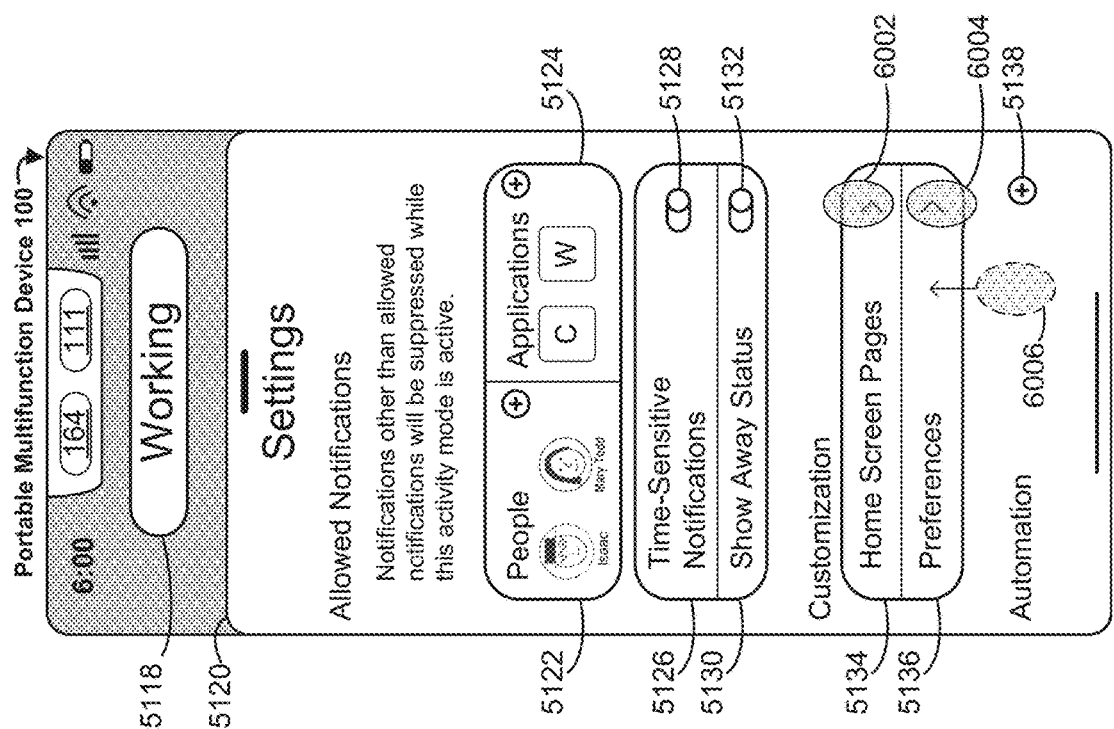
Figure 6B:
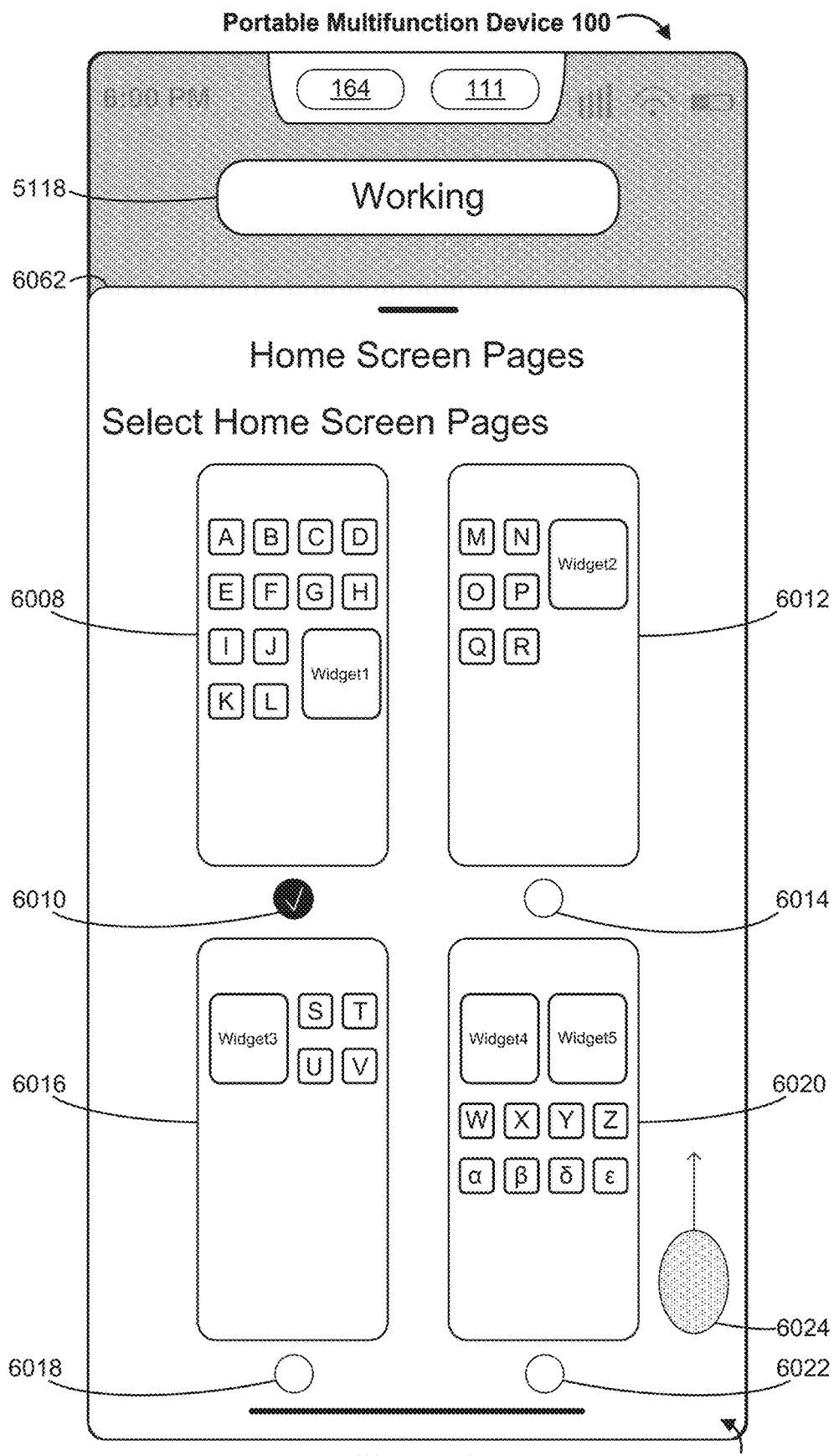
Figure 7A:
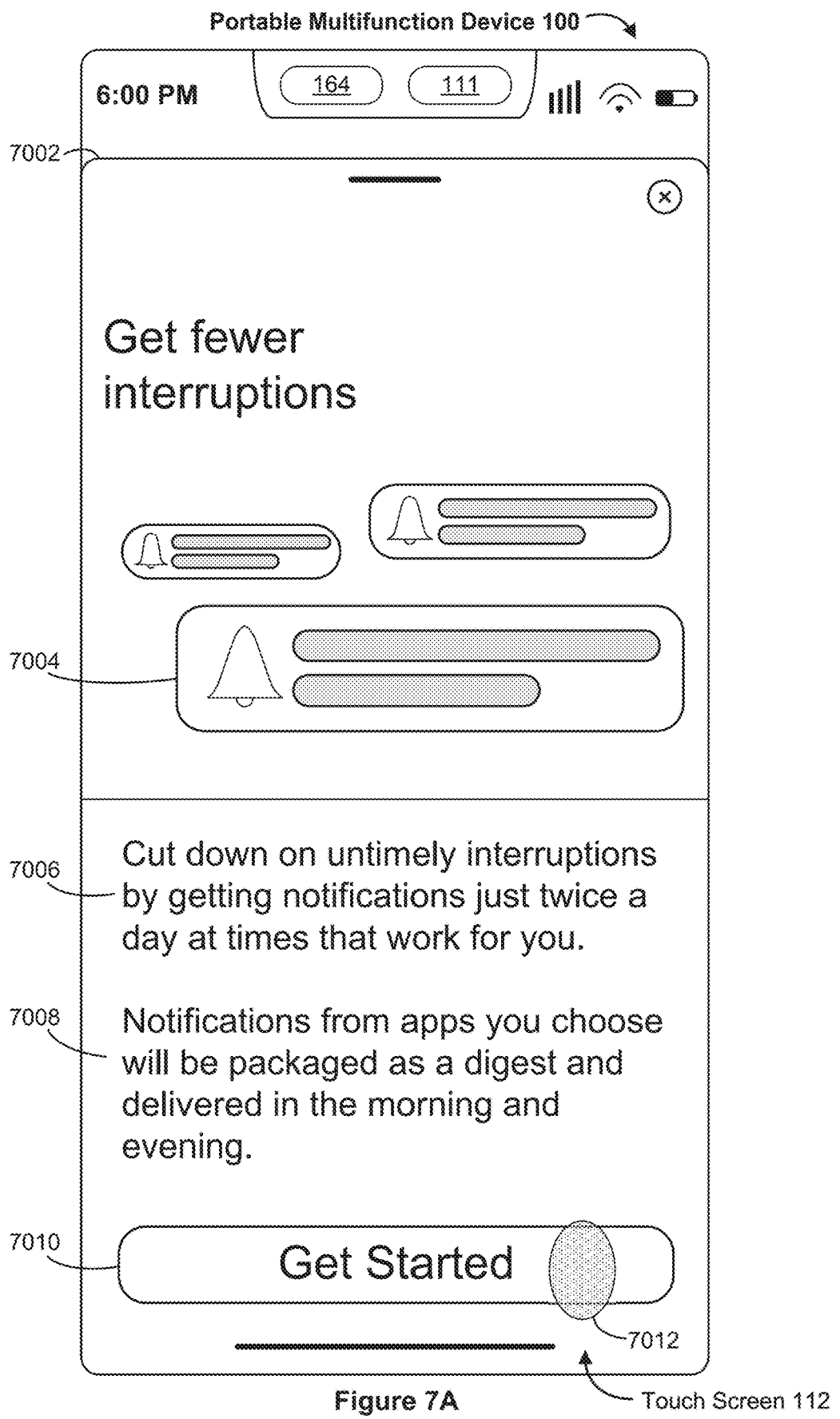
FIGS. 7A-7AE illustrate example user interfaces for configuring bundled notifications, in accordance with some embodiments.

FIGS. 6A-1 and 6A-2 are analogous to FIGS. 5R-1 and 5R-2. In response to a swipe input 6006, the portable multifunction device scrolls the settings interface 5120 for a respective activity mode (e.g., the "Working" activity mode in this example). In response to a user input (e.g., user input 6002) on the "Home Screen Pages" affordance 5134, and as shown in FIG. 6B, the portable multifunction device displays a user interface 6062 for selecting one or more home screen pages that are displayed when the respective activity mode (e.g., the "Working" activity mode) is active. FIG. 6B shows a plurality of home screen pages, including, in this example, a first home screen page 6008, a second home screen page 6012, a third home screen page 6016, and a fourth home screen page 6020. In some embodiments, each home screen page has an associated home screen page selector (e.g., the first home screen page 6008 has an associated home screen page selector 6010; the second home screen page 6012 has an associated home screen page selector 6014; the third home screen page 6016 has an associated home screen page selector 6018; and the fourth home screen page 6020 has an associated home screen page selector 6022). The home screen page selector 6010 indicates (e.g., by displaying a checkmark or other visual indicator) that the first home screen page 6008 is selected and will be displayed when the "Working" activity mode is active. The home screen page selectors 6014, 6018, and 6022 indicates that the second, third, and fourth home screen pages 6012, 6016, 6020, respectively, are not selected and will not be displayed when the "Working" activity mode is active.

Figure 6C:
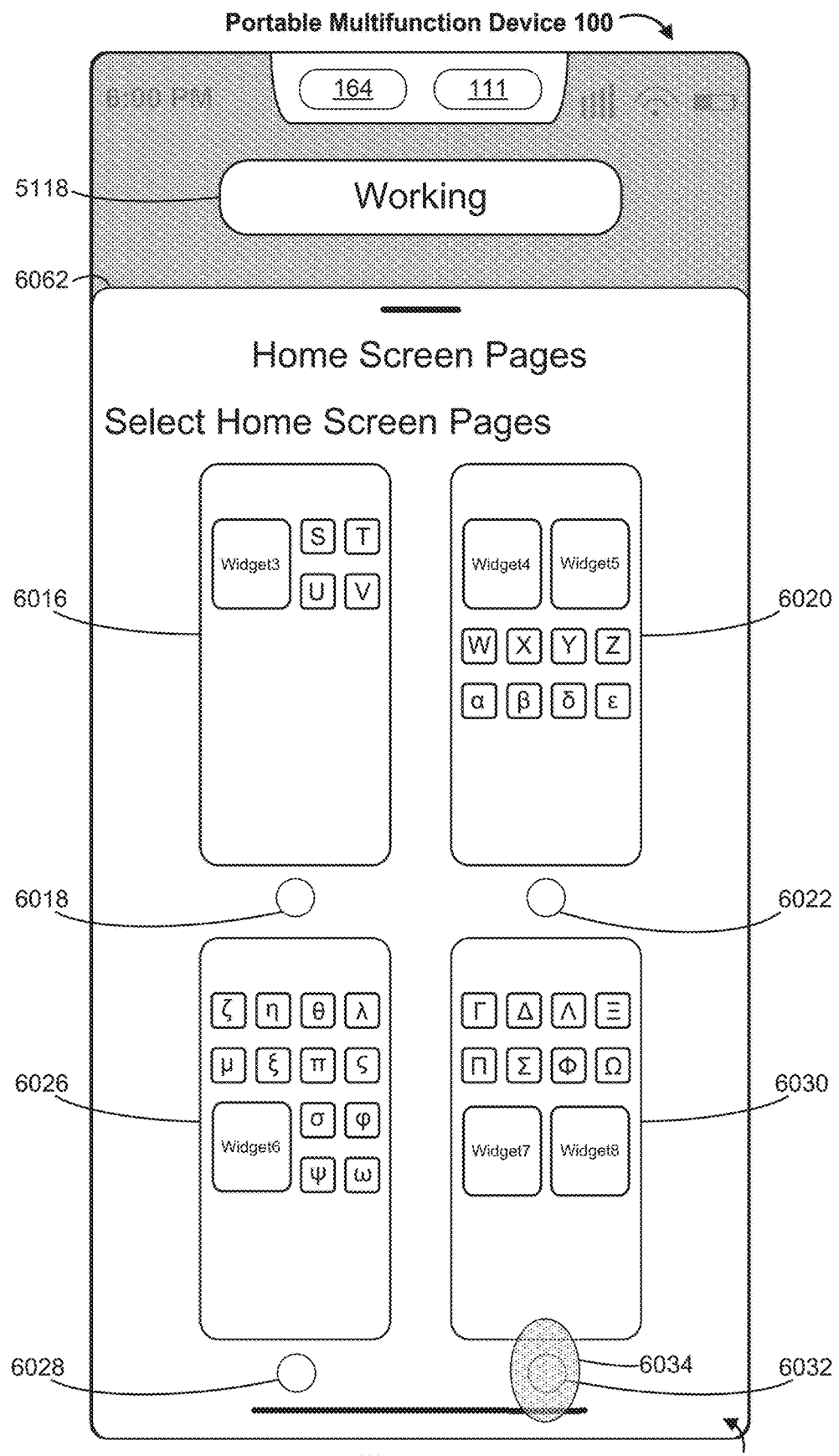
Figure 6D:
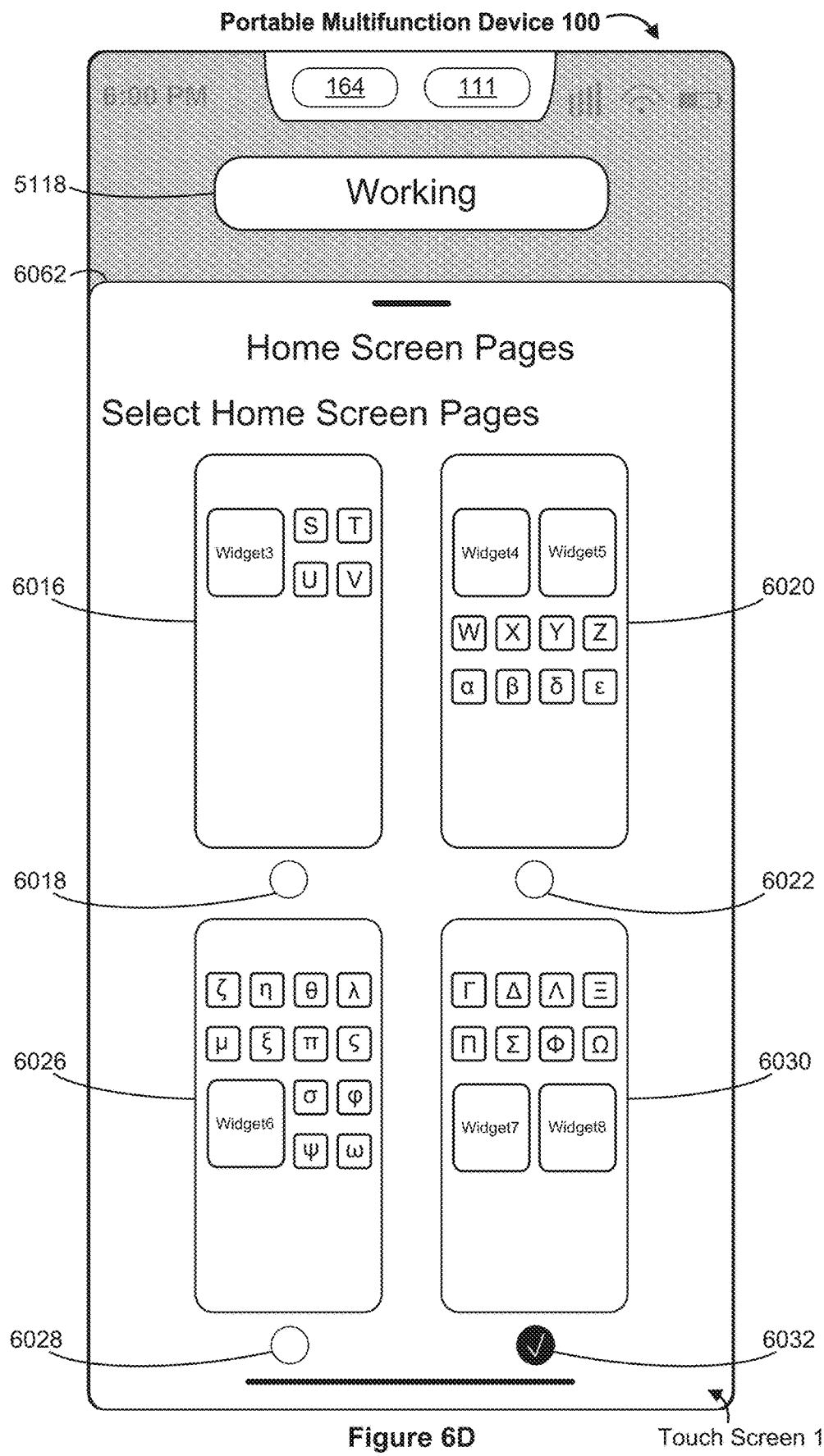

In some embodiments, in response to a user input (e.g., a swipe up by a user input 6024 in FIG. 6B), and as shown in FIG. 6C, the portable multifunction device 100 displays one or more home screens that were not displayed before detecting the user input (e.g., a fifth home screen page 6026, and a sixth home screen page 6030). In response to detecting a user input (e.g., a tap by a user input 6034) on a home screen page selector 6032, the portable multifunction device 100 selects the sixth home screen page 6030, and indicates that the sixth home screen page 6030 is selected (e.g., as shown in FIG. 6D, the home screen page selector 6032 includes a checkmark to visually indicate that the sixth home page 6030 has been selected for display, when the respective (e.g., "Working") activity mode is active, in response to the user input 6034). In some embodiments, the user input is detected at a different location (e.g., on the sixth home screen page 6030).

Figure 6E:
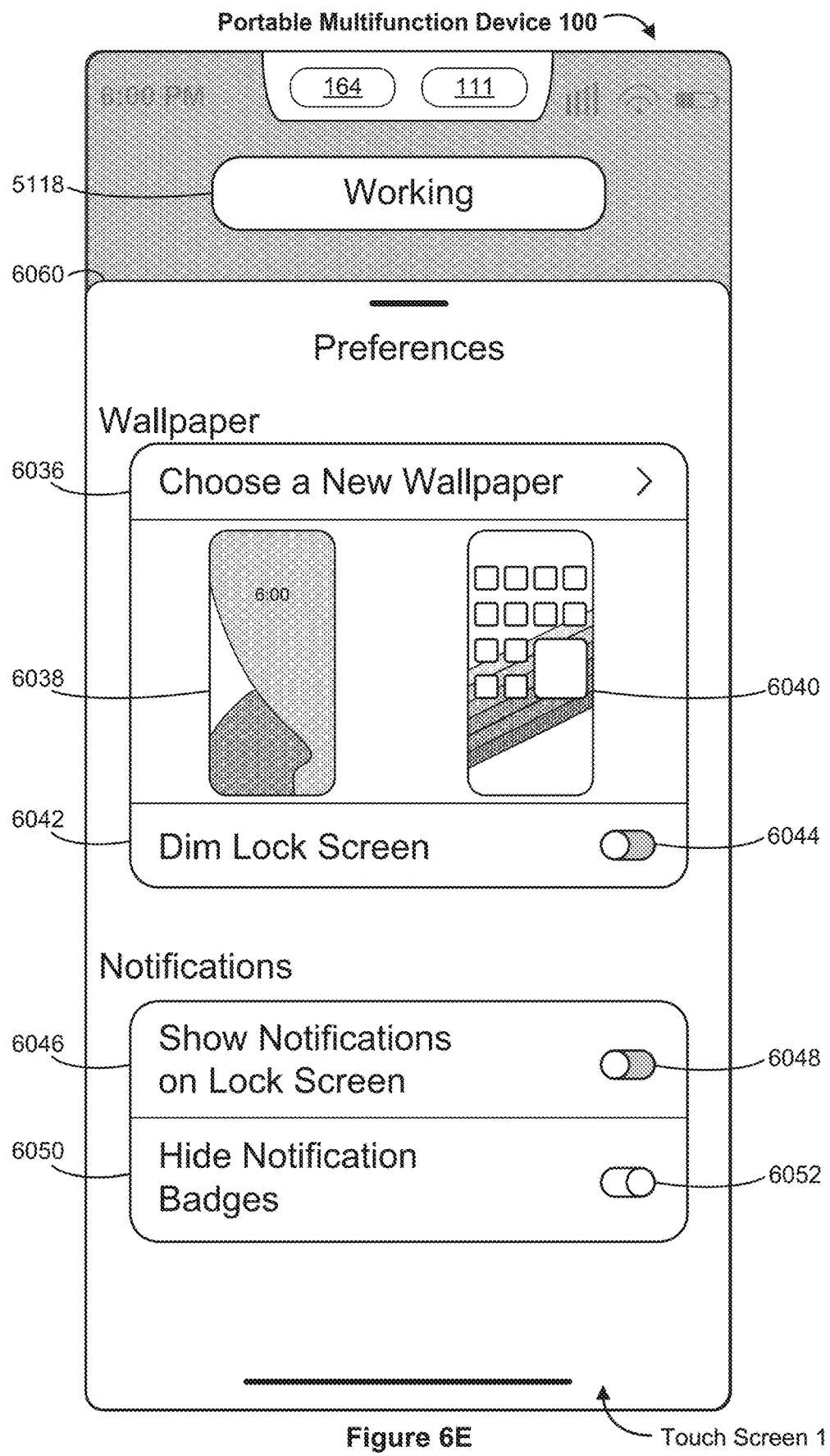

FIG. 6E illustrates an example of a user interface for modifying preference settings for the activity mode. In some embodiments, the user interface for modifying preference settings for the activity mode is displayed in response to a user input (e.g., the user input 6004 in FIG. 6A-1) on the "Preferences" option 5136. In some embodiments, the user interface for modifying preference settings includes a "Choose a New Wallpaper" option 6036, which when activated, displays available wallpapers. A lock screen wallpaper preview 6038 and a home screen wallpaper preview 6040 display a preview of the selected wallpapers (e.g., previously configured using the "Choose a New Wallpaper" option 6036, or default wallpapers automatically assigned to the respective activity mode that is being configured). In some embodiments, the user interface for modifying preference settings includes a "Dim Lock Screen" option 6042 and, optionally, an associated toggle affordance 6044, for enabling or disabling an option for dimming the lock screen while the respective activity mode is active. In some embodiments, the user interface for modifying preference settings includes notification related settings, such as a "Show Notification on Lock Screen" option 6046 and, optionally, an associated toggle 6048 (e.g., for enabling or disabling display of notifications on the lock screen while the activity mode is active), and/or a "Hide Notification Badges" option 6050 and, optionally, an associated toggle 6052 (e.g., for enabling or disabling the hiding of indications of notifications on application icons).

FIGS. 6F-1 to 6F-3 illustrate examples of user interfaces while the respective activity mode is active, in accordance with home screen page settings and preference settings of the respective activity mode. FIG. 6F-1 illustrates an example of a lock screen user interface that includes the wallpaper 6054 (e.g., as configured using the portion of the settings interface shown in FIG. 6E). In this example, no notifications are displayed on the lock screen user interface (e.g., because the "Show Notification on Lock Screen" option 6042 is not enabled, as shown in FIG. 6E).

FIG. 6F-2 illustrates the first home screen page 6008 (e.g., displayed because the home screen page 6008 is selected, as shown in FIG. 6B). FIG. 6F-3 illustrates the sixth home screen page 6030 (e.g., displayed because the home screen page 6030 is selected, as shown in FIG. 6D).

Figure 6G:
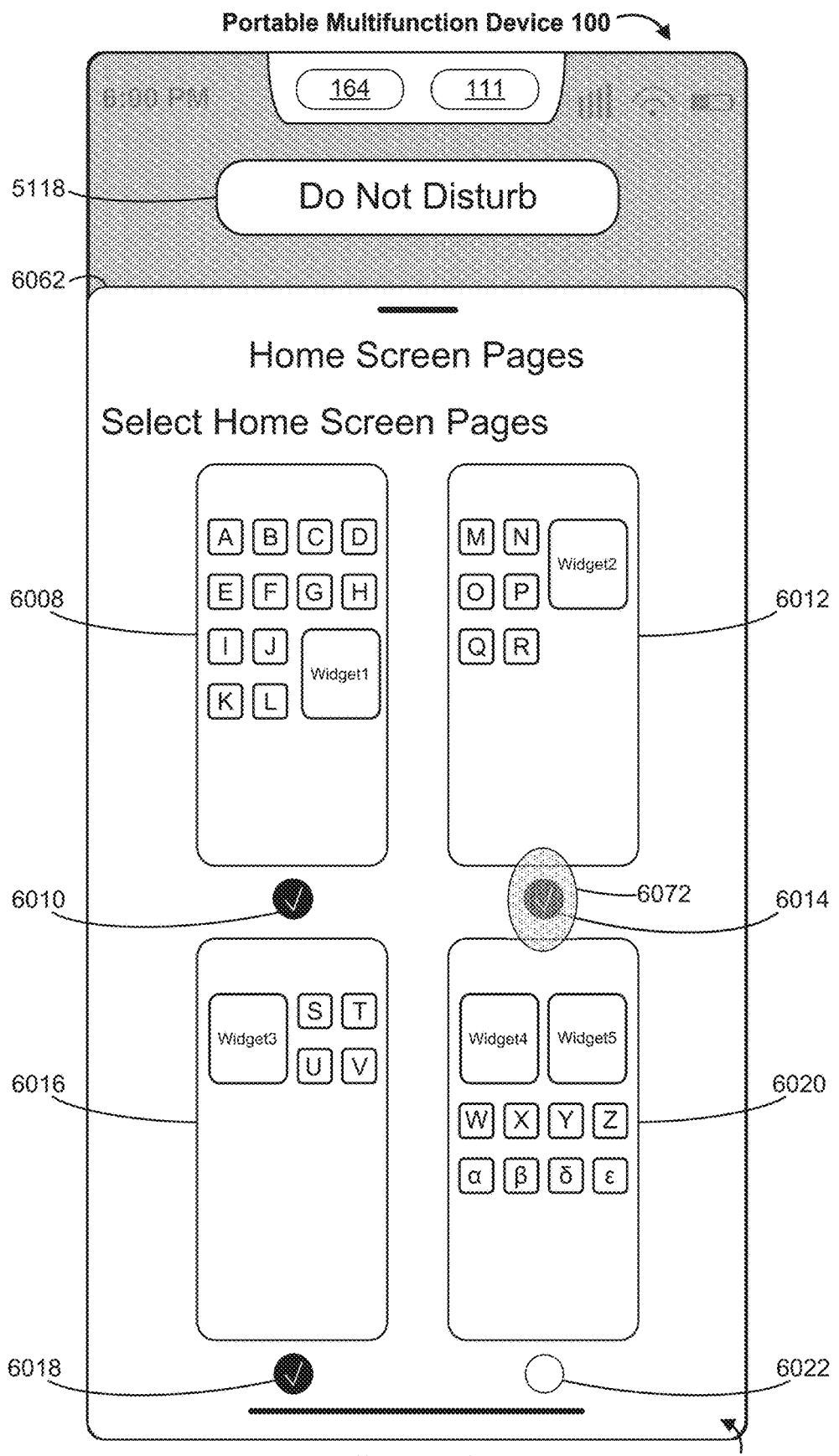
Figure 6H:
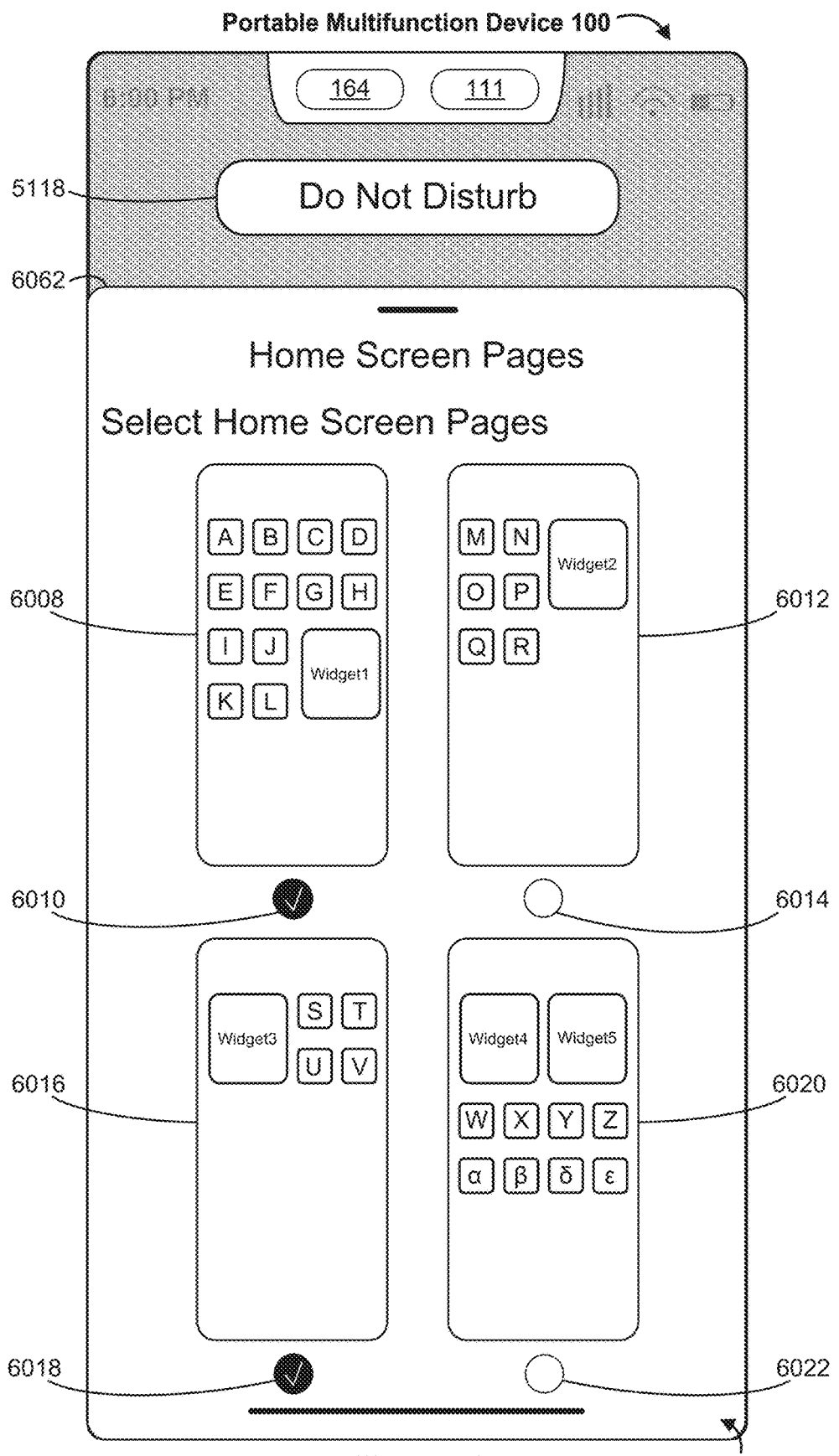

FIG. 6G is analogous to FIG. 6B, but displays a user interface 6062 for selecting one or more home screens while the "Do Not Disturb" activity mode is active (note that, although some of the same reference numbers are used in FIG. 6G and FIG. 6B to indicate corresponding parts, it should be understood that the example in FIG. 6G is applicable to a different activity mode (e.g., the "Do Not Disturb" activity mode) than the respective activity mode (e.g., the "Working" activity mode) for which home screen pages are selected in the user interface shown in FIG. 6B). In the example shown in FIG. 6G, the first home screen page 6008, the second home screen page 6012, and the third home screen page 6016 are selected for display when the corresponding activity mode (e.g., the "Do Not Disturb" activity mode) is active. In response to detecting a user input (e.g., a tap by user input 6072 on a home screen page selector 6014 associated with the second home screen 6012), the portable multifunction device 100 unselects the second home screen page 6012 and removes the indication that the second home screen page 6012 is selected (e.g., as shown in FIG. 6H, the home screen page selector 6014 no longer displays the checkmark that was displayed in FIG. 6G). As a result of user input 6072, the second home screen will not be displayed when the corresponding activity mode is active. However, a subsequent user input on the same home screen page selector (e.g., home screen page selector 6014) would once again select the second home screen for display when the corresponding activity mode is active.

Figure 6I:
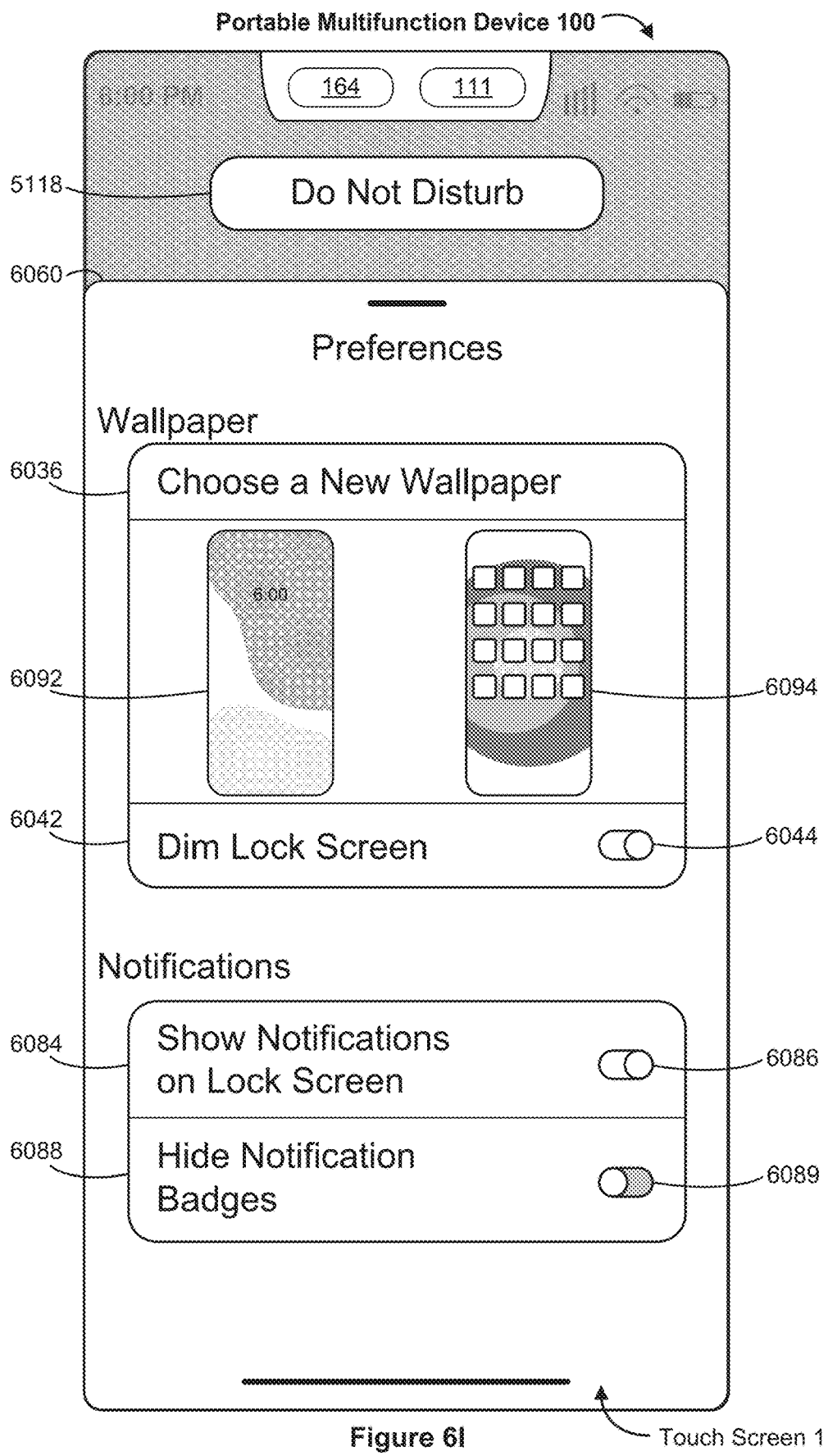

FIG. 6I is analogous to FIG. 6E, but illustrates the preference settings for the "Do Not Disturb" activity mode instead of the "Working" activity mode (as shown in FIG. 6E). In contrast to the "Working" activity mode, in the "Do Not Disturb" activity mode, a "Show Notifications on Lock Screen" option 6084 is enabled (e.g., by toggle 6086), and a "Hide Notification Badges" option 6088 is not enabled (e.g., by toggle 5089), and therefore notification badges will not be hidden when the corresponding (e.g., "Do Not Disturb") activity mode is active.

FIGS. 6J-1 to 6J-3 illustrate exemplary user interfaces while the "Do Not Disturb" activity mode is active, in accordance with home screen page settings and preference settings of the "Do Not Disturb" activity mode. FIG. 6J-1 illustrates an example of a lock screen user interface that includes the wallpaper 6092 (e.g., as configured in the "Choose a New Wallpaper" option 6036 of the preferences settings interface of FIG. 6I). A notification is displayed on the lock screen user interface (e.g., because the "Show Notification on Lock Screen" option 6084 is enabled, as shown in FIG. 6I).

FIG. 6J-2 illustrates the first home screen page 6008 (e.g., displayed because the home screen page 6008 is selected, as shown in FIG. 6G) that includes wallpaper 6094 (e.g., as configured in the "Choose a New Wallpaper" option 6036 of the preferences settings interface of FIG. 6I). Notification badges are displayed for a phone application and a mail application (e.g., because the "Hide Notification Badges" option 6088 is not enabled). FIG. 6J-3 illustrates the third home screen page 6016 (e.g., displayed because the home screen page 6030 is selected, as shown in FIG. 6G).

FIGS. 7A-7AE illustrate example user interfaces for configuring bundled notifications in accordance with some embodiments. The user interfaces in these figures are used to illustrate the processes described below, including the processes in FIGS. 11A-11H. For convenience of explanation, some of the embodiments will be discussed with reference to operations performed on a device with a touch-sensitive display system 112.

FIGS. 7A-7J illustrates exemplary onboarding user interfaces for initial setup for notification bundling (e.g., bundling notifications into daily notification digests, that are delivered at predetermined delivery times). FIG. 7A illustrates a user interface 7002 for introducing a user to notification bundling. In some embodiments, the user interface 7002 includes text 7006 (e.g., a brief description of why notification bundling is useful), and optionally includes text 7008 (e.g., a description of how notification bundling affects performance of the multifunction device 100). The introductory user interface 7002 includes a "Get Started" affordance 7010.

Figure 7B:
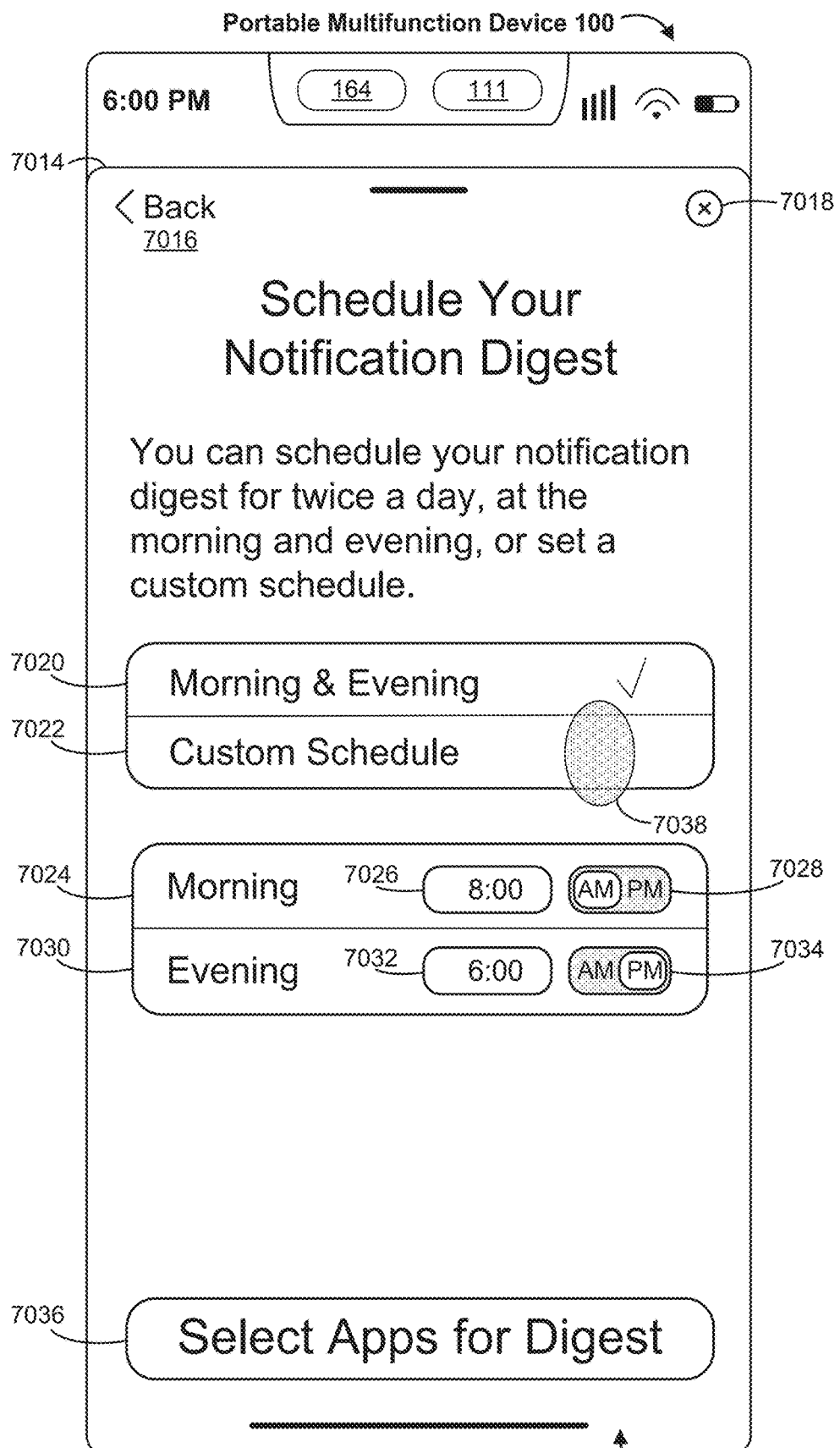

In response to a user input (e.g., a user input 7012 on the "Get Started" input 7010), and as shown in FIG. 7B, the portable multifunction device 100 displays a user interface 7014 for configuring scheduled delivery times for bundled notifications (e.g., as part of a notification digest). The user interface 7014 optionally includes a "Back" affordance 7016 (e.g., for returning to the user interface 7002 in FIG. 7A) and optionally an "X" affordance 7018 (e.g., for exiting the onboarding process). In some embodiments, the user interface 7014 includes a default scheduling option 7020 (e.g., the "Morning and Evening" option as the default option for providing bundled notifications in a notification digest twice a day, once in the morning and once in the evening) and a "Custom Schedule" option 7022 (e.g., for configuring additional delivery times, for configuring a single delivery time, etc.). In some embodiments, while the default scheduling option 7020 is selected (e.g., as shown by the checkmark on the default option 7020), a "Morning" delivery time 7024 and an "Evening" delivery time 7030 are configured (e.g., the delivery time is adjusted by one or more user inputs on the "Morning" time 7026 and/or the "Evening" time 7032 (e.g., a swipe input, a tap input, etc.)). In some embodiments, the hour and minute segments of the "Morning" time 7026 and the "Evening" time 7032 are adjusted independently (e.g., by a tap input on the corresponding hour or minute segment to be configured). In some embodiments, the hour and minute segments are configured simultaneously (e.g., tapping on the "Morning" time 7026 displays a numeric keypad for entering the desired hour and minute). In some embodiments, the delivery time can be further adjusted by selecting a morning or evening time (e.g., via an AM/PM toggle 7028 for the "Morning" delivery time 7024, and/or via an AM/PM toggle 7034 for the "Evening" delivery time 7030). The user interface 7014 includes an applications selection option (e.g., "Select Apps for Digest" affordance 7036) for selecting applications for which delivery of notifications is to be deferred and delivered in the form of digests.

Figure 7C:
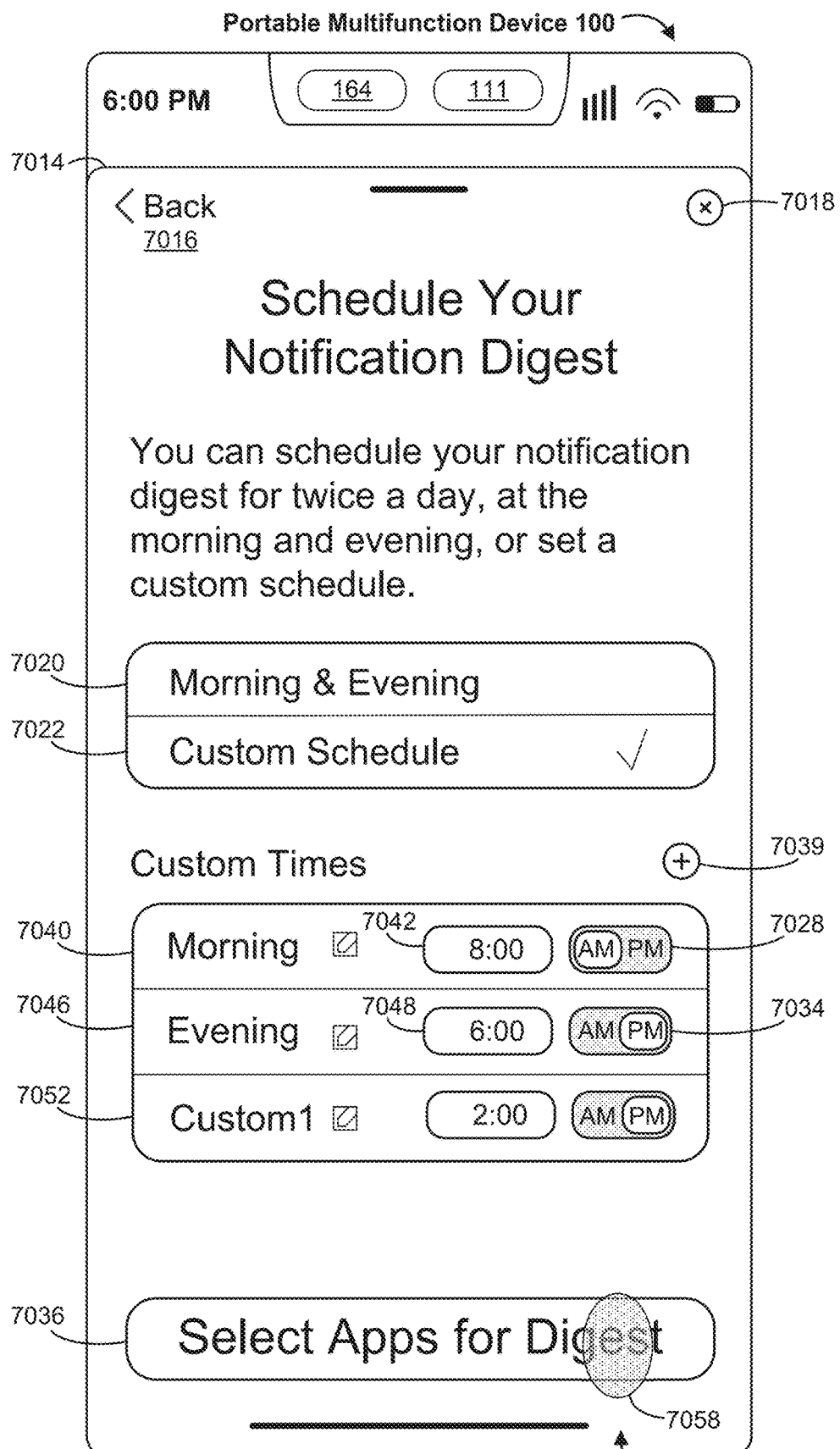

In response to a user input (e.g., a user input 7038 on the "Custom Schedule" affordance 7022), and as shown in FIG. 7C, the portable multifunction device 100 updates the user interface 7014 to include additional delivery time configuration options. FIG. 7C is analogous to FIG. 7B, but displays custom times, rather than just the one or more default delivery times, such as "Morning" delivery time 7024 and "Evening" delivery time 7030. Specifically, the user interface 7014 includes a first delivery time (e.g., a "Morning" delivery time 7040), a second delivery time (e.g., an "Evening" delivery time 7046), and a third delivery time (e.g., a "Custom1" delivery time 7052). In some embodiments, the first, second, and third delivery times can be renamed by the user of the portable multifunction device 100 (e.g., to names other than "Morning," "Evening," and "Custom1," respectively). The delivery times are configured in an analogous manner as described above with reference to FIG. 7B.

Figures 1, 7D:
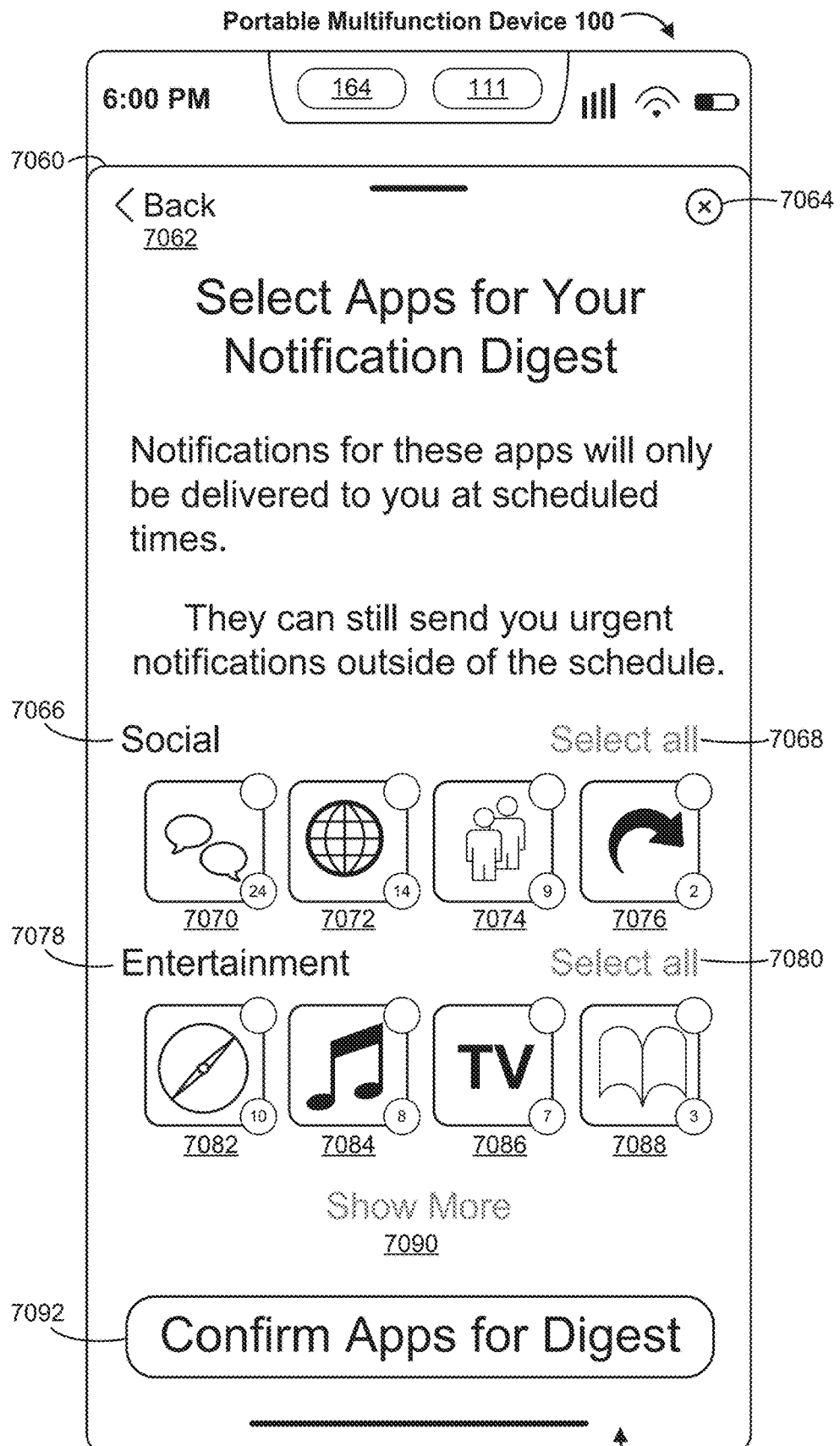
Figures 2, 7D:
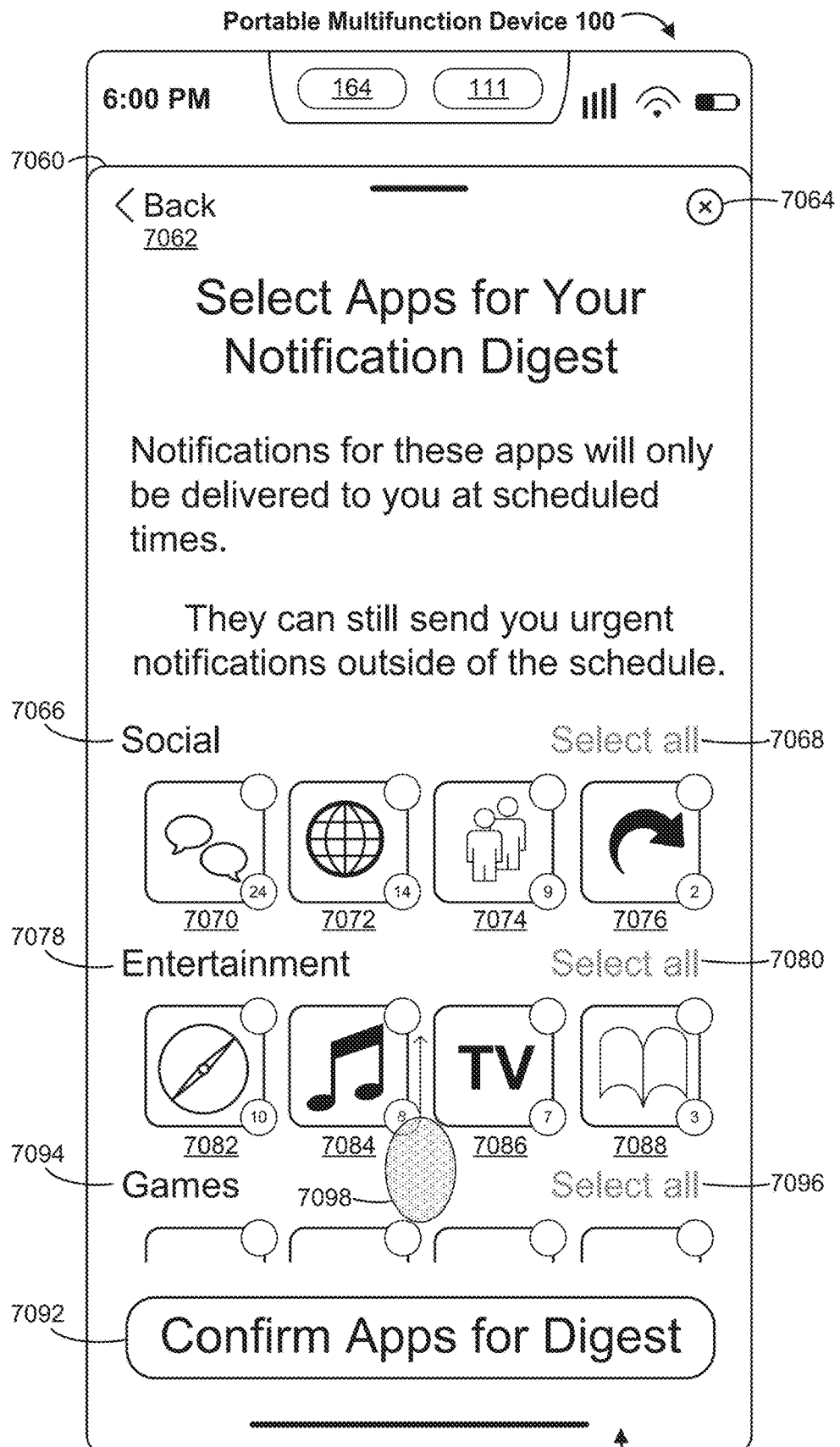

In response to a user input (e.g., a user input 7058 on the applications selection affordance (e.g., "Select Apps for Digest" affordance 7036), and as shown in FIG. 7D-1, the portable multifunction device 100 displays a user interface 7060 for selecting applications for which notifications will be bundled (e.g., and delivered as digests). The user interface 7060 optionally includes a "Back" affordance 7062 (e.g., for returning to the user interface 7014 in FIG. 7C), and optionally includes an exit affordance (e.g., "X" affordance 7064) for exiting the onboarding process. The user interface 7060 includes a list of application icons for applications available for notification bundling. In some embodiments, the displayed application icons each include a selection indicator (e.g., a bubble in the upper right hand corner) for indicating whether the respective application is an application for which notifications will be bundled (e.g., via a checkmark in the bubble), and optionally includes a usage indicator (e.g., a bubble in the lower right hand corner) for indicating a usage metric for the corresponding application (e.g., an average number of notifications generated by the application (e.g., averaged over a set amount of time (e.g., a week))). In some embodiments, the user interface 7060 includes application icons sorted by application type (e.g., into a "Social" group 7066 and an "Entertainment" group 7078). In some embodiments, the displayed applications are suggested applications (e.g., based on past usage). In some embodiments, the user interface 7060 includes a "Show More" affordance 7090, which when activated, causes display of additional applications for selection, which are not initially displayed. The user interface 7060 includes a "Confirm Apps for Digest" affordance 7092 (e.g., for confirming the selected applications and continuing with the onboarding process).

FIG. 7D-2 illustrates an alternative version of FIG. 7D-1, but includes a list of applications that can be scrolled (e.g., by a swipe up by a user input 7098), and does not include the "Show More" affordance 7090. Instead, additional applications (e.g., for a "Games" category 7094) are displayed (e.g., partially cut-off, as there is not enough space on the screen to fully display the applications in the "Games" category 7094).

Figure 7E:
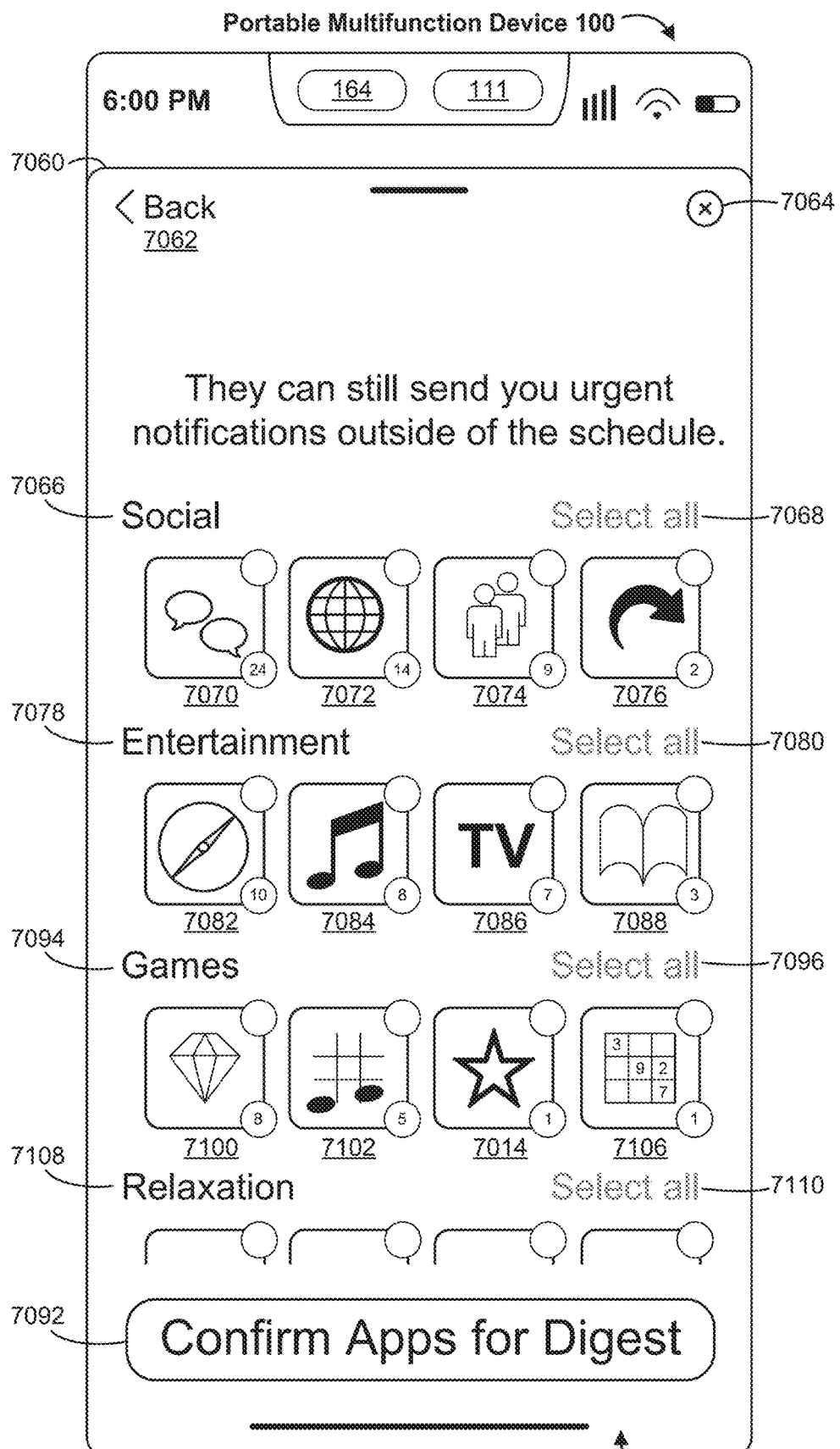

In response to a user input (e.g., the swipe up by the user input 7098), and as shown in FIG. 7E, the portable multifunction device 100 scrolls the list of applications (e.g., the applications in the "Games" category 7094 are now fully displayed, and text from the top of the user interface 7060 as shown in FIG. 7D-2 has scrolled off the display of the portable multifunction device 100).

Figure 7F:
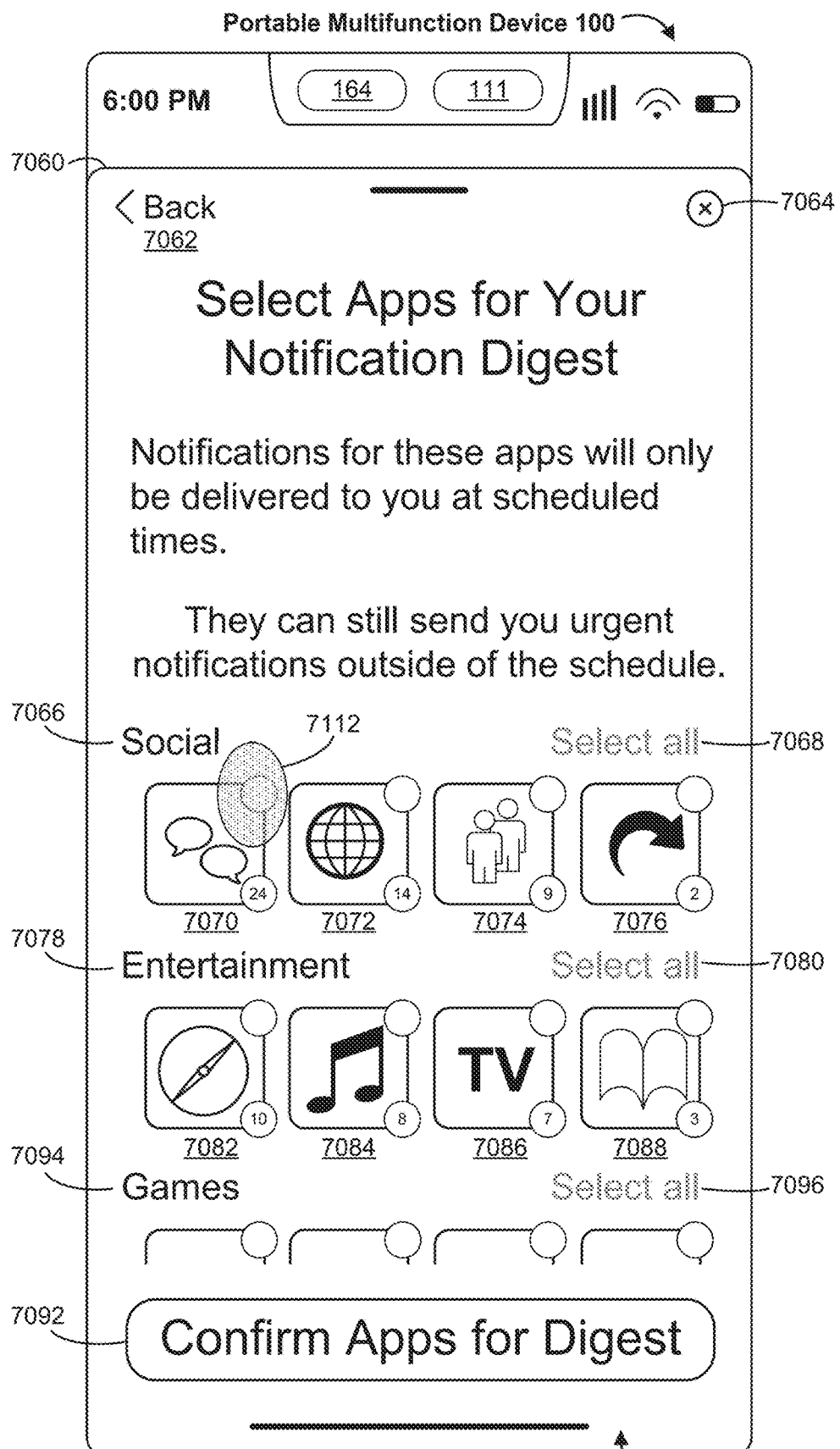
Figure 7G:
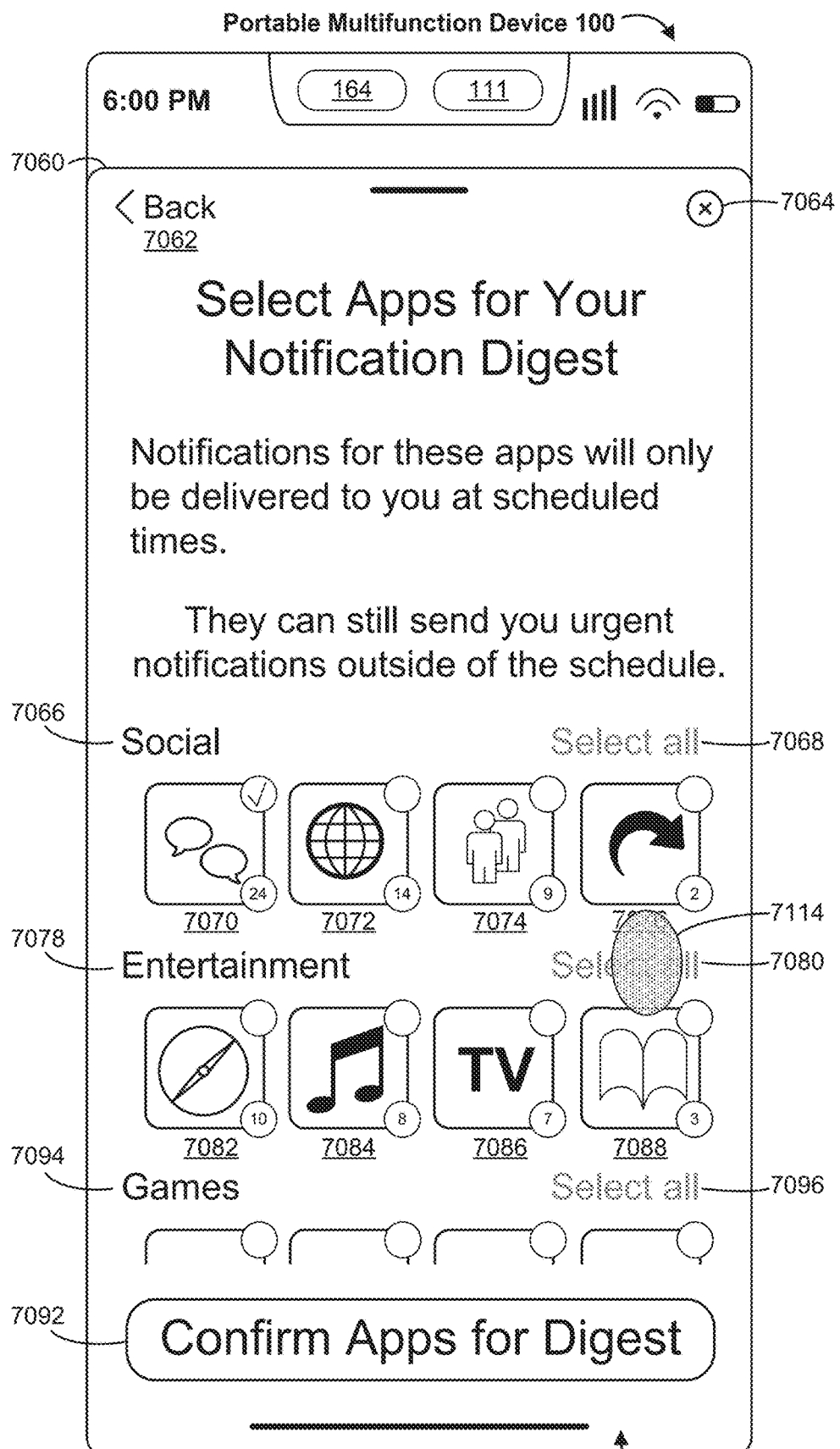

FIG. 7F illustrates a user input 7112 on an application icon 7070 in the "Social" group 7066. In response to detecting the user input 7112 on the application icon 7070, and as shown in FIG. 7G (e.g., by the checkmark on the application icon 7070) the portable multifunction device 100 selects the application corresponding to the application icon 7070 for notification bundling. In some embodiments, and as shown in FIG. 7F, the appearance of a selection indicator of a respective application changes, for example from unchecked to checked, in response to user selection of the respective application.

Figure 7H:
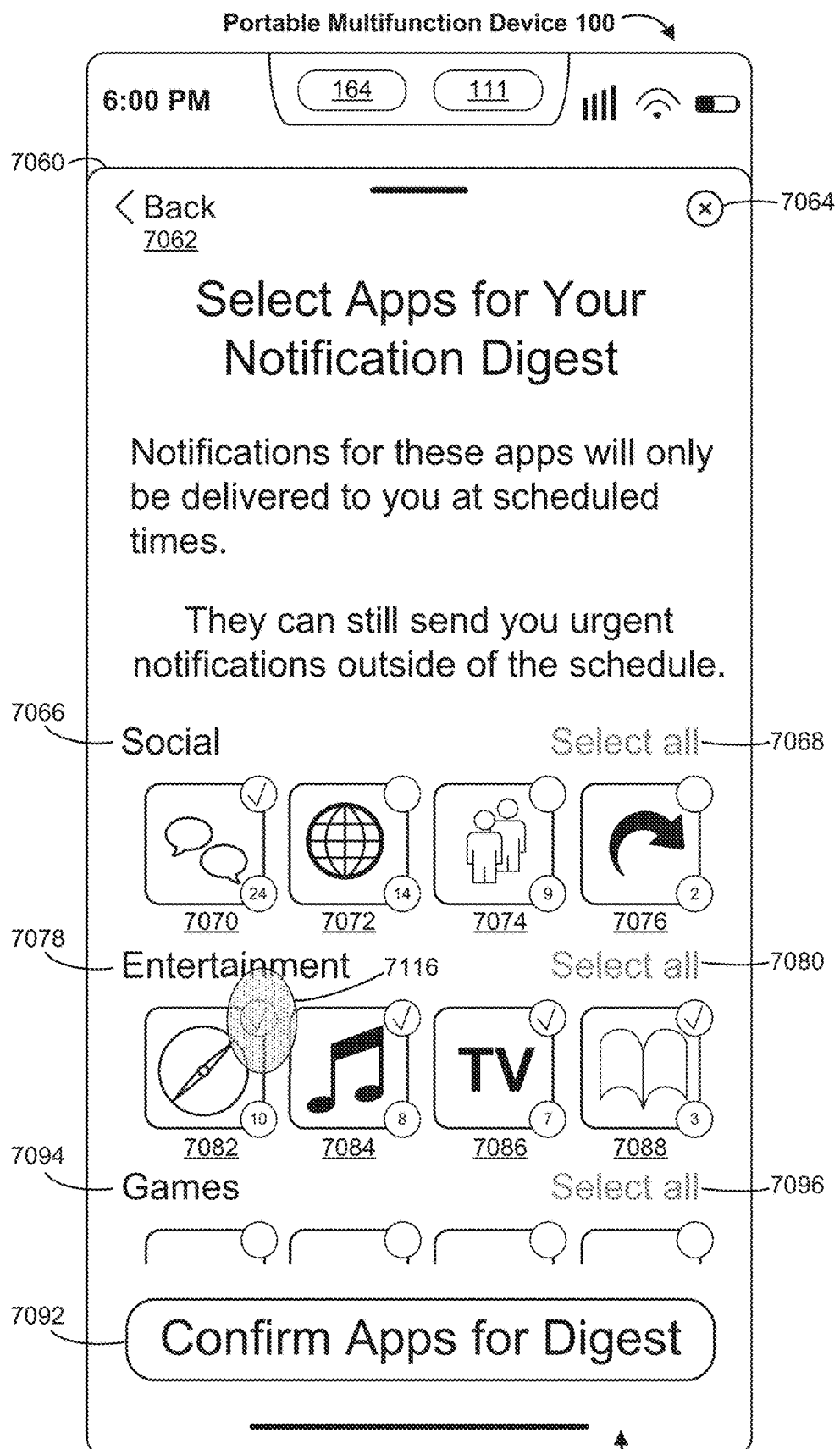

In response to detecting a user input on a group selection affordance for a respective group of application (e.g., a user input 7114 on a "Select All" affordance 7080 associated with the "Entertainment" group 7078), and as shown in FIG. 7H, the portable multifunction device 100 selects all the applications in the respective group of applications corresponding to the user-selected group selection affordance (e.g., the "Entertainment" group 7078). As shown in FIG. 7H, in response to the user input on the group selection affordance 7080, the selection indicators of the applications in the corresponding group of applications (e.g., the applications for which application icons are displayed in the corresponding group) are updated to indicate that those applications have been selected.

Figure 7I:
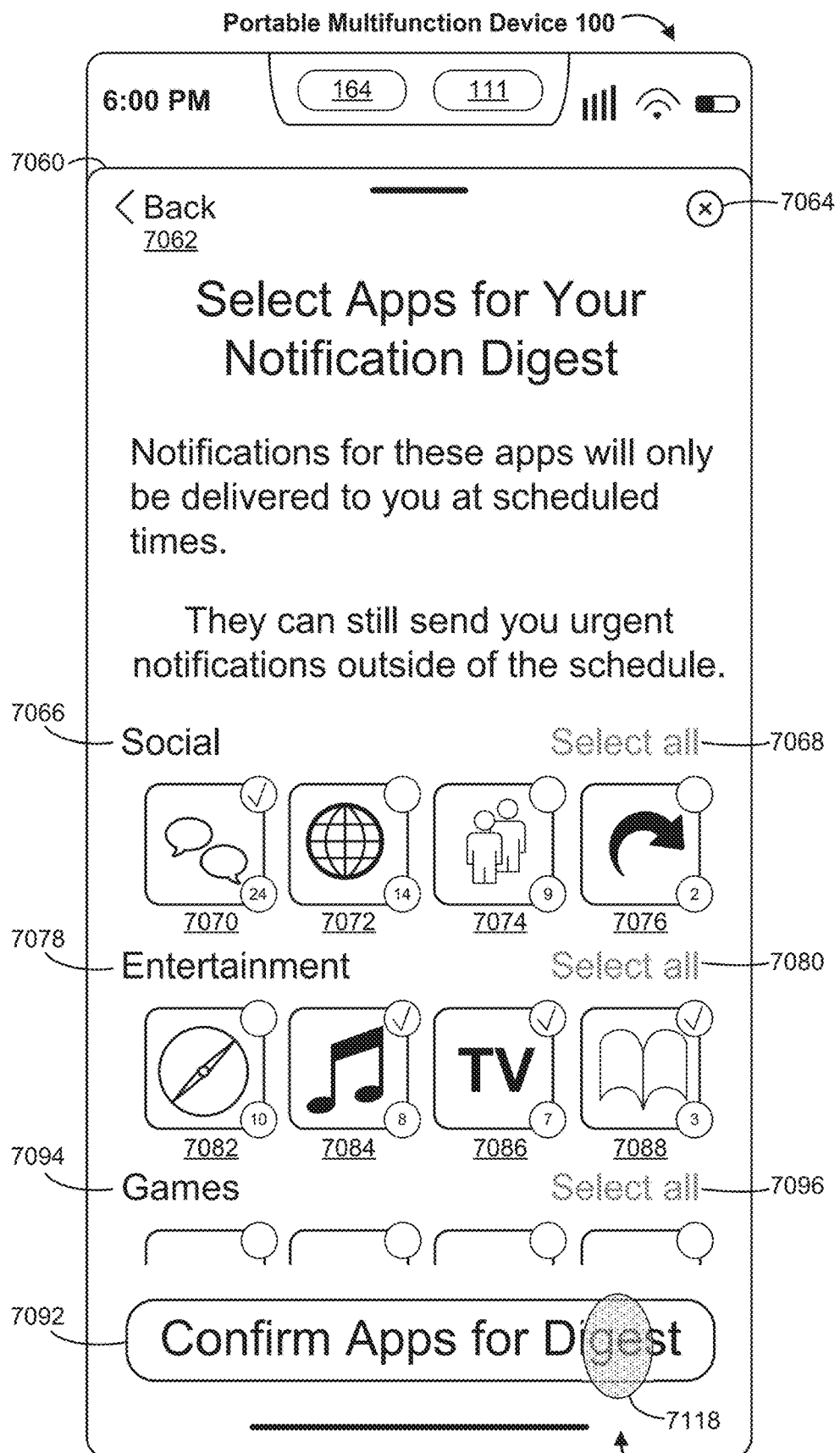

In some embodiments, in response to a further user input (e.g., a user input 7116 on an application icon 7082), and as shown in FIG. 7I (e.g., by removal of the checkmark from the selection indictor of application icon 7082), the portable multifunction device 100 deselects the application 7082 (e.g., notifications corresponding to the application 7082 will not be bundled).

Figure 7J:
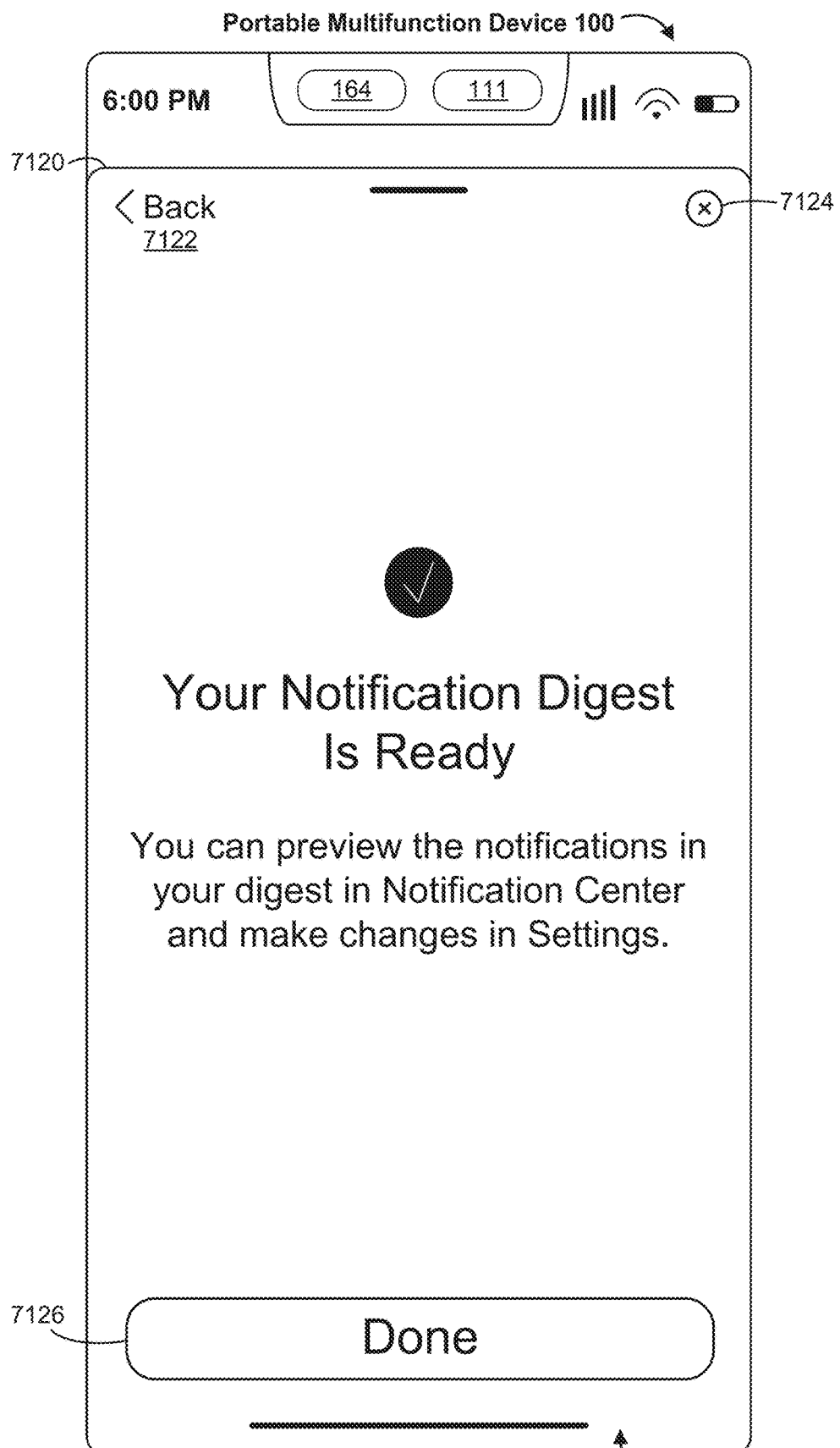

In some embodiments, in response to a user input on a selection confirmation affordance (e.g., a user input 7118 on the "Confirm Apps for Digest" affordance 7092), and as shown in FIG. 7J, the portable multifunction device 100 displays a user interface 7120 confirming that the user has completed configuration of the bundled notification settings (also referred to as "bundling settings") (e.g., the user interface 7120 displays the text "Your Notification Digest Is Ready," and optionally provides additional information on how to further configure (e.g., modify) the settings for bundled notifications. In some embodiments, the user interface 7120 includes a "Done" affordance 7126 for dismissing the user interface 7120 (e.g., and/or redisplaying a user interface that was displayed prior to displaying the user interface 7002 in FIG. 7A).

Figure 7K:
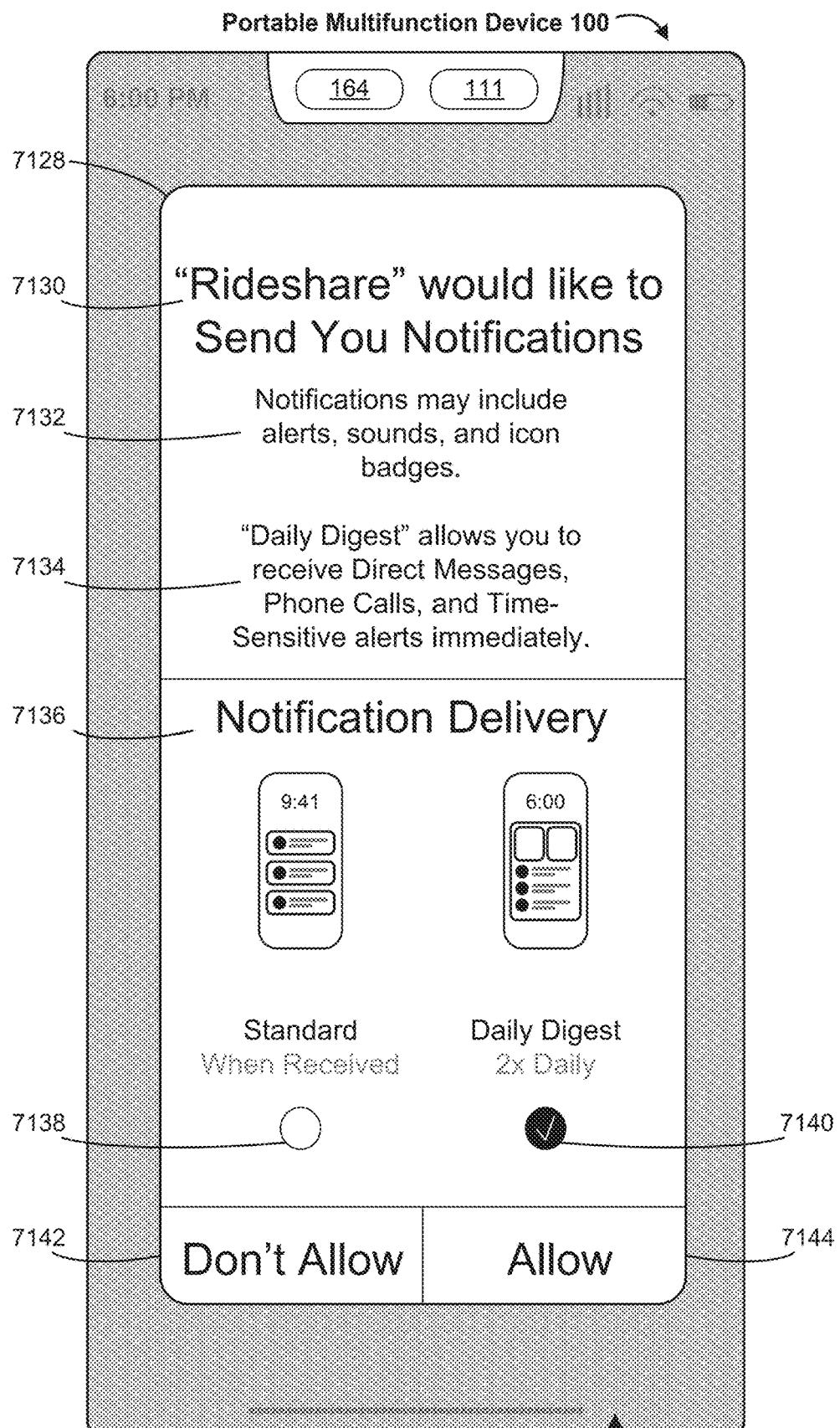

FIG. 7K illustrates an example of a user interface for configuring notification bundling for a specific application (e.g., in response to installing a new application). A user interface 7128 displays options for configuring notification bundling for the specific application, which in this example is a "Rideshare" application. All references to the "Rideshare" application in this discussion, with reference to FIGS. 7K-7N, are to be understood to be equally applicable to any specific application for which notification delivery is being configured. The user interface 7128 optionally includes a message 7130 that explains that the portable multifunction device 100 can be configured to provide notifications associated with the "Rideshare" application. Optionally, user interface 7128 includes a message 7132 that provides additional details for (general) notifications (e.g., not specific to bundled notifications). Optionally, user interface 7128 includes a message 7134 that provides additional details regarding bundled notifications (e.g., that bundled notifications can be provided as a "daily digest," but that some notification types (e.g., time-sensitive notifications) may still be provided (e.g., not bundled)). In some embodiments, the user interface 7128 includes a "Notification Delivery" portion 7136, which includes a "Standard" option 7138 and a "Daily Digest" option 7140. If selected, the "Standard" option 7138 configures the portable multifunction device 100 to provide notifications contemporaneously with detection of corresponding events (e.g., at the time such events are received or generated). If selected, as shown by the checkmark in FIG. 7K, the "Daily Digest" option 7140 configures the portable multifunction device 100 to provide notifications in accordance with bundled notification settings for the portable multifunction device 100. The user interface 7128 optionally includes a "Don't Allow" affordance 7142, for suppressing all notifications associated with the Rideshare application (e.g., without bundling the notifications), and optionally includes an "Allow" affordance 7144 that allows notifications associated with the Rideshare application to be provided (e.g., twice daily, because the "Daily Digest" option 7140 is selected).

Figure 7L:
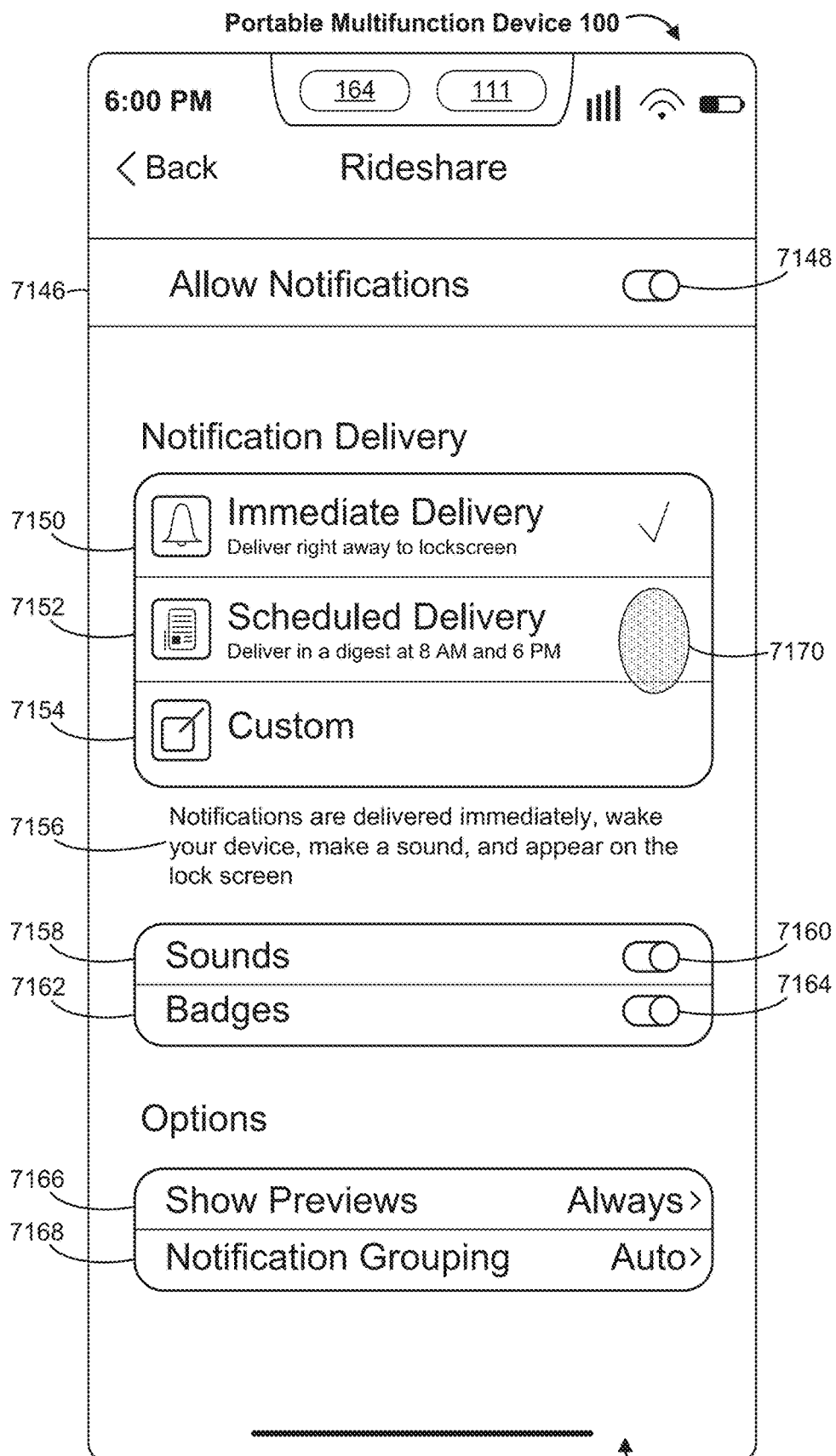
Figure 7M:
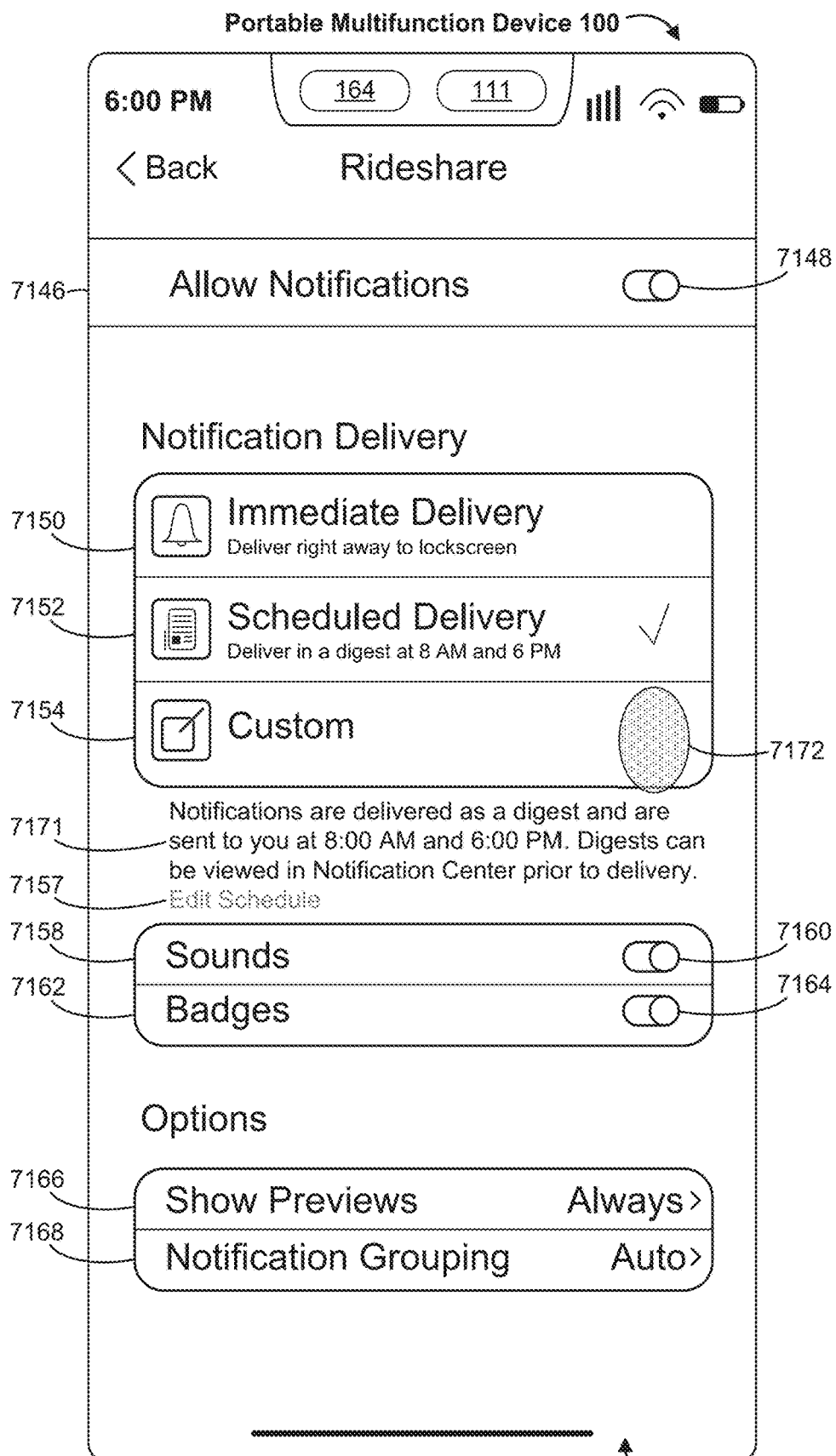
Figure 7N:
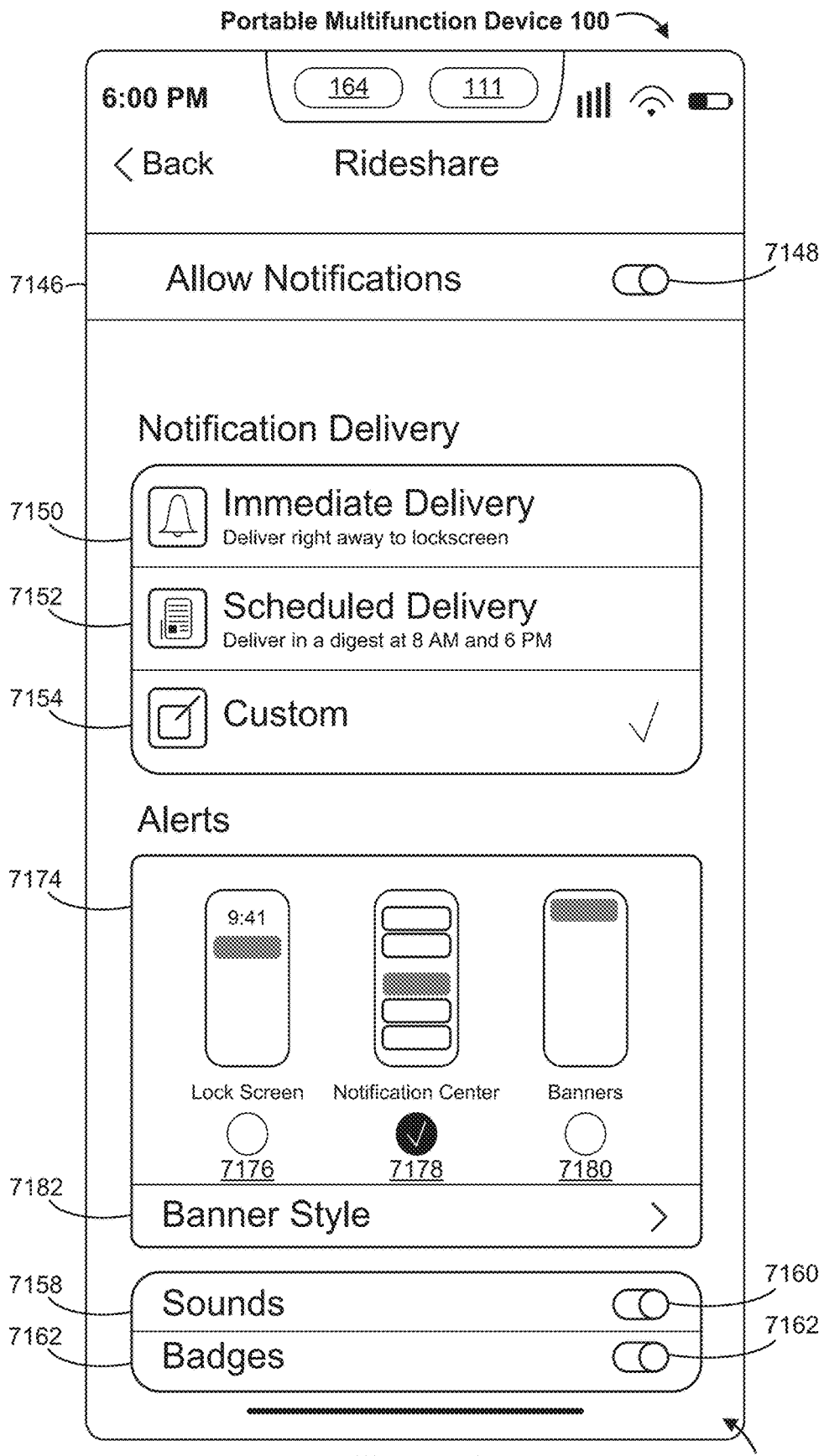

FIGS. 7L-7N illustrate exemplary user interfaces for configuring time-sensitive notifications for a specific application. In some embodiments, the user interface for configuring time-sensitive notifications for a specific application is displayed in response to a user input on a Settings application (e.g., application 446 in FIG. 5A). In some embodiments, a user interface for configuring time-sensitive notifications for a specific application is displayed in response to a user input on the "Allow" affordance 7144 (shown in FIG. 7K), in accordance with a determination that the "Daily Digest" option 7140 is (or has been) selected (e.g., that notification bundling is enabled for the "Rideshare" application).

As shown in FIG. 7L, the user interface for configuring time-sensitive notifications for a specific application includes a plurality of user-selectable options, including one or more (or two or more, or all) of: an "Allow Notifications" option 7146 (e.g., for enabling or suppressing all notifications for the "Rideshare" application) and associated toggle 7148, a "Sounds" option 7158 and optionally an associated toggle 7160 (e.g., for enabling sound output when providing a notification associated with the "Rideshare" application), a "Badges" option 7162 and optionally an associated toggle 7164 (e.g., for displaying badges on the "Rideshare" application), a "Show Previews" option 7166, and a "Notifications Grouping" option 7168. The user interface for configuring time-sensitive notifications for a specific application includes notification delivery options, including, for example, one or more (or two or more) of: an "Immediate Delivery" affordance 7150 (e.g., for configuring the portable multifunction device 100 to provide notifications associated with the "Rideshare" application at the time at which the notifications are received), a "Scheduled Delivery" affordance (e.g., for enabling notification bundling for the "Rideshare" application), and a "Custom" affordance (e.g., for further customizing how notifications are provided). As shown by the checkmark on the "Immediate Delivery" affordance 7150, the portable multifunction device 100 is currently configured to provide notifications associated with the "Rideshare" application at the time at which the notifications are received. In some embodiments, the portable multifunction device 100 displays a summary of the current notification settings (e.g., as text 7156, which summarizes the notification delivery settings and sound options).

In response to a user input (e.g., a user input 7170 on the "Scheduled Delivery" affordance 7152), and as shown in FIG. 7M, the portable multifunction device 100 updates the configuration for the notification settings of the "Rideshare" application. Optionally, the resulting user interface includes text 7171, which provides a brief summary of bundled notifications, and optionally includes an "Edit Schedule" affordance 7157, for adjusting the delivery times for the daily digests (e.g., bundled notifications).

In response to a user input (e.g., a user input 7172 on the "Custom" affordance 7154), and as shown in FIG. 7N, the portable multifunction device 100 updates the configuration for the notification settings of the "Rideshare" application. In some embodiments, an "Alerts" section 7174 of the settings user interface displays additional configuration options for further customizing how notifications are provided, including, for example, one or more (or two or more) of: a "Lock Screen" option 7176 (e.g., for enabling or disabling display of notifications associated with the "Rideshare" application while a lock screen is displayed), a "Notification Center" option 7178 (e.g., for enabling or disabling display of notifications associated with the "Rideshare" application in a notification center), a "Banners" option 7180 (e.g., for enabling or disabling display of banners corresponding to notifications associated with the "Rideshare" application (e.g., banners which are displayed over a currently displayed user interface)), and a "Banner Style" affordance (e.g., for further customizing the appearance of banners (e.g., if the "Banners" option 7180 is selected).

Figure 7O:
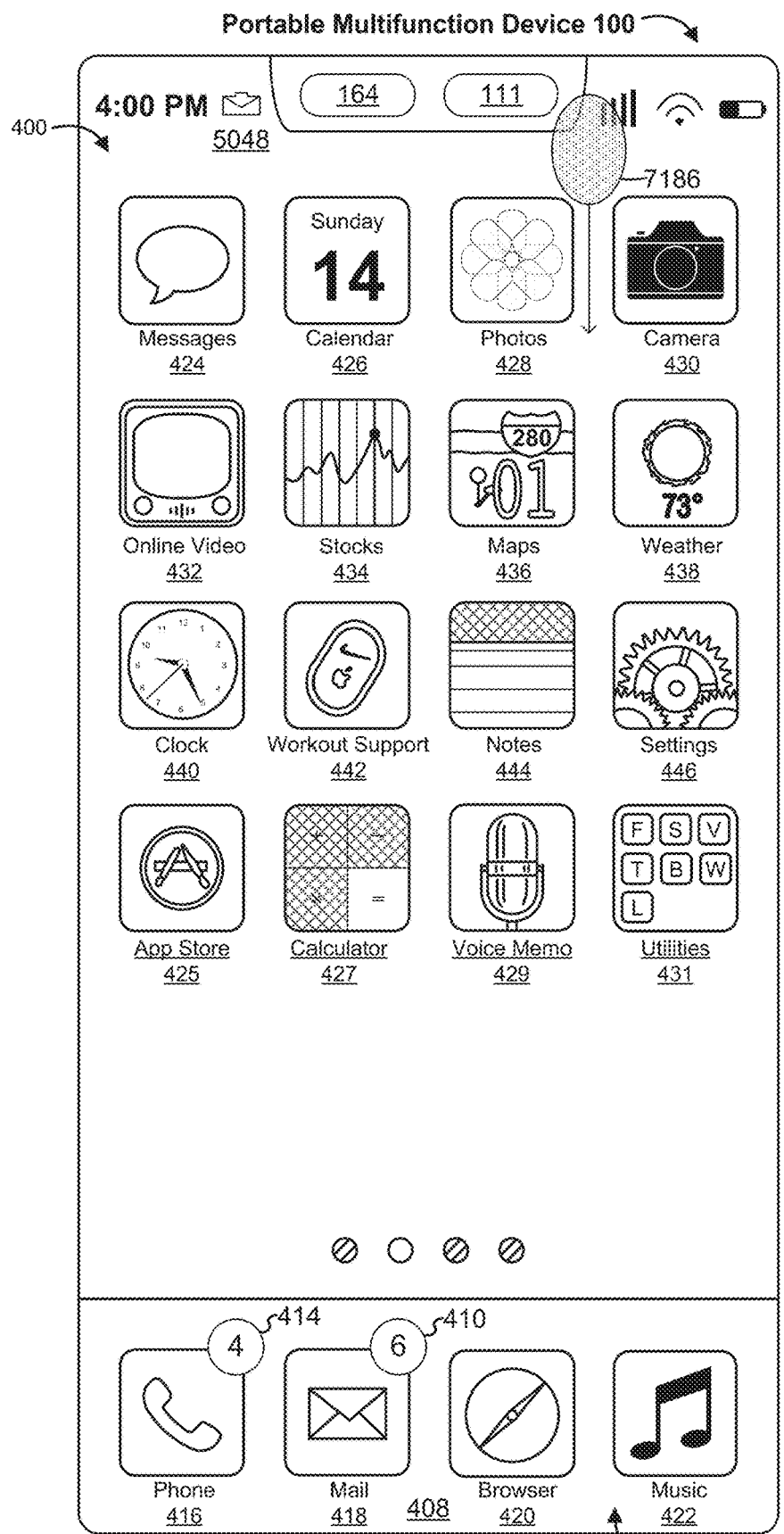
Figure 7P:
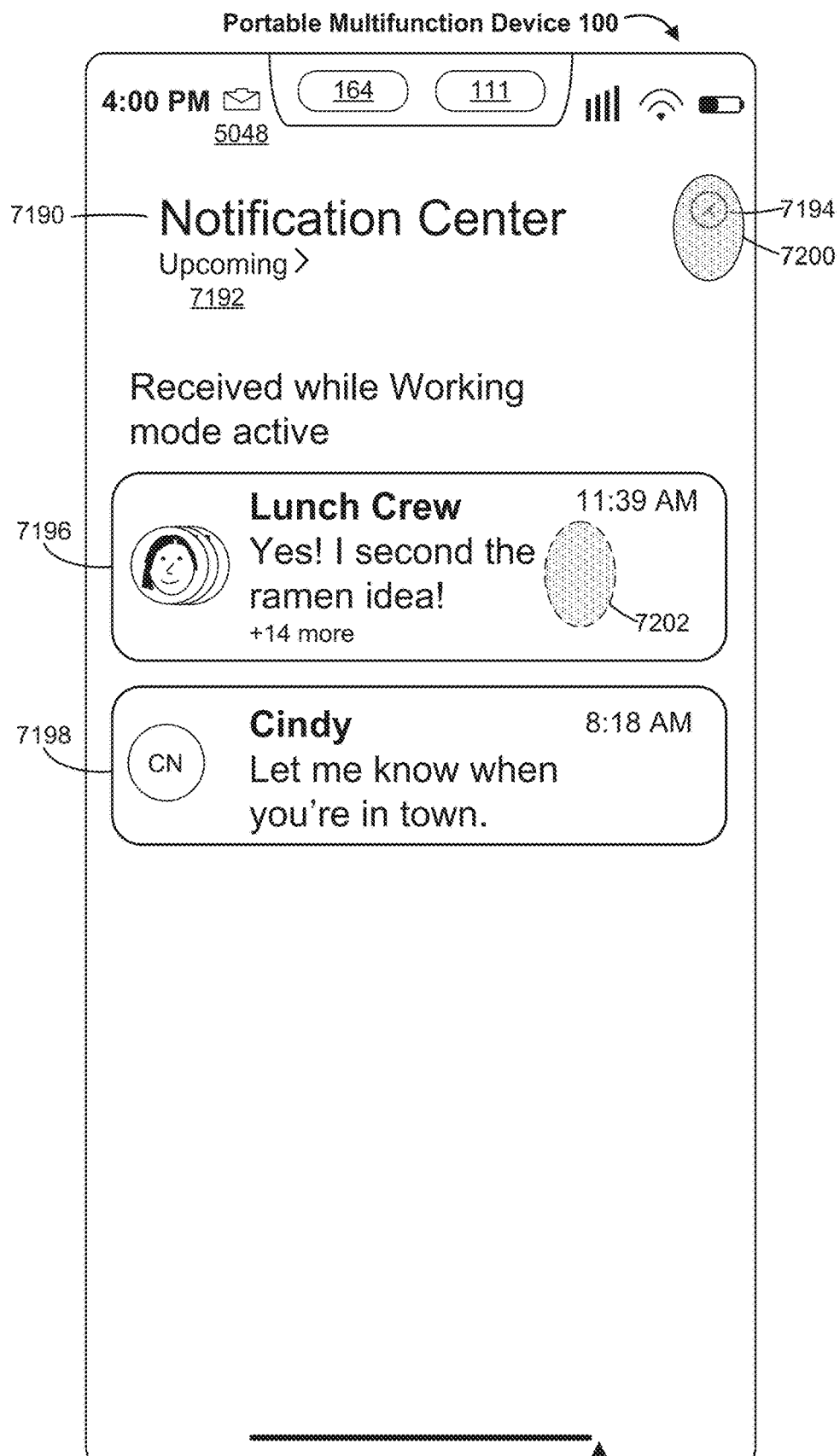

FIG. 7P illustrates an example of a notification user interface (e.g., a notification center user interface 7190) while an activity mode is active (e.g., in response to a swipe down by a user input 7186 on an application launch user interface, as shown in FIG. 7O). The notification center user interface 7190 optionally includes an "Upcoming" affordance 7192 (discussed in greater detail below, with reference to FIGS. 7AB through 7AC-2), and optionally includes an exit affordance (e.g., "X" affordance) 7194 (e.g., for ceasing display of the notification center user interface). The notification center user interface includes notifications (e.g., a notification 7196 and a notification 7198) associated with events (e.g., device events) that have already occurred (e.g., after the "Working" activity mode was activated), but for which notifications have not yet been provided by the portable multifunction device 100 (e.g., because the "Working" activity mode is active, as indicated by the indicator 5048).

Figure 7Q:
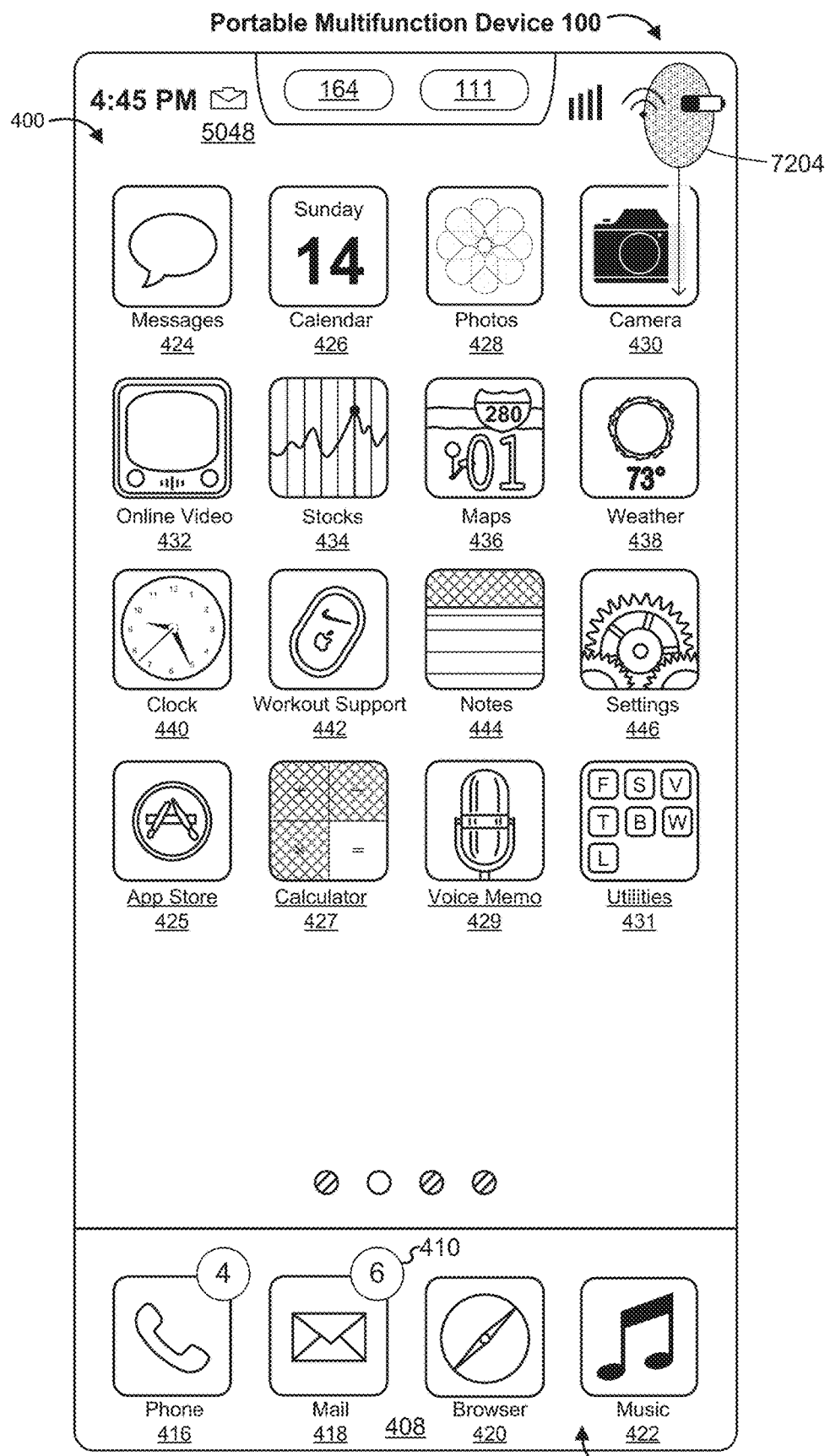
Figure 7R:
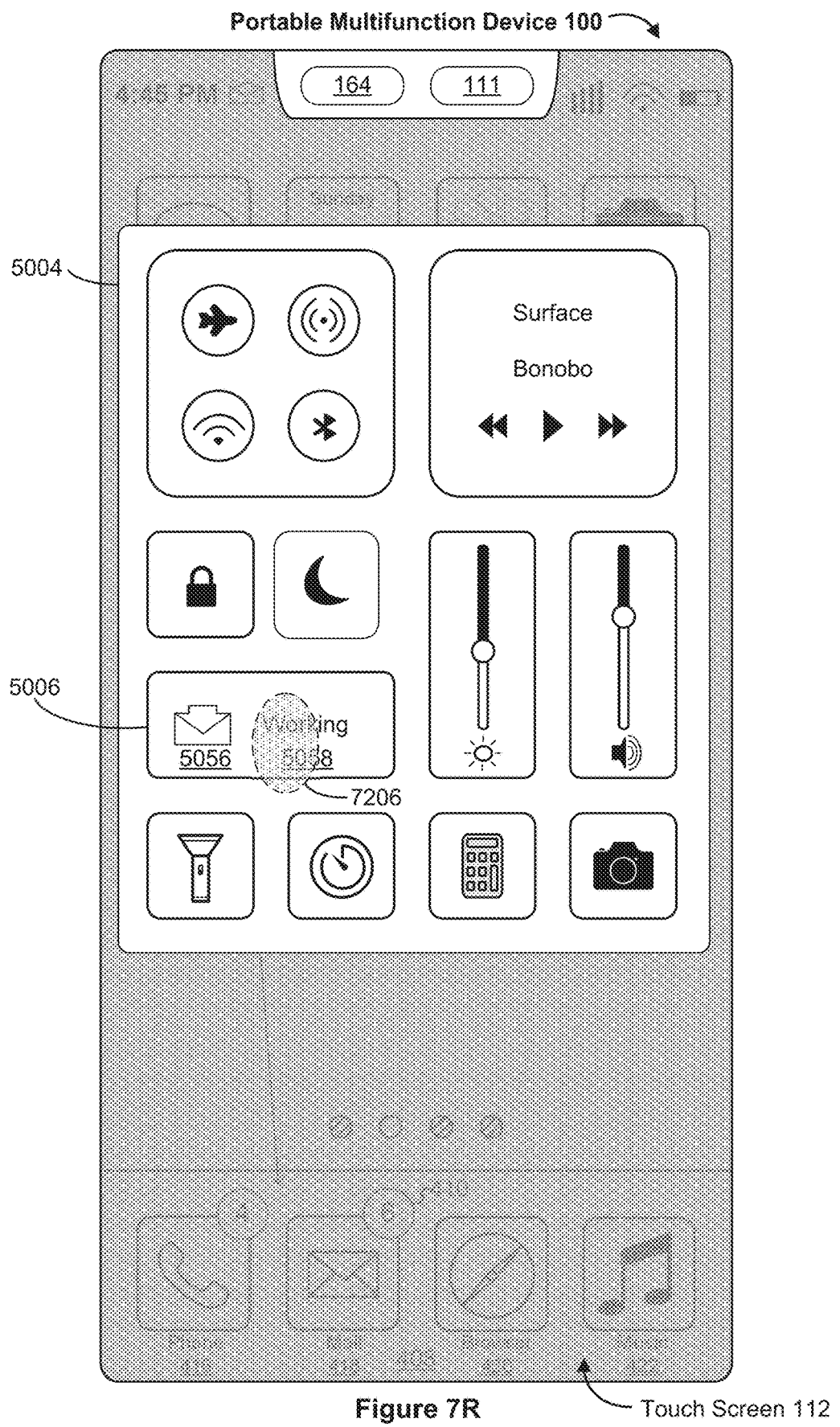
Figure 7S:
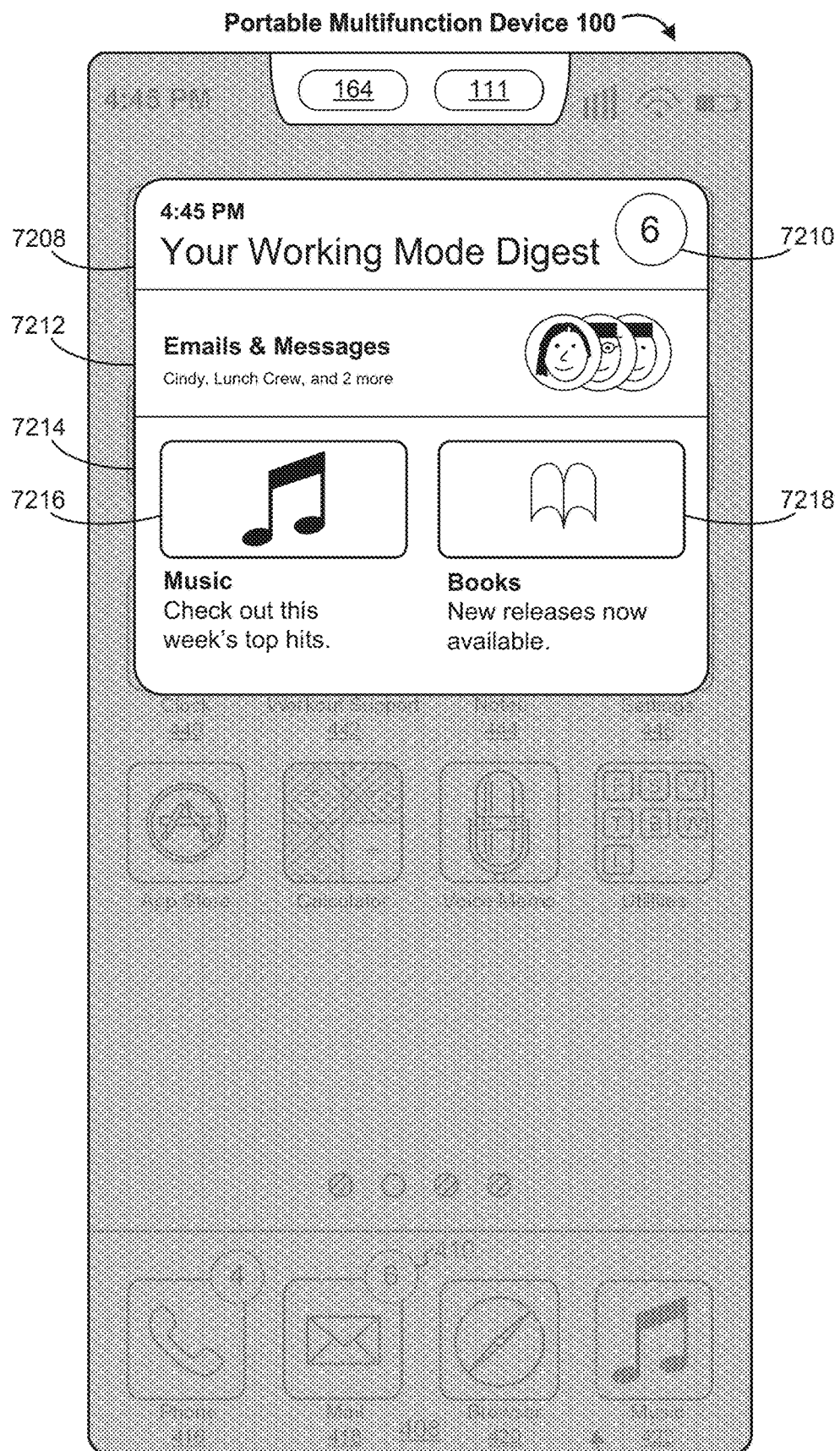

In response to detecting a user input (e.g., a user input 7200 on the "X" affordance 7194 in FIG. 7P, or other user input or gesture for dismissing the notification user interface), and as shown in FIG. 7Q, the portable multifunction device 100 displays an application launch user interface. In response to detecting a user input (e.g., a swipe down by user input 7204, in the upper-right corner the application launch user interface in FIG. 7Q), and as shown in FIG. 7R, the portable multifunction device 100 displays the control center user interface 5004 (e.g., the same control center user interface 5004 shown in FIG. 5C). In response to detecting a user input (e.g., a user input on the affordance 5006 in FIG. 7R), the portable multifunction device 100 deactivates the current activity mode (e.g., the "Working" activity mode in this example), and furthermore, as shown in FIG. 7S, the portable multifunction device 100 automatically, upon deactivation of the activity mode, provides a digest 7208 (e.g., a bundled notification) that includes indications of notifications that were not provided while that activity mode was active (e.g., indications of notifications that were deferred because the "Working" activity mode was active). In the example shown in FIG. 7S, the digest 7208 is displayed over a home screen (e.g., a respective page of a multi-page application launch user interface, described above with respect to FIGS. 4A, 5A and 5B), but in other examples is displayed over whichever user interface happens to be active at the time the current activity mode is deactivated, whether due to a user input or due to a trigger condition being satisfied. In some embodiments, the digest 7208 includes a count 7210 of indications of notifications in the digest 7208, and a plurality of different sections for displaying indications of different types or sets of notifications, such as an "Emails & Messages" section 7212 (e.g., displaying one or more indications associated with notifications classified as emails or messages), and a section 7214 that includes a "Music" indication 7216 and a "Books" indication 7218. In some embodiments, the digest 7208 is visually distinguished from (e.g., displayed on top of) a previously displayed user interface (e.g., the application launch user interface). In some embodiments, a previously displayed user interface is dimmed or blurred (e.g., to improve clarity of the digest 7208, and/or to draw attention to the digest 7208).

Figure 7T:
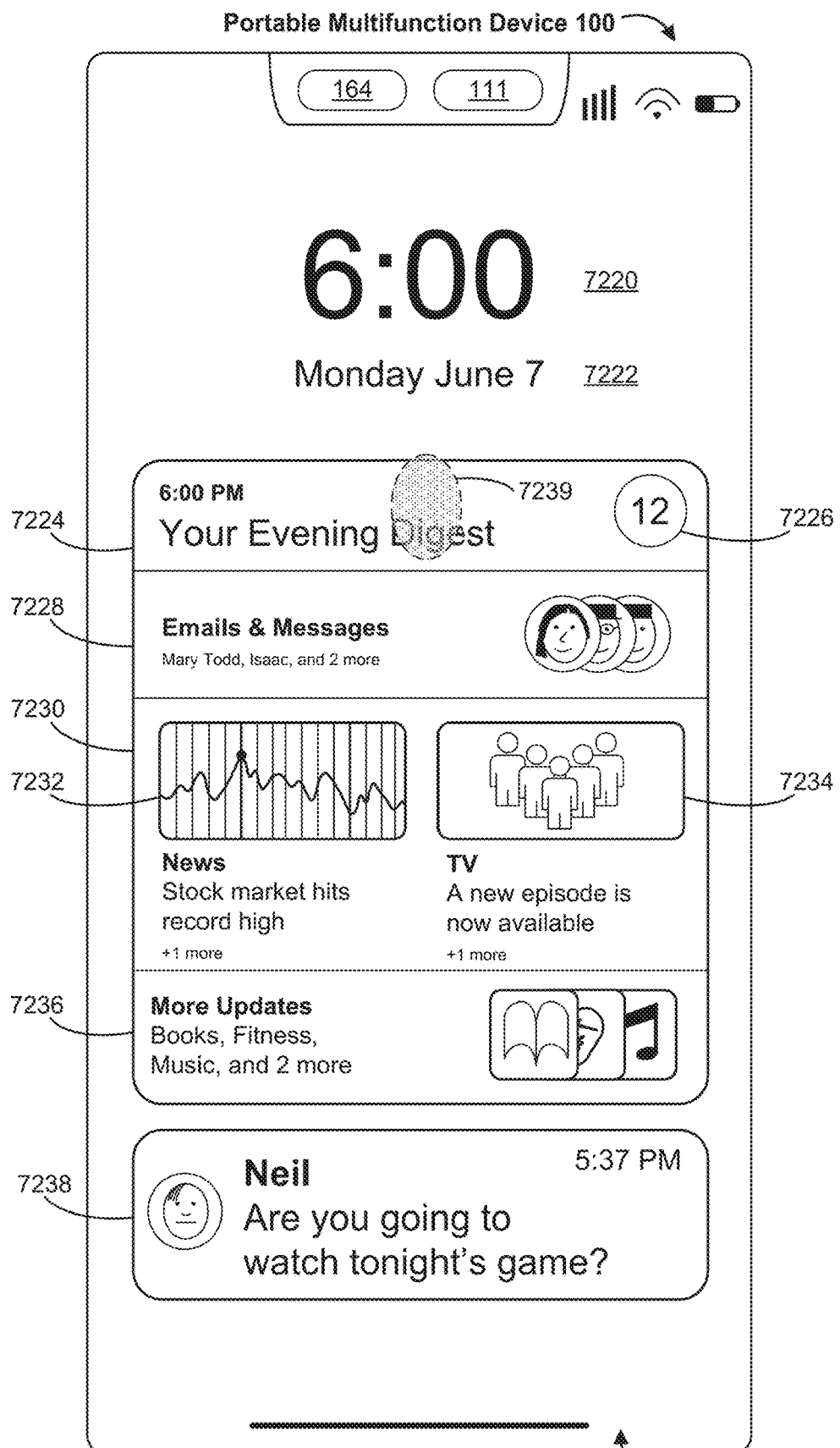

FIG. 7T illustrates an example of a digest (e.g., an "Evening" digest) displayed on a lock screen user interface, sometimes called a wake screen user interface. The lock screen user interface displays the digest 7224, and a notification 7238 (e.g., notification 7238, corresponding to a message from "Neil," is displayed because the user Neil is not a user for which notifications are bundled). In some embodiments, the digest 7224 includes a count of indications (of notifications) included in the digest, and multiple portions for displaying indications of different sets of notifications, such as one or more (or two or more) of: an "Emails & Messages" portion 7228 that includes indications of communication notifications (e.g., notifications for a messaging application, notifications for an e-mail application, etc.), a portion 7230 that provides indications for a news application and a TV application (e.g., for notifications that the portable multifunction device 100 determines are more likely to be relevant to a user (e.g., based on a history of user interaction with different types of applications)), and a "More Updates" portion that includes indications for other applications (e.g., for notifications that the portable multifunction device 100 determines are less relevant to the user (e.g., as compared to the indications for notifications in the portion 7230). In some embodiments, the indications in the portion 7230 are displayed with a greater prominence (e.g., with more detail, with more content, etc.) as compared to indications in the "More Updates" portion 7236.

Figure 7U:
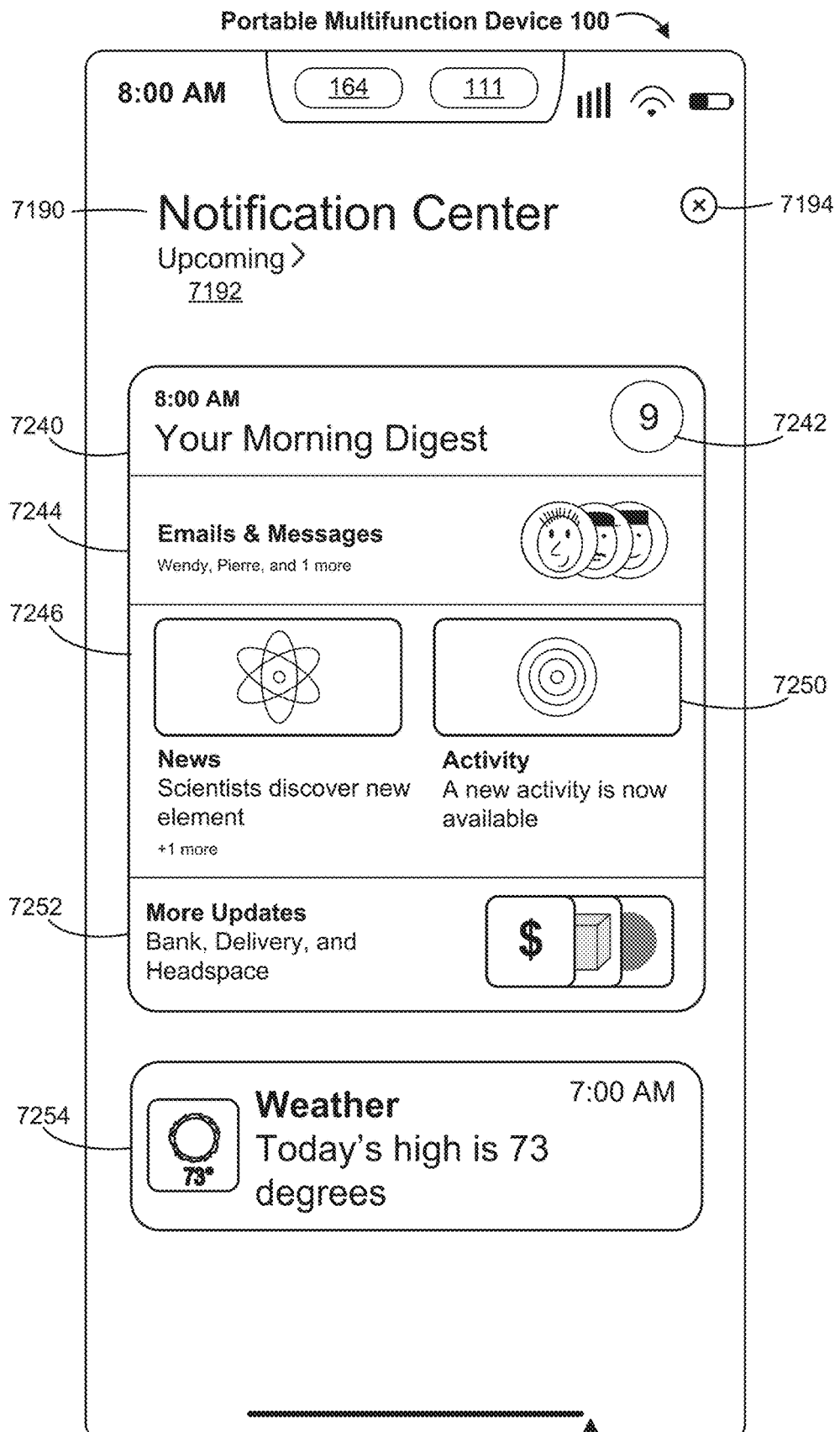

FIG. 7U illustrates an example of a digest (e.g., a "Morning" digest) displayed in a notification user interface, sometimes herein called a notification center user interface. The notification center user interface includes a digest 7240 (analogous to the digest 7224, but for a different set of bundled notifications), and a notification 7254 (e.g., a notification for a weather application that is not an application for which notifications are bundled). In some embodiments, the digest 7240 is initially displayed over another user interface (e.g., a lock screen, at the appropriate delivery time), but can also be accessed from (e.g., displayed in) the notification center user interface (e.g., if the user dismisses the digest 7240 from the lock screen, but wants to view the digest again at a later time).

Figure 7V:
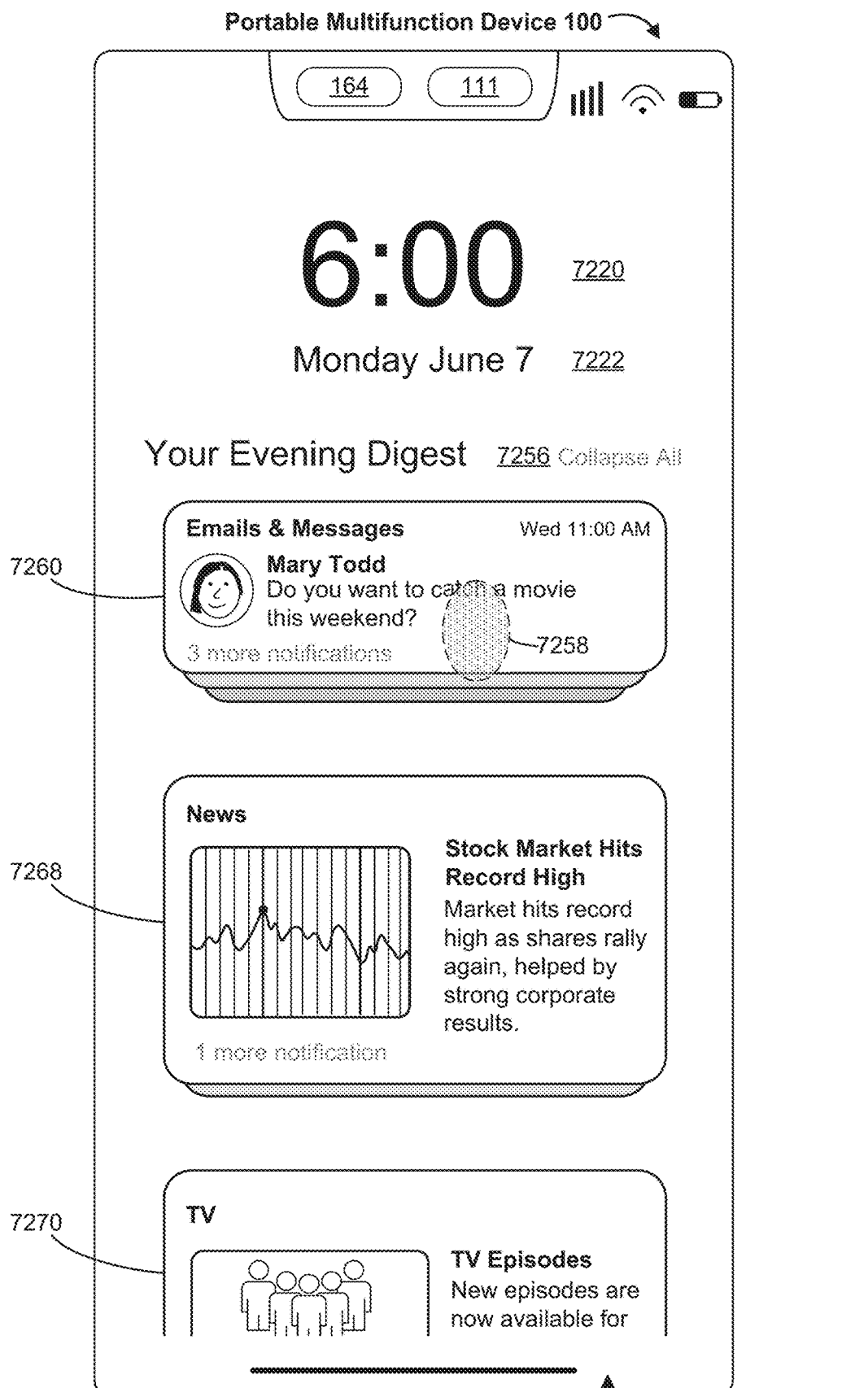

FIGS. 7V-7Z illustrate examples of user interfaces for expanding portions of a digest. In some embodiments, in response to a user input (e.g., a user input 7239 on the digest 7224 in FIG. 7T), and as shown in FIG. 7V, the portable multifunction device displays an expanded view of the digest 7224. The expanded view of the digest 7224 optionally includes a "Collapse All" affordance 7256 (e.g., for collapsing the expanded view of the digest 7224 (e.g., to the version of the digest 7224 shown in FIG. 7T), or for dismissing the digest 7224), a notification 7260 (e.g., a messaging notification), and a plurality of indications of notification, such as an indication of notification 7268 (e.g., for a news application), and an indication of notification 7270 (e.g., for a TV application). The indication of notification 7260 includes a visual indication that additional communication notifications (or indications of such notifications), in addition to the one initially displayed in the expanded view of the digest, are included in the digest 7224 (e.g., a textual indication, such as "3 more notifications" and/or a graphical indications, such as notification bubbles that appear to be stacked beneath the notification 7260 (e.g., representing a "stacked deck"). Similarly, the notification 7268 includes a visual indication that an additional news notification, in addition to the one initially displayed in the expanded view of the digest, is included in the digest 7224 (e.g., a textual indication, such as "1 more notification," and/or a graphical indication, such as a notification bubble that appears stacked beneath the notification 7260 (e.g., representing a "stacked deck"). In some embodiments, the "stacked deck" provides an indication of the number of notifications (e.g., a single bubble is stacked beneath the notification 7268, indicating one additional notification). In some embodiments, the "stacked deck" includes no more than a predefined maximum number of stacked items (e.g., a maximum of two bubbles appear stacked beneath the notification 7260, even though three or more additional notifications are included (e.g., to avoid cluttering the user interface)).

Figure 7W:
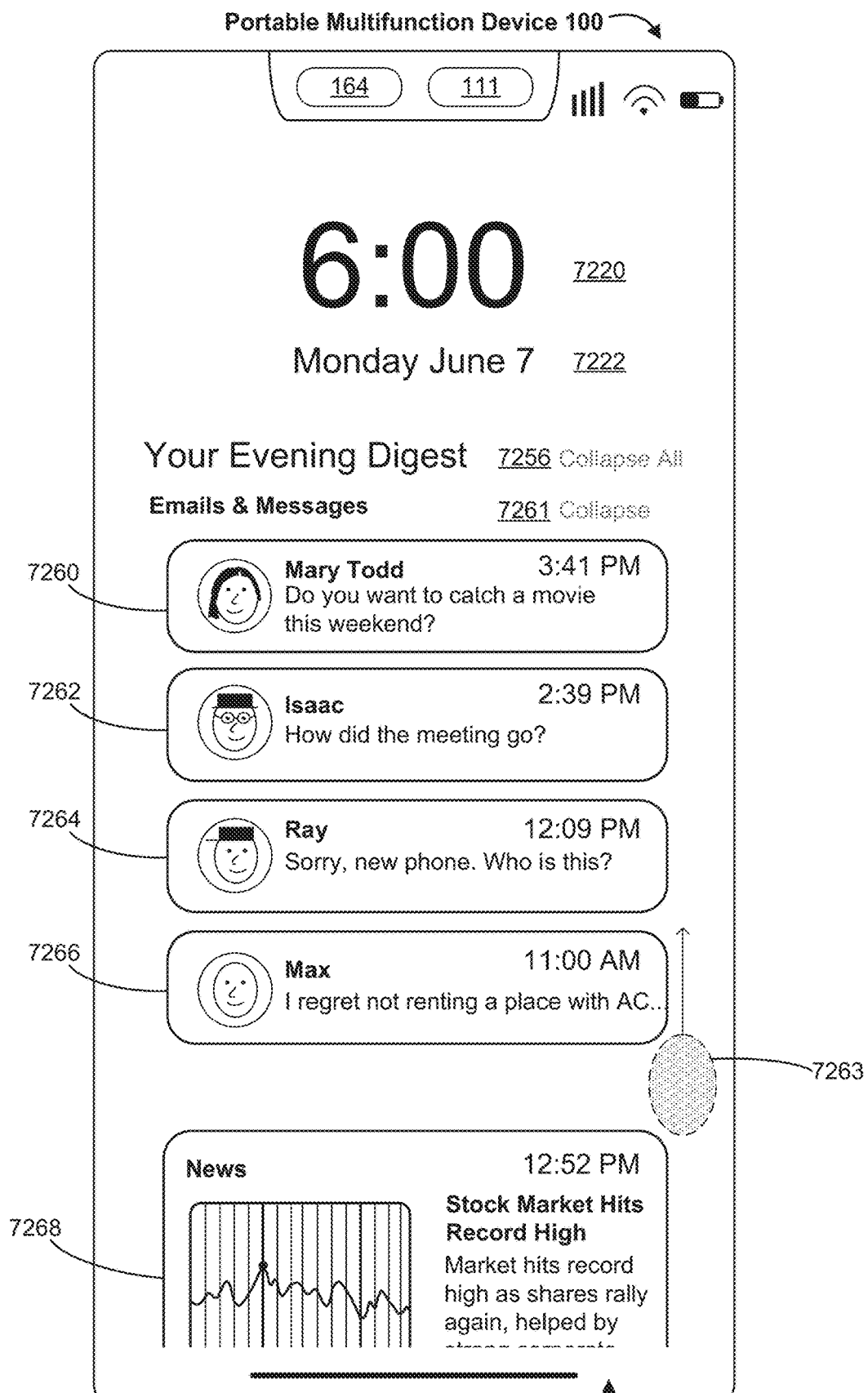

In response to detecting a user input (e.g., a user input 7258) on an indication of a set of notifications (e.g., a notification in a "stacked deck"), and as shown in FIG. 7W, the portable multifunction device 100 expands the "Emails & Messages" portion of the digest to display all the notifications (e.g., notifications 7260, 7262, 7264 and 7266) in the "Emails & Messages" portion of the digest. As shown in FIG. 7W, the notification 7260 is displayed along with each of the three additional notifications of the "Emails & Messages" portion, and furthermore, the notifications in this portion of the digest are shown in chronological order (e.g., with notifications of the most recent events shown above notifications for less recent events). As the "Emails & Messages" portion has been expanded, a "Collapse" affordance 7261 (e.g., for collapsing the "Emails & Messages" portion (e.g., returning to the view shown in FIG. 7V)) is optionally displayed.

Figures 1, 7X:
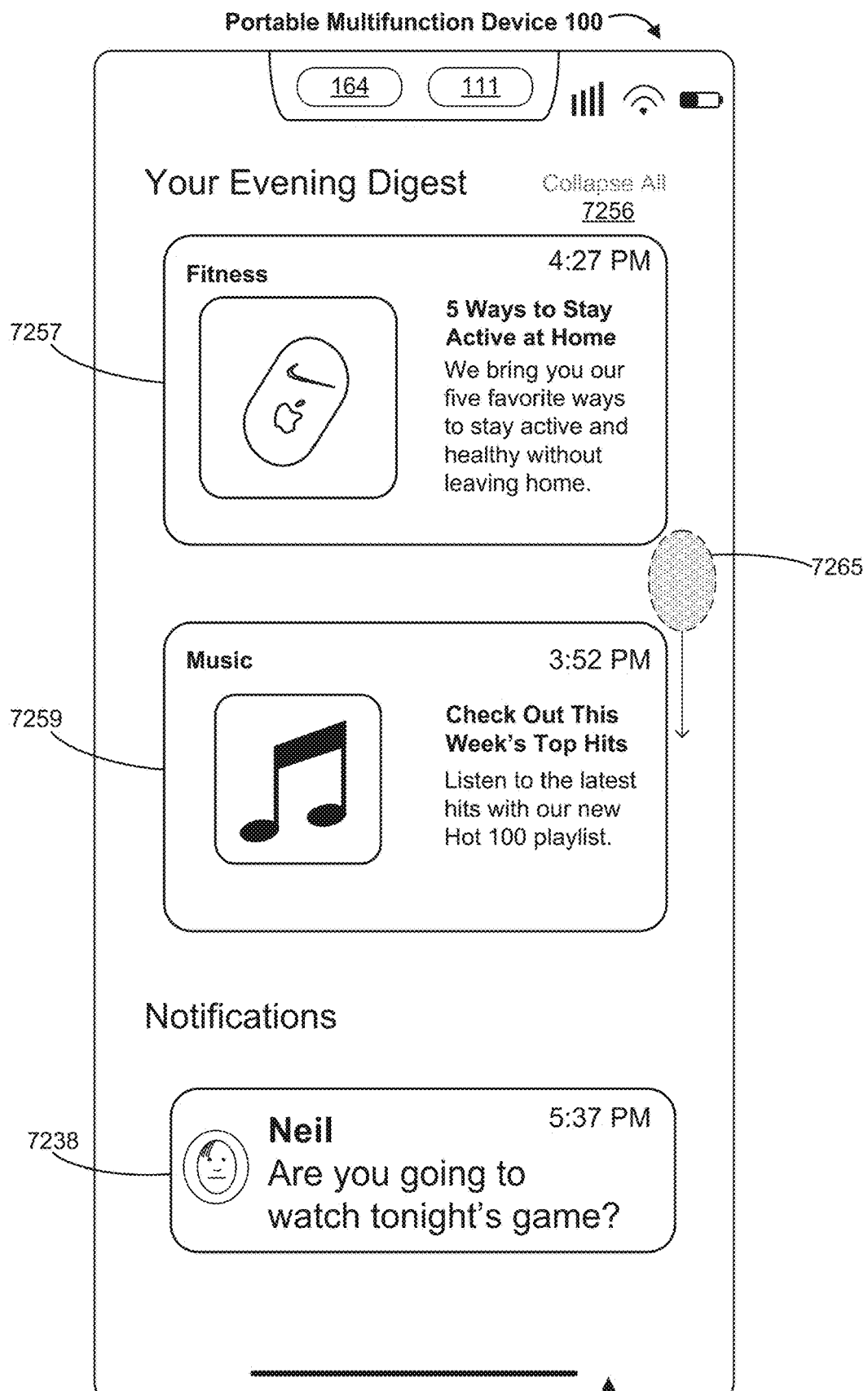
Figures 2, 7X:
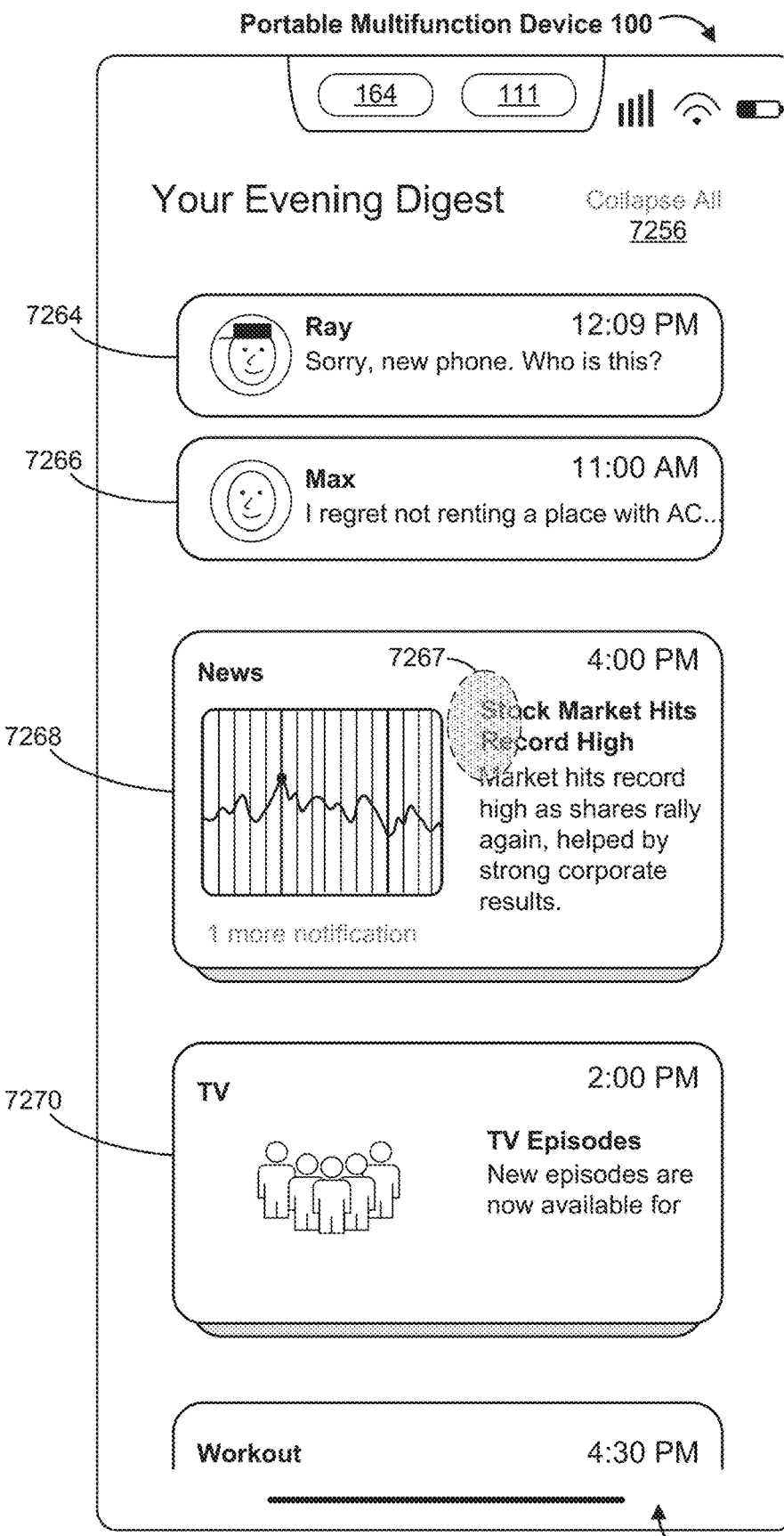

In response to detecting a user input (e.g., a swipe up by a user input 7263), and as shown in FIG. 7X-1, the portable multifunction device 100 scrolls the content in the digest 7224, allowing the user to navigate through the portions of the digest 7224. FIG. 7X-1 shows that the user has scrolled through most of the notifications in the "Evening" digest (e.g., a notification 7259 for a "Music" application is the last notification in the digest, and additional notifications such as the notification 7238, which are not included in the digest, are shown in a separate section below the notifications for the digest).

In response to detecting a user input (e.g., a swipe down by a user input 7265), and as shown in FIG. 7X-2, the portable multifunction device 100 scrolls the content in the digest 7224 (e.g., such that a notification not displayed immediately prior to detecting the user input, such as the notification 7268 for the "News" application, is shown in response to detecting the user input).

Figure 7Y:
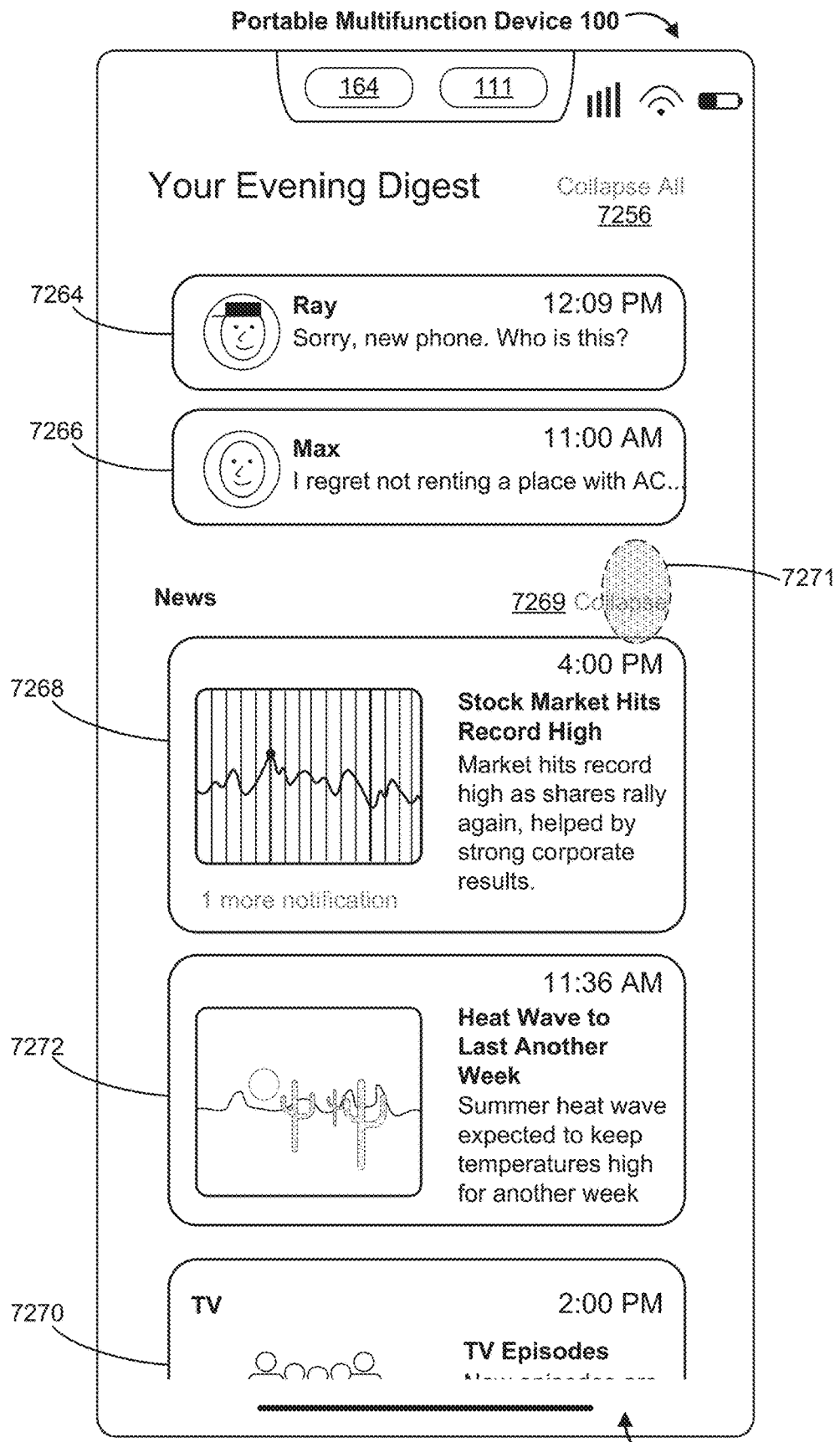

In response to detecting a user input (e.g., a user input 7267) on a different "stacked deck" of notifications (e.g., a "stacked deck" including the notification 7268) in the digest, and as shown in FIG. 7Y, the portable multifunction device 100 expands another portion (e.g., the "News" portion) of the digest 7224 to display the notifications in that portion (e.g., the "News" portion) of the digest (e.g., notification 7268 and notification 7272 are displayed). In response to detecting a user input (e.g., a user input 7271 on a "Collapse" affordance 7269), and as shown in FIG. 7Z, the portable multifunction device 100 collapses the expanded portion (e.g., the "News" portion) of the digest 7224 (e.g., without collapsing another expanded portion, such as the "Emails & Messages" portion, of the digest 7224).

Figure 7Z:
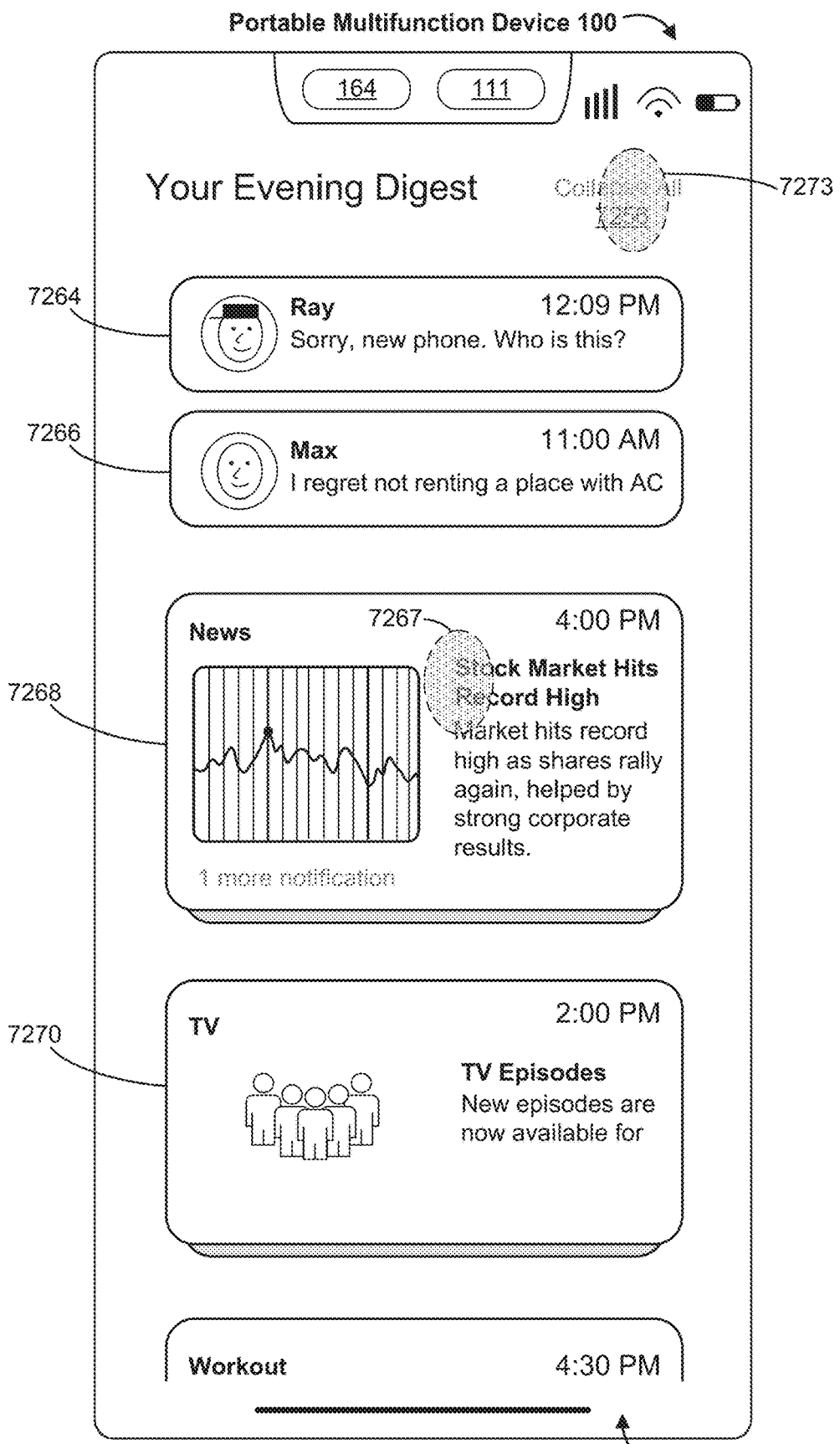
Figure 7A:
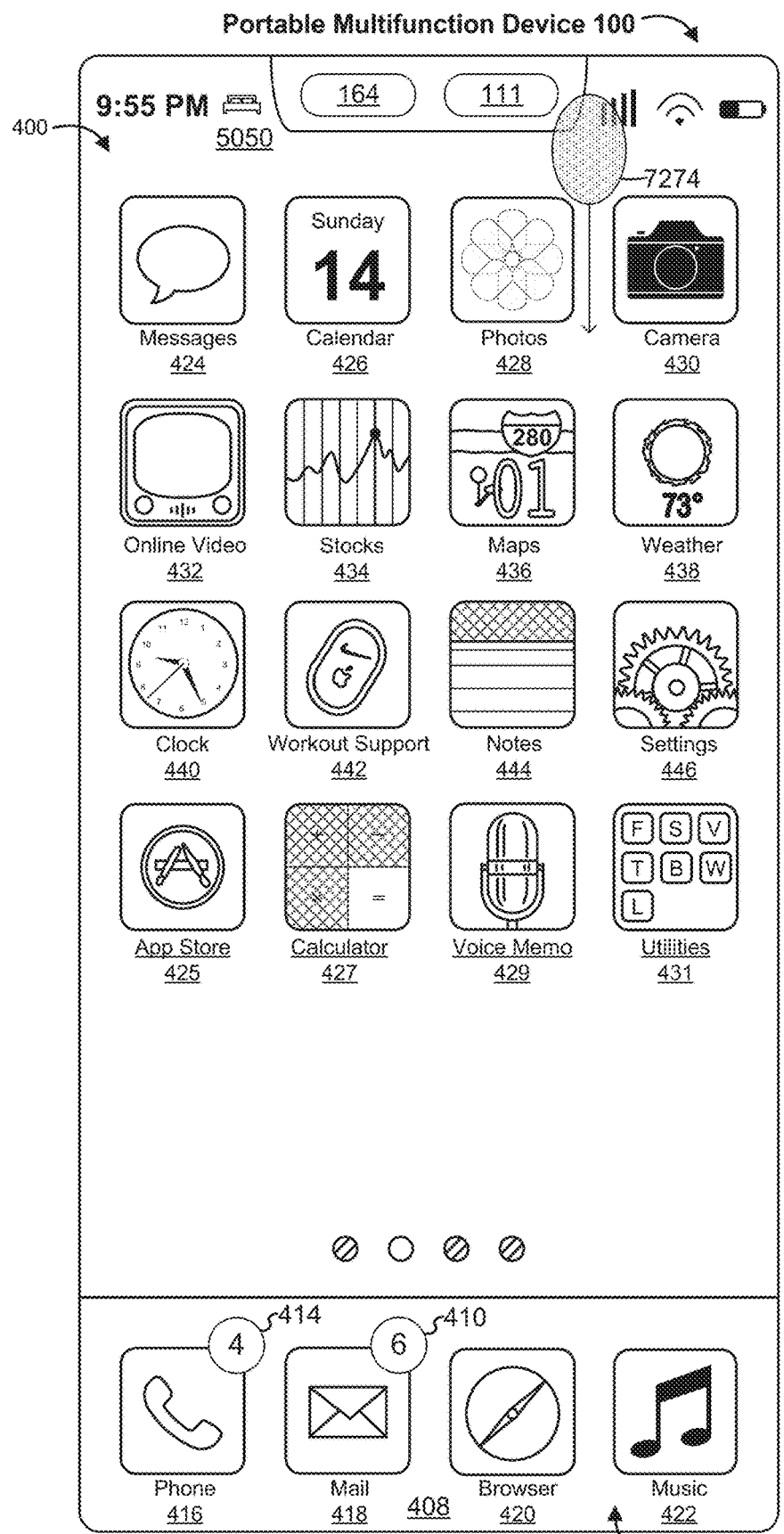
Figure 7A:
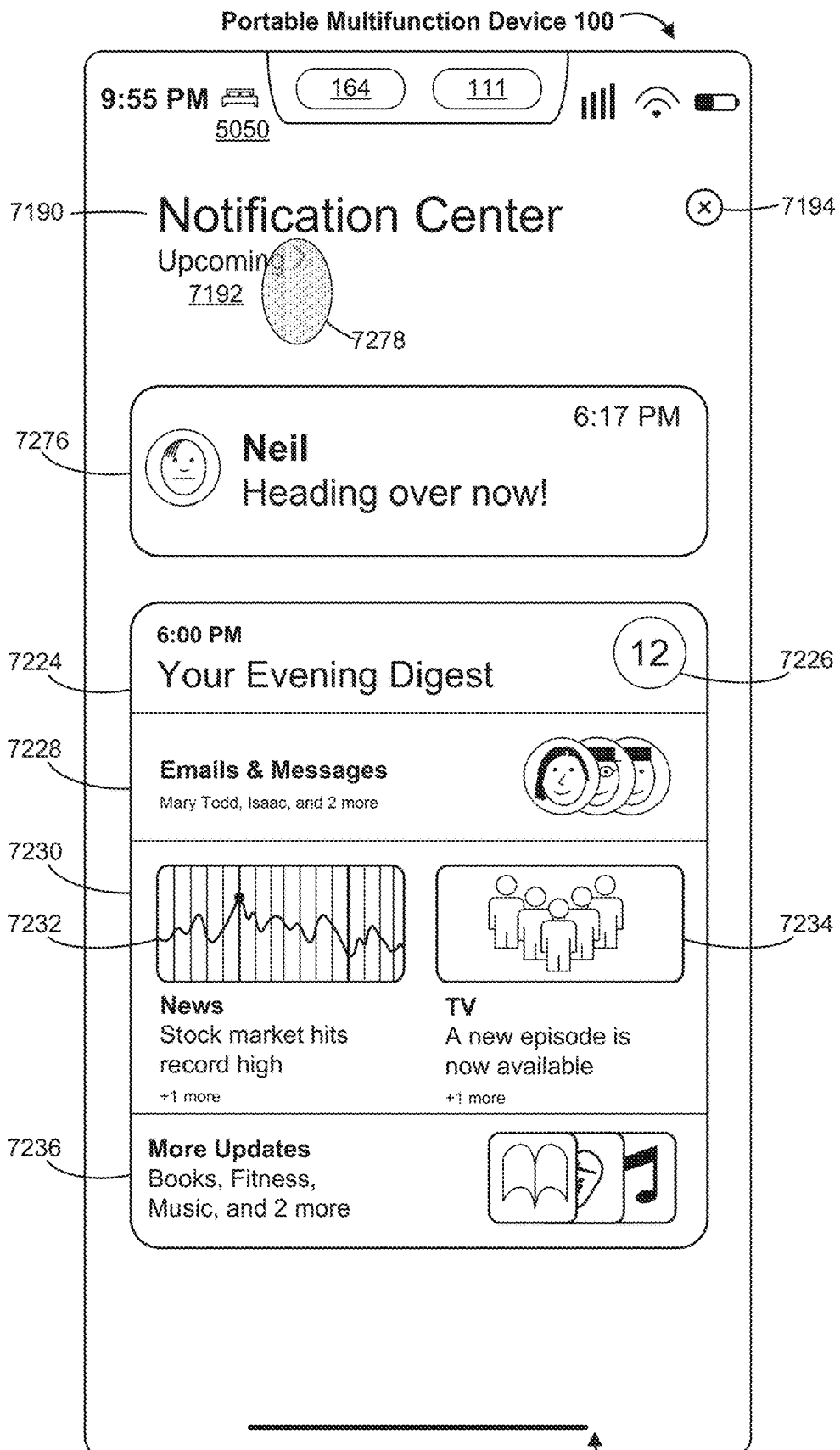
Figure 7A:
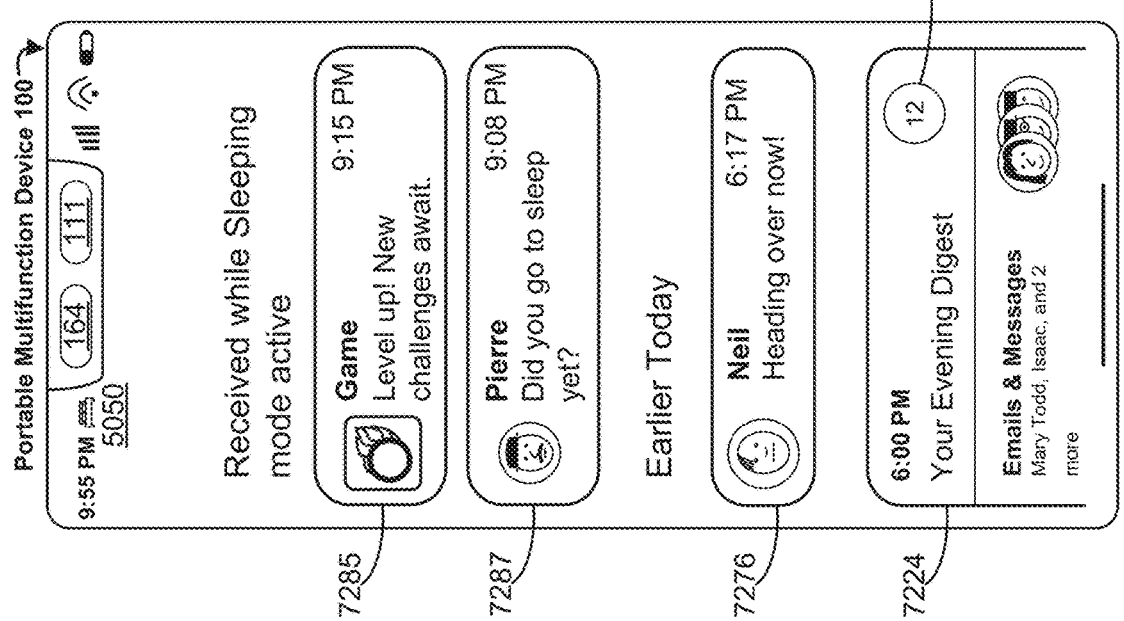
Figure 7A:
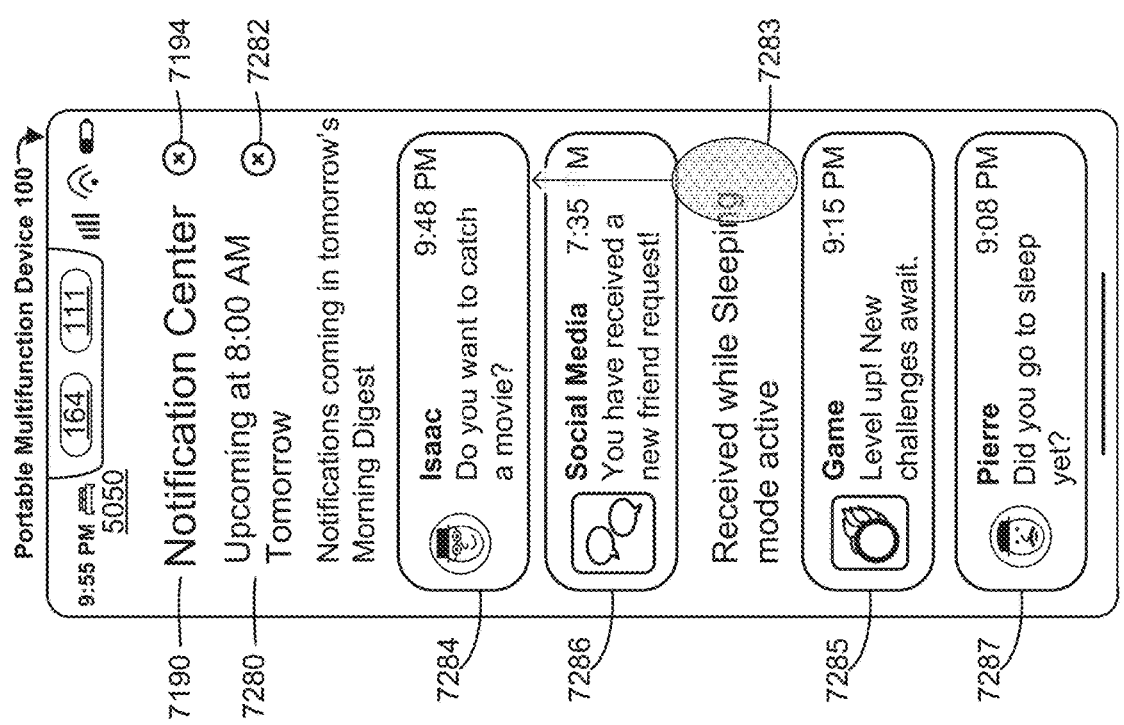
Figure 7A:
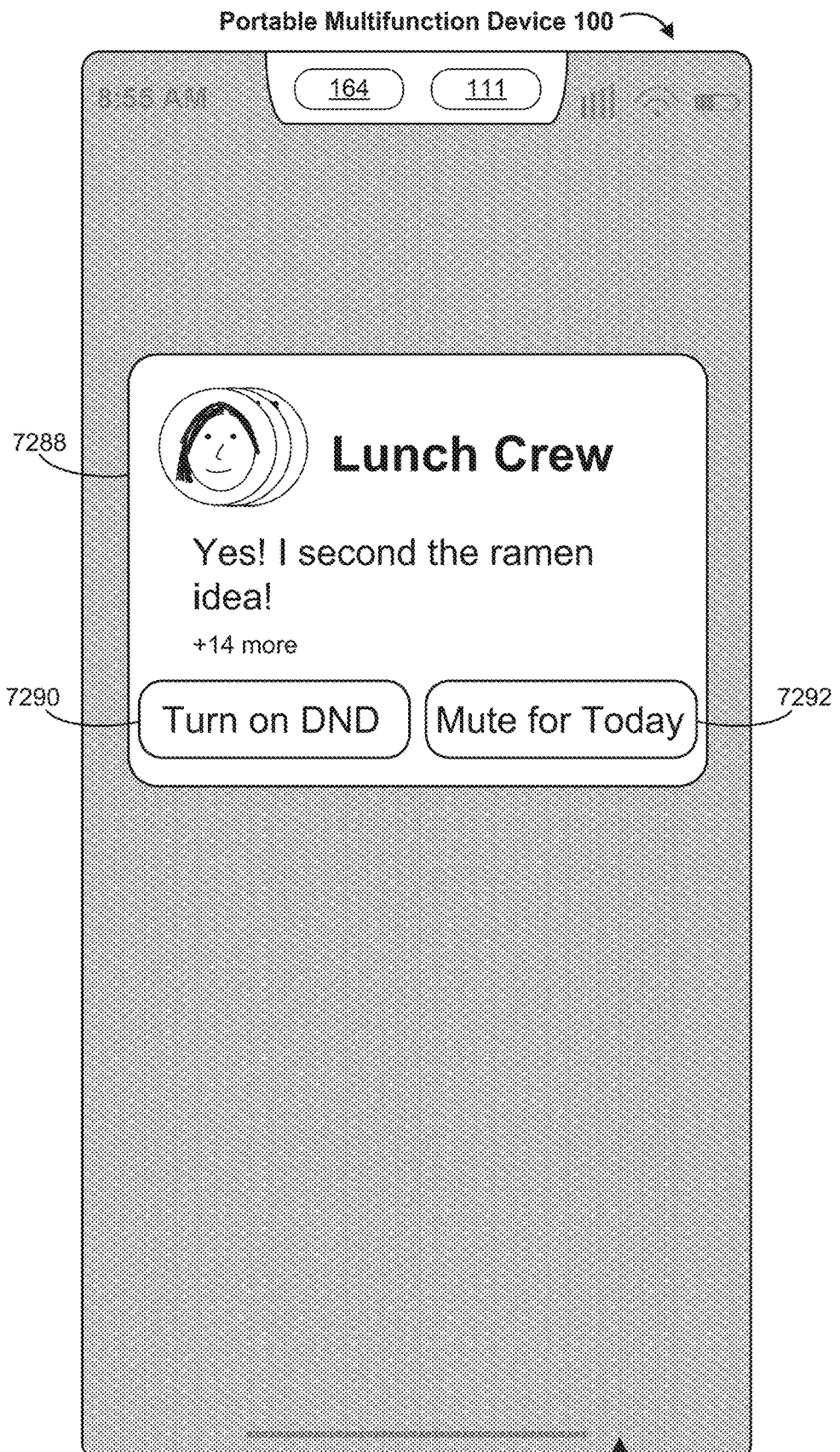
Figure 7A:
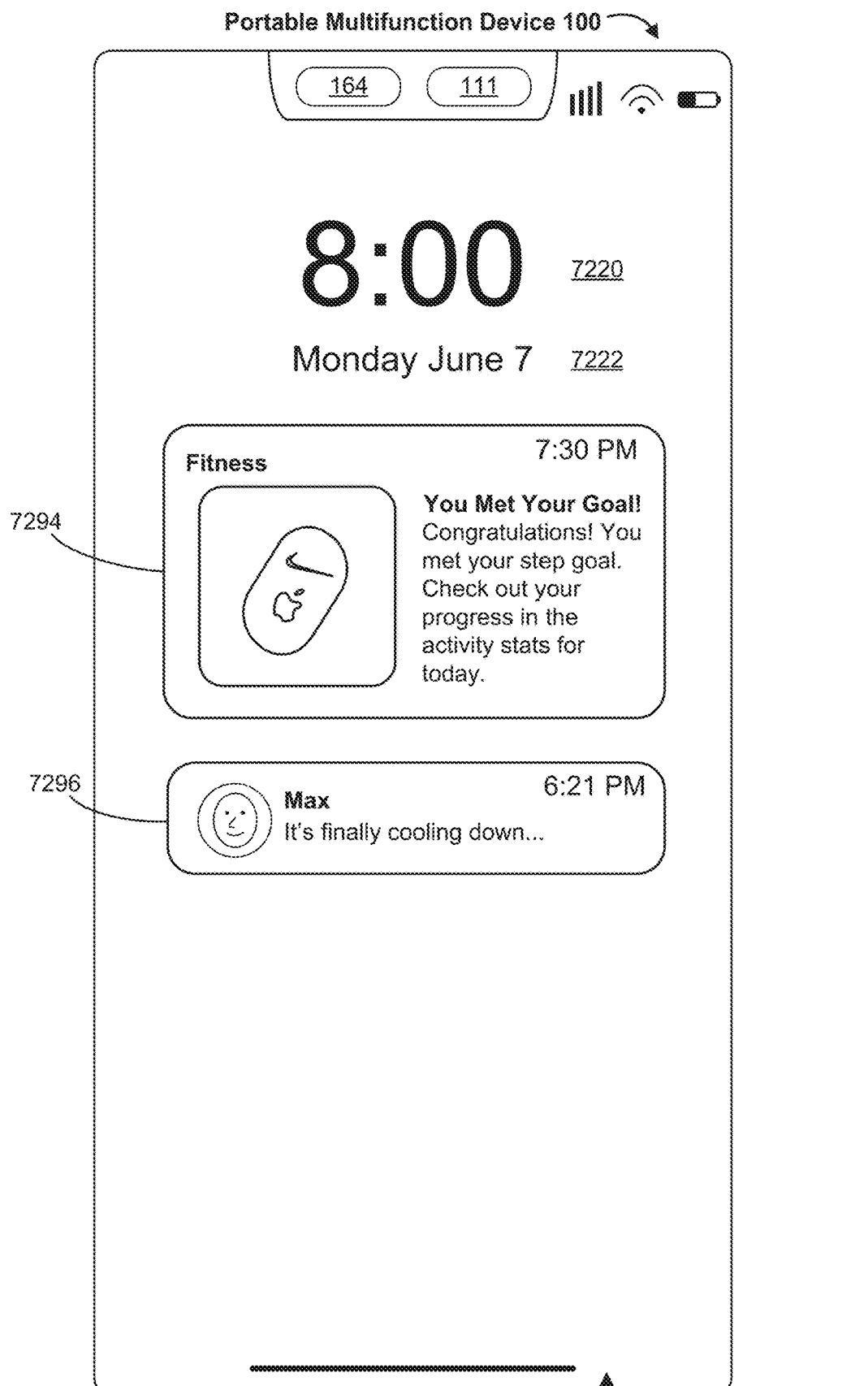

In some embodiments, in response to detecting a user input (e.g., a user input 7273 on the "Collapse All" affordance 7256, shown in FIG. 7Z), the portable multifunction device 100 collapses all expanded portions of the digest 7224, for example, causing the portable multifunction device 100 to return to displaying a compact representation of the digest, similar to the compact representation shown in FIG. 7T. In some embodiments, a first activation the "Collapse All" affordance collapses all expanded portions of the digest 7224, while maintaining display of the digest 7224, and a second activation of the "Collapse All" affordance (e.g., once all portions of the digest 7224 are collapsed) ceases display of the digest 7224.

FIGS. 7AA through 7AC-2 illustrate exemplary user interfaces for previewing upcoming notifications (e.g., notifications corresponding to events (e.g., device events) that have already occurred, but for which notifications have not yet been provided (e.g., due to notification bundling)). FIG. 7AA shows an application launch user interface (e.g., a respective page of a multipage application launch user interface). In response to detecting a user input (e.g., a downward swipe by a user input 7274), and as shown in FIG. 7AB, the portable multifunction device 100 displays a notification user interface, such as notification center user interface 7190. In response to a user input (e.g., a user input 7278 on the "Upcoming" affordance 7192), and as shown in FIG. 7AC-1, the portable multifunction device 100 displays an upcoming notifications portion 7280 of the notifications user interface (e.g., in the notification center user interface 7190). In some embodiments, the upcoming notifications portion 7280 is displayed above or below other portions (e.g., at the bottom of) the notification center user interface 7190. In some embodiments, the user can navigate to the upcoming notifications portion 7280 by scrolling in the notification center user interface 7190 (e.g., instead of, or as an alternative to, activating the "Upcoming" affordance 7192). In some embodiments, the upcoming notifications portion 7280 is displayed above other notifications (e.g., above notifications that normally appear in the notification center, are not bundled, and were not suppressed in accordance with an active activity mode). In some embodiments, the upcoming notifications portion 7280 can be scrolled (e.g., in response to a swipe up by a user input 7283 in FIG. 7AC-1). In some embodiments, as shown in FIG. 7AC-2, other notifications normally displayed within the notification center (e.g., notification 7276 and notification digest 7224) are displayed below the upcoming notifications portion 7280.

In the example shown in FIG. 7AC-1, the upcoming notifications portion 7280 of the notifications user interface includes a plurality of notifications, including a notification 7284, for an event received or detected at 9:48 PM, and a notification 7286, for an event received or detected at 7:35 PM. Although the notification 7284 and the notification 7286 correspond to an events (e.g., device event) that have already occurred (e.g., receipt of a message from Isaac at 9:48 PM, and receiving a new friend request in a social media application at 7:35 PM), the notification 7284 and the notification 7286 were not provided at the times the corresponding events were detected (e.g., because Isaac is a user for whom notifications are bundled, and because the social media application is an application for which notifications are bundled in accordance with notification settings (e.g., notification digest settings) for the computer system (e.g., as configured in FIGS. 7F-7G)). It is note that the settings for bundling notifications are separate from the settings for specific activity modes, such as the "Sleeping" activity mode. In some embodiments, both notifications whose delivery is deferred in accordance with bundling settings and notifications whose delivery is deferred in accordance with activity mode settings can be previewed, e.g., prior to scheduled delivery times for those deferred notifications, by user selection of a respective affordance (e.g., the "Upcoming" affordance 7192, shown in FIG. 7AB). In some embodiments, the upcoming notifications are collapsed (e.g., a single user interface item is displayed for notifications in a morning digest and a single user interface item is displayed for notifications in a digest of notifications that were suppressed while an activity mode was active). In some embodiments, collapsed representations of upcoming notifications can be selected to display additional information about separate notifications in the digests. In some embodiments, a digest of notifications that were suppressed while an activity mode was active does not include notifications that were delivered during the activity mode (e.g., notifications that were delivered as "high priority" notifications or delivered because they were associated with (or from) applications which are on a list of permitted applications during the activity mode or are associated with (or from) users who are on a list of permitted users during the activity mode).

In this example, although the "Sleeping" activity mode is active (e.g., as shown by indication 5050), the notification 7284 and the notification 7286 are not suppressed due to the "Sleeping" activity mode being active (e.g., Isaac is a user for which notifications are provided while the "Sleeping" activity mode is active (e.g., as shown in FIG. 5AK), because the notification settings for the "Sleeping" activity mode allow the social media application to provide notifications while the "Sleeping" activity mode is active (e.g., as shown by the "S" application icon in Application option 5384, corresponding to the social media application, in FIG. 5AK)). However, since the events occurred after the delivery time (of 6:00 PM) for the "Evening" digest 7224, the notification 7284 will be provided in the next "Morning" digest (e.g., delivered at 8:00 AM the following day). In contrast, a notification 7285 is a notification for an application that is not configured to provide notifications while the "Sleeping" activity mode is active, but is not a notification for which notification bundling is configured (e.g., the notification 7285 will not be included in the next "Morning" digest to be delivered at 8:00 AM). Similarly, a notification 7287 is a notification for a user that is not configured to provide notifications while the "Sleeping" activity mode is active, but is not a notification for which notification bundling is configured (e.g., the notification 7287 will not be included in the next "Morning" digest to be delivered at 8:00 AM). The notification 7285 and the notification 7287 are displayed in a "Received while Sleeping mode active" portion, distinct from the upcoming notifications portion 7280, of the notification center user interface 7190.

The upcoming notification portion 7280 of the notifications user interface provides a way for the user to view notifications for events that have already occurred, but for which notifications have not yet been provided (e.g., in case the user has additional free time to view and interact with notifications now, rather than waiting for the next predetermined delivery time for a bundled notification). The upcoming notifications user interface optionally includes an exit affordance (e.g., the "X" affordance) 7282 (e.g., for ceasing display of the upcoming notifications portion (and in some embodiments, returning directly to the application launch user interface in FIG. 7AA)).

FIG. 7AD illustrates an example of a user interface for managing "chatty" conversation threads (e.g., events that generate a large number of notifications). In some embodiments, a notification 7288 is displayed in response to a user input (e.g., a user input 7202 on a notification 7195 for a respective conversation thread (e.g., the "Lunch Crew" thread in FIG. 7P). In some embodiments, the notification 7288 for the respective conversation thread includes an activity mode affordance (e.g., a "Turn on DND" affordance) 7290, e.g., for activating an activity mode that causes suppression of notifications, and optionally includes a second affordance (e.g., a "Mute for Today" affordance) 7292, e.g., for suppressing notifications associated with the respective conversation thread (the "Lunch Crew" thread) for a period of time (e.g., until the next day), without activating an activity mode (e.g., to avoid suppressing other notifications other than those associated with the respective conversation thread).

FIG. 7AE illustrates notifications provided, on an example of a lock screen or wake screen user interface, when no activity mode is active while the events corresponding to the notifications occur. In this example, no activity mode is active between 6:00 PM (e.g., after the scheduled delivery time for the digest 7224, in FIG. 7T) and 8:00 PM (the present time in FIG. 7AE). The portable multifunction device 100 receives a communication from a user Max at 6:21 PM, and an event for a fitness application occurs at 7:30 PM. The lock screen or wake screen user interface displays a notification 7294 (corresponding to the event for the fitness application that occurred at 7:30 PM) and a notification 7296 (for the communication from the user Max, received at 6:21 PM). The notification 7294 and the notification 7296 are displayed in chronological order (e.g., because the notification 7294 and the notification 7296 were not bundled).

FIGS. 8A-8J illustrate example user interfaces for configuring and managing time-sensitive notifications in accordance with some embodiments. The user interfaces in these figures are used to illustrate the processes described below, including the processes illustrated in FIGS. 12A-12B. For convenience of explanation, some of the embodiments will be discussed with reference to operations performed on a device with a touch-sensitive display system 112.

Figure 8A:
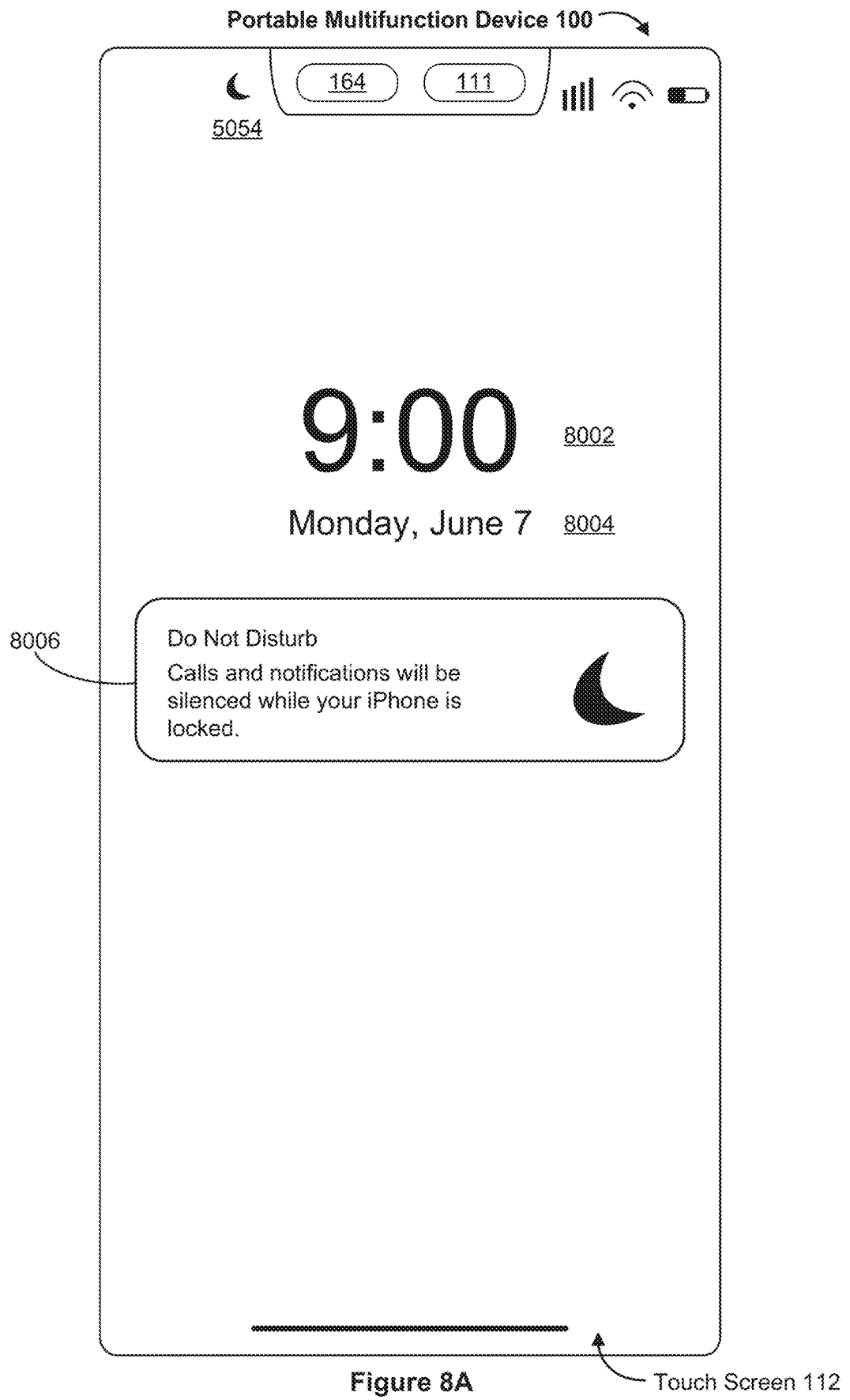
FIGS. 8A-8J illustrate example user interfaces for configuring and managing time-sensitive notifications, in accordance with some embodiments.

FIG. 8A illustrates an example of a lock screen user interface. The lock screen user interface includes a representation 8002 of the current time, a representation 8004 of the current date, and an indicator 8006 that a "Do Not Disturb" activity mode is active. The "Do Not Disturb" activity mode causes delivery of some notifications to be suppressed while the "Do Not Disturb" activity mode is active.

Figure 8B:
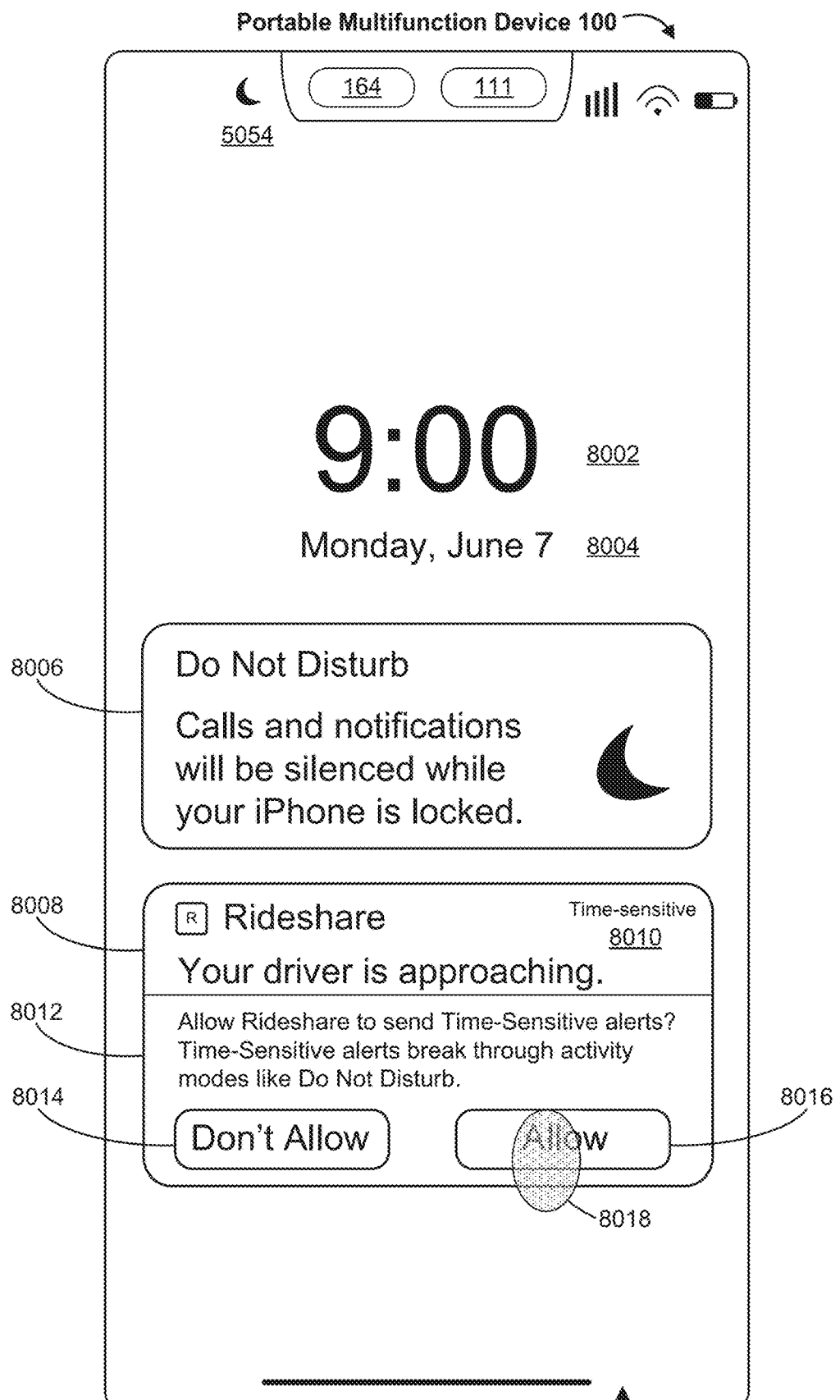

As shown in FIG. 8B, in response to detecting an event that meets predefined criteria, the portable multifunction device 100 provides a notification 8008 of the event (e.g., because the Rideshare event meets predefined criteria that indicate that the Rideshare event is time-sensitive). In some embodiments, the notification 8008 includes an indication that the notification meets the predefined criteria (e.g., the text "Time-sensitive" of an indicator 8010). In some embodiments, the notification 8008 includes a prompt 8012 that provides additional details regarding time-sensitive notifications (e.g., an explanation for why this notification was provided even though the "Do Not Disturb" activity mode is active). In some embodiments, the notification 8008 includes a "Don't Allow" option 8014 and an "Allow" option 8016 for suppressing future time-sensitive notifications for the associated application (e.g., Rideshare) and for allowing future time-sensitive notifications for the associated application, respectively. In response to detecting a user input 8018 (e.g., a tap or other touch input on the "Allow" option 8016), the portable multifunction device 100 configures the time-sensitive notification settings for the portable multifunction device 100 to allow future time-sensitive notifications for the "Rideshare" application.

Figure 8C:
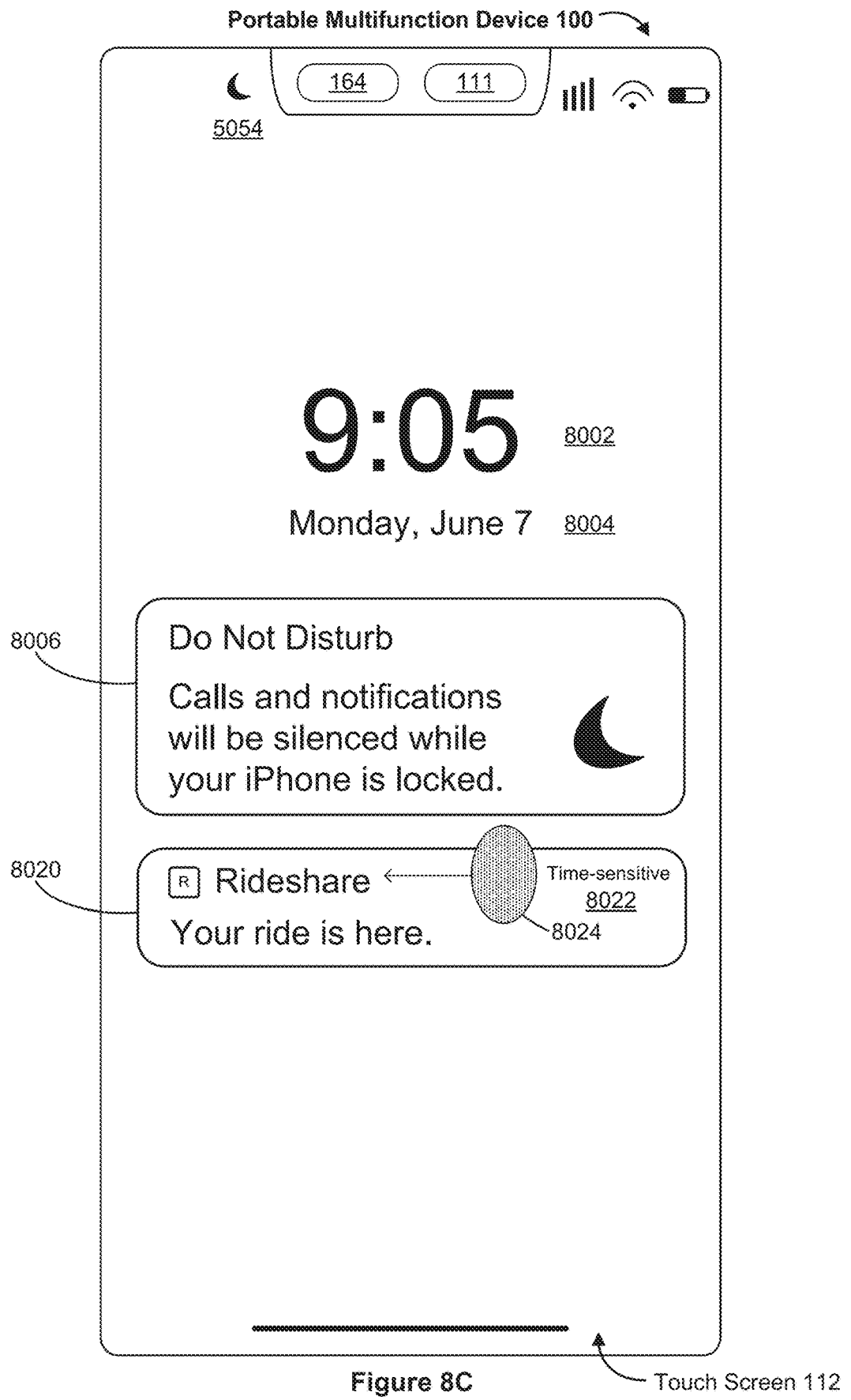

At a later time, as shown in FIG. 8C, a subsequent notification 8020 is displayed for the Rideshare application. The notification 8020 is also a time-sensitive notification (e.g., as indicated by an indicator 8022 with the text "Time-sensitive"), and the portable multifunction device 100 provides the notification 8020 in accordance with time-sensitive notification settings (e.g., because the user previously selected the "Allow" option 8014, as shown in FIG. 8B). In some embodiments, the notification 8020 does not include a prompt (analogous to the prompt 8012 for notification 8008) for time-sensitive notifications (e.g., only the first time-sensitive notification for a respective application displays a prompt). In some embodiments, the notification 8020 also includes an analogous prompt, "Don't Allow" and "Allow" options, as those for notification 8008 (e.g., every time-sensitive notification for a respective application displays the prompt 8012). In some embodiments, the notification 8020 includes a prompt and/or options for allowing/suppressing future time-sensitive notifications, but the prompt and/or options are displayed with a reduced level of prominence (e.g., displayed with abridged text, smaller text, smaller "Don't Allow" and "Allow" affordances, etc.) as compared to the prompt 8012 the "Don't Allow" option 8014, and/or the "Allow" option 8016 for notification 8008.

Figure 8D:
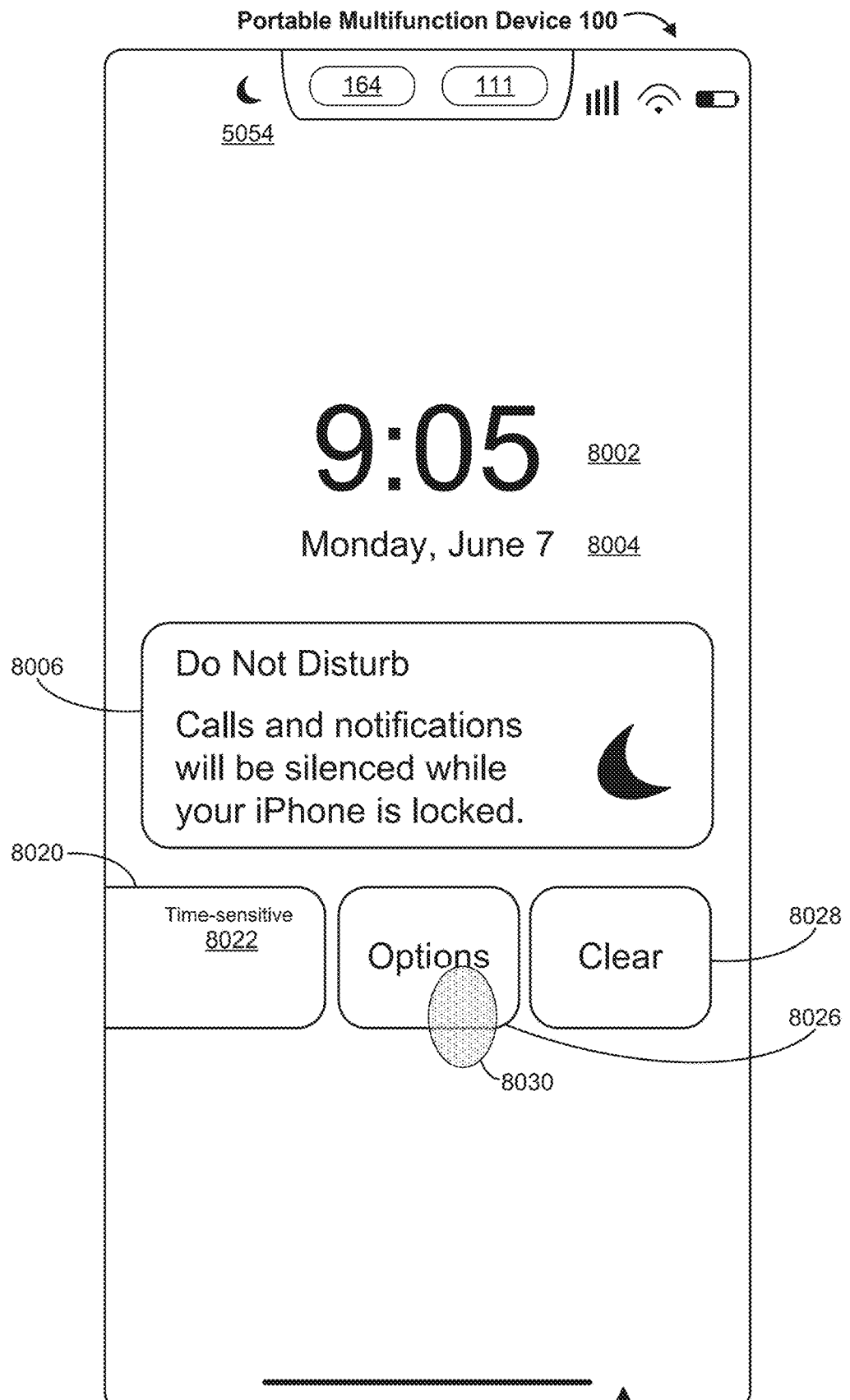

In some embodiments, in response to detecting a user input (e.g., a swipe left by a user input 8024), and as shown in FIG. 8D, the portable multifunction device 100 displays an "Options" affordance 8026 (e.g., for configuring settings associated with the notification 8020) and a "Clear" affordance 8028 (e.g., for dismissing the notification 8020).

Figure 8E:
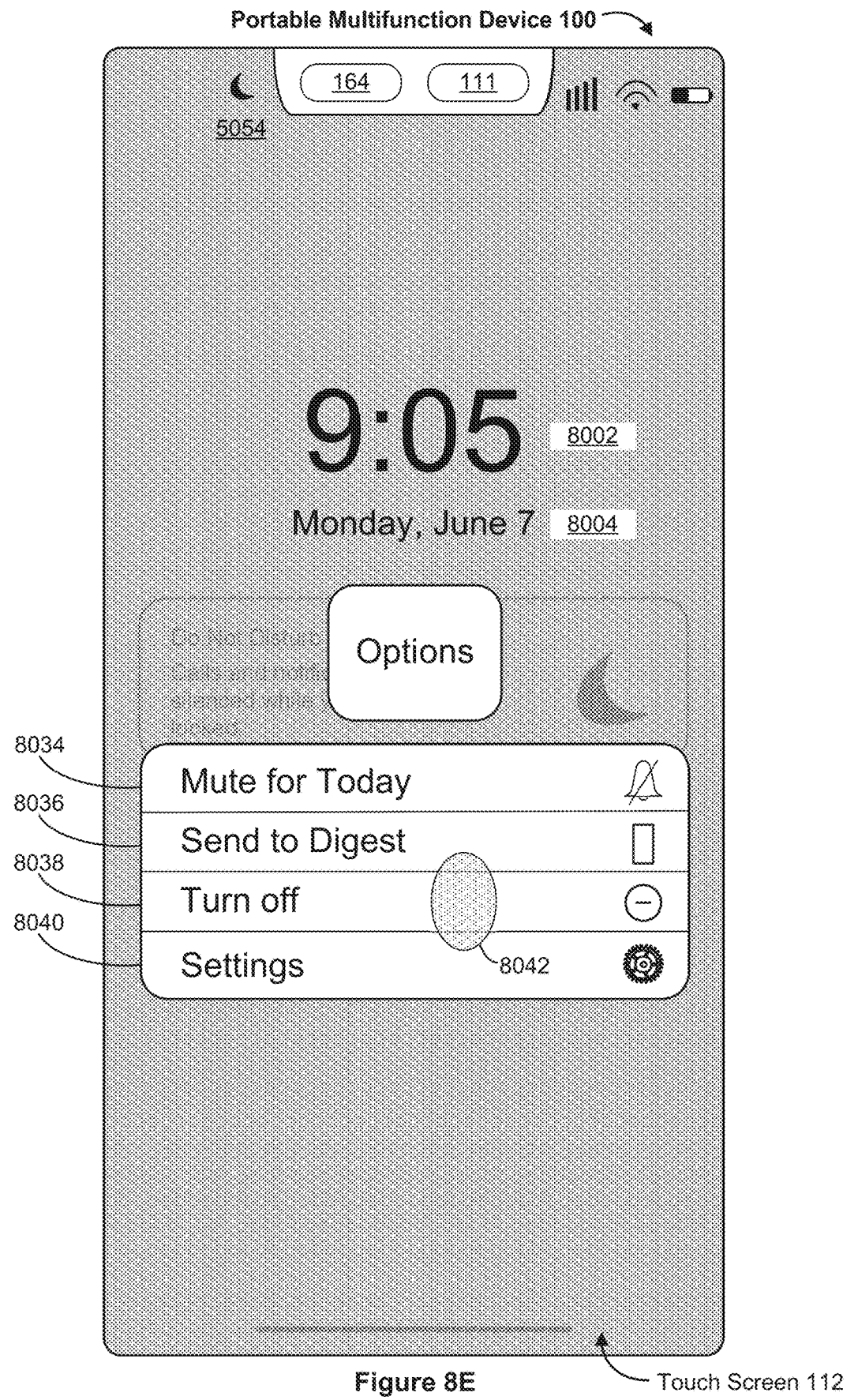

In response to detecting a user input (e.g., a tap by a user input 8030 on the "Options" affordance 8026), and as shown in FIG. 8E, the portable multifunction device 100 displays additional affordances for interacting with the notification 8020, including one or more (or two or more, or all) of: a "Mute for Today" affordance 8034 (e.g., for suppressing future notifications for the associated Rideshare application, for the remainder of the day), a "Send to Digest" affordance 8036 (e.g., for sending the notification 8020 to a notification digest (discussed above with reference to FIGS. 7A-7AE), a "Turn Off" affordance 8038 (e.g., for suppressing future time-sensitive notifications for the associated Rideshare application, for displaying additional affordances for selective suppression of time-sensitive notifications, etc.), and a "Settings" affordance 8040 (e.g., for modifying time-sensitive notification settings for the portable multifunction device 100).

Figure 8F:
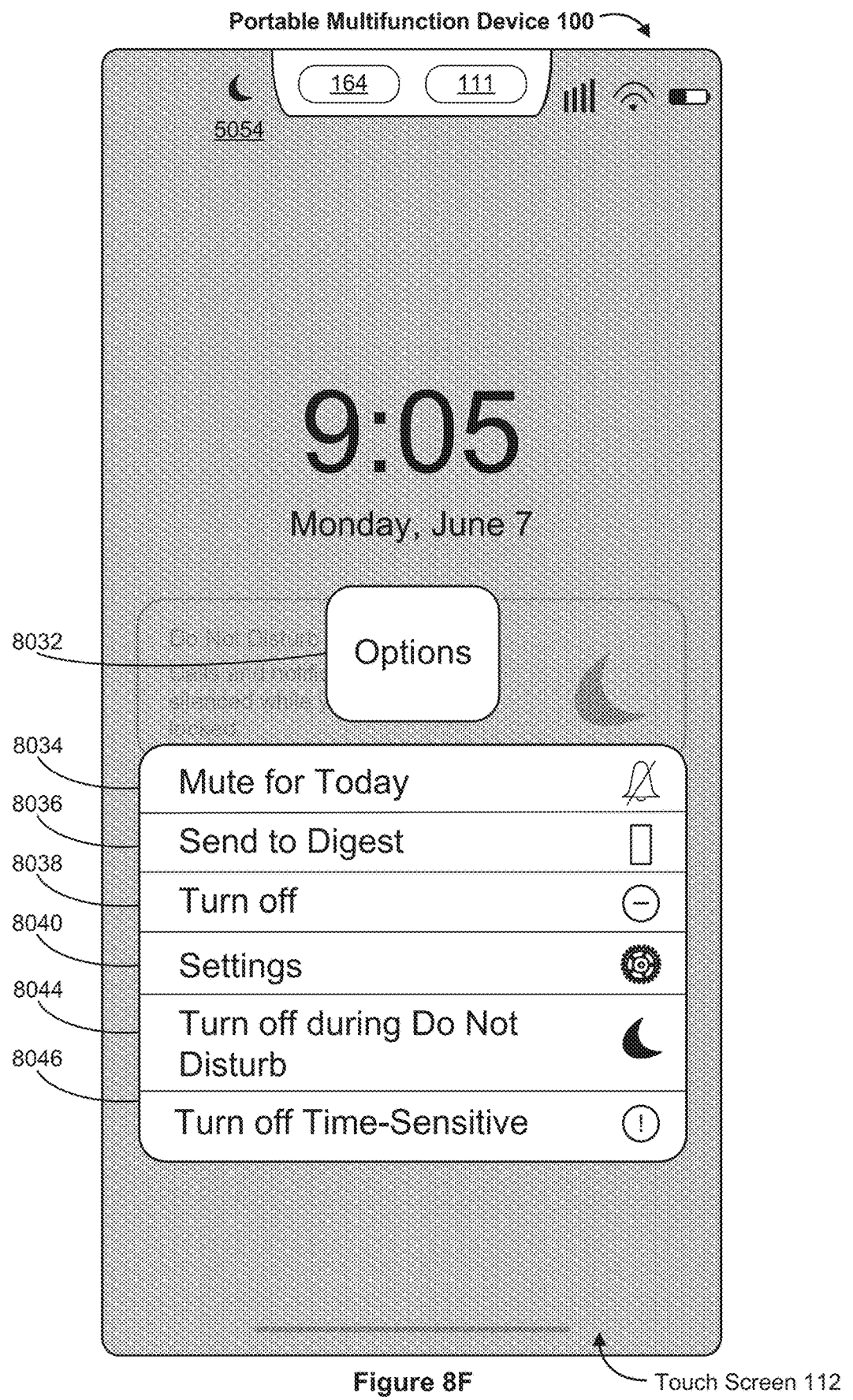

In response to detecting a user input (e.g., a tap by a user input 8042), and as shown in FIG. 8F, the portable multifunction device 100 displays a "Turn off during Do Not Disturb" affordance 8044 (e.g., for suppressing future time-sensitive notifications for the Rideshare application only when the "Do Not Disturb" activity mode is active (e.g., time-sensitive notifications will still be provided when activity modes other than the "Do Not Disturb" activity mode is active)) and/or a "Turn off Time-Sensitive" affordance 8046 (e.g., for suppressing all future time-sensitive notifications for the Rideshare application).

Figure 8G:
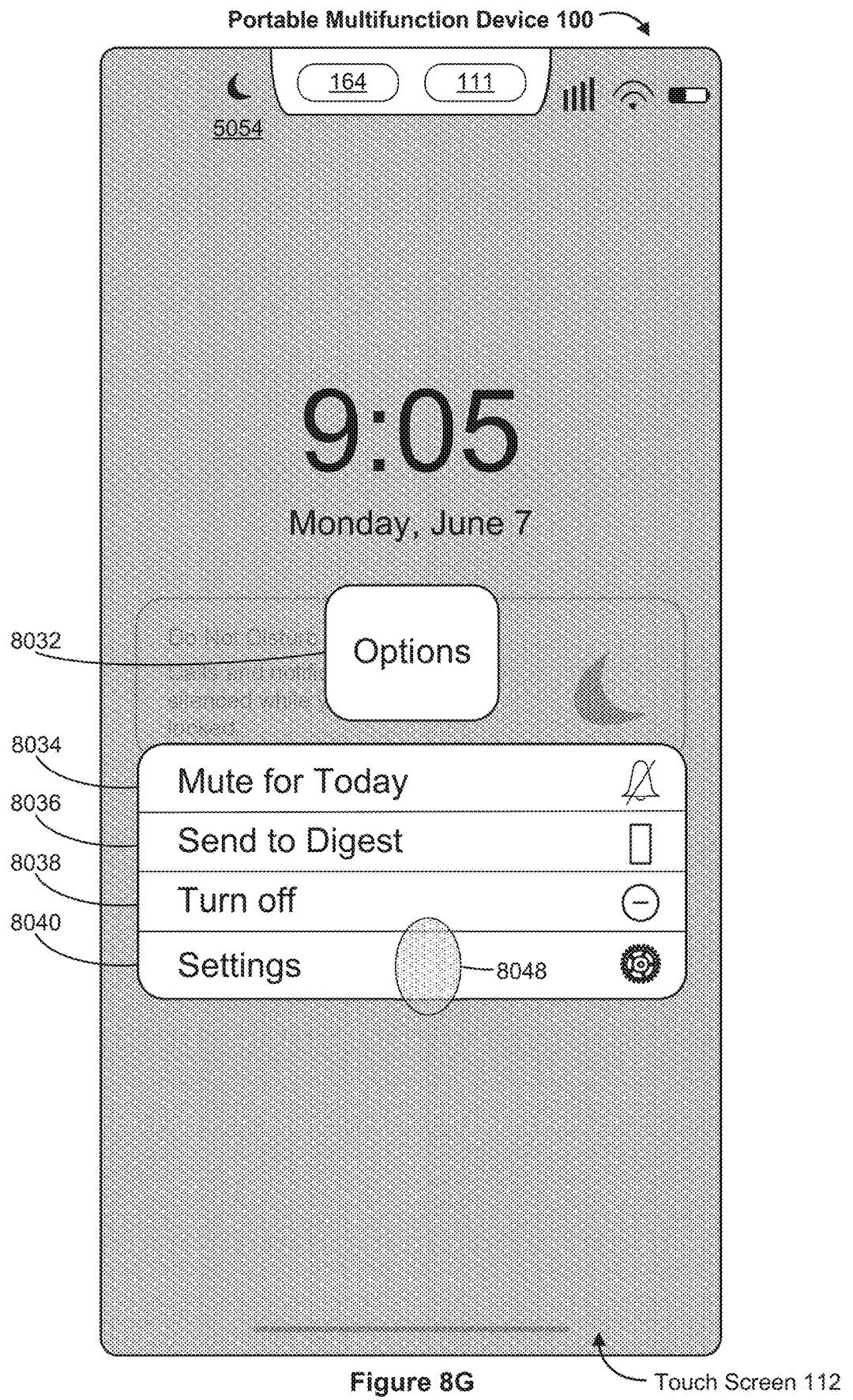

FIG. 8G is analogous to FIG. 8E, but illustrates a user input 8048 on the "Settings" affordance 8040, rather than the user input 8042 on the "Turn off" affordance 8038 (as shown in FIG. 8E).

Figure 8H:
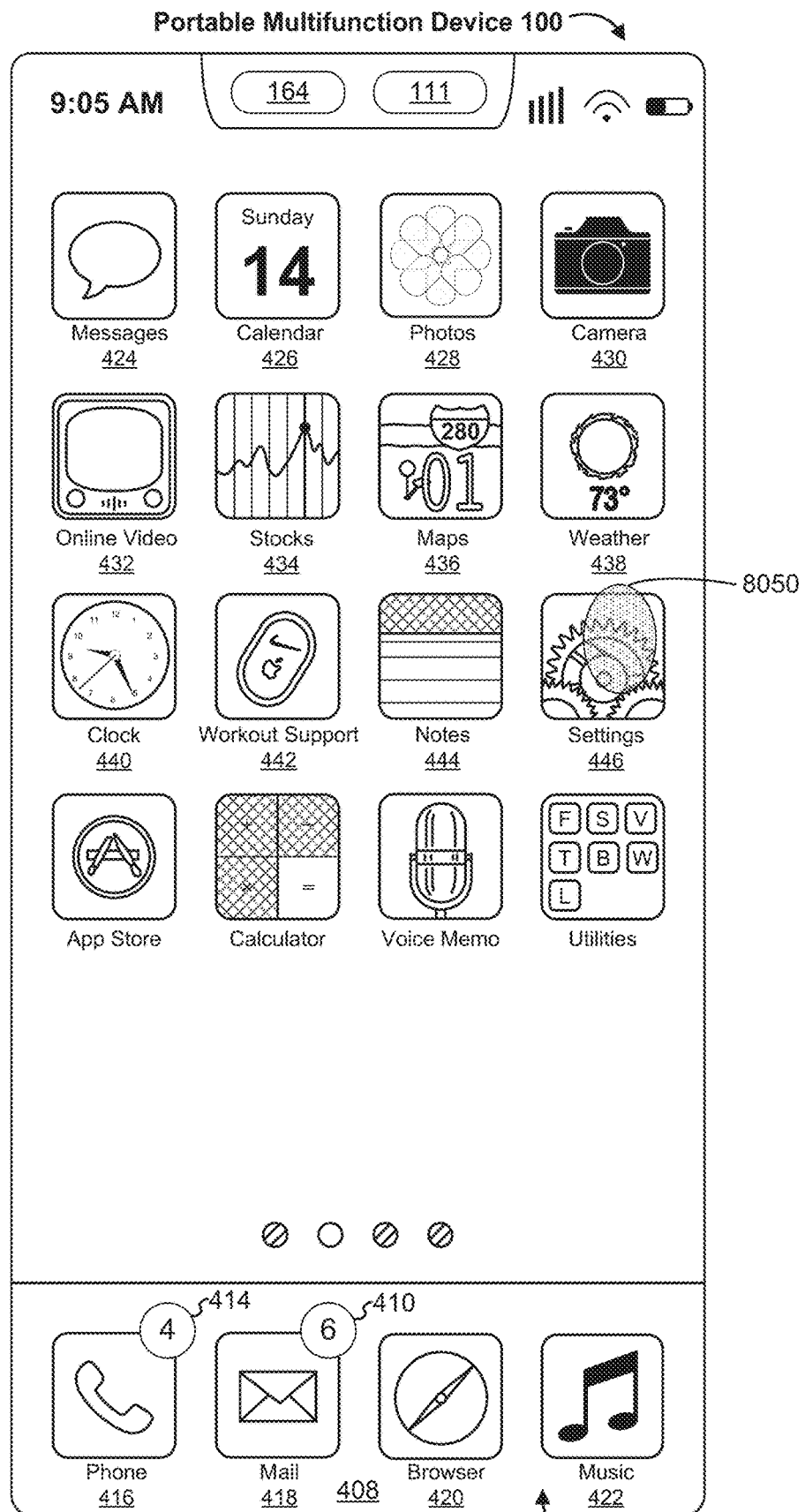
Figure 8I:
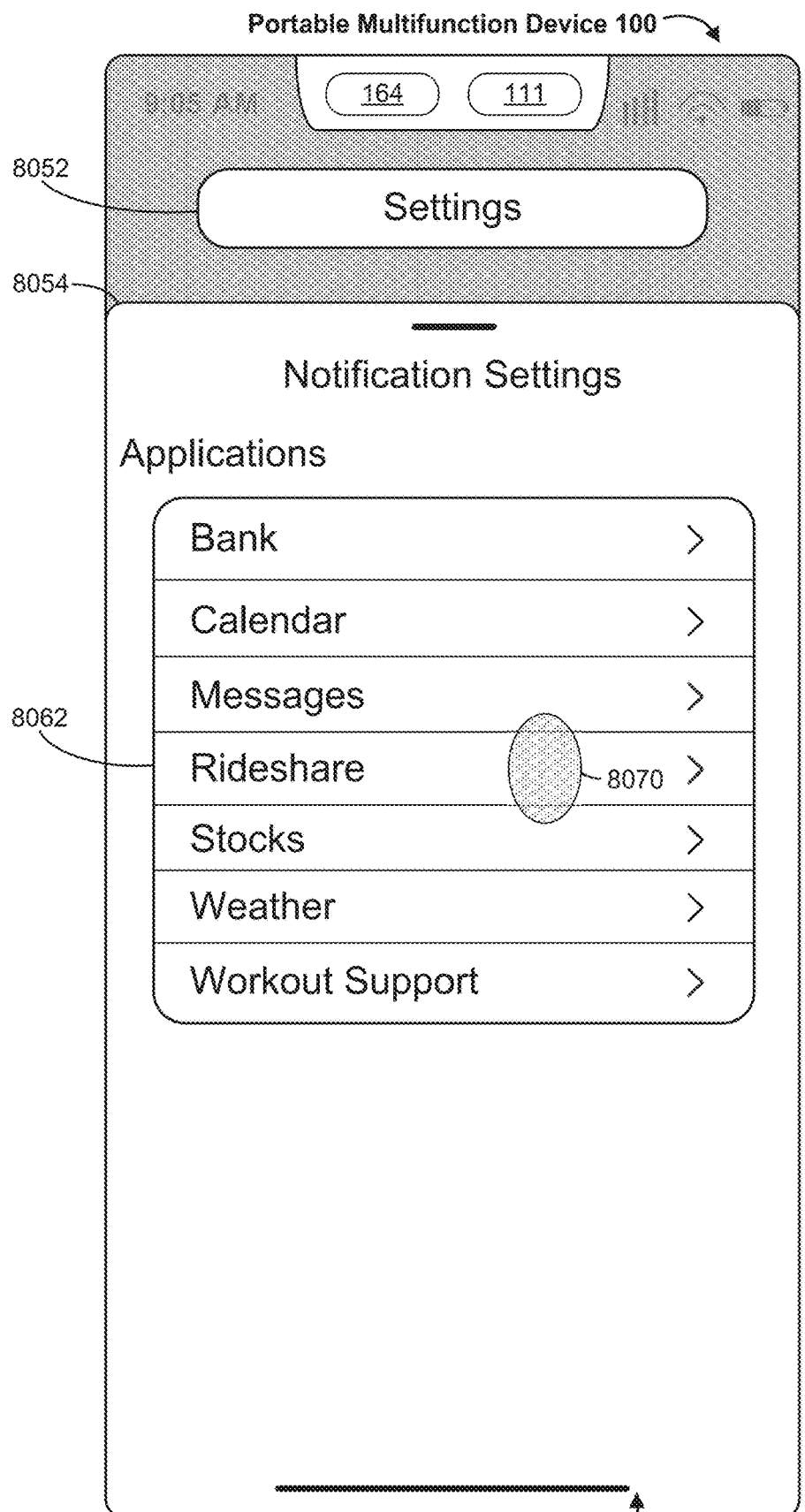

In some embodiments, in response to detecting a user input 8048 on the "Settings" affordance 8040, and as shown in FIG. 8I, the portable multifunction device 100 displays a settings interface 8054 for modifying notification settings for the portable multifunction device 100. In some embodiments, the settings interface for modifying notification settings is displayed in response to a user input on a Settings application icon (e.g., a user input 8050 on a "Settings" application icon 446, as shown in FIG. 8H). In response to detecting a user input 8070 on the Rideshare affordance 8062, the portable multifunction device 100 displays an application-specific settings interface 8072 for the Rideshare application, an example of which is shown in FIG. 8J.

Figure 8J:
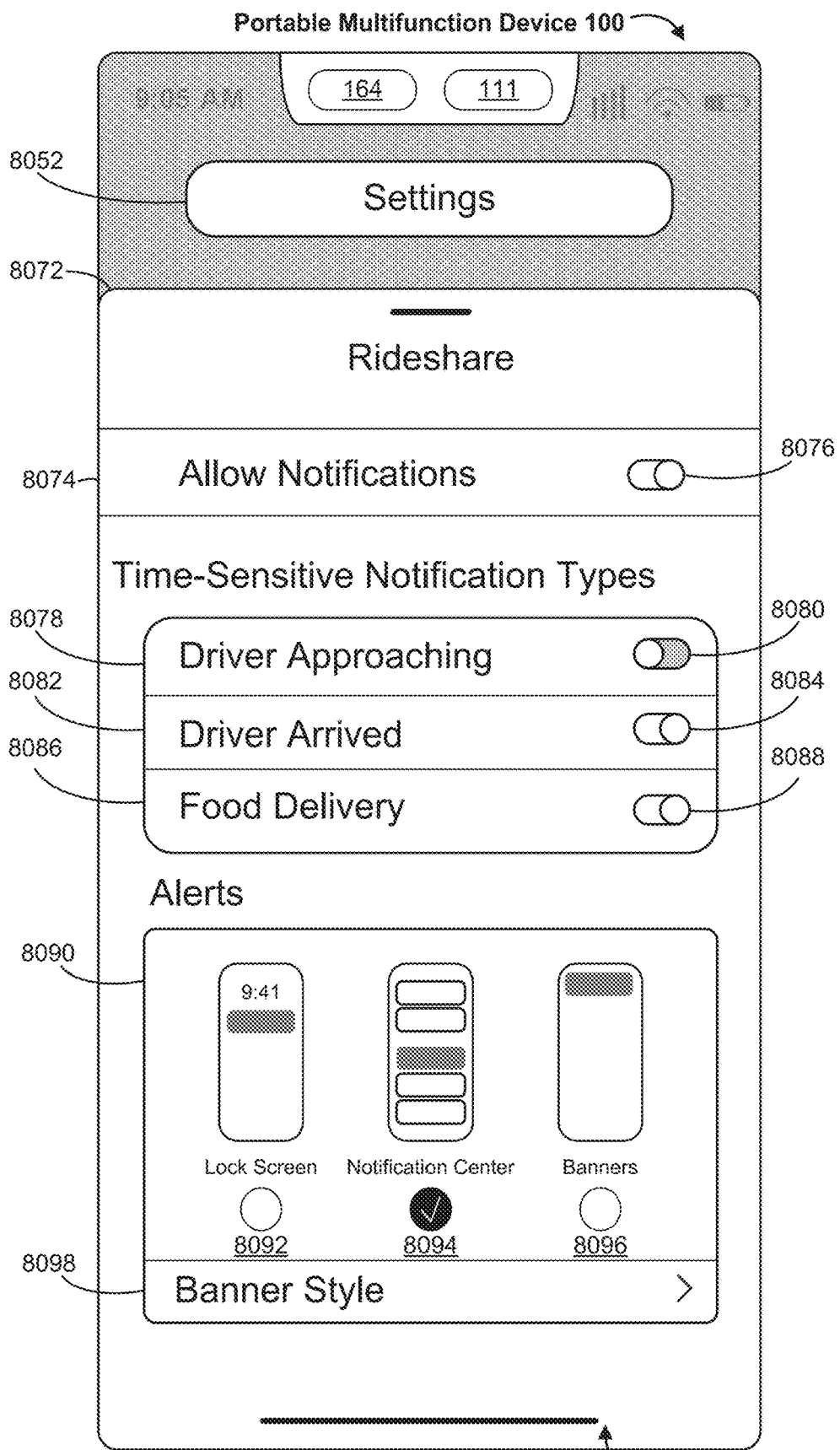

In some embodiments, in response to detecting a user input 8048 on the "Settings" affordance 8040 (shown in FIG. 8G), the portable multifunction device 100 displays the settings interface 8072 (as shown in FIG. 8J).

FIG. 8J illustrates an example of a settings interface for modifying time-sensitive notification settings for the Rideshare application. In some embodiments, the settings interface 8072 includes options for configuring notification settings for notifications that are not time-sensitive, for example one or more (or two or more, or all) of: an "Allow Notifications" option 8074 and optionally an associated toggle 8076, for configuring whether the Rideshare application can provide notifications at all; alerts customization options 8090 for configuring where notifications for the Rideshare application are displayed (e.g., by selecting one or more of the lock screen selector 8092, the notification center selector 8094, and the banner selector 8096); and a "Banner Style" option 8098 for customizing the appearance of banners (if applicable, e.g., if the banner selector 8096 is selected). In some embodiments, the settings interface 8072 includes options for enabling or disabling one or more subsets of notifications for the Rideshare application. For example, as shown in FIG. 8J, the settings interface includes one or more (or two or more, or all) of: a "Driver Arrived" option 8082 and a "Food Delivery" option 8086, which in this example are enabled (as shown through the associated toggles 8084 and 8088, respectively), and a "Driver Approaching" option 8078, which in this example is not enabled (as shown through the associated toggle 8080). As a result of these settings, the portable multifunction device 100 will provide time-sensitive notifications for "Driver Arrived" and "Food Delivery" notifications, but will not provide time-sensitive notifications for "Driver Approaching" notifications.

FIGS. 9A-9F are flow diagrams illustrating method 9000 of configuring, activating, and deactivating an activity mode in accordance with some embodiments. Method 9000 is performed at a computer system, sometimes herein referred to as an electronic device (e.g., device 300, FIG. 3, or portable multifunction device 100, FIG. 1A) with a display generation component (e.g., a display controller or display), a touch-sensitive surface, and one or more sensors to detect intensity of contacts with the touch-sensitive surface. In some embodiments, the computer system includes a display that is a touch-screen display and the touch-sensitive surface is on or integrated with the display. In some embodiments, the computer system includes a display or display generation component that is separate from the touch-sensitive surface. Some operations in method 9000 are, optionally, combined and/or the order of some operations is, optionally, changed.

The computer system displays (9002) via the display generation component, a first user interface that includes (e.g., concurrent display of) a first affordance associated with a first activity mode, a second affordance associated with modifying settings for the first activity mode, and a third affordance associated with a second activity mode. While displaying the first user interface (e.g., including the concurrent display of the first, second, and third affordances), the computer system detects (9004) a first user input. In response to detecting (9006) the first user input: in accordance with a determination that the first user input activates the first affordance, the computer system initiates (9008) activation of the first activity mode; in accordance with a determination that the first user input activates the second affordance, the computer system displays (9010), via the display generation component, a first settings interface for modifying settings of the first activity mode; and in accordance with a determination that the first user input activates the third affordance, the computer system initiates (9012) activation of the second activity mode.

Concurrently displaying first and third affordances in the first user interface allows the user to initiate activation of the first activity mode and the second activity mode, respectively, without requiring further user input to configure the computer system with settings corresponding to the first activity mode and the second activity mode. For example, while existing computer systems may have configurable "Do not disturb" settings that can suppress delivery of certain notifications for the computer system while the "Do not disturb" mode is active, if different types of notifications should be suppressed in different contexts (e.g., notifications from coworkers should not be suppressed while working, but should be suppressed while driving), the user must reconfigure the "Do not disturb" settings each time the context changes (e.g., each time the user is working or driving context). The first user interface of method 9000 reduces the need for constant reconfiguration by displaying affordances for initiating activation of multiple activity modes (e.g., a working activity mode and a driving activity mode). Automatically performing an operation when a set of conditions has been met without requiring further user input enhances the operability of the device, which, additionally, reduces power usage and improves battery life of the device by enabling the user to use the device more quickly and efficiently.

Additionally, initiating activation of the first activity mode, in accordance with a determination that the first user input activates the first affordance, and displaying a first settings interface for modifying settings of the first activity mode, in accordance with a determination that the first user input activates the second affordance, reduces the number of user inputs needed to modify settings of the first activity mode (e.g., the user does not need to perform additional inputs to navigate away from the first user interface, and additional inputs to navigate to the first settings interface (e.g., through a general settings user interface), in order to modify settings of the first activity mode). Reducing the number of inputs needed to perform an operation enhances the operability of the device, which, additionally, reduces power usage and improves battery life of the device by enabling the user to use the device more quickly and efficiently.

In some embodiments, before displaying the first user interface, the computer system displays (9014) a control user interface (e.g., control center) with an activity mode affordance. While displaying the control user interface, the computer system detects an input on the activity mode affordance, and in response to detecting the input on the activity mode affordance, the computer system displays the first user interface. This is shown in FIG. 5C, for example, where before displaying the first user interface (e.g., the user interface in FIG. 5D), the computer system (e.g., the portable multifunction device 100) displays a control user interface (e.g., the control panel 5004) with an activity mode affordance (e.g., the affordance 5006). Displaying the first user interface in response to detecting an input on the activity mode affordance in a control user interface provides additional control options without cluttering the UI with additional displayed controls (e.g., cluttering the control user interface with the first, second, and third affordances). Providing additional control options without cluttering the UI with additional displayed controls enhances the operability of the device, which, additionally, reduces power usage and improves battery life of the device by enabling the user to use the device more quickly and efficiently.

In some embodiments, before displaying the control user interface (e.g., with the activity mode affordance), the computer system displays (9016) an application launch interface, detects an input on the application launch user interface, and in response to detecting the input on the application launch user interface, the computer system displays the control user interface. This is shown in FIG. 5B, for example, where before displaying the control user interface (e.g., the control panel 5004 in FIG. 5C), the computer system (e.g., the portable multifunction device 100) displays an application launch interface, the computer system detects an input on the application launch user interface (e.g., the swipe down by the user input 5002), and in response to detecting the input on the application launch user interface, the computer system displays the control user interface (e.g., the control panel 5004 in FIG. 5C). Displaying the control user interface in response to detecting the input on the application launch user interface provides additional control options without cluttering the UI with additional displayed controls (e.g., additional displayed controls for displaying the control user interface, additional displayed controls (within the application launch interface) for each affordance included in the control user interface, etc.). Reducing the number of inputs needed to perform an operation enhances the operability of the device, which, additionally, reduces power usage and improves battery life of the device by enabling the user to use the device more quickly and efficiently.

In some embodiments, the first user interface includes (9018) a fourth affordance associated with modifying settings for the second activity mode, which, when activated, causes display of a settings interface for the second activity mode. This is shown in FIG. 5D, for example, where the first user interface includes a fourth affordance (e.g., the affordance 5028) associated with modifying settings of the second activity mode (e.g., the "Sleeping" activity mode), which when activated, causes display of a settings interface for the second activity mode (e.g., the settings interface 5380 in FIG. 5AK). Displaying a first user interface that includes a fourth affordance associated with modifying settings for the second activity mode, which, when activated, causes display of a settings interface for the second activity mode, reduces the number of inputs needed to display the settings interface for the second activity mode (e.g., the user does not need to perform additional inputs to first dismiss the first user interface, then perform additional inputs to navigate to the settings interface for the second activity mode). Reducing the number of inputs needed to perform an operation enhances the operability of the device, which, additionally, reduces power usage and improves battery life of the device by enabling the user to use the device more quickly and efficiently.

In some embodiments, the first settings interface for modifying the settings of the first activity mode includes (9020) at least one option (e.g., a user-selectable option) for specifying criteria for automatically initiating activation of the first activity mode. This is shown in FIGS. 5R-1 and 5R-2, for example, where the first settings interface (e.g., the settings interface 5120) for modifying the settings of the first activity mode (e.g., the "Working" activity mode) includes at least one option for specifying criteria for automatically initiating activation of the first activity mode (e.g., the "+" affordance 5138, for adding new automation). Including, in the first settings interface for modifying the settings of the first activity mode, at least one option for specifying criteria for automatically initiating activation of the first activity mode, performs an operation (e.g., initiating activation of the first activity mode) when a set of conditions has been met (e.g., the specified criteria) without requiring further user input (e.g., further user input to manually initiate activation of the first activity mode). Automatically performing an operation when a set of conditions has been met without requiring further user input enhances the operability of the device, which, additionally, reduces power usage and improves battery life of the device by enabling the user to use the device more quickly and efficiently.

In some embodiments, the criteria for automatically initiating activation of the first activity mode include (9022) criteria based at least in part on a specified time, location, or active application. This is shown in FIG. 5AB-5AE, for example, where the criteria for automatically initiating activation of the first activity mode include criteria based at least in part on a specified time (e.g., as shown in FIG. 5AC), location (e.g., as shown in FIG. 5AD), or active application (e.g., as shown in FIG. 5AE). This is also shown in FIG. 5AF-1-5AF-3, which show time, location, and active application criteria, respectively, in the "Automation" section of the settings interface 5120. Including, in the first settings interface for modifying the settings of the first activity mode, at least one option for specifying criteria for automatically initiating activation of the first activity mode, wherein the criteria for automatically initiating activation of the first activity mode include criteria based at least in part on a specified time, location, or active application, performs an operation (e.g., initiates activation of the first activity mode) when a set of conditions has been met (e.g., the specified criteria based at least in part on a specified time, location, or active application) without requiring further user input (e.g., further user input to manually initiate activation of the first activity mode). Automatically performing an operation when a set of conditions has been met without requiring further user input enhances the operability of the device, which, additionally, reduces power usage and improves battery life of the device by enabling the user to use the device more quickly and efficiently.

In some embodiments, the computer system displays (9023), in response to detection of a trigger condition, a notification that includes a prompt to configure the first activity mode to automatically initiate activation of the first activity mode when a condition, specified in the notification, is detected (e.g., the notification may recommend automatically activating an "exercise" activity mode when (or whenever) a user arrives at or enters a particular location, such as a gym or exercise studio, and the trigger condition is optionally the user entering or arriving at that location after having, at one or more times in the past, manually started the first activity mode upon or shortly after entering that location). For example, FIG. 5AL shows an example of a notification 5400 that includes a prompt to automatically activate the Working mode when the user arrives at work. In some embodiments, signals interpreted to determine whether to set up a new activity mode (see operation 9066) or set up a new automation for an existing mode include one or more of: the time of day, events on a calendar, motion state of the computer system, location, Bluetooth devices that are connected, applications that are in use on the computer system, screen sharing, recording the screen, signals from a peripheral device (e.g., a paired smartwatch), workout data from a health application, and/or sleep data from a health application. Displaying, in response to detection of a trigger condition, a notification that includes a prompt to configure the first activity mode to automatically initiate activation of the first activity mode when a condition, specified in the notification, is detected, performs an operation (e.g., displaying the prompt to configure the first activity mode) when a set of conditions has been met (e.g., an application is in use) without requiring further user input (e.g., further user input to navigate to a settings interface to configure the first activity mode). Performing an operation when a set of conditions has been met without requiring further user input enhances the operability of the device, which, additionally, reduces power usage and improves battery life of the device by enabling the user to use the device more quickly and efficiently.

In some embodiments, the criteria for automatically initiating activation (9024) of the first activity mode is based at least in part on recorded user data corresponding to user activity associated with (e.g., on) the computer system (e.g., times and when the device has, historically, been in a particular activity mode, such as a "Working" activity mode; applications which are in use when a particular activity mode is active; etc.). In some embodiments, the criteria for automatically initiating activation of the first activity mode is implemented by machine-selected automation settings (e.g., that the user can change). This is shown in FIG. 5AE, for example, where the computer system (e.g., the portable multifunction device 100) displays suggested applications (e.g., applications 5322, 5324, 5236, and 5328). In some embodiments, the suggested applications are suggested based on recorded user data corresponding to user activity associated with the computer system. Including, in the first settings interface for modifying the settings of the first activity mode, at least one option for specifying criteria for automatically initiating activation of the first activity mode, wherein the criteria for automatically initiating activation of the first activity mode is based at least in part on recorded user data corresponding to user activity associated with the computer system, performs an operation (e.g., initiates activation of the first activity mode) when a set of conditions has been met (e.g., the specified criteria based at least in part on recorded user data corresponding to user activity associated with the computer system) without requiring further user input (e.g., further user input to manually initiate activation of the first activity mode). Automatically performing an operation when a set of conditions has been met without requiring further user input enhances the operability of the device, which, additionally, reduces power usage and improves battery life of the device by enabling the user to use the device more quickly and efficiently.

In some embodiments, displaying (9026) the first settings interface includes displaying at least one of an option for determining whether or not notifications associated with a respective application (an application suggested by the computer system) will be output by the computer system while the first activity mode is active, and an option for determining whether or not notifications associated with a contactable user (a user suggested by the computer system) will be output by the computer system while the first activity mode is active. In some embodiments, for different types of activity modes, whether newly created (see operation 9066) or existing, there are different recommendations for users/apps/trigger conditions (e.g., the suggestion in FIGS. 5T and 5X), for example work contacts and work apps might be suggested to break through a work activity mode, while personal contacts and social media apps might be suggested to break through a personal time activity mode, while different location/time/app use criteria are suggested as start/end conditions for different types of activity modes. Examples of conditions that are used to automatically start an activity mode include, starting a gaming activity mode in response to detecting connection of a wireless game controller to the communication system; starting an exercising activity mode in response to detecting that the user has started a workout (e.g., based on movement or biometric indications detected by a device with one or more biometric sensors such as a heartrate sensor and/or one or more motion sensors and/or based on the user starting a workout activity on a device associated with the computer system such as a smart watch or based on the user starting a workout video program on the computer system or an associated device); starting a driving activity mode—the user is driving or enters a vehicle based on motion of the user, the use of a driving direction feature of the computer system, and/or connection of the computer system to a vehicle such as via a wired or wireless connection to an infotainment system. This is shown in FIG. 5R-1, for example, where the computer system (e.g., the portable multifunction device 100) displays an option for determining whether or not notifications associated with a respective application will be output by the computer system (e.g., the "Apps" option 5124) and an option for determining whether or not notifications associated with a contactable user will be output by the computer system (e.g., the "People" option 5122). Displaying, in the first settings interface for modifying the settings of the first activity mode, at least one of an option for determining whether or not notifications associated with a respective application will be output by the computer system while the first activity mode is active, and an option for determining whether or not notifications associated with a contactable user will be output by the computer system while the first activity mode is active, performs an operation (e.g., outputs a notification associated with a respective application or contactable user, while the first activity mode is active) when a set of conditions has been met (e.g., the notification is associated with a respective application or contactable user) without requiring further user input (e.g., the user does not need to perform additional inputs to navigate to another user interface (e.g., a notification center user interface) that includes notifications were not displayed in accordance with the first activity mode being active for the computer system). Performing an operation when a set of conditions has been met without requiring further user input enhances the operability of the device, which, additionally, reduces power usage and improves battery life of the device by enabling the user to use the device more quickly and efficiently.

In some embodiments, the first settings interface includes (9028) an affordance that when activated, switches between a first portion of the first settings interface that includes an option for selecting applications for which notifications will be provided while the first activity mode is active, and a second portion of the first settings interface that includes an option for selecting respective user contacts for which notifications will be provided while the first activity mode is active. This is shown in FIG. 5V, for example, where the first settings interface includes an affordance (e.g., the toggle 5156) that when activated (e.g., by the user input 5194), switches between a first portion of the first settings interface that includes an option for selecting applications for which notifications will be provided while the first activity mode is active (e.g., the user interface shown in FIG. 5W, in response to the user input 5194 on the toggle 5156) and a second portion of the first settings interface that includes an option for selecting respective user contacts for which notifications will be provided while the first activity mode is active (e.g., the user interface shown in FIG. 5V). Including, in the first settings interface for modifying the settings of the first activity mode, an affordance that when activated, switches between a first portion of the first settings interface that includes an option for configuring a respective application to provide notifications (or selecting applications to provide notifications) while the first activity mode is active, and a second portion of the first settings interface that includes an option for configuring a respective user contact for which notifications will be provided (or selecting respective user contacts for which notifications will be provided) while the first activity mode is active, reduces the number of inputs needed to navigate between the first portion of the first settings interface and the second portion of the first settings interface (e.g., the user does not need to perform additional navigational inputs to navigate from the first portion of the first settings interface to the second portion of the first settings interface, or vice versa). Reducing the number of inputs needed to perform an operation enhances the operability of the device, which, additionally, reduces power usage and improves battery life of the device by enabling the user to use the device more quickly and efficiently.

In some embodiments, the option for determining whether or not notifications associated with a contactable user will be output by the computer system while the first activity mode is active configures (9030) the respective application to provide notifications while the first activity mode is active without configuring the respective application to provide notifications while an activity mode other than the first activity mode is active. This is shown in FIGS. 5AJ and 5AK, for example, where a respective application (e.g., the "Activity" application, as shown in FIG. 5AJ) is configured to provide notifications while the first activity mode (e.g., the "Working" activity mode) is active without configuring the respective application to provide notifications while an activity mode other than the first activity mode (e.g., the "Sleeping" activity mode in FIG. 5AK) is active (e.g., the "Activity" application is not configured for the "Sleeping" activity mode, as shown in FIG. 5AK). Configuring a respective application to provide notifications while the first activity mode is active without configuring the respective application to provide notifications while an activity mode other than the first activity mode is active, reduces the number of inputs needed to configure multiple activity modes (e.g., the user can freely configure the first activity mode without needing to perform additional inputs to prevent (or undo) configuration of the activity mode other than the first activity mode, when the first activity mode and the activity mode other than the first activity mode have different configurations). Reducing the number of inputs needed to perform an operation enhances the operability of the device, which, additionally, reduces power usage and improves battery life of the device by enabling the user to use the device more quickly and efficiently.

In some embodiments, the computer system displays (9032), via the display generation component, an activity mode indicator, indicating a current activity mode of the computer system, on a wake screen user interface that corresponds to a wake state of the computer system (e.g., the activity mode indicator 5048 shown in FIG. 5G, or the indication 5066 of a current activity mode. In accordance with a determination that the computer system is in the first activity mode, the activity mode indicator has a first appearance, and in accordance with a determination that the computer system is in the second activity mode that is different from the first activity mode, the activity mode indicator has a second appearance that is different from the first appearance. In some embodiments, the activity mode indicator is also an affordance, selection of which by a user input deactivates the currently active activity mode (e.g., in some embodiments, selection of indication 5066 of the current activity mode deactivates the current activity mode; as described below, this is similar to user input 5060, selecting an activity mode affordance 5006 in a control user interface 5004, as shown in FIG. 5F, which deactivates the current activity mode). This is shown in FIG. 5G, for example, where the computer system (e.g., the portable multifunction device 100) displays an activity mode indicator indicating a current activity mode of the computer system, on a wake screen user interface that corresponds to a wake state of the computer system (e.g., the indication 5066 on a lock screen user interface). Displaying an activity mode indicator, indicating a current activity mode of the computer system, with a first appearance, in accordance with a determination that the computer system is in the first activity mode, and displaying the activity mode indicator with a second appearance that is different from the first appearance, in accordance with a determination that the computer system is in the second activity mode that is different from the first activity mode, provides improved visual feedback to the user (e.g., improved visual feedback about the current activity mode of the computer system). Providing improved feedback enhances the operability of the device, which, additionally, reduces power usage and improves battery life of the device by enabling the user to use the device more quickly and efficiently.

In some embodiments, the computer system displays (9034), via the display generation component, a representation of a current time on the wake screen user interface, wherein the activity mode indicator is displayed below the representation of the current time on the wake screen user interface. This is shown in FIG. 5G, for example, where the computer system (e.g., the portable multifunction device 100) displays a representation of the current time (e.g., the time 5062) on the wake screen user interface, and where the activity mode indicator (e.g., the indication 5066) is displayed below the representation of the time on the wake screen user interface. Displaying, below (or adjacent) a representation of the current time, an activity mode indicator indicating a current activity mode of the computer system, with a first appearance, in accordance with a determination that the computer system is in the first activity mode, and displaying the activity mode indicator with a second appearance that is different from the first appearance, in accordance with a determination that the computer system is in the second activity mode that is different from the first activity mode, provides improved visual feedback to the user (e.g., improved visual feedback about the current activity mode of the computer system). Providing improved feedback enhances the operability of the device, which, additionally, reduces power usage and improves battery life of the device by enabling the user to use the device more quickly and efficiently.

In some embodiments, the computer system displays (9036) via the display generation component, an activity mode indicator, indicating a current activity mode of the computer system, in a status region of a respective user interface (e.g., an application launch interface or application user interface). In accordance with a determination that the computer system is in the first activity mode, the activity mode indicator has a first appearance, and in accordance with a determination that the computer system is in the second activity mode that is different from the first activity mode, the activity mode indicator has a second appearance that is different from the first appearance. In some embodiments, while a respective activity mode of a plurality of activity modes is active, the computer system displays, in the respective user interface, an indication corresponding to the respective activity mode, wherein the indication corresponding to the respective activity mode is distinct from each other indicator corresponding to each other activity mode of the plurality of activity modes.) This is shown in FIG. 5E-1-5E-4, for example, where the computer system (e.g., the portable multifunction device 100) displays an activity mode indicator (e.g., indication 5048, indication 5050, indication 5052, or indication 5054) indicating a current activity mode (e.g., a "Working" activity mode, a "Sleeping" activity mode, a "Driving" activity mode, or a "Do Not Disturb" activity mode, respectively) in a status region of a respective user interface (e.g., an application launch user interface). Displaying an activity mode indicator indicating a current activity mode of the computer system, in a status region of a respective user interface, including, in accordance with a determination that the computer system is in the first activity mode, the activity mode indicator has a first appearance, and in accordance with a determination that the computer system is in the second activity mode that is different from the first activity mode, the activity mode indicator has a second appearance that is different from the first appearance, provides improved visual feedback to the user (e.g., improved visual feedback that an activity mode is active for the computer system, improved visual feedback regarding the current activity mode of the computer system). Providing improved feedback enhances the operability of the device, which, additionally, reduces power usage and improves battery life of the device by enabling the user to use the device more quickly and efficiently.

In some embodiments, while a current activity mode (e.g., the first activity mode), of a plurality of activity modes, is active, the computer system detects (9038) a fourth user input that selects an activity mode affordance (e.g., an activity mode affordance, in the control user interface 5004 in FIG. 5F, that indicates or corresponds to the current activity mode of the computer system). In response to detecting the fourth user input that selects the activity mode affordance, the computer system initiates deactivation of the current activity mode (e.g., the deactivation may be immediate upon detecting the fourth input, or deactivation may further require a confirmation input). This is shown in FIG. 5F, for example, where while a current activity mode (e.g., the "Working" activity mode) is active, the computer system (e.g., the portable multifunction device 100) detects a fourth user input (e.g., the user input 5060) that selects an activity mode affordance (e.g., the affordance 5006), and in response to detecting the fourth user input, the computer system initiates deactivation of the current activity mode. Initiating deactivation of the current activity mode (e.g., first activity mode), in response to detecting a fourth user input that selects a current activity mode affordance, provides additional control options without cluttering the UI with additional displayed controls (e.g., additional displayed controls specifically for initiating deactivation of the current activity mode). Providing additional control options without cluttering the UI with additional displayed controls enhances the operability of the device, which, additionally, reduces power usage and improves battery life of the device by enabling the user to use the device more quickly and efficiently.

In some embodiments, the computer system displays (9040), in a plurality of user interfaces associated with a first user of another computer system, an activity mode indicator for the first user, the activity mode indicator for the first user corresponding to a respective activity mode that is active for the first user. This is shown in FIG. 5L, where the computer system (e.g., the portable multifunction device 100-*b*) displays an activity mode indicator (e.g., indication 5090) for the first user (e.g., the user Genevive), where the activity mode for the first user corresponds to a respective activity mode that is active for the first user (e.g., a "Working" activity mode). Displaying, in a plurality of user interfaces associated with a first user of another computer system, an activity mode indicator for the first user corresponding to a respective activity mode that is active for the first user, provides improved visual feedback to the user (e.g., improved visual feedback regarding the active activity mode for the first user of the other computer system). Providing improved feedback enhances the operability of the device, which, additionally, reduces power usage and improves battery life of the device by enabling the user to use the device more quickly and efficiently.

In some embodiments, the computer system concurrently displays (9042), in a respective user interface of the plurality of user interfaces associated with the first user, an avatar of the first user, and the activity mode indicator for the first user that is visually associated with (e.g., is at or near the location of) the avatar of the first user. This is shown in FIG. 5L, for example, where the computer system (e.g., the portable multifunction device 100-*b*) concurrently displays an avatar of the first user (e.g., the indication 5068), and the activity mode indicator for the first user (e.g., the activity mode indicator 5090) that is visually associated with the avatar of the first user. Concurrently displaying, in a respective user interface of the plurality of user interfaces associated with the first user, an avatar of the first user, and an activity mode indicator for the first user that is visually associated with the avatar of the first user, provides improved visual feedback to the user (e.g., improved visual feedback regarding the active activity mode for the first user of the other computer system). Providing improved feedback enhances the operability of the device, which, additionally, reduces power usage and improves battery life of the device by enabling the user to use the device more quickly and efficiently.

In some embodiments, the plurality of user interfaces associated with the first user includes (9044) a messaging user interface that corresponds to a communication session between the first user of the other computer system and a user of the computer system. This is shown in FIGS. 5L-5P, for example, where the plurality of user interface associated with the first user (e.g., the user Genevive) includes a messaging user interface that corresponds to a communication session (e.g., as shown by messages 5070, 5072, 5074, and 5084) between the first user of the other computer system and a user of the computer system. Displaying, in a plurality of user interfaces associated with a first user of another computer system, an activity mode indicator for the first user corresponding to a respective activity mode that is active for the first user, wherein the plurality of user interfaces associated with the first user includes a messaging user interface that corresponds to a communication session between the first user of the other computer system and a user of the computer system, provides improved visual feedback to the user (e.g., improved visual feedback regarding the active activity mode for the first user of the other computer system). Providing improved feedback enhances the operability of the device, which, additionally, reduces power usage and improves battery life of the device by enabling the user to use the device more quickly and efficiently.

In some embodiments, the activity mode indicator for the first user is (9046) the same for a plurality (e.g., some or all) of different activity modes. In some embodiments, the user of the computer system sees the same activity mode indicator (e.g., a generic do-not-disturb symbol) regardless of which activity mode is active for the first user, while the first user sees an indication of which mode is active for their own device (e.g., a different indicator for each respective activity mode). This conveys information that an activity mode is active (e.g., and that notifications are being suppressed) to other users, while preserving the privacy of the first user as to which activity mode is active. Displaying, in a plurality of user interfaces associated with a first user of another computer system, an activity mode indicator for the first user corresponding to a respective activity mode that is active for the first user, wherein the plurality of user interfaces associated with the first user include a messaging user interface that corresponds to a communication session between the first user of the other computer system and a user of the computer system, and wherein the activity mode indicator for the first user is the same for a plurality of different activity modes, provides improved visual feedback to the user (e.g., improved visual feedback regarding the active activity mode for the first user of the other computer system), while preserving the privacy of the first user as to which activity mode is active for the first user. Providing improved feedback while preserving privacy of the users of other devices enhances the operability of the computer system (or device), which, additionally, reduces power usage and improves battery life of the device by enabling the user to use the device more quickly and efficiently.

In some embodiments, while the respective activity mode is active for the first user, the computer system transmits (9048) a first communication to the first user, and the computer system displays in the messaging user interface an indication that the first communication was delivered in accordance with the respective activity mode being active for the first user. (e.g., the indication indicates that the notification has been "delivered quietly"). This is shown in FIG. 5N, for example, where while the respective activity mode is active for the first user (e.g., while a "Working" activity mode is active for the user Genevive), the computer system (e.g., the portable multifunction device 100-*b*) transmits a first communication to the first user (e.g., the message 5084), and the computer system displays an indication (e.g., the indication 5096) that the first communication was delivered in accordance with the respective activity mode being active for the first user (e.g., that the message 5096 was delivered quietly, because a "Working" mode is active for the user Genevive). Displaying in the messaging user interface an indication that the first communication was delivered in accordance with the respective activity mode being active for the first user (of another computer system or device), provides improved visual feedback to the user (e.g., improved visual feedback that an activity mode is active for the first user and that the first communication was delivered in accordance with the respective activity mode being active for the first user). Providing improved feedback enhances the operability of the device, which, additionally, reduces power usage and improves battery life of the device by enabling the user to use the device more quickly and efficiently.

In some embodiments, the indication that the first communication was delivered in accordance with the respective activity mode being active for the first user includes (9050) an option which, when activated, sends a request to the other computer system to provide a notification corresponding to the first communication. In some embodiments, the option is available for each activity mode of the plurality of activity modes (e.g., the settings interface for each activity mode includes an option that controls whether or not the option is included in the indication that the first communication was delivered in accordance with the respective activity mode being active). In some embodiments, a message bubble for the first communication, as shown in the messaging user interface of the sender, is animated (e.g., jiggles, and/or its size oscillates, or it is animated in another manner) to indicate that the notification was delivered and/or that a request to generate the notification was sent to a device associated with the recipient. This is shown in FIG. 5N, for example, where the indication (e.g., the indication 5096) that the first communication was delivered in accordance with the respective activity mode being active for the first user includes an option (e.g., the override affordance 5098) which, when activated, sends a request to the other computer system (e.g., the portable multifunction device 100) to provide a notification corresponding to the first communication. Displaying in the messaging user interface an indication that the first communication was delivered in accordance with the respective activity mode being active for the first user, and (e.g., within or adjacent the indication) an option which, when activated, sends a request to the other computer system to provide a notification corresponding to the first communication, reduces the number of inputs needed to send a request to the other computer system to provide a notification corresponding to the first communication (e.g., the user can send the request directly from the messaging user interface and does not need to perform additional inputs to send the message through alternative means (e.g., a different type of communication application)). Reducing the number of inputs needed to perform an operation enhances the operability of the device, which, additionally, reduces power usage and improves battery life of the device by enabling the user to use the device more quickly and efficiently.

In some embodiments, the indication that the first communication was delivered in accordance with the respective activity mode being active for the first user is displayed (9052) in accordance with a determination that the other computer system is configured to indicate (e.g., configured to provide information to the computer system and its user) that the respective activity mode is active for the first user (e.g., is configured send a status indicator corresponding to the respective activity mode of the first user, while the respective activity mode is active for the first user). In some embodiments, the settings interface for each activity mode of the plurality of activity modes includes an option to enable or disable display of the indication while the respective activity mode is active. This is shown in FIG. 5R-1, for example, where the computer system (e.g., the portable multifunction device) is configured to indicate that the respective activity mode is active for the first user (e.g., because the "Show Away Status" option 5130 is enabled, as shown by the toggle 5132). Displaying in the messaging user interface an indication that the first communication was delivered in accordance with the respective activity mode being active for the first user in accordance with a determination that the other computer system is configured (e.g., a "show away status" or "show activity mode" option of the other computer system is enabled) to indicate that the respective activity mode is active for the first user provides improved visual feedback to the user (e.g., improved visual feedback that an activity mode is active for the first user and that the first communication was delivered in accordance with the respective activity mode being active for the first user). Providing improved feedback enhances the operability of the device, which, additionally, reduces power usage and improves battery life of the device by enabling the user to use the device more quickly and efficiently.

In some embodiments, one or more of the first user interface and the first settings interface include (9054) an option for enabling display, to users other than a user of the computer system, of a status indicator corresponding to the first activity mode; and an option for disabling display, to users other than the user of the computer system, of the status indicator corresponding to the first activity mode. In some embodiments, the option is available in settings interfaces for each activity mode of the plurality of activity modes. This is shown in FIG. 5R-1, for example, where the first settings interface (e.g., the settings interface 5120) includes an option for enabling/disabling display of a status indicator corresponding to the first activity mode (e.g., via the toggle 5132). Including, in the first user interface and the first settings interface, an option for enabling display, to users other than a user of the computer system, of a status indicator corresponding to the first activity mode, and an option for disabling display of the status indicator corresponding to the first activity mode, reduces the number of inputs needed to display, to users other than a user of the computer system, the status indicator corresponding to the first activity mode (e.g., by configuring the options for enabling or disabling display of the status indicator in the first settings interface, the user does not need to perform additional inputs to enable or disable display of the status indicator (e.g., in the first user interface) each time the first activity mode is activated; by including the options for enabling and disabling display of the status indicator in the first user interface, the user can enable/disable display of the status indicator (e.g., temporarily) without needing to perform additional inputs to navigate to the first settings interface). Reducing the number of inputs needed to perform an operation enhances the operability of the device, which, additionally, reduces power usage and improves battery life of the device by enabling the user to use the device more quickly and efficiently.

In some embodiments, while the displaying first settings interface, the computer system detects (9056) a fifth user input that meets navigation criteria (e.g., a horizontal swipe of at least a threshold length, and that begins away from an edge of the a touch-display or other touch-sensitive surface of the one or more input devices). In response to detecting the fifth user input that meets the navigation criteria, the computer system displays a second settings interface for modifying settings of the second activity mode. (e.g., wherein a swipe gesture satisfies the navigation criteria). This is shown in FIGS. 5AJ-5AK, for example, where while displaying the first settings interface (e.g., the settings interface 5120), the computer system (e.g., the portable multifunction device 100) detects a fifth user input that meets navigation criteria (e.g., the left swipe by the user input 5376, in FIG. 5AJ), and in response, the computer system displays a second settings interface (e.g., the settings interface 5380) for modifying settings of the second activity mode (e.g., the "Sleeping" activity mode). Displaying a second settings interface for modifying settings of the second activity mode, in response to detecting the fifth user input that meets navigation criteria, provides additional control options without cluttering the UI with additional displayed controls (e.g., additional displayed controls for navigating to the second settings interface for modifying settings of the second activity mode). Providing additional control options without cluttering the UI with additional displayed controls enhances the operability of the device, which, additionally, reduces power usage and improves battery life of the device by enabling the user to use the device more quickly and efficiently.

In some embodiments, the first settings interface includes (9058) an option for specifying applications (e.g., sometimes called allowed applications) for which notifications will be provided while the first activity mode is active. This is shown in FIGS. 5X-5Z, for example, where the first settings interface includes an option for specifying application (e.g., as shown in FIG. 5X) for specifying applications for which notifications will be provided while the first activity mode (e.g., the "Working" activity mode) is active (e.g., as indicated by the text in FIG. 5W). Including, in the first settings interface, an option for specifying applications for which notifications will be provided while the first activity mode is active, performs an operation (e.g., provides notifications for the specified application while the first activity mode is active) when a set of conditions has been met (e.g., the notifications are associated with the specified applications) without requiring further user input (e.g., the user does not need to perform additional inputs to navigate to another user interface (e.g., a notification center user interface) that includes notifications that were not displayed in accordance with the first activity mode being active for the computer system). Automatically performing an operation when a set of conditions has been met without requiring further user input enhances the operability of the device, which, additionally, reduces power usage and improves battery life of the device by enabling the user to use the device more quickly and efficiently.

In some embodiments, the first settings interface includes (9060) an option for enabling delivery, while the first activity mode is active, of time-sensitive notifications for a plurality of applications, wherein the time-sensitive notifications satisfy time sensitivity criteria (e.g., an option for enabling delivery of notifications satisfying predefined time sensitivity criteria, for example notifications designated by the originating or receiving application as being time sensitive). This is shown in FIG. 5R-1, for example, where the first settings interface (e.g., the settings interface 5120) includes an option (e.g., the "Time-Sensitive Notifications" option 5126) for enabling delivery of time-sensitive notifications for a plurality of applications. Including, in the first settings interface, an option for enabling delivery, while the first activity mode is active, of time-sensitive notifications for a plurality of applications, wherein the time-sensitive notifications satisfy time sensitivity criteria, performs an operation (e.g., displays time-sensitive notifications while the first activity mode is active) when a set of conditions has been met (e.g., the time-sensitive notifications satisfy the time sensitivity criteria) without requiring further user input (e.g., the user does not need to perform additional inputs to navigate to another user interface (e.g., a notification center user interface) that includes notifications that were not displayed in accordance with the first activity mode being active for the computer system). Performing an operation when a set of conditions has been met without requiring further user input enhances the operability of the device, which, additionally, reduces power usage and improves battery life of the device by enabling the user to use the device more quickly and efficiently. Including this option in the first settings user interface also provides an efficient way for a user to enable a specific set or subset of notifications from multiple applications with a small number of inputs (e.g., one input) by the user, which enhances the operability of the device, and additionally reduces power usage and improves battery life of the device by enabling the user to use the device more quickly and efficiently.

In some embodiments, the first user interface (or a respective user interface) includes (9062) an option to configure a new activity mode, distinct from the first activity mode and the second activity mode. After the new activity mode is configured, an affordance for the new activity mode is displayed in the first user interface. In some embodiments, when a user provides an input corresponding to a request to create a new DND mode (e.g., with the "+" button in FIG. 5D) the user is provided with a plurality of selectable options corresponding to different suggested types of modes (e.g., driving, reading, work, personal time, sleep, etc.), where different suggested types of modes are associated with different graphical representations (e.g., different icons) and different default options for parameters for the activity mode such as automated rules for entering the activity mode and/or rules for allowing notifications associated with applications and or users to be delivered during the activity mode.) This is shown in FIG. 5D, for example, where the first user interface includes an option (e.g., the "+" affordance 5042) to configure a new activity mode, distinct from the first activity mode and the second activity mode (e.g., distinct from the "Working" activity mode, the "Sleeping" activity mode, the "Driving" activity mode, and the "Do Not Disturb" activity mode). Including, in the first user interface, an option to configure a new activity mode, distinct from the first activity mode and the second activity mode, reduces the number of inputs needed to configure a new activity mode (e.g., the user does not need to perform additional inputs to navigate to a settings user interface to configure a new activity mode). Reducing the number of inputs needed to perform an operation enhances the operability of the device, which, additionally, reduces power usage and improves battery life of the device by enabling the user to use the device more quickly and efficiently.

In some embodiments, the computer system displays (9064) in the first user interface a scheduled activation time for the first activity mode or the second activity mode (e.g., a scheduled activation time configured in the settings interface of the first activity mode or the second activity mode). In some embodiments, in the first user interface, a scheduled activation time for a respective activity mode is displayed underneath the mode name. This is shown in FIG. 5D, for example, where the computer system (e.g., the portable multifunction device 100) displays a scheduled activation time for the first activity mode or the second activity mode (e.g., the text "Begins at 11 PM" in the affordance 5012 for the "Sleeping" activity mode). Displaying, in the first user interface, a scheduled activation time for the first activity mode or the second activity mode, provides improved visual feedback to the user (e.g., improved visual feedback regarding the scheduled activation time for the first activity mode or the second activity mode, improved visual feedback regarding which activity mode is scheduled to become active next, etc.). Providing improved feedback enhances the operability of the device, which, additionally, reduces power usage and improves battery life of the device by enabling the user to use the device more quickly and efficiently.

In some embodiments, the computer system displays (9066), in response to a detection of a trigger condition, a notification that includes a prompt to set up or start use of a new activity mode, distinct from the first activity mode and the second activity mode (e.g., if only sleeping and working activity modes have been established, the trigger condition may be detected when the user uses a reader (e.g., book reading) application, and the recommended new activity mode would be a "reading" activity mode; in another example, the new activity mode is a working activity mode, where the trigger condition is using a work application or the user being at a location where the user is known to work). In some embodiments, the notification has a "start" affordance for activating the new activity mode, and/or a "set up" affordance that, when activated, causes the computer system to display a settings interface for modifying settings of the new activity mode. This is shown in FIG. 5AG, for example, where the computer system (e.g., the portable multifunction device 100) displays, in response to a detection of a trigger condition (e.g., a "Books" application is in use), a notification that includes a prompt (e.g., the prompt 5354) to set up or start use of a new activity mode, distinct from the first activity mode and the second activity mode (e.g., a "Reading" activity mode distinct from the existing activity modes (e.g., as shown in FIG. 5D)). Automatically displaying a notification with a recommendation to set up or start using a new activity mode provides increased functionality, without requiring the user to traverse a set of options or affordances for proactively setting up a new activity mode, thereby making use of the electronic device more efficient. Performing an operation when a set of conditions has been met without requiring further user input enhances the operability of the device, which, additionally, reduces power usage and improves battery life of the device by enabling the user to use the device more quickly and efficiently.

It should be understood that the particular order in which the operations in FIGS. 9A-9F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 10000, 11000, 12000, and 13000) are also applicable in an analogous manner to method 9000 described above with respect to FIGS. 9A-9F. For example, the contacts, gestures, and user interface objects described above with reference to method xxx optionally have one or more of the characteristics of the contacts, gestures, and user interface objects described herein with reference to other methods described herein (e.g., methods 10000, 11000, 12000, and 13000). For brevity, these details are not repeated here.

FIGS. 10A-10D are flow diagrams illustrating method 10000 of configuring one or more home screens or home screen pages to be displayed while an activity mode is active, in accordance with some embodiments. Method 10000 is performed at an electronic device (e.g., device 300, FIG. 3, or portable multifunction device 100, FIG. 1A) with a display generation component (e.g., a display controller or display), a touch-sensitive surface, and one or more sensors to detect intensity of contacts with the touch-sensitive surface. In some embodiments, the computer system includes a display that is a touch-screen display and the touch-sensitive surface is on or integrated with the display. In some embodiments, the computer system includes a display or display generation component that is separate from the touch-sensitive surface. Some operations in method 10000 are, optionally, combined and/or the order of some operations is, optionally, changed.

The computer system, in communication with a display generation component and one or more input devices, detects (10002) a first input requesting display of a home screen of the computer system (e.g., while a respective activity mode is active on the computer system (e.g., an electronic device, the portable multifunction device 100, etc.)). In response to detecting (10004) the first input: in accordance with a determination that a first activity mode is active on the computer system, the computer system displays (10006), via the display generation component, a first home screen associated with the first activity mode, and enables provision of first notifications by the computer system in accordance with settings of the first activity mode; and in accordance with a determination that a second activity mode is active on the computer system, the computer system displays (10008), via the display generation component, a second home screen associated with the second activity mode, wherein the second home screen is different from the first home screen, and enables provision of second notifications by the computer system in accordance with settings of the second activity mode, wherein at least some of the settings of the second activity mode are different from the settings of the first activity mode. In some embodiments, the first home screen is a single home screen page. In some embodiments, the first home screen includes a plurality of home screen pages. In such embodiments, while displaying a first home screen page of the plurality of home screen pages, and in response to a user input (e.g., a left or right swipe), the computer system displays a second home screen page of the plurality of home screen pages.

Automatically displaying a first home screen when a first activity mode is active, and displaying a second, different home screen when a second activity mode is active, displays the appropriate home screen when a set of conditions has been met without requiring further user input (e.g., further user input to reconfigure the home screen (e.g., once when activating an activity mode, again when deactivating the activity mode, and again when activating another activity mode, etc.)). Performing an operation when a set of conditions has been met without requiring further user input enhances the operability of the device, which, additionally, reduces power usage and improves battery life of the device by enabling the user to use the device more quickly and efficiently.

In some embodiments, the computer system detects (10010) a user input that activates a settings affordance, and in response to detecting the user input that activates the settings affordance, the computer system displays a settings interface that includes an option for selecting a first respective home screen page to use as the first home screen, and an option for selecting a second respective home screen page, distinct from the first respective home screen page, to use as the second home screen. This is shown in FIGS. 6A-1 and 6B, for example, where in response to detecting the user input that activates the settings affordance (e.g., the user input 6002 on the "Home Screen Pages" affordance 5134, in FIG. 6A-1), the computer system (e.g., the portable multifunction device 100) displays a settings interface that includes an option for selecting a first respective home screen page (e.g., the home screen page selector 6010 for selecting the first home screen page 6008, in FIG. 6B) to use as the first home screen, and an option for selecting a second respective home screen page (e.g., the home screen page selector 6014 for selecting the second home screen page 6012, in FIG. 6B), distinct from the first respective home screen page, to use as the second home screen. In some embodiments, the settings interface includes a first settings interface for selecting settings for the first activity mode and a second settings interface for selecting settings for the second activity mode (e.g., as shown in FIGS. 5AJ and 5AK, respectively). Displaying a settings interface that includes an option for selecting a first respective home screen page to use as the first home screen, and an option for selecting a second respective home screen page, distinct from the first respective home screen page, to use as the second home screen, reduces the number of inputs needed to configure a home screen (e.g., the user does not need to perform additional inputs to reconfigure a home screen each time the first and/or second activity mode is activated/deactivated). Reducing the number of inputs needed to perform an operation enhances the operability of the device, which, additionally, reduces power usage and improves battery life of the device by enabling the user to use the device more quickly and efficiently.

In some embodiments, the first home screen is (10012) one page of a first plurality of home screen pages, and the second home screen is one page of a second plurality of home screen pages different from the first plurality of home screen pages. This is shown in FIGS. 6F-2-6F-3 and 6J-3, for example, where the home screen 6016 for the "Do Not Disturb" activity mode is different from the first plurality of home screen pages (e.g., the home screen 6008 and the home screen 6030, for the "Working" activity mode). In some embodiments, the first plurality of home screen pages are selected for the first activity mode using a settings interface, the second plurality of home screen pages are selected for the second activity mode using the settings interface, and least two pages second plurality of home screen pages are different from pages of the first plurality of home screen pages. Displaying a first home screen associated with a first activity mode, in accordance with a determination that the first activity mode is active on the computer system, wherein the first home screen is one page of a first plurality of home screen pages, and displaying a second home screen associated with a second activity mode, in accordance with a determination that the second activity mode is active on the computer system, wherein the second home screen is one page of a second plurality of home screen pages different from the first plurality of home screen pages, automatically performs an operation (e.g., displaying the first or second home screen) when a set of conditions has been met (e.g., in accordance with a determination that the first or second activity mode is active), without requiring further user input (e.g., further user input to customize a home screen page after activating a respective activity mode). Automatically performing an operation when a set of conditions has been met without requiring further user input enhances the operability of the device, which, additionally, reduces power usage and improves battery life of the device by enabling the user to use the device more quickly and efficiently.

In some embodiments, the first plurality of home screen pages includes (10014) at least one home screen page also included in the second plurality of home screen pages. In some embodiments, the at least one home screen page is displayed when both the first activity mode is active, and when the second activity mode is active. In some embodiments, home screen pages (e.g., including the at least one home screen page) included in both the first plurality of home screen pages and the second plurality of home screen pages, are displayed in the same order. This is shown in FIGS. 6F-2 and FIG. 6J-2, for example, where the home screen 6008 for the "Working" activity mode and the home screen 6008 for the "Do Not Disturb" activity mode both correspond to the home screen page 6008 in the settings interface (e.g., as shown in FIGS. 6B and 6H). Displaying a first home screen associated with a first activity mode, in accordance with a determination that the first activity mode is active on the computer system, and displaying a second home screen associated with a second activity mode, in accordance with a determination that the second activity mode is active on the computer system, wherein the first plurality of home screen pages includes at least one home screen page also included in the second plurality of home screen pages, automatically performs an operation (e.g., displaying the appropriate home screen pages in the first or second plurality of home screen pages) when a set of conditions has been met (e.g., in accordance with a determination that the first or second activity mode is active), without requiring further user input (e.g., further user input to customize the home screens included in the first or second plurality of home screen pages after activating the first or second activity mode, respectively). Automatically performing an operation when a set of conditions has been met without requiring further user input enhances the operability of the device, which, additionally, reduces power usage and improves battery life of the device by enabling the user to use the device more quickly and efficiently.

In some embodiments, the first plurality of home screen pages includes (10016) at least one home screen page that is not included in the second plurality of home screen pages (e.g., the home screen pages for the first activity mode include at least one home screen page not include in the home screen pages for the second activity mode). This is shown in FIG. 6F-3, for example, where the home screen 6030 for the "Working" activity mode is not shown in the second plurality of home screen pages (e.g., the home screen 6008 and the home screen 6018, for the "Do Not Disturb" activity mode, as shown in FIGS. 6J-2 and 6J-3). Displaying a first home screen associated with a first activity mode, in accordance with a determination that the first activity mode is active on the computer system, and displaying a second home screen associated with a second activity mode, in accordance with a determination that the second activity mode is active on the computer system, wherein the first plurality of home screen pages includes at least one home screen page that is not included in the second plurality of home screen pages, automatically performs an operation (e.g., displaying the appropriate home screen pages in the first or second plurality of home screen pages) when a set of conditions has been met (e.g., in accordance with a determination that the first or second activity mode is active), without requiring further user input (e.g., further user input to customize the home screens included in the first or second plurality of home screen pages after activating the first or second activity mode, respectively). Automatically performing an operation when a set of conditions has been met without requiring further user input enhances the operability of the device, which, additionally, reduces power usage and improves battery life of the device by enabling the user to use the device more quickly and efficiently.

In some embodiments, the second plurality of home screen pages includes (10018) at least one home screen page that is not included in the first plurality of home screen pages (e.g., the home screen pages for the second activity mode include at least one home screen page not include in the home screen pages for the first activity mode). This is shown in FIG. 6J-3, for example, where the home screen 6016 for the "Do Not Disturb" activity mode is not included in the first plurality of home screen pages (e.g., the home screen 6008 and the home screen 6030, for the "Working" activity mode). Displaying a first home screen associated with a first activity mode, in accordance with a determination that the first activity mode is active on the computer system, and displaying a second home screen associated with a second activity mode, in accordance with a determination that the second activity mode is active on the computer system, wherein the second plurality of home screen pages includes at least one home screen page that is not included in the first plurality of home screen pages, automatically performs an operation (e.g., displaying the appropriate home screen pages in the first or second plurality of home screen pages) when a set of conditions has been met (e.g., in accordance with a determination that the first or second activity mode is active), without requiring further user input (e.g., further user input to customize the home screens included in the first or second plurality of home screen pages after activating the first or second activity mode, respectively). Automatically performing an operation when a set of conditions has been met without requiring further user input enhances the operability of the device, which, additionally, reduces power usage and improves battery life of the device by enabling the user to use the device more quickly and efficiently.

In some embodiments, the computer system detects (10020) a user input that activates a settings affordance. In response to detecting the user input that activates the settings affordance, the computer system displays a settings interface that includes options for configuring one or more settings of a respective activity mode (e.g., the first activity mode or the second activity mode), including an option to select a home screen page to be included in the first plurality of home screen pages (e.g., if the settings affordance is for the second activity mode, display options for configuring settings corresponding to the second activity mode, including an option to select a home screen page to be included in the second plurality of home screen pages). This is shown in FIGS. 6A-1-6C, for example, where in response to detecting the user input that activates the settings affordance (e.g., the user input 6002 on the "Home Screen Pages" affordance 5134 in FIG. 6A-1), the computer system (e.g., the portable multifunction device 100) displays a settings interface that includes options for configuring one or more settings of a respective activity mode, including an option to select a home screen page to be included in the first plurality of home screen pages (e.g., the home screen page selector 6032 for selecting the home screen page 6030, e.g., in response to the user input 6034 on the home screen page selector 6032, as shown in FIG. 6C). Displaying a settings interface that includes options for configuring one or more settings of a respective activity mode, including an option to select a home screen page to be included in the first plurality of home screen pages, reduces the number of inputs needed to display the appropriate home screen pages in the first plurality of home screen pages (e.g., while the first activity mode is active) (e.g., the user does not need to perform additional inputs to configure the home screen pages included in the first plurality of home screen pages each time the first activity mode is activated). Reducing the number of inputs needed to perform an operation enhances the operability of the device, which, additionally, reduces power usage and improves battery life of the device by enabling the user to use the device more quickly and efficiently.

In some embodiments, at least one home screen page is available (10022) for selection for inclusion in the first plurality of home screen pages and inclusion in the second plurality of home screen pages. This is shown in FIGS. 6B and 6H, for example, where the home screen page 6008 is available for selection for inclusion in the first plurality of home screen pages (e.g., as shown in FIG. 6F-2) and inclusion in the second plurality of home screen pages (e.g., as shown in FIG. 6J-2). Including an option to select a home screen page, wherein at least one home screen page is available for selection for inclusion in the first plurality of home screen pages and inclusion in the second plurality of home screen pages, reduces the number of inputs to configure the same home screen page for multiple activity modes (e.g., a user does not need to separately configure multiple home screen pages, each associated with a different activity mode, with identical settings). Reducing the number of inputs needed to perform an operation enhances the operability of the device, which, additionally, reduces power usage and improves battery life of the device by enabling the user to use the device more quickly and efficiently.

In some embodiments, a respective home screen page (e.g., each home screen page) in the first plurality of home screen pages includes (10024) a respective background region, and the settings interface includes an option to configure the respective background region for the respective home screen page (e.g., a respective home screen page for the first activity mode). In some embodiments, the selected home screen wallpaper for a respective activity mode is shared by multiple (or all) home screen pages for that mode, and thus is displayed when any (or all) home screen pages are displayed in the respective activity mode. In some embodiments, the settings interface includes an option to configure a background region of (e.g., to select wallpaper for) a wake page displayed while the respective activity mode is active. This is shown in FIG. 6E, for example, where settings interface includes an option to configure the respective background region for the respective home screen page (e.g., the "Choose a New Wallpaper" affordance 6036). Including, in the settings interface, an option to configure the background region for a respective home screen page provides improved visual feedback to the user (e.g., improved visual feedback in the form of custom wallpaper, which indicates the currently active activity mode). Providing improved feedback enhances the operability of the device, which, additionally, reduces power usage and improves battery life of the device by enabling the user to use the device more quickly and efficiently.

In some embodiments, the settings interface includes (10026) an option for configuring at least one of a start time and an end time for the respective activity mode. This is shown in FIG. 5R-1, for example, where the settings interface (e.g., user interface 5120), includes an option for configuring at least one of a start time and an end time for the respective activity mode (e.g., by adding a new time-based automation through the "+" affordance 5138, or by modifying an existing automation schedule (e.g., the first automation schedule 5142)). Including, in the settings interface, an option for configuring at least one of a start time and an end time for the respective activity mode, automatically performs an operation (e.g., initiating activation of the respective activity mode, or deactivating the respective activity mode) when a set of conditions has been met (e.g., the current time is the start time for the respective activity mode, or is the end time for the respective activity mode) without requiring further user input (e.g., manual user input to initiate activation of the respective activity mode). Automatically performing an operation when a set of conditions has been met without requiring further user input enhances the operability of the device, which, additionally, reduces power usage and improves battery life of the device by enabling the user to use the device more quickly and efficiently.

In some embodiments, the settings interface includes (10028) an option for enabling delivery of notifications, in response to requests by other users, with respect to notifications that are otherwise blocked or deferred while a respective activity mode is active (e.g., the "Show Away Status" option 5130 in FIG. 5R-1) enables other users to see that user is a DND mode and to override the DND mode (e.g., as shown in FIGS. 5N-5O)). In some embodiments, the settings interface includes an option (e.g., as shown in FIGS. 5R-1-5V) for specifying a set of one or more other users from whom messages, and corresponding notifications, are to be delivered while the respective activity mode is active. Including, in the settings interface, an option for enabling delivery of notifications, in response to requests by other users, with respect to notifications that are otherwise blocked or deferred while a respective activity mode is active, reduces the number of inputs needed to enable delivery of desired notifications (e.g., the user does not need to perform additional inputs to deactivate an active activity mode, or reconfigure settings for the active activity mode, to enable delivery of certain notifications (e.g., urgent notifications)). Reducing the number of inputs needed to perform an operation enhances the operability of the device, which, additionally, reduces power usage and improves battery life of the device by enabling the user to use the device more quickly and efficiently.

In some embodiments, the settings interface includes (10030) an option that configures a brightness with which a wake screen user interface is displayed while the respective activity mode is active. This is shown in FIG. 6E, for example, where the settings interface includes an option (e.g., the "Dim Lock Screen" affordance 6042) that configures a brightness with which a wake screen user interface (e.g., a lock screen) is displayed (e.g., the lock screen is dimmed) while the respective activity mode is active. Including, in the settings interface, an option that configures a brightness with which a wake screen user interface is displayed while the respective activity mode is active, provides improved visual feedback to the user (e.g., improved visual feedback that an activity mode is active, improved visual feedback regarding which activity mode (e.g., of a plurality of activity modes) is active, etc.). Providing improved feedback enhances the operability of the device, which, additionally, reduces power usage and improves battery life of the device by enabling the user to use the device more quickly and efficiently.

In some embodiments, the settings interface includes (10032) an option for forgoing display of notification indicators (e.g., a notifications count of pending notifications) on application icons while the respective activity mode is active. This is shown in FIG. 6E, for example, where the settings interface includes an option (e.g., the "Hide Notification Badges" affordance 6050) for forgoing display of notification indicators (e.g., as shown in FIGS. 6F-2 and 6F-3, where no notification indicators are displayed (e.g., on the phone and mail application, in contrast to FIGS. 6J-2 and 6J-3). Including, in the settings interface, an option for forgoing display of notification indicators on application icons while the respective activity mode is active, reduces the number of inputs needed to forgo display of indicators on application icons (e.g., the user does not need to perform additional inputs to forgo display of indicators on application icons each time the respective activity mode is activated). Reducing the number of inputs needed to perform an operation enhances the operability of the device, which, additionally, reduces power usage and improves battery life of the device by enabling the user to use the device more quickly and efficiently.

In some embodiments, the settings interface includes (10034) an option for suppressing notifications on a user interface corresponding to a locked state of the computer system. In some embodiments, a separate option, for suppressing notifications a user interface corresponding to the locked state of the computer system, is provided for each distinct activity mode of a plurality of activity modes. This is shown in FIG. 6E, for example, where the settings interface includes an option for suppressing notifications (e.g., the "Show Notifications on Lock Screen" affordance 6046) on a user interface corresponding to a locked state of the computer system (e.g., as shown in FIG. 6F-1, where no notifications are shown on a lock screen corresponding to a locked state of the portable multifunction device 100). Including, in the settings interface, an option for suppressing notifications on a user interface corresponding to a locked state of the computer system, reduces the number of inputs needed to suppress notifications on a user interface corresponding to a locked state of the computer system (e.g., the user does not need to perform additional inputs to suppress notifications on a user interface corresponding to a locked state of the computer system each time the respective activity mode is activated). Reducing the number of inputs needed to perform an operation enhances the operability of the device, which, additionally, reduces power usage and improves battery life of the device by enabling the user to use the device more quickly and efficiently.

In some embodiments, the first home screen includes (10036) a first plurality of application user interface elements (e.g., widgets and/or application icons), and the second home screen includes a second plurality of application user interface elements (e.g., widgets and/or application icons), different from the first plurality of application user interface elements (e.g., the second plurality of application UI elements in the second home screen includes a different number of elements, at least one element of a different size than a corresponding element of the first home screen, at least one element at a different location than a corresponding element of the first home screen, and/or one or more elements corresponding to different applications than the elements of the first plurality of elements in the first home screen, etc.). This is shown in FIGS. 6F-3 and 6J-3, for example, where the home screen 6030 for the "Working" activity mode" includes a plurality of application icons and widgets, and the home screen 6016 for the "Do Not Disturb" activity mode includes a plurality of application icons and widgets, different from those included in the home screen 6030 (e.g., home screen 6030 includes widgets 7 and 8, while home screen 6016 does not include widgets 7 and 8, and includes only widget 3). Displaying a first home screen associated with a first activity mode, in accordance with a determination that the first activity mode is active on the computer system, wherein the first home screen includes a first plurality of application user interface elements, and displaying a second home screen associated with a second activity mode, in accordance with a determination that the second activity mode is active on the computer system, wherein the second home screen includes a second plurality of application user interface elements different from the first plurality of application user interface elements, automatically performs an operation (e.g., displaying the first or second home screen) when a set of conditions has been met (e.g., in accordance with a determination that the first or second activity mode is active), without requiring further user input (e.g., further user input to customize a home screen page after activating a respective activity mode). Automatically performing an operation when a set of conditions has been met without requiring further user input enhances the operability of the device, which, additionally, reduces power usage and improves battery life of the device by enabling the user to use the device more quickly and efficiently.

In some embodiments, the computer system automatically activates (10038) the first activity mode in accordance with predefined criteria. In some embodiments, when a "Do Not Disturb" activity mode is enabled automatically (e.g., based on an automation or schedule), the device displays a banner that indicates which mode has been activated. In some embodiments, the banner includes an "X" affordance (e.g., the "X" affordance 5370) to exit the mode. In some embodiments, the banner will automatically dismiss after a time threshold, or the banner can be manually dismissed (e.g., by swiping away the banner), either of which will allow the "Do Not Disturb" activity mode to remain active. This is shown in FIG. 5AH, for example, where the computer system (e.g., the portable multifunction device 100) automatically activates the first activity mode (e.g., the "Reading" activity mode) in accordance with predefined criteria (e.g., the "Books" application is in use). The computer system displays a banner (e.g., the banner 5368 including an "X" button (e.g., the "X" affordance 5370) to exit the mode. Automatically activating the first activity mode in accordance with predefined criteria, automatically performs an operation (e.g., activates the first activity mode) when a set of conditions has been meet (e.g., the predefined criteria are met) without requiring further user input (e.g., further user input to manually activate the first activity mode). Automatically performing an operation when a set of conditions has been met without requiring further user input enhances the operability of the device, which, additionally, reduces power usage and improves battery life of the device by enabling the user to use the device more quickly and efficiently.

In some embodiments, the computer system activates (10040) the first activity mode in response to a user input.

This is shown in FIGS. 5D-5G, for example, where the computer system (e.g., the portable multifunction device 100) activates the first activity mode (e.g., the "Working" activity mode) in response to a user input (e.g., the user input on the affordance 5010 that corresponds to the "Working" activity mode). Activating the first activity mode in response to a user input, and displaying a first home screen associated with a first activity mode in accordance with a determination that the first activity mode is active on the computer system, performs an operation (e.g., displaying the first home screen) when a set of conditions has been met (e.g., the first activity mode has been activated in response to a user input), without requiring further user input (e.g., further user input to customize a home screen page after activating a respective activity mode). Performing an operation when a set of conditions has been met without requiring further user input enhances the operability of the device, which, additionally, reduces power usage and improves battery life of the device by enabling the user to use the device more quickly and efficiently.

In some embodiments, the computer system detects (10042) the user input while displaying a wake screen (e.g., from a locked state of the electronic device). Activating the first activity mode in response to a user input detected while displaying a wake screen, and displaying a first home screen associated with a first activity mode in accordance with a determination that the first activity mode is active on the computer system, performs an operation (e.g., displaying the first home screen) when a set of conditions has been met (e.g., the first activity mode has been activated in response to a user input), without requiring further user input (e.g., further user input to customize a home screen page after activating a respective activity mode). Performing an operation when a set of conditions has been met without requiring further user input enhances the operability of the device, which, additionally, reduces power usage and improves battery life of the device by enabling the user to use the device more quickly and efficiently.

It should be understood that the particular order in which the operations in FIGS. 10A-10D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 11000, 12000, and 13000) are also applicable in an analogous manner to method 10000 described above with respect to FIGS. 10A-10D. For example, the contacts, gestures, and/or user interface objects described above with reference to method xxx optionally have one or more of the characteristics of the contacts, gestures, and/or user interface objects described herein with reference to other methods described herein (e.g., methods 9000, 11000, 12000, and 13000). For brevity, these details are not repeated here.

FIGS. 11A-11H are flow diagrams illustrating method 11000 of configuring and interacting with bundled notifications (e.g., digests) in accordance with some embodiments. Method 11000 is performed at an electronic device (e.g., device 300, FIG. 3, or portable multifunction device 100, FIG. 1A) with a display generation component (e.g., a display controller or display), a touch-sensitive surface, and one or more sensors to detect intensity of contacts with the touch-sensitive surface. In some embodiments, the computer system includes a display that is a touch-screen display and the touch-sensitive surface is on or integrated with the display. In some embodiments, the computer system includes a display or display generation component that is separate from the touch-sensitive surface. Some operations in method 11000 are, optionally, combined and/or the order of some operations is, optionally, changed.

While a user is using (11002) the computer system, the computer system detects (11004) the occurrence of a first plurality of events including a first event corresponding to a first application, wherein the first event is associated with a first time, and a second event corresponding to a second application that is different from the first application, wherein the second event is associated with a second time (e.g., wherein each of the plurality of events is associated with a notification). At a first delivery time that is after the first time and after the second time, the computer system provides (11006) notifications corresponding to the first plurality of events as a first bundled notification that includes an indication of the first event (e.g., an indication of content associated with the first event) and an indication of the second event (e.g., an indication of content associated with the second event), wherein a notification for the first event was not provided prior to the first delivery time and a notification for the second event was not provided prior to the first delivery time. In some embodiments, notifications that are not provided in the bundled notification (e.g., because they are notification that are not configured in the settings interface for a respective activity mode as notifications that are to be bundled, or because they are notifications configured in the settings interface for the respective activity mode as notifications that are provided while the respective activity mode is active (e.g., notifications associated with people or applications for which notifications are enabled in the respective activity mode)) are delivered as normal (e.g., immediately, at the time associated with a respective event for the respective notification, etc.) rather than at the first delivery time.

Automatically providing, at first (e.g., previously scheduled) delivery time, notifications corresponding to a first plurality of events as a first bundled notification that includes an indication of a first event and an indication of a second event, reduces the number of inputs needed to display the notifications corresponding to the first plurality of events. In addition, providing a first bundled notification at the first delivery time, reduces the need for the user to interact with the computer system at multiple times (e.g., at both the first time and the second time), which can help prevent distractions caused by the computer system (e.g., during periods when the user's attention should be focused elsewhere (e.g., while working), during periods when the user does not want to be distracted (e.g., while sleeping, working, etc.). Reducing the number of inputs needed to perform an operation enhances the operability of the device, which, additionally, reduces power usage and improves battery life of the device by enabling the user to use the device more quickly and efficiently.

Additionally, providing the first bundled notification at the first delivery time, instead of multiple notifications at multiple times (e.g., the notification corresponding to the first event at the first time, and the second notification corresponding to the second event at the second time), further reduces power usage and improves battery life of the device, as it reduces the number of times the device must provide a notification (e.g., which may involve waking the device and/or increasing the brightness of the screen).

In some embodiments, the notifications corresponding to the first plurality of events are ordered (11008) in the first bundled notification in a non-chronological order based on importance criteria of the respective events. This is shown in FIG. 7T, for example, where the notifications in the portion 7230 appear above (e.g., before) notifications in the "More Updates" portion 7236 based on importance criteria (e.g., rather than being ordered in chronological order). As shown in FIG. 7W, in which the "emails and messages" portion of the digest has been expanded, the "emails and messages" portion of the digest includes notifications for events earlier than at least one of the "News" notifications, but are nonetheless displayed above the news notification(s) in the digest. Furthermore, in some embodiments, within any portion of the digest, such as the "emails and messages" portion, the notifications are displayed in chronological order (e.g., with notifications for the most recent events (e.g., message) being displayed notifications for less recent events), while, as a whole, the notifications in the digest are displayed in a non-chronological order based on importance criteria of the respective events.

Ordering the first plurality of events in the first bundled notification in a non-chronological order based on importance criteria of the respective events reduces the number of inputs needed to navigate to notifications corresponding to important events (e.g., the user does not need to perform additional inputs to navigate through a chronological list of notifications in order to navigate to notifications corresponding to important events). Reducing the number of inputs needed to perform an operation enhances the operability of the device, which, additionally, reduces power usage and improves battery life of the device by enabling the user to use the device more quickly and efficiently.

In some embodiments, the importance criteria include (11010) a criterion based on a determination of whether a respective event corresponds to a communication received by the computer system. The computer system orders events corresponding to communications received by the computer system with a higher priority than events, which do not correspond to communications received by the computer system, having event types corresponding to a predefined set of event types (e.g., assigned a lower priority). This is shown in FIG. 7T, for example, where the "Emails & Messages" portion 7228 is ordered above (e.g., before) other portions (e.g., the portion 7230 and the "More Updates" portion) because the "Emails & Messages" portion 7228 includes notifications corresponding to communications received by the computer system (e.g., the portable multifunction device 100). Ordering events corresponding to communications received by the computer system with a higher priority than events, which do not correspond to communications received by the computer system, having event types corresponding to a predefined set of event types, reduces the number of inputs needed to navigate to communications received by the computer system (e.g., the user does not need to perform additional inputs to navigate through a chronological list of notifications that includes notifications that are not communications, and which the user does not need to respond to). Reducing the number of inputs needed to perform an operation enhances the operability of the device, which, additionally, reduces power usage and improves battery life of the device by enabling the user to use the device more quickly and efficiently.

In some embodiments, the importance criteria include (11012) a criterion based on a level of user interaction with the respective event. The computer system orders events associated with higher levels of user interaction with a higher priority than events associated with lower levels of user interaction. This is shown in FIG. 7T, for example, where notifications in the portion 7230 appear above (e.g., before) notifications in the "More Updates" portion 7236 based on importance criteria (e.g., importance criteria based on a level of user interaction with respective events (e.g., always reading news stories for a news application that is associated with the notification 7232)). Ordering events associated with higher levels of user interaction with a higher priority than events associated with lower levels of user interaction reduces the number of inputs needed to navigate to notifications corresponding to events associated with higher levels of user interaction or higher levels of interest to the user (e.g., the user does not need to perform additional inputs to navigate through a chronological list of notifications that includes notifications corresponding to events associated with low/lower levels of user interaction). Reducing the number of inputs needed to perform an operation enhances the operability of the device, which, additionally, reduces power usage and improves battery life of the device by enabling the user to use the device more quickly and efficiently.

In some embodiments, the computer system displays (11014) the first bundled notification, and displays, in the first bundled notification, indications of events meeting higher importance criteria with a greater prominence than indications of events meeting lower importance criteria. This is shown in FIG. 7T, for example, where the notification 7232 and the notification 7234 are displayed with a greater prominence (e.g., a larger size) than indications of events meeting lower importance criteria (e.g., the notifications in the "More Updates" portion 7236, which show only application icons corresponding to the notifications in the "More Updates" portion 7236). Displaying, in the first bundled notification, events meeting higher importance criteria with a greater prominence of events meeting lower importance criteria provides improved visual feedback to the user (e.g., improved visual feedback regarding which indications of events are most likely to be relevant to the user (e.g., due to the event type, due to the level of user interaction associated with the event(s), etc.)). Providing improved feedback enhances the operability of the device, which, additionally, reduces power usage and improves battery life of the device by enabling the user to use the device more quickly and efficiently.

In some embodiments, the notifications for the first event and the second event were not provided (11016) prior to the first delivery time in accordance with a determination that a reduced notification mode was active on the computer system at both the first time and the second time. In some embodiments, detecting the first plurality of events occurs while a reduced notification mode (e.g., a respective activity mode) is active on the computer system. In some embodiments, the first plurality of events are bundled in accordance with settings for a respective activity mode. This is shown in FIG. 7S, for example, where notifications (e.g., the six notifications in the digest 7208, as indicated by the count 7210) were not provided prior to the first delivery time (e.g., a delivery time of 4:45 PM, when the "Working" activity mode was deactivated) in accordance with a determination that a reduced notification mode (e.g., the "Working" activity mode) was active on the computer system (e.g., the portable multifunction device 100) at both the first time and the second time. Providing notifications corresponding to the first plurality of events as a first bundled notification that includes an indication of the first event and an indication of the second event, wherein the notifications for the first event and the second event were not provided prior to the first delivery time in accordance with a determination that a reduced notification mode was active on the computer system at both the first time and the second time, reduces the number of inputs needed to display the indication of the first event and the indication of the second event (e.g., the first bundled notification is provided (e.g., at a first delivery time that is a time when the reduced notification mode is deactivated) without the user needing to perform additional inputs (e.g., to navigate to a notification center) in order to view notifications corresponding to events that were not provided in accordance with a determination that a reduced notification mode was active on the computer system). Reducing the number of inputs needed to perform an operation enhances the operability of the device, which, additionally, reduces power usage and improves battery life of the device by enabling the user to use the device more quickly and efficiently.

In some embodiments, the computer system detects (11018) the first plurality of events when a reduced notification mode is active; wherein first settings for the reduced notification mode disable delivery of notifications corresponding to the first plurality of events while the reduced notification mode is active. The computer system detects, while the reduced notification mode is not active, occurrence of a second plurality of events that correspond to notifications for which the first settings for the reduced notification mode disable delivery. For example, the events in the second plurality of events are events of the same types (e.g., associated with the same applications or persons) as events that are deferred when the reduced notification mode is active. The computer system delivers notifications corresponding to the second plurality of events in a same chronological order as the second plurality of events are detected. In some circumstances, the computer system has one or more reduced notification modes (e.g., activity modes), but occurrence of the events in the second plurality of events is detected when none of the one or more reduced notification modes is active, and therefore notifications for the events in the second plurality of events are delivered normally, without being bundled and delivered at scheduled delivery times for bundled notifications. This is shown in FIG. 7AE, for example, where notifications 7294 (e.g., a fitness application notification) and 7296 (e.g., a message notification) are displayed in chronological order (e.g., with notifications for the most recent events being show above notifications for less recent events), and correspond to events detected while no reduced notification mode is active, and thus are not included in a digest such as digest 7224 (shown in FIG. 7T) (e.g., the notifications 7294 and 7296 are not bundled). As shown in FIG. 7AE, the notifications 7294 and 7296 are delivered in a same chronological order as the order in which the corresponding events are detected. Furthermore, further notifications for these same events would have been displayed in non-chronological order in a bundled notification for a respective activity mode (e.g., in accordance with settings for the respective activity mode) if the respective activity mode had been active while the events were detected. Delivering notifications corresponding to a second plurality of events in a same chronological order as the second plurality of events are detected, wherein the occurrence of the second plurality of events are detected while the reduced notification mode is not active, automatically performs an operation (e.g., delivering notifications corresponding to the second plurality of events in chronological order) when a set of conditions has been met (e.g., the reduced notification mode is not active during occurrence of the second plurality of events) without requiring further user input (e.g., further user input to reconfigure notification delivery settings for the computer system). Automatically performing an operation, or reducing the number of inputs needed to perform the operation, enhances the operability of the device, which, additionally, reduces power usage and improves battery life of the device by enabling the user to use the device more quickly and efficiently.

In some embodiments, the first delivery time is (11020) a time when the reduced notification mode is deactivated. This is shown in FIGS. 7R-7S, where the reduced notification mode is deactivated (e.g., via the user input 7206 on the affordance 5006 in FIG. 7R), and the first delivery time is the time when the reduced notification mode is deactivated (e.g., the digest 7208 is delivered at a delivery time of 4:45 PM in FIG. 7S, and 4:45 PM is the time when the "Working" activity mode was deactivated in FIG. 7R). Providing notifications corresponding to the first plurality of events as a first bundled notification that includes an indication of the first event and an indication of the second event, wherein the notifications for the first event and the second event were not provided prior to the first delivery time in accordance with a determination that a reduced notification mode was active on the computer system at both the first time and the second time, at a first delivery time that is a time when the reduced notification mode is deactivated, reduces the number of inputs needed to display the indication of the first event and the indication of the second event (e.g., the first bundled notification is provided without the user needing to perform additional inputs (e.g., to navigate to a notification center) in order to view notifications corresponding to events that were not provided in accordance with a determination that a reduced notification mode was active on the computer system). Reducing the number of inputs needed to perform an operation enhances the operability of the device, which, additionally, reduces power usage and improves battery life of the device by enabling the user to use the device more quickly and efficiently.

In some embodiments, the computer system detects (11022) the first plurality of events when a reduced notification mode is active. The computer system detects, while the reduced notification mode is not active, occurrence of a third plurality of events, and the computer system delivers notifications corresponding to at least some events (e.g., a first subset) of the third plurality of events in a non-chronological order based on importance criteria of the respective events, and delivering notifications corresponding to at least some (e.g., a third subset, or all other events) events of the third plurality of events in chronological order (e.g., the notification 7238 is delivered in chronological order). This is shown in FIG. 7T, for example, where a reduced notification mode is not active (e.g., the "Working" mode was deactivated in 4:45 PM, as shown in FIG. 7S, and no activity mode is active between 4:45 PM and 6:00 PM) and the computer system (e.g., the portable multifunction device 100) delivers notifications corresponding to at least some events of the third plurality of events in a non-chronological order based on importance criteria (e.g., the notifications included in the digest 7224, in non-chronological order), and delivers notifications corresponding to at least some of the third plurality of events Delivering notifications corresponding to at least some events of the third plurality of events in a non-chronological order based on importance criteria of the respective events, and delivering notifications corresponding to at least some of the third plurality of events notification in chronological order, reduces the number of inputs needed to navigate to a desired indication of an event (e.g., indications of events meeting higher importance criteria may be ordered before (e.g., in a non-chronological order with respect to) indications of events that do not meet the higher importance criteria, to reduce the need for additional inputs (e.g., scrolling) to navigate through indications of events that do not meet the higher important criteria). Reducing the number of inputs needed to perform an operation enhances the operability of the device, which, additionally, reduces power usage and improves battery life of the device by enabling the user to use the device more quickly and efficiently.

In some embodiments, the first delivery time is (11024) a first scheduled delivery time. This is shown in FIGS. 7C and 7T, for example, where a first delivery time is 6:00 PM (e.g., as configured in FIG. 7C), and the digest 7224 is delivered at 6:00 PM (as shown in FIG. 7T). Providing notifications corresponding to the first plurality of events as a first bundled notification that includes an indication of the first event and an indication of the second event, at a first delivery time that is a first scheduled delivery time, reduces the number of inputs needed to display the indication of the first event and the indication of the second event (e.g., the user does not need to perform additional inputs to display the indication of the first event and the indication of the second event, as the indications will be included in the first bundled notification delivered at the first delivery time that is a first scheduled delivery time) and reduces the number of inputs needed to interact with the indication of the first event and the indication of the second event (e.g., rather than having to view and interact with an indication of the first event at the first time, then later having to view and interact with an indication of the second event at the second time, the user can view and interact with both the indication of the first event and the indication of the second event at the first delivery time, etc.). Reducing the number of inputs needed to perform an operation enhances the operability of the device, which, additionally, reduces power usage and improves battery life of the device by enabling the user to use the device more quickly and efficiently.

In some embodiments, the first scheduled delivery time is (11026) a time selected by a user of the computer system. This is shown in FIG. 7C, where the "Morning" delivery time 7040, the "Evening" delivery time 7046, and the "Custom 1" delivery time 7052 are times selected by a user (e.g., configured by the user in the user interface 7014). Providing notifications corresponding to the first plurality of events as a first bundled notification that includes an indication of the first event and an indication of the second event, at a first delivery time that is a time selected by a user of the computer system, reduces the number of inputs needed to display the indication of the first event and the indication of the second event (e.g., the user does not need to perform additional inputs to display the indication of the first event and the indication of the second event, as the indications will be included in the first bundled notification delivered at the first delivery time that is a first scheduled delivery time) and reduces the number of inputs needed to interact with the indication of the first event and the indication of the second event (e.g., rather than having to view and interact with an indication of the first event at the first time, then later having to view and interact with an indication of the second event at the second time, the user can view and interact with both the indication of the first event and the indication of the second event at the first delivery time selected by the user (e.g., a time that the user selects because it is a time the user knows is convenient for interacting with indications of events), etc.). Reducing the number of inputs needed to perform an operation enhances the operability of the device, which, additionally, reduces power usage and improves battery life of the device by enabling the user to use the device more quickly and efficiently.

In some embodiments, after the first delivery time, the computer system detects (11028) the occurrence of a fourth plurality of events including a third event corresponding to a third application, wherein the third event is associated with a third time, and a fourth event corresponding to a fourth application that is different from the third application, wherein the fourth event is associated with a fourth time (e.g., wherein each of the plurality of events is associated with a notification), wherein the third time and the fourth time are after the first delivery time. At a second delivery time that is after the third time, after the fourth time, and after the first delivery time, the computer system provides notifications corresponding to the fourth plurality of events as a second bundled notification that includes an indication of the third event (e.g., an indication of content associated with the first event) and an indication of the fourth event (e.g., an indication of content associated with the second event), wherein a notification for the third event was not provided prior to the second delivery time and a notification for the fourth event was not provided prior to the second delivery time. This is shown in FIGS. 7C, 7T and 7U, for example, where after a first delivery time (e.g., the "Evening" delivery time 7046 is 6:00 PM, as configured in FIG. 7C), the second delivery time (e.g., the "Morning" delivery time 7040 is 8:00 AM (of the next day), as configured in FIG. 7C), and a second bundled notification (e.g., the digest 7240 in FIG. 7U) is provided at the second delivery time (e.g., 8:00 AM) and includes an indication of the third event (e.g., an event corresponding to an "Activity" application (e.g., as shown by a notification 7250), and an event corresponding to a "Bank" application, in FIG. 7U). Providing notifications corresponding to the fourth plurality of events as a second bundled notification that includes an indication of the third event and an indication of the fourth event, at a second delivery time that is after the third time, reduces the number of inputs needed to navigate to the indication of the third event and the indication of the fourth event (e.g., without providing the second bundled notification at the second delivery time, the first bundled notification provided at the first delivery time may include a large number of indications of events, which in turn, may require the user to perform additional inputs (e.g., scrolling) to navigate through the first bundled notification in order to navigate to the indication of the third event and the indication of the fourth event). Reducing the number of inputs needed to perform an operation enhances the operability of the device, which, additionally, reduces power usage and improves battery life of the device by enabling the user to use the device more quickly and efficiently.

In some embodiments, the second delivery time is (11030) a scheduled delivery time selected by a user of the computer system. This is shown in FIG. 7C, for example, where the first delivery time (e.g., the "Evening" delivery time 7046) is 6:00 PM and the second delivery time (e.g., the "Morning" delivery time 7040) is a scheduled delivery time selected by a user of the computer system (e.g., configured in the user interface 7014). Providing notifications corresponding to the fourth plurality of events as a second bundled notification that includes an indication of the third event and an indication of the fourth event, at a second delivery time selected by a user of the computer system, reduces the number of inputs needed to navigate to the indication of the third event and the indication of the fourth event (e.g., without providing the second bundled notification at the second delivery time selected by the user of the computer system, the first bundled notification provided at the first delivery time may include a large number of indications of events, which in turn, may cause the user to perform additional inputs (e.g., scrolling) to navigate through the first bundled notification in order to navigate to the indication of the third event and the indication of the fourth event. Providing the second bundled notification at the second delivery time selected by the user of the computer system allows the user additional flexibility regarding scheduled delivery times (e.g., the user may select the first and/or second scheduled delivery time based on past experience regarding the number of events that occur between scheduled delivery times)). Reducing the number of inputs needed to perform an operation enhances the operability of the device, which, additionally, reduces power usage and improves battery life of the device by enabling the user to use the device more quickly and efficiently.

In some embodiments, the first bundled notification includes (11032) notifications generated by one or more predetermined applications. This is shown in FIGS. 7H and 7T, for example, where a "TV" application (e.g., the application 7086 in FIG. 7H) is a predetermined application (e.g., an application configured to notification bundling, via the user interface 7060, in FIG. 7H), and the first bundled notification (e.g., the digest 7224 in FIG. 7T) includes notifications generated by the one or more predetermined applications (e.g., the notification 7234 for the "TV" application). Providing, at a first delivery time, notifications corresponding to the first plurality of events as a first bundled notification that includes an indication of the first event and an indication of the second event, wherein the first bundled notification includes notifications generated by one or more predetermined applications (e.g., two or more distinct applications), performs an operation (e.g., provides notifications corresponding to the first plurality of events, including notifications associated with the one or more predetermined applications, as a first bundled notification) when a set of conditions has been met (e.g., the current time is the first predetermined delivery time) without requiring further user input (e.g., further user input to display the indications corresponding to events included in the first bundled notification). Automatically performing an operation when a set of conditions has been met without requiring further user input enhances the operability of the device, which, additionally, reduces power usage and improves battery life of the device by enabling the user to use the device more quickly and efficiently.

In some embodiments, the computer system detects (11034) a user input (at a location) corresponding to the first bundled notification. In response to detecting the user input corresponding to the first bundled notification, the computer system displays the indication of the first event and the indication of the second event. In some embodiments, the user input is a voice command. This is shown in FIGS. 7T and 7U, for example, where the computer system (e.g., the portable multifunction device 100) detects a user input (e.g., the user input 7239 on the digest 7224), and in response, the computer system displays the indication of the first event (e.g., the notification 7260) and the indication of the second event (e.g., the notification 7268). Displaying the indication of the first event and the indication of the second event, in response to detecting the user input corresponding to the first bundled notification, reduces the number of inputs needed to display the indication of the first event and the indication of the second event (e.g., the user can display the indication of the first event and the indication of the second event directly from the first bundled notification, and does not need to perform additional inputs to navigate to another user interface (e.g., a notification center user interface) that displays the indication of the first event and the indication of the second event). Providing improved feedback enhances the operability of the device, which, additionally, reduces power usage and improves battery life of the device by enabling the user to use the device more quickly and efficiently.

In some embodiments, the first bundled notification includes (11036) a count of indications, corresponding to respective events, that are included in the first bundled notification. This is shown in FIG. 7T, for example, where the first bundled notification (e.g., the digest 7224) includes a count of indications (e.g., the count 7226), corresponding to respective events, that are included in the first bundled notification. Including, in the first bundled notification, a count of indications corresponding to respective events that are included in the first bundled notification, provides improved visual feedback to the user (e.g., improved visual feedback regarding the number of indications of events included in the first bundled notification). Providing improved feedback enhances the operability of the device, which, additionally, reduces power usage and improves battery life of the device by enabling the user to use the device more quickly and efficiently.

In some embodiments, the first bundled notification includes (11038) an indication of at least one of the first application and the second application. This is shown in FIG. 7T, for example, where the first bundled notification (e.g., the digest 7224) includes an indication of at least one of the first application and the second application (e.g., the displayed application icons in the "More Updates" portion 7236 of the digest 7224). Including, in the first bundled notification, an indication of at least one of the first application and the second application, provides improved visual feedback to the user (e.g., improved visual feedback regarding one or more applications that are associated with the indications of events included in the first bundled notification). Providing improved feedback enhances the operability of the device, which, additionally, reduces power usage and improves battery life of the device by enabling the user to use the device more quickly and efficiently.

In some embodiments, each respective indication included in the first bundled notification has (11040) a respective size based on a type of content (e.g., thumbnails, communications, etc.) associated with the respective indication. This is shown in FIG. 7T, for example, where each respective indication included in the first bundled notification (e.g., the digest 7224) has a respective size based on a type of content associated with the respective indication (e.g., the notification 7232 has a larger size than the notifications in the "More Updates" portion 7236, as the notification 7232 includes an image associated with a news story for the notification 7232). Providing notifications corresponding to the first plurality of events as a first bundled notification that includes an indication of the first event and an indication of the second event, wherein each respective indication included in the first bundled notification has a respective size based on a type of content associated with the respective indication provides improved visual feedback to the user (e.g., improved visual feedback regarding the type of content associated with a respective indication, improved visual feedback regarding the content of respective indication, etc.). Providing improved feedback enhances the operability of the device, which, additionally, reduces power usage and improves battery life of the device by enabling the user to use the device more quickly and efficiently.

In some embodiments, the indication of the first event and the indication of the second event are bundled (11042) together as part of the first bundled notification in accordance with bundled notification settings of the computer system. The computer system displaying a settings user interface that includes the bundled notification settings of the computer system, wherein the bundled notification settings of the computer system are configurable in the settings user interface. The settings user interface includes one or more options for specifying (e.g., for updating the bundling settings) one or more respective applications for which indications of events will be bundled (included in a same bundled notification). The computer system displays in the settings user interface a bundling recommendation that indicates one or more applications for which indications of events would be bundled in accordance with the bundling recommendation. This is shown in FIGS. 7A-7J, for example, wherein the bundled notification settings of the computer system are configurable in the settings user interface, and the settings user interface includes one or more options for specifying one or more respective applications for which indications of events will be bundled (e.g., the application icons 7070-7076, and 7082-7088, in the user interface 7060, shown in FIGS. 7D-1 through 7I). Displaying, in the settings user interface, a bundling recommendation that indicates one or more applications for which indications of events would be bundled in accordance with the bundling recommendation reduces the number of inputs needed to configure the bundled notification settings of the computer system (e.g., the computer system provides bundling recommendations that the user can accept, so the user does not need to perform additional inputs to navigate through additional settings to configure the bundled notification settings). Reducing the number of inputs needed to perform an operation enhances the operability of the device, which, additionally, reduces power usage and improves battery life of the device by enabling the user to use the device more quickly and efficiently.

In some embodiments, the notifications for the first event and the second event are not provided (11044) prior to the first delivery time in accordance with the bundled notification settings of the computer system. In some embodiments, the settings user interface includes an option for specifying the first delivery time. This is shown in FIGS. 7D-1 through 7I, where the user interface 7060 indicates that notifications for the selected applications will be provided only at scheduled times (e.g., the "Morning" delivery time 7040, the "Evening" delivery time 7046, and the "Custom 1" delivery time 7052, configured in FIG. 7C). Automatically forgoing the provision of notifications for the first event and the second event, in accordance with the bundled notification settings of the computer system, suppresses provision of notifications for the first event and the second event when a set of conditions (e.g., corresponding to the bundling settings of the computer system) are met without requiring further user input (e.g., further user input to suppress provision of notifications, further user input to provide notifications for the first event and the second event in a bundled notification, further user input to dismiss notifications for the first and/or second event, etc.). Automatically performing an operation when a set of conditions has been met without requiring further user input enhances the operability of the device, which, additionally, reduces power usage and improves battery life of the device by enabling the user to use the device more quickly and efficiently.

In some embodiments, the one or more options for specifying one or more respective applications for which indications of events will be bundled includes (11046) only options corresponding to respective applications that are configured to provide notifications. This is shown in FIG. 7D-1, for example, where the one or more respective applications for which indications of events will be bundled (e.g., the application icons 7070-7076 and 7082-7088) includes only options corresponding to respective applications that are configured to provide notifications. Displaying a settings user interface that includes one or more options for specifying one or more respective applications for which indications of events will be bundled, wherein the one or more options for specifying one or more respective applications for which indications of events will be bundled includes only options corresponding to respective applications that are configured to provide notifications, reduces the number of inputs needed to configure the bundled notification settings (e.g., the user does not need to perform additional inputs (e.g., scrolling) to navigate through options corresponding to respective application that are not configured to provide notifications). Reducing the number of inputs needed to perform an operation enhances the operability of the device, which, additionally, reduces power usage and improves battery life of the device by enabling the user to use the device more quickly and efficiently.

In some embodiments, the one or more options for specifying one or more respective applications for which indications of events will be bundled are grouped (11048) at least in part based application types of the respective applications. In some embodiments, the bundling recommendation includes two or more groups of respective applications, grouped at least in part based application types (e.g., games, social, entertainment, etc.) of the respective applications, for which indications of events would be bundled in accordance with the respective bundling recommendation. This is shown in FIG. 7D-1, for example, where the one or more options for specifying one or more respective applications for which indications of events will be bundled (e.g., the application icons 7070-7076 and 7082-7088) are grouped at least in part based on application types of the respective applications (e.g., into aa "Social" group 7066 and an "Entertainment" group 7078). Displaying a settings user interface that includes one or more options for specifying one or more respective applications for which indications of events will be bundled, wherein the one or more options for specifying one or more respective applications for which indications will be bundled are automatically grouped at least in part based application types of the respective applications, reduces the number of inputs needed to configure the bundled notification settings (e.g., by grouping respective applications for which indications will be bundled, at least in part based on application type, allows the user to specify similar applications (as applications for which indications will be bundled) without requiring additional user inputs to navigate through a list of all applications (e.g., that is ordered alphabetically)). Reducing the number of inputs needed to perform an operation enhances the operability of the device, which, additionally, reduces power usage and improves battery life of the device by enabling the user to use the device more quickly and efficiently.

In some embodiments, the bundling recommendation includes (11050) indications of a plurality of suggested applications for which indications of events would be bundled in accordance with the respective bundling recommendation (e.g., would be bundled while a respective activity mode is active). This is shown in FIG. 7D-1, for example, where the bundling recommendation (e.g., recommended applications) includes indications of a plurality of suggested applications (e.g., the application icons shown in FIG. 7D-1) for which indications of events would be bundled in accordance with the respective bundling recommendation. Displaying, in the settings user interface, a bundling recommendation that indicates applications for which indications of events would be bundled in accordance with the bundling recommendation, wherein the bundling recommendation includes indications of a plurality of suggested applications for which indications of events would be bundled in accordance with the respective bundling recommendation, reduces the number of inputs needed to configure the bundled notification settings (e.g., the user can select from the suggested applications without needing to perform additional inputs to navigate through all applications). Reducing the number of inputs needed to perform an operation enhances the operability of the device, which, additionally, reduces power usage and improves battery life of the device by enabling the user to use the device more quickly and efficiently.

In some embodiments, the settings user interface includes (11052) an option for selecting a subset (e.g., individual applications) of the suggested applications as applications for which indications of events will be bundled (e.g., will be bundled while a respective activity mode is active). This is shown in FIGS. 7F-7G, for example, where the settings user interface (e.g., the user interface 7060) includes an option (e.g., the bubble in the upper right hand corner of the application icon 7070) for selecting a subset (e.g., one) of the suggested applications as applications for which indications of events will be bundled (e.g., as shown by the checkmark on the application icon 7070, in FIG. 7G). Displaying, in the settings user interface, a bundling recommendation that indicates suggested applications for which indications of events would be bundled in accordance with the bundling recommendation, wherein the settings user interface includes an option for selecting a subset of the suggested applications as applications for which indications of events will be bundled, reduces the number of inputs needed to select a subset of suggested applications (e.g., the user can select a subset of the suggested applications instead of needing to select all of the suggested applications and later removing suggested applications the user does not want to configure as applications for which indications of events will be bundled). Reducing the number of inputs needed to perform an operation enhances the operability of the device, which, additionally, reduces power usage and improves battery life of the device by enabling the user to use the device more quickly and efficiently.

In some embodiments, the settings user interface includes (11054) an option for selecting all of the suggested applications as applications for which indications of events will be bundled. This is shown in FIGS. 7G-7H, for example, where the settings user interface (e.g., the user interface 7060) includes an option (e.g., the "Select All" affordance 7080) for selecting all of the suggested applications as applications for which indications of events will be bundled (e.g., as shown by the checkmarks on the application icons in the "Entertainment" group 7078, in FIG. 7H). Displaying, in the settings user interface, a bundling recommendation that indicates suggested applications for which indications of events would be bundled in accordance with the bundling recommendation, wherein the settings user interface includes an option for selecting all of the suggested applications as applications for which indications of events will be bundled, reduces the number of inputs needed to select the suggested applications (e.g., the user does not need to perform an individual input to select each suggested application). Reducing the number of inputs needed to perform an operation enhances the operability of the device, which, additionally, reduces power usage and improves battery life of the device by enabling the user to use the device more quickly and efficiently.

In some embodiments, the settings user interface includes (11056) an option for specifying the first delivery time and an option for specifying a second delivery time for delivering respective bundled notifications. This is shown in FIG. 7B, for example, where the settings user interface (e.g., the user interface 7014) includes an option for specifying the first delivery time (e.g., via the time "Morning" 7026) and an option for specifying a second delivery time (e.g., via the "Evening" time 7032) for delivering respective bundled notifications (e.g., a "Morning" digest and an "Evening" digest). Displaying a settings user interface that includes one or more options for specifying one or more respective applications for which indications of events will be bundled, wherein the settings user interface includes an option for specifying the first delivery time and an option for specifying a second delivery time for delivering respective bundled notifications, reduces the number of inputs needed to navigate to the desired indication of an event (e.g., without an option for specifying a second delivery time, the first bundled notification provided at the first delivery time may include a large number of indications of events, which in turn, may require the user to perform additional inputs (e.g., scrolling) to navigate through the first bundled notification in order to navigate to the desired indication of a respective event). Reducing the number of inputs needed to perform an operation enhances the operability of the device, which, additionally, reduces power usage and improves battery life of the device by enabling the user to use the device more quickly and efficiently.

In some embodiments, the settings user interface includes (11058) one or more options for specifying a third delivery time, distinct from the first delivery time and distinct from the second delivery time. At the third delivery time, the computer system provides a third bundled notification that includes indications of a respective plurality of events associated with respective times, wherein the third delivery time is after the first delivery time and after the second delivery time, and wherein notifications for the respective plurality of events were not provided prior to the third delivery time. This is shown in FIG. 7C, for example, where three delivery times are specified (e.g., the "Morning" delivery time 7040, the "Evening" delivery time 7046, and the "Custom 1" delivery time 7052). Displaying a settings user interface that includes one or more options for specifying one or more respective applications for which indications of events will be bundled, wherein the settings user interface includes one or more options for specifying a third delivery time, distinct from the first delivery time and distinct from the second delivery time, reduces the number of inputs needed to navigate to the desired indication of a respective event (e.g., without an option for specifying a third delivery time, the first bundled notification and the second bundled notification provided at the first delivery time and second delivery time, respectively, may include a large number of indications of events, which in turn, may require the user to perform additional inputs (e.g., scrolling) to navigate through the first and/or second bundled notification in order to navigate to the desired indication of a respective event). Reducing the number of inputs needed to perform an operation enhances the operability of the device, which, additionally, reduces power usage and improves battery life of the device by enabling the user to use the device more quickly and efficiently. In addition, providing an option for specifying a third delivery time enables a user to specify more than a default (e.g., two) number of bundled notifications per day, thereby enhancing the utility of the bundled notifications feature for many users.

In some embodiments, after the first delivery time, the computer system detects (11060) occurrence of a fifth event associated with a fifth time that is after the first delivery time. After detecting occurrence of the fifth event, the computer system displays, concurrently with at least a portion of the first bundled notification (e.g., in the first bundled notification, or in a same notifications user interface as the first bundled notification), an upcoming notification affordance. The upcoming notification affordance 7192, shown in FIG. 7AB, in notification center user interface 7190, is optionally displayed in (e.g., near the top of) the bundled notification 7224, instead of being positioned near a top of the notification center user interface 7190 as shown in FIG. 7AB). In response to user selection of the upcoming notification affordance, the computer system displays a preview of an indication of the fifth event. In some embodiments, the upcoming notification affordance is displayed at predefined top location in a list of indications of events included in the notification center user interface. This is shown in FIG. 7AB through 7AC-2, for example, where the computer system (e.g., the portable multifunction device 100) displays, in a notification center user interface (e.g., the notification center user interface 7190), an upcoming notification affordance (e.g., the "Upcoming" affordance 7192 in FIG. 7AB), and in response to user selection of the upcoming notification affordance (e.g., in response to the user input 7278 on the "Upcoming" affordance 7192), the computer system displays a preview of an indication of the fifth event (e.g., the notification 7284 in FIG. 7AC-1). Displaying a preview of an indication of the fifth event, in response to user selection of the upcoming notification affordance in (or concurrently displayed with at least a portion of) the first bundled notification, reduces the number of inputs needed to display a preview of an indication of the fifth event, or an indication of the fifth event prior to a next delivery time for bundled notifications (e.g., the user does not need to perform additional inputs to reconfigure the bundled notification settings of the computer system to allow provision of an indication of the fifth event). Reducing the number of inputs needed to perform an operation enhances the operability of the device, which, additionally, reduces power usage and improves battery life of the device by enabling the user to use the device more quickly and efficiently. Furthermore, provision of the upcoming notification affordance increases flexibility of the bundled notification feature, allowing user access to event notifications between scheduled delivery times that would otherwise only become available at the next scheduled delivery time, and improving the utility of the bundled notification feature.

In some embodiments, after the first delivery time, the computer system defers (11062) delivery of notifications corresponding to a fifth plurality of events while a respective activity mode is active, and then in response to user selection of the upcoming notification affordance, the computer system displays a preview of indications of the fifth plurality of events. This is shown in FIGS. 7AB through 7AC-2, for example, where in response to user selection of the upcoming notification affordance (e.g., the user input 7278 on the "Upcoming" affordance 7192, in FIG. 7AB), the computer system (e.g., the portable multifunction device 100) displays a preview of indications of the fifth plurality of events (e.g., the notification 7285 and the notification 7287, which were deferred while a "Sleeping" activity mode was active, as shown in FIG. 7AC-1). Deferring delivery of notifications corresponding to a fifth plurality of events while a respective activity mode is active, and then in response to user selection of the upcoming notification affordance, displaying a preview of indications of the fifth plurality of events, reduces the number of inputs needed to display a preview of indications of the fifth plurality of events, or the indications of the fifth plurality of events prior to a next delivery time for bundled notifications (e.g., the user does not need to perform additional inputs in order to first deactivate the respective activity mode to display the indications of the fifth plurality of events, and can instead display previews of indications of the fifth plurality of events while the respective activity mode is still active). Reducing the number of inputs needed to perform an operation enhances the operability of the device, which, additionally, reduces power usage and improves battery life of the device by enabling the user to use the device more quickly and efficiently.

In some embodiments, after the first delivery time, the computer system defers (11064) delivery of notifications corresponding to a sixth plurality of events in accordance with bundled notification settings of the computer system, the bundling settings specifying one or more applications (e.g., a plurality of applications) for which indications of events are to be bundled, and then in response to user selection of the upcoming notification affordance, the computer system displays a preview of indications of the sixth plurality of events. In some embodiments, the preview is presented along with (e.g., concurrently with, or in a single scrollable list that includes) the indications in the first bundled notification. This is shown in FIGS. 7AB through 7AC-2, for example, where in response to user selection of the upcoming notification affordance (e.g., the user input 7278 on the "Upcoming" affordance 7192, in FIG. 7AB), the computer system (e.g., the portable multifunction device 100) displays a preview of indications of the sixth plurality of events (e.g., the notification 7284 and the notification 7286, in FIG. 7AC-1). Deferring delivery of notifications corresponding to a sixth plurality of events in accordance with bundled notification settings of the computer system, the bundling settings specifying one or more applications for which indications of events are to be bundled, and then in response to user selection of the upcoming notification affordance, displaying a preview of indications of the sixth plurality of events, reduces the number of inputs needed to display a preview of indications of the sixth plurality of events, or the indications of the sixth plurality of events (e.g., the user does not need to perform additional inputs in order to reconfigure the bundled notification settings of the computer system (e.g., to change which indications of events will be bundled, or to change a predetermined delivery time) to view a preview of indications of the sixth plurality of events, or the indications of the sixth plurality of events). Reducing the number of inputs needed to perform an operation enhances the operability of the device, which, additionally, reduces power usage and improves battery life of the device by enabling the user to use the device more quickly and efficiently.

In some embodiments, while displaying a notification associated with a respective application, the computer system displays (11066) an option to specify that future indications of events for the respective application are to be included in respective future bundled notifications (along with indications of events for one or more other applications already specified by the bundling settings). In some embodiments, the bundling settings are modified, to include the respective application in a list of applications for which notifications are deferred and bundled, if the displayed option is selected by the user. This is shown in FIG. 8E, for example, where the computer system (e.g., the portable multifunction device 100) displays an option to specify that future indications of events for the respective application are to be included in respective future bundled notifications (e.g., the "Send to Digest" affordance 8036). Displaying an option to specify that future indications of events for the respective application are to be included in respective future bundled notifications, while displaying a notification associated with the respective application, reduces the number of inputs needed to configure future notifications for the respective application to be included in respective future bundled notifications (e.g., the user does not need to perform additional inputs to first navigate to the settings user interface to configure future notifications for the respective application to be included in respective future bundled notifications). Reducing the number of inputs needed to perform an operation enhances the operability of the device, which, additionally, reduces power usage and improves battery life of the device by enabling the user to use the device more quickly and efficiently.

In some embodiments, while displaying a notification associated with a communication thread with one or more other users, the computer system displays (11068) (e.g., concurrently displays) a mute option for forgoing display of future notifications corresponding to the communication thread until predetermined criteria are satisfied, and a reduced notification option for initiating activation of a reduced notification mode, during which delivery of a predefined set of notifications (notifications meeting predefined criteria) is deferred. This is shown in FIG. 7AD, for example, where the computer system (e.g., the portable multifunction device 100) displays a mute option (e.g., the "Mute for Today" affordance 7292) for forgoing display of future notifications corresponding to the communication thread until predetermined criteria are satisfied (e.g., the current day ends), and a reduced notification option for initiating activation of a reduced notification mode (e.g., the "Turn on DND" affordance 7290), during which delivery of a predefined set of notifications is deferred. Displaying a mute option for forgoing display of future notifications corresponding to the communication thread until predetermined criteria are satisfied and a reduced notification option for initiating activation of a reduced notification mode, during which delivery of a predefined set of notifications is deferred, while displaying a notification associated with a communication thread with one or more other users, reduces the number of inputs needed to mute the communication thread or activate the reduced notification mode (e.g., the user can mute the communication thread or activate the reduced notification mode directly from the displayed notification associated with the communication thread, and does not need to perform additional inputs to navigate to a separate user interface to mute the conversation thread or activate the reduced notification mode). Reducing the number of inputs needed to perform an operation enhances the operability of the device, which, additionally, reduces power usage and improves battery life of the device by enabling the user to use the device more quickly and efficiently.

In some embodiments, while a reduced notification mode is inactive, the computer system displays (11070) a plurality of mode control options including an option for activating the reduced notification mode, and in response to a user input activating the reduced notification mode, the computer system suppresses provision of bundled notifications for at least the first application and second application. This is shown in FIG. 5D, for example, where a reduced notification mode is inactive (e.g., no activity mode is currently active in FIG. 5D), the computer system (e.g., the portable multifunction device 100) displays a plurality of mode control options (e.g., the affordance 5010, the affordance 5012, the affordance 5014, and the affordance 5016, in FIG. 5D, each corresponding to different activity modes), including an option for activating the reduced notification mode (e.g., the "Working" activity mode). In response to a user input (e.g., a user input 5034 on the affordance 5010), the computer system suppresses provision of bundled notifications for at least the first application and the second application (e.g., in accordance with settings for the "Working" activity mode, notifications for applications other than the "Activity" application 5236 and the "Calendar" application 5196 are suppressed, as configured in FIG. 5Z). Displaying, while a reduced notification mode is inactive, a plurality of mode control options, including an option for activating the reduced notification mode, and in response to a user input activating the reduced notification mode, suppressing provision of bundled notifications for at least the first application and second application, suppresses provision of bundled notifications for at least the first application and second application when a set of conditions has been met (e.g., the reduced notification mode is activated) without requiring further user input (e.g., further user input to suppress provision of bundled notifications for at least the first application and the second application). Performing an operation when a set of conditions has been met without requiring further user input enhances the operability of the device, which, additionally, reduces power usage and improves battery life of the device by enabling the user to use the device more quickly and efficiently.

It should be understood that the particular order in which the operations in FIGS. 11A-11H have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 10000, 12000, and 13000) are also applicable in an analogous manner to method 11000 described above with respect to FIGS. 11A-11H. For example, the contacts, gestures, and user interface objects described above with reference to method xxx optionally have one or more of the characteristics of the contacts, gestures, and user interface objects described herein with reference to other methods described herein (e.g., methods 9000, 10000, 12000, and 13000). For brevity, these details are not repeated here.

FIGS. 12A-12B are flow diagrams illustrating method 12000 of configuring and interacting with time-sensitive notifications in accordance with some embodiments. Method 12000 is performed at an electronic device (e.g., device 300, FIG. 3, or portable multifunction device 100, FIG. 1A) with a display generation component (e.g., a display controller or display), a touch-sensitive surface, and one or more sensors to detect intensity of contacts with the touch-sensitive surface. In some embodiments, the computer system includes a display that is a touch-screen display and the touch-sensitive surface is on or integrated with the display. In some embodiments, the computer system includes a display or display generation component that is separate from the touch-sensitive surface. Some operations in method 12000 are, optionally, combined and/or the order of some operations is, optionally, changed.

While notifications for a respective application are suppressed (12002), the computer system detects (12004) an event associated with the respective application. In response to detecting (12006) the event: in accordance with a determination that notifications corresponding to the respective application are being suppressed and that the event meets predefined criteria for overriding suppression of notifications (for the respective application), the computer system provides (12008) a notification of the event (e.g., via one or more audio output components associated with the device, via one or more haptic output components associated with the device, and/or via the display generation components), the notification including an option to suppress future notifications, associated with the respective application, that meet the predefined criteria for overriding suppression of notifications (e.g., the notification including the option is visually displayed and optionally includes an audio prompt such as "This notification broke through the active activity mode because it was marked as high priority. If you want to stop receiving high priority notifications, select the 'Stop breakthrough notifications' option"). The term "option" is used here to mean a displayed, user-selectable option. In accordance with a determination that notifications corresponding to the respective application are being suppressed and the event does not meet the predefined criteria for overriding suppression of notifications, the computer system forgoes (12010) providing the notification of the event; and in accordance with a determination that notifications corresponding to the respective application are not being suppressed, the computer system provides (12012) the notification of the event (e.g., without regard to whether the notification met the predefined criteria for overriding suppression of notifications).

According to method 12000, in response to detecting an event associated with the respective application, the computer system provides a notification of the event, the notification including an option to suppress future notifications, associated with the respective application, that meet the predefined criteria for overriding suppression of notifications, in accordance with a determination that notifications corresponding to the respective application are being suppressed and that the event meets predefined criteria for overriding suppression of notifications. Automatically, while notifications for a respective application are being suppressed, providing a notification of an event associated with the respective application that meets predefined criteria for overriding suppression of notifications, and furthermore providing in the notification an option to suppress future notifications, associated with the respective application, that meet the predefined criteria for overriding suppression of notifications, reduces the number of inputs needed to configure suppression of notifications corresponding to the respective application. In particular, the user can configure the computer system to suppress such notifications directly from the notification itself, without the need to navigate to a separate user interface (e.g., a settings user interface). Reducing the number of inputs needed to perform an operation enhances the operability of the device, which, additionally, reduces power usage and improves battery life of the device by enabling the user to use the device more quickly and efficiently.

In some embodiments, if the notification of the event is provided in accordance with a determination that notifications corresponding to the respective application are not being suppressed, the notification of the event is displayed (12014) without the option to suppress future notifications. Providing a notification of an event associated with a respective application, the notification including an option to suppress future notifications associated with the respective application that meet the predefined criteria for overriding suppression of notifications, in accordance with a determination that notifications corresponding to the respective application are being suppressed and that the event meets predefined criteria for overriding suppression of notifications, and displaying the notification of the event without the option to suppress future notifications, in accordance with a determination that notifications corresponding to the respective application are not being suppressed, provides additional control options without cluttering the UI without additional displayed controls (e.g., additional displayed controls for suppressing future notifications, associated with the respective application, that meet the predefined criteria for overriding suppression of notifications, when such controls are not applicable (e.g., the event does not meet the predefined criteria for overriding suppression of notifications)). Providing additional control options without cluttering the UI with additional displayed controls enhances the operability of the device, which, additionally, reduces power usage and improves battery life of the device by enabling the user to use the device more quickly and efficiently.

In some embodiments, the option to suppress future notifications is displayed (12016) at a first level of prominence, and subsequent notifications, associated with the respective application, include respective options to suppress future notifications, wherein the respective options to suppress future notifications are displayed with a level of prominence below the first level of prominence. In some embodiments, levels of prominence are implemented using font size, font color, bolding, underlining, and/or other font characteristics. In some embodiments, subsequent notifications associated with the respective application include respective options to suppress future notifications that are displayed with reduced prominence compared to the option to suppress future notifications. This is illustrated in FIGS. 8B-8F, for example, where the respective options to suppress future notifications (e.g., "Turn off Time-Sensitive" affordance 8046 in FIG. 8F) are displayed with a level of prominence below the first level of prominence (e.g., because the "Turn off Time-Sensitive" affordance 8046 is not initially displayed, e.g., with the notification 8020 in FIG. 8C). Displaying, for subsequent notifications, the respective options to suppress future notifications with a level of prominence below the first level of prominence at which the option to suppress future notifications is displayed, provides improved visual feedback to the user (e.g., improved visual feedback that the user has already seen and/or interacted with the option to suppress future notifications). Providing improved feedback enhances the operability of the device, which, additionally, reduces power usage and improves battery life of the device by enabling the user to use the device more quickly and efficiently.

In some embodiments, the determination that notifications for the respective application are suppressed includes (12018) a determination that a reduced notification mode is active on the first computer system (and, in some embodiments, a determination that notifications for the respective application are suppressed in accordance with settings for the reduced notification mode). This is illustrated in FIG. 8C, for example, where a reduced notification mode (e.g., the "Do Not Disturb" activity mode, as indicated by the indicator 8006) is active on the first computer system (e.g., the portable multifunction device 100). Providing a notification of the event that includes an option to suppress future notifications, associated with the respective application, that meet the predefined criteria for overriding suppression of notifications, in accordance with a determination that notifications corresponding to the respective application are being suppressed, including a determination that a reduced notification mode is active on the first computer system, and that the event meets predefined criteria for overriding suppression of notifications, reduces the number of inputs needed to suppress future notifications associated with the respective application, that meet the predefined criteria for overriding suppression of notifications (e.g., the user can configure suppression of future notifications, associated with the respective application, that meet the predefined criteria for overriding suppression of notifications, without needing to perform additional inputs in order to first navigate through additional user interfaces (e.g., a general settings user interface, a general notification settings user interface, etc.) to configure suppression of future notifications, associated with the respective application, that meet the predefined criteria for overriding suppression of notifications). Reducing the number of inputs needed to perform an operation enhances the operability of the device, which, additionally, reduces power usage and improves battery life of the device by enabling the user to use the device more quickly and efficiently.

In some embodiments, the computer system suppresses (12020) notifications for the respective application in accordance with settings for bundled notifications, wherein suppressed notifications for the respective application are provided, at one or more (predefined or user specified) delivery times, in one or more bundled notifications that each include a plurality of indications of events corresponding to respective suppressed notifications. This is illustrated in FIGS. 7H, 7J, and 7R-7S, for example, where the computer system (e.g., the portable multifunction device 100) suppresses notifications for the respective applications (e.g., the applications associated with the application icons 7070-7088 in FIG. 7H, or the Rideshare application in FIG. 7J). Suppressed notifications for the respective applications are provided, at one or more delivery times (e.g., a first delivery time of 8:00 AM, as shown in FIG. 7S, and a second delivery time at 6:00 PM, as shown in FIG. 7R), in one or more bundled notifications that each include a plurality of indications of events corresponding to respective suppressed notifications (e.g., the "Morning Digest" in FIG. 7S, and/or the "Evening Digest" in FIG. 7R). Automatically providing, in accordance with settings for bundled notifications, suppressed notifications for a respective application as bundled notifications at one or more delivery times, in addition to providing notifications of events corresponding to the respective application while notifications are being suppressed but that meet predefined criteria for overriding suppression of notifications reduces the number of inputs needed to suppress future notifications associated with the respective application while providing access to the suppressed notifications at the one or more delivery times and not suppressing notifications that meet the predefined criteria for overriding suppression of notifications. Reducing the number of inputs needed provide access to and manage delivery of notifications for a respective application enhances the operability of the device, which, additionally, reduces power usage and improves battery life of the device by enabling the user to use the device more quickly and efficiently.

In some embodiments, the computer system configures (12022) the settings for bundled notifications, including displaying an indication corresponding to the predefined criteria (e.g., an option to not bundle notifications of high priority events). In some embodiments, the computer system provides an indication corresponding to notifications that will not be suppressed due to notification bundling (e.g., direct messages, delivery notifications, etc.). This is illustrated in FIG. 7K, for example, where the computer system (e.g., the portable multifunction device 100) displays an indication corresponding to the predefined criteria (e.g., the text 7134 indicating that "Direct Messages, Phone Calls, and Time-Sensitive alerts" are received immediately, despite bundling notifications in a daily digest). Displaying an indication corresponding to the predefined criteria in the settings for bundled notifications provides improved visual feedback to the user (e.g., improved visual feedback regarding notifications that will not be suppressed based on the settings for bundled notifications). Providing improved feedback enhances the operability of the device, which, additionally, reduces power usage and improves battery life of the device by enabling the user to use the device more quickly and efficiently.

In some embodiments, the computer system detects (12024) a user input directed to the option to suppress future notifications associated with the respective application, and in response to detecting the user input directed to the option to suppress future notifications, the computer system suppresses future notifications, associated with the respective application, that meet the predefined criteria for overriding suppression of notifications (e.g., future notifications, even for notifications that otherwise would have been allowed to break through the suppression of notifications, are suppressed by bundling the future notifications for delivery at (predefined) scheduled delivery times and delivering at the scheduled delivery times indications of notifications that were suppressed (e.g., while a respective activity mode was active)). This is illustrated in FIGS. 8E and 8F, for example, where in response to detecting the user input directed to the option to suppress future notifications (e.g., the "Turn off Time-Sensitive" affordance 8046 in FIG. 8F), the computer system (e.g., the portable multifunction device 100) suppresses future notifications, associated with the respective application (e.g., the Rideshare application), that meet the predefined criteria for overriding suppression of notifications (e.g., are time-sensitive notifications). Suppressing future notifications, associated with the respective application, that meet the predefined criteria for overriding suppression of notifications, in response to detecting the user input directed to the option to suppress future notifications, reduces the number of inputs needed to suppress future notifications, associated with the respective application, that meet the predefined criteria for overriding suppression of notifications (e.g., the user can configure suppression of future notifications, associated with the respective application, that meet the predefined criteria for overriding suppression of notifications, starting from a received notification associated with the respective application, and does not need to perform additional inputs in order to first navigate through additional user interfaces (e.g., a general settings user interface, a general notification settings user interface, etc.) to configure suppression of future notifications, associated with the respective application, that meet the predefined criteria for overriding suppression of notifications). Reducing the number of inputs needed to perform an operation enhances the operability of the device, which, additionally, reduces power usage and improves battery life of the device by enabling the user to use the device more quickly and efficiently.

In some embodiments, in response to detecting a user input that causes display of a settings user interface, the computer system displays (12026) the settings user interface, including an option to suppress future notifications, associated with the respective application, that meet the predefined criteria for overriding suppression of notifications. This is illustrated in FIGS. 8H-8J, for example, where in response to detecting a user input (e.g., the user input 8050 in FIG. 8H) that causes display of a settings user interface (e.g., settings interface 8054 in FIG. 8I), the computer system (e.g., the portable multifunction device 100) displays the settings user interface, including an option (e.g., the "Driver Approaching" option 8078, the "Driver Arrived" option 8082, and/or the "Food Delivery" option 8086) to suppress future notifications, associated with the respective application (e.g., the Rideshare application), that meet the predefined criteria for overriding suppression of notifications (e.g., are time-sensitive notifications). Displaying a settings user interface that includes an option to suppress future notifications associated with the respective application that meet the predefined criteria for overriding suppression of notifications, in response to detecting a user input that causes display of the settings user interface, provides additional control options without cluttering the UI with additional displayed controls (e.g., the option to suppress future notifications, associated with the respective application, that meet the predefined criteria for overriding suppression of notifications, included in the provided notification, may be sufficient for the most commonly encountered scenarios, while the settings user interface may include lesser used and/or more granular control options for suppressing future notifications and/or the predefined criteria for overriding suppression of notifications). Providing additional control options without cluttering the UI with additional displayed controls enhances the operability of the device, which, additionally, reduces power usage and improves battery life of the device by enabling the user to use the device more quickly and efficiently.

It should be understood that the particular order in which the operations in FIGS. 12A-12B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 10000, 11000, and 13000) are also applicable in an analogous manner to method 12000 described above with respect to FIGS. 12A-12B. For example, the contacts, gestures, and/or user interface objects described above with reference to method xxx optionally have one or more of the characteristics of the contacts, gestures, and/or user interface objects described herein with reference to other methods described herein (e.g., methods 9000, 10000, 11000, and 13000). For brevity, these details are not repeated here.

FIGS. 13A-13B are flow diagrams illustrating method 13000 of displaying an indication of an active activity modes for another user (e.g., another user in an active messaging session of a messaging application), and options for overriding settings (e.g., settings that would otherwise cause notifications for a message sent by the user) for the active activity mode, in accordance with some embodiments. Method 13000 is performed at an electronic device (e.g., device 300, FIG. 3, or portable multifunction device 100, FIG. 1A) with a display generation component (e.g., a display controller or display), a touch-sensitive surface, and one or more sensors to detect intensity of contacts with the touch-sensitive surface. In some embodiments, the computer system includes a display that is a touch-screen display and the touch-sensitive surface is on or integrated with the display. In some embodiments, the computer system includes a display or display generation component that is separate from the touch-sensitive surface. Some operations in method 13000 are, optionally, combined and/or the order of some operations is, optionally, changed.

The device displays (13002) via the display generation component, a messaging user interface on the display, the messaging user interface including a conversation region that includes a plurality of messages between a user of the first computer system and another participant. After (e.g., while) displaying the messaging user interface, the computer system receives (13004) a request to send a message to the other participant. In response to the request to send the message to the other participant, the computer system sends (13006) a message to the other participant. After sending the message to the other participant, the computer system concurrently displays (13008) in the messaging user interface, via the display generation component: a representation of the message; an indication that the message was delivered (e.g., delivered to a second computer system or electronic device, but without notification to the other participant) in accordance with reduced notification settings for the other participant (e.g., of an activity mode that is active for the other participant on at least the second computer system); and an affordance for requesting delivery, to the other participant, of a notification associated with the message. In some embodiments, reduced notification settings for a user are automatically applied across multiple computer systems or devices of the user.

According to method 13000, after sending a message to the other participant, the computer system concurrently displays, in the messaging user interface: a representation of the message, an indication that the message was delivered in accordance with reduced notification settings for the other participant, and an affordance for requesting delivery, to the other participant, of a notification associated with the message. Displaying an affordance for requesting delivery, to the other participant, of a notification associated with the message, reduces the number of inputs needed to request delivery, to the other participant, of a notification associated with the message (e.g., the user does not need to perform additional inputs to send the message through alternative means (e.g., a different type of communication application), or perform additional inputs to request delivery of the notification associated with the message through a separate user interface). Reducing the number of inputs needed to perform an operation enhances the operability of the device, which, additionally, reduces power usage and improves battery life of the device by enabling the user to use the device more quickly and efficiently.

Additionally, concurrently displaying the representation of the message, the indication that the message was delivered in accordance with reduced notification settings for the other participant, and the affordance for requesting delivery, to the other participant, of a notification associated with the message, provides improved visual feedback to the user (e.g., improved visual feedback that the message was delivered in accordance with reduced notification settings for the other participant). Providing improved feedback enhances the operability of the device, which, additionally, reduces power usage and improves battery life of the device by enabling the user to use the device more quickly and efficiently.

In some embodiments, the computer system detects (13010) activation of the affordance for requesting delivery of the notification, and in response to detecting activation of the affordance for requesting delivery of the notification associated with the message, the computer system sends a request (e.g., to one or more electronic devices of the other participant) for delivery of the notification associated with the message (e.g., sending a request that overrides the reduced notification settings of the other participant, causing delivery of the notification to the other participant). This is illustrated in FIGS. 5N-5O, for example, where in response to detecting activation of the affordance for requesting delivery of the notification associated with the message (e.g., in response to detecting the user input 5100 on the override affordance 5098), the computer system (e.g., the portable multifunction device 100) sends a request for delivery of the notification associated with the message (e.g., the "Delivered" indication 5104 of FIG. 5O shows that the notification associated with the message was delivered). Sending a request for delivery of the notification associated with the message, in response to detecting activation of the affordance for requesting delivery of the notification associated with the message, reduces the number of inputs needed to deliver the notification associated with the message despite the reduced notification settings of the other participant (e.g., the user does not need to perform additional inputs to send the message through alternative means (e.g., a different type of communication application)). Reducing the number of inputs needed to perform an operation enhances the operability of the device, which, additionally, reduces power usage and improves battery life of the device by enabling the user to use the device more quickly and efficiently.

In some embodiments, if the affordance for requesting delivery of the notification associated with the message is not activated (13012), delivery of the message to the other participant is deferred in accordance with the reduced notification settings for the other participant. In some embodiments, the indication that the message was delivered is an indication that the message was delivered to a second computer system associated with the other participant. This is illustrated in FIG. 5N, for example, where delivery of the message is deferred (e.g., as indicated by the "Delivered quietly" indication 5096, prior to detecting the user input 5100) in with the reduced notification settings for the other participant (e.g., in accordance with a "Working" activity mode active for the user Genevive). Deferring delivery of the message to the other participant, in accordance with the reduced notification settings for the other participant, if the affordance for requesting delivery of the notification associated with the message is not activated, automatically defers delivery of the message to the other participant when a set of conditions has been met (e.g., the affordance for requesting delivery of the notification associated with the message is not activated) without requiring further user input (e.g., further user input to manually delay delivery of the message). Automatically performing an operation when a set of conditions has been met without requiring further user input enhances the operability of the device, which, additionally, reduces power usage and improves battery life of the device by enabling the user to use the device more quickly and efficiently.

In some embodiments, the computer system sends (13014) a second message to the other participant; and in accordance with a determination that the second message was delivered to the other participant (e.g., and that delivery of the message was not suppressed in accordance with reduced notification settings for the other participant, e.g., because the DND mode was not active on the second computer system associated with the other participant; e.g., no activity mode is active for the other participant on at least the second computer system, or the activity mode that is active for the other participant does not include settings that affect delivery of the message, etc.), the computer system displays, via the display generation component, a second indication that the second message was delivered to the other participant. In some embodiments, the second indication (e.g., a message read or message delivered receipt) is displayed at a same location of the messaging user interface as the first indication (e.g., a "delivered quietly" receipt). This is illustrated in FIGS. 5J and FIGS. 5N-5O, for example, where in accordance with a determination that the second message was delivered (e.g., because no activity mode is active for the other user Genevive in FIG. 5J, or because the override affordance 5098 was activated in FIG. 5N) to the other participant (e.g., the other user Genevive), the computer system (e.g., the portable multifunction device 100) displays a second indication that the second message was delivered to the other participant (e.g., the "Delivered" indication 5086 in FIG. 5J, or the "Delivered" indication 5104 in FIG. 5O). Displaying a second indication that the second message was delivered to the other participant provides improved visual feedback to the user (e.g., improved visual feedback that delivery of the message was not suppressed in accordance with reduced notification settings for the participant). Providing improved feedback enhances the operability of the device, which, additionally, reduces power usage and improves battery life of the device by enabling the user to use the device more quickly and efficiently.

In some embodiments, in accordance with a determination that the message has been viewed by the other participant (e.g., in some embodiments, the second computer system transmits an indication that the message has been displayed on the second computer system), the computer system displays (13016) a third indication (e.g., a message read receipt) that the message has been viewed. This is illustrated, for example, in FIG. 5P, where in accordance with a determination that the message has been viewed by the other participant (e.g., viewed by the user Genevive), the computer system (e.g., the portable multifunction device 100) displays a third indication that the message has been viewed (e.g., the "Read" indication 5106). Displaying a third indication that the message has been viewed, in accordance with a determination that the message has been viewed by the other participant, provides improved visual feedback to the user (e.g., improved visual feedback that the other participant has viewed the message, improved visual feedback regarding additional details associated with the other participant viewing the message (e.g., a time stamp reflecting when the other participant viewed the message)). Providing improved feedback enhances the operability of the device, which, additionally, reduces power usage and improves battery life of the device by enabling the user to use the device more quickly and efficiently.

It should be understood that the particular order in which the operations in FIGS. 13A-13B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 10000, 11000, and 12000) are also applicable in an analogous manner to method 13000 described above with respect to FIGS. 13A-13B. For example, the contacts, gestures, and/or user interface objects, described above with reference to method xxx optionally have one or more of the characteristics of the contacts, gestures, and/or user interface objects described herein with reference to other methods described herein (e.g., methods 9000, 10000, 11000, and 12000). For brevity, these details are not repeated here.

The operations described above with reference to FIGS. 9A-13B are, optionally, implemented by components depicted in FIGS. 1A-1B. For example, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at a computer system in communication with a display generation component and one or more input devices:
      detecting a first input requesting display of a home screen of the computer system; and
      in response to detecting the first input:
         in accordance with a determination that a first activity mode is active on the computer system, displaying, via the display generation component, a first home screen of a first plurality of home screen pages associated with the first activity mode, wherein the first home screen includes a first plurality of application user interface elements, and selectively suppressing a first set of notifications in accordance with settings of the first activity mode; and
         in accordance with a determination that a second activity mode is active on the computer system, displaying, via the display generation component, a second home screen of a second plurality of home screen pages associated with the second activity mode, wherein the second home screen is different from the first home screen and wherein the second home screen includes a second plurality of application user interface elements that are different from the first plurality of application user interface elements, and selectively suppressing a second set of notifications, different from the first set of notifications, in accordance with settings of the second activity mode, wherein at least some settings for notification delivery of the second activity mode are different from the settings of the first activity mode, and wherein the first plurality of home screen pages includes at least one home screen page also included in the second plurality of home screen pages, the first plurality of home screen pages includes at least one home screen page that is not included in the second plurality of home screen pages, and the second plurality of home screen pages includes at least one home screen page that is not included in the first plurality of home screen pages;
   while displaying a respective home screen page, detecting a request to navigate through home screen pages; and
   in response to detecting the request to navigate through home screen pages:
      in accordance with a determination that the first activity mode is active on the computer system, navigating through the first plurality of home screen pages; and
      in accordance with a determination that the second activity mode is active on the computer system, navigating through the second plurality of home screen pages.

2. The method of claim 1, including:
   detecting a user input that activates a settings affordance; and
   in response to detecting the user input that activates the settings affordance, displaying a settings interface that includes an option for selecting a first respective home screen page to use as the first home screen, and an option for selecting a second respective home screen page, distinct from the first respective home screen page, to use as the second home screen.

3. The method of claim 1, including:
   detecting a user input that activates a settings affordance; and
   in response to detecting the user input that activates the settings affordance, displaying a settings interface that includes:
      options for configuring one or more settings of a respective activity mode, including an option to select a home screen page to be included in the first plurality of home screen pages.

4. The method of claim 3, wherein at least one home screen page is available for selection for inclusion in the first plurality of home screen pages and inclusion in the second plurality of home screen pages.

5. The method of claim 3, wherein a respective home screen page in the first plurality of home screen pages includes a respective background region, and the settings interface includes an option to configure the respective background region for the respective home screen page.

6. The method of claim 3, wherein the settings interface includes an option for configuring at least one of a start time and an end time for the respective activity mode.

7. The method of claim 1, including:
   detecting a user input that activates a settings affordance; and in response to detecting the user input that activates the settings affordance, displaying a settings interface that includes options for configuring one or more settings of a respective activity mode;
wherein the settings interface includes an option for enabling delivery of notifications, in response to requests by other users, with respect to notifications that are otherwise blocked or deferred while the respective activity mode is active.

8. The method of claim 7, wherein the settings interface includes an option that configures a brightness with which a wake screen user interface is displayed while the respective activity mode is active.

9. The method of claim 7, wherein the settings interface includes an option for forgoing display of notification indicators on application icons while the respective activity mode is active.

10. The method of claim 7, wherein the settings interface includes an option for suppressing notifications on a user interface corresponding to a locked state of the computer system.

11. The method of claim 1, including automatically activating the first activity mode in accordance with predefined criteria.

12. The method of claim 1, including activating the first activity mode in response to a user input.

13. The method of claim 12, including detecting the user input while displaying a wake screen.

14. The method of claim 1, wherein selectively suppressing the first set of notifications comprises suppressing the first set of notifications based on a first list of applications and/or a first list of people, and selectively suppressing a second set of notifications comprises suppressing the second set of notifications based on a second list of applications different from the first list of applications and/or a second list of people different from the first list of people.

15. The method of claim 1, wherein selectively suppressing the first set of notifications comprises suppressing the first set of notifications based on applications and/or people selected using a settings user interface for the first activity mode, and selectively suppressing the second set of notifications comprises suppressing the second set of notifications based on applications and/or people selected using a settings user interface for the second activity mode.

16. The method of claim 1, wherein:
selectively suppressing the first set of notifications comprises:
outputting a third set of notifications based on a first list of applications and/or a first list of people; and
suppressing notifications for applications and/or people that are not included in the first list of applications and/or the first list of people; and
selectively suppressing the second set of notifications comprises:
outputting a fourth set of notifications, different from the third set of notifications, based on a second list of applications and/or a second list of people; and
suppressing notifications for applications and/or people that are not included in the second list of applications and/or the second list of people.

17. The method of claim 1, including:
in accordance with a determination that a third activity mode is active on the computer system, displaying, via the display generation component, a third home screen associated with the third activity mode, wherein the third home screen is different from the first home screen and the second home screen, and selectively suppressing a fifth set of notifications, different from the first set of notifications and the second set of notifications, by the computer system in accordance with settings of the third activity mode, wherein at least some of the settings for notification delivery of the third activity mode are different from the settings of the first activity mode and settings of the second activity mode.

18. The method of claim 1, wherein:
the first plurality of application user interface elements includes a first application user interface element and does not include a second application user interface element that is included in the second plurality of application user interface elements; and
the second plurality of application user interface elements includes the second application user interface element and does not include the first application user interface element that is included in the first plurality of application user interface elements.

19. A computer system, comprising:
a display generation component;
one or more input devices;
one or more processors; and
memory storing one or more programs, wherein the one or more programs are configured to be executed by the one or more processors, the one or more programs including instructions for:
detecting a first input requesting display of a home screen of the computer system; and
in response to detecting the first input:
in accordance with a determination that a first activity mode is active on the computer system, displaying, via the display generation component, a first home screen of a first plurality of home screen pages associated with the first activity mode, wherein the first home screen includes a first plurality of application user interface elements, and selectively suppressing a first set of notifications in accordance with settings of the first activity mode; and
in accordance with a determination that a second activity mode is active on the computer system, displaying, via the display generation component, a second home screen of a second plurality of home screen pages associated with the second activity mode, wherein the second home screen is different from the first home screen and wherein the second home screen includes a second plurality of application user interface elements that are different from the first plurality of application user interface elements, and selectively suppressing a second set of notifications, different from the first set of notifications, in accordance with settings of the second activity mode, wherein at least some settings for notification delivery of the second activity mode are different from the settings of the first activity mode, and wherein the first plurality of home screen pages includes at least one home screen page also included in the second plurality of home screen pages, the first plurality of home screen pages includes at least one home screen page that is not included in the second plurality of home screen pages, and the second plurality of home screen pages includes at least one home screen page that is not included in the first plurality of home screen pages;
while displaying a respective home screen page, detecting a request to navigate through home screen pages; and in response to detecting the request to navigate through home screen pages:
  in accordance with a determination that the first activity mode is active on the computer system, navigating through the first plurality of home screen pages; and
  in accordance with a determination that the second activity mode is active on the computer system, navigating through the second plurality of home screen pages.

20. The computer system of claim 19, wherein the one or more programs include instructions for:
  detecting a user input that activates a settings affordance; and
  in response to detecting the user input that activates the settings affordance, displaying a settings interface that includes an option for selecting a first respective home screen page to use as the first home screen, and an option for selecting a second respective home screen page, distinct from the first respective home screen page, to use as the second home screen.

21. The computer system of claim 19, wherein the one or more programs include instructions for:
  detecting a user input that activates a settings affordance; and
  in response to detecting the user input that activates the settings affordance, displaying a settings interface that includes:
    options for configuring one or more settings of a respective activity mode, including an option to select a home screen page to be included in the first plurality of home screen pages.

22. The computer system of claim 21, wherein the settings interface includes an option for configuring at least one of a start time and an end time for the respective activity mode.

23. The computer system of claim 19, wherein the one or more programs include instructions for:
  detecting a user input that activates a settings affordance; and
  in response to detecting the user input that activates the settings affordance, displaying a settings interface that includes options for configuring one or more settings of a respective activity mode;
  wherein the settings interface includes an option for enabling delivery of notifications, in response to requests by other users, with respect to notifications that are otherwise blocked or deferred while the respective activity mode is active.

24. The computer system of claim 23, wherein the settings interface includes an option that configures a brightness with which a wake screen user interface is displayed while the respective activity mode is active.

25. The computer system of claim 23, wherein the settings interface includes an option for forgoing display of notification indicators on application icons while the respective activity mode is active.

26. The computer system of claim 23, wherein the settings interface includes an option for suppressing notifications on a user interface corresponding to a locked state of the computer system.

27. The computer system of claim 19, wherein the one or more programs include instructions for automatically activating the first activity mode in accordance with predefined criteria.

28. The computer system of claim 19, wherein the one or more programs include instructions for activating the first activity mode in response to a user input.

29. The computer system of claim 28, wherein the one or more programs include instructions for detecting the user input while displaying a wake screen.

30. The computer system of claim 19, wherein selectively suppressing the first set of notifications comprises suppressing the first set of notifications based on a first list of applications and/or a first list of people, and selectively suppressing a second set of notifications comprises suppressing the second set of notifications based on a second list of applications different from the first list of applications and/or a second list of people different from the first list of people.

31. The computer system of claim 19, wherein selectively suppressing the first set of notifications comprises suppressing the first set of notifications based on applications and/or people selected using a settings user interface for the first activity mode, and selectively suppressing the second set of notifications comprises suppressing the second set of notifications based on applications and/or people selected using a settings user interface for the second activity mode.

32. The computer system of claim 19, wherein:
  selectively suppressing the first set of notifications comprises:
    outputting a third set of notifications based on a first list of applications and/or a first list of people; and
    suppressing notifications for applications and/or people that are not included in the first list of applications and/or the first list of people; and
  selectively suppressing the second set of notifications comprises:
    outputting a fourth set of notifications, different from the third set of notifications, based on a second list of applications and/or a second list of people; and
    suppressing notifications for applications and/or people that are not included in the second list of applications and/or the second list of people.

33. The computer system of claim 19, wherein the one or more programs include instructions for:
  in accordance with a determination that a third activity mode is active on the computer system, displaying, via the display generation component, a third home screen associated with the third activity mode, wherein the third home screen is different from the first home screen and the second home screen, and selectively suppressing a fifth set of notifications, different from the first set of notifications and the second set of notifications, by the computer system in accordance with settings of the third activity mode, wherein at least some of the settings for notification delivery of the third activity mode are different from the settings of the first activity mode and settings of the second activity mode.

34. The computer system of claim 19, wherein:
  the first plurality of application user interface elements includes a first application user interface element and does not include a second application user interface element that is included in the second plurality of application user interface elements; and
  the second plurality of application user interface elements includes the second application user interface element and does not include the first application user interface element that is included in the first plurality of application user interface elements.

35. A non-transitory computer readable storage medium storing one or more programs, the one or more programs comprising instructions that, when executed by a computer system that includes a display generation component, and one or more input devices, cause the computer system to:

detect a first input requesting display of a home screen of the computer system; and in response to detecting the first input:

in accordance with a determination that a first activity mode is active on the computer system, display, via the display generation component, a first home screen of a first plurality of home screen pages associated with the first activity mode, wherein the first home screen includes a first plurality of application user interface elements, and selectively suppress a first set of notifications in accordance with settings of the first activity mode; and in accordance with a determination that a second activity mode is active on the computer system, display, via the display generation component, a second home screen of a second plurality of home screen pages associated with the second activity mode, wherein the second home screen is different from the first home screen and wherein the second home screen includes a second plurality of application user interface elements that are different from the first plurality of application user interface elements, and selectively suppress a second set of notifications, different from the first set of notifications, in accordance with settings of the second activity mode, wherein at least some settings for notification delivery of the second activity mode are different from the settings of the first activity mode, and wherein the first plurality of home screen pages includes at least one home screen page also included in the second plurality of home screen pages, the first plurality of home screen pages includes at least one home screen page that is not included in the second plurality of home screen pages, and the second plurality of home screen pages includes at least one home screen page that is not included in the first plurality of home screen pages;

while displaying a respective home screen page, detect a request to navigate through home screen pages; and in response to detecting the request to navigate through home screen pages:

in accordance with a determination that the first activity mode is active on the computer system, navigate through the first plurality of home screen pages; and in accordance with a determination that the second activity mode is active on the computer system, navigate through the second plurality of home screen pages.

36. The non-transitory computer readable storage medium of claim 35, wherein the one or more programs comprise instructions that, when executed by the computer system, cause the computer system to:

detect a user input that activates a settings affordance; and in response to detecting the user input that activates the settings affordance, display a settings interface that includes an option for selecting a first respective home screen page to use as the first home screen, and an option for selecting a second respective home screen page, distinct from the first respective home screen page, to use as the second home screen.

37. The non-transitory computer readable storage medium of claim 35, wherein the one or more programs comprise instructions that, when executed by the computer system, cause the computer system to:

detect a user input that activates a settings affordance; and in response to detecting the user input that activates the settings affordance, display a settings interface that includes:

options for configuring one or more settings of a respective activity mode, including an option to select a home screen page to be included in the first plurality of home screen pages.

38. The non-transitory computer readable storage medium of claim 37, wherein the settings interface includes an option for configuring at least one of a start time and an end time for the respective activity mode.

39. The non-transitory computer readable storage medium of claim 35, wherein the one or more programs comprise instructions that, when executed by the computer system, cause the computer system to:

detect a user input that activates a settings affordance; and in response to detecting the user input that activates the settings affordance, display a settings interface that includes options for configuring one or more settings of a respective activity mode;

wherein the settings interface includes an option for enabling delivery of notifications, in response to requests by other users, with respect to notifications that are otherwise blocked or deferred while the respective activity mode is active.

40. The non-transitory computer readable storage medium of claim 39, wherein the settings interface includes an option that configures a brightness with which a wake screen user interface is displayed while the respective activity mode is active.

41. The non-transitory computer readable storage medium of claim 39, wherein the settings interface includes an option for forgoing display of notification indicators on application icons while the respective activity mode is active.

42. The non-transitory computer readable storage medium of claim 39, wherein the settings interface includes an option for suppressing notifications on a user interface corresponding to a locked state of the computer system.

43. The non-transitory computer readable storage medium of claim 35, wherein the one or more programs comprise instructions that, when executed by the computer system, cause the computer system to automatically activate the first activity mode in accordance with predefined criteria.

44. The non-transitory computer readable storage medium of claim 35, wherein the one or more programs comprise instructions that, when executed by the computer system, cause the computer system to activate the first activity mode in response to a user input.

45. The non-transitory computer readable storage medium of claim 44, wherein the one or more programs comprise instructions that, when executed by the computer system, cause the computer system to detect the user input while displaying a wake screen.

46. The non-transitory computer readable storage medium of claim 35, wherein selectively suppressing the first set of notifications comprises suppressing the first set of notifications based on a first list of applications and/or a first list of people, and selectively suppressing a second set of notifications comprises suppressing the second set of notifications based on a second list of applications different from the first list of applications and/or a second list of people different from the first list of people.

47. The non-transitory computer readable storage medium of claim 35, wherein selectively suppressing the first set of notifications comprises suppressing the first set of notifications based on applications and/or people selected using a settings user interface for the first activity mode, and selectively suppressing the second set of notifications comprises suppressing the second set of notifications based on applications and/or people selected using a settings user interface for the second activity mode.

48. The non-transitory computer readable storage medium of claim 35, wherein:
selectively suppressing the first set of notifications comprises:
outputting a third set of notifications based on a first list of applications and/or a first list of people; and
suppressing notifications for applications and/or people that are not included in the first list of applications and/or the first list of people; and
selectively suppressing the second set of notifications comprises:
outputting a fourth set of notifications, different from the third set of notifications, based on a second list of applications and/or a second list of people; and
suppressing notifications for applications and/or people that are not included in the second list of applications and/or the second list of people.

49. The non-transitory computer readable storage medium of claim 35, wherein the one or more programs comprise instructions that, when executed by the computer system, cause the computer system to:
in accordance with a determination that a third activity mode is active on the computer system, display, via the display generation component, a third home screen associated with the third activity mode, wherein the third home screen is different from the first home screen and the second home screen, and selectively suppress a fifth set of notifications, different from the first set of notifications and the second set of notifications, by the computer system in accordance with settings of the third activity mode, wherein at least some of the settings for notification delivery of the third activity mode are different from the settings of the first activity mode and settings of the second activity mode.

50. The non-transitory computer readable storage medium of claim 35, wherein:
the first plurality of application user interface elements includes a first application user interface element and does not include a second application user interface element that is included in the second plurality of application user interface elements; and
the second plurality of application user interface elements includes the second application user interface element and does not include the first application user interface element that is included in the first plurality of application user interface elements.

\* \* \* \* \*